United States Patent [19]

Koopman et al.

[11] Patent Number: 4,980,821
[45] Date of Patent: Dec. 25, 1990

[54] STOCK-MEMORY-BASED WRITABLE INSTRUCTION SET COMPUTER HAVING A SINGLE DATA BUS

[75] Inventors: Philip J. Koopman, N. Kingston, R.I.; Glen B. Haydon, La Honda, Calif.

[73] Assignee: Harris Corporation, Melbourne, Fla.

[21] Appl. No.: 31,473

[22] Filed: Mar. 24, 1987

[51] Int. Cl.[5] .................. G06F 13/40; G06F 15/76; G06F 9/22
[52] U.S. Cl. .................. 364/200; 364/244.3; 364/240.1; 364/228; 364/262.8
[58] Field of Search ... 364/200 MS File, 900 MS File

[56] References Cited

U.S. PATENT DOCUMENTS

| | | | |
|---|---|---|---|
| 3,629,857 | 12/1971 | Faber | 364/200 |
| 3,757,306 | 9/1973 | Boone | 364/200 |
| 3,786,432 | 1/1974 | Woods | 364/200 |
| 3,821,715 | 6/1974 | Hoff, Jr. et al. | 364/200 |
| 4,040,033 | 8/1977 | Strutynski | 364/200 |
| 4,204,252 | 5/1980 | Hitz et al. | 364/200 |
| 4,210,960 | 7/1980 | Borgerson et al. | 364/200 |
| 4,432,050 | 2/1984 | Harris et al. | 364/200 |
| 4,654,780 | 3/1987 | Logsdon et al. | 364/200 |
| 4,674,032 | 6/1987 | Michaelson | 364/200 |
| 4,719,565 | 1/1988 | Moller | 364/200 |
| 4,745,544 | 5/1988 | Renner et al. | 364/200 |
| 4,750,108 | 6/1988 | Slavenburg | 364/200 |
| 4,835,738 | 5/1989 | Mehans et al. | 364/900 |
| 6,648,068 | 11/1987 | Ninnemann et al. | 364/900 |

OTHER PUBLICATIONS

Glen B. Haydon, "Forth Guide, An Exploration of the Intricacies of MVP-Forth", Mountain View Press, Inc., Mar. 1985.
Glen B. Haydon, "All About Forth, An Annotated Glossary", Mountain View Press, Inc., Inc., Second Edition, Mar. 1983.
Thurber et al., "A Systematic Approach to the Design of Digital Bussing Structures", Fall Joint Computer Conference, 1972, pp. 719-740.
Byte, The Small Systems Journal, Mountain View Press, Byte, Jun. 1986.
WISC Machine, Stack Oriented, WISC Tech., La Honda, 94020, 2 pages.
Microcoded Versus Hard-Wired Control, Programmable Hardware, Jan. 1987, Byte.
The Multi-Dimensions of Forth, Glen B. Haydon, La Honda, Calif., Forth Dimensions, vol. VIII, No. 3.
Action Processor Forthright, Thomas Rust, copyright 3/8/1979, Computer Tools.
Software and System Evaluation of a Forth Machine System.
System Design & Hardware Structure of a FORTH Machine System, by Wada, Kobe University, Japan 65.
Adaptive Interpretation as a Means of Exploiting Coupler Instruction Sets, by Richard Norton et al., U. of Illinois 61801.
Designated Implementation of RISC, by Sequier and Patterson, Computer Science Div., Univ. of Berkeley 94720.
Patterson, David A. et al, Sympos. Computer Architecture, 9th Ed., 1982, pp. 3-8.
Folger, David et al; Intellectual Lev. for Inform. Soc.; Spring 1987, pp. 25-31.

(List continued on next page.)

Primary Examiner—Thomas C. Lee
Attorney, Agent, or Firm—Edward B. Anderson

[57] ABSTRACT

A computer is provided as an add-on board for attachment to a host computer. Included are a single data bus, a 16-bit arithmetic logic unit, a data stack, a return stack, a main program memory, data registers, program counters, microprocessor memory, and microinstruction register. Each stack has a pointer which may be set without altering the contents of the respective stacks. The main program memory has a direct connection to the writable microprogram memory for providing instruction. MVP-FORTH is used for programming a microcode assembler, a cross-compiler, a set of diagnostic programs, and microcode.

2 Claims, 30 Drawing Sheets

OTHER PUBLICATIONS

Larus, James, Comp. Arch. News., vol. 10, No. 5, pp. 10–15.

μ3L, An HLL-RISC Processor for Parallel Execution, by M. Castan & Organick Dept. of Comp. Science, Un. of Utah.

Koopman, Jr., *Stack Computers-the New Wave*, 1989.

Kaneda, Wada and Maekawa, "High-Speed Execution of Forth and Pascal Programs on a High-Level Language Machine", 1983, pp. 259–266, *Microcomputers: Development in Industry, Business and Education.*

Grewe and Dixon, "A Forth Machine for the S-100 System", The Journal of Forth Application and Research Volume, No. 1, 1984, pp. 23–32.

A. C. D. Haley, "The KDF.9 Computer System", *AFIPS Conference Proceedings*, vol. 22, 1962 Fall Joint Computer Conference, pp. 108–120.

STOCK-MEMORY-BASED WRITABLE INSTRUCTION SET COMPUTER HAVING A SINGLE DATA BUS

BACKGROUND AND SUMMARY OF THE INVENTION

This invention relates to general purpose data processors, and in particular, to such data processors having a writable instruction set with a hardware stack.

Since the advent of computers, attempts have been made to make computers smaller, with increased memory and with faster operation. Recently, minicomputers and microcomputers have been built which have the memory capacity of original mainframe computers. Most of these computers are referred to as "complex instruction set" computers. Because of the use of complex instruction sets, these computers tend to be relatively slow in operation as compared to computers designed for specific applications. However, they are able to perform a wide variety of programs because of their ability to process instruction sets corresponding to the source programs run on them.

More recently, "reduced instruction set" computers have been developed which can execute programs more quickly than the complex instruction set computers. However, these computers tend to be limited in that the instruction sets are reduced to only those instructions which are used most often. Infrequently used instructions are eliminated to reduce hardware complexity and to increase hardware speed. Such computers provided limited semantic efficiency in applications for which they were not designed. The large semantic gaps cannot be tilled easily. Emulation of complex but frequently used instructions is always a less efficient solution and significantly reduces the initial speed advantage. Thus, such computers provide limited general applicability.

The present invention provides a computer having general purpose applicability by increasing flexibility while providing substantially improved speed of operation by minimizing complexity, as compared to conventional computers. The invention provides this in a way which uses simple, inexpensive, and commonly available components. Further, the invention minimizes hardware and software tool costs.

More specifically, the present invention provides a computer having a main program memory, a writable microprogram memory, an arithmetic logic unit, and a stack memory all connected to a single common data bus. In a preferred embodiment, this invention provides a computer interface for use with a host computer. Further, more specifically, both a data stack and a subroutine return stack are provided, each associated with a pointer which may be set to any element in the corresponding stack without affecting the contents of the stack. Further, there is a direct communication link between the main program memory and the microprogram memory which is separate from the data bus. This provides overlapped instruction fetching and execution. The data high input to the ALU can be used as a register serving as the top of the stack but it is not necessary. By user determined convention the DHI register is designated as the top of the stack. Other computer architectures must designate a register as the top of the stack and usually dedicate a register as such.

Additionally, an instruction set is preferably coded using a plurality of bits in a selected pattern for denoting a microcoded primltive, as opposed to a procedure call in order to increase the amount of addressable memory. The use of an operations code value as a page address into microprogram memory serves a double function allowing the computer to run more efficiently. A writable microprogram memory allows the computer to be run using various lanquages and for different applications. An identical parameter passing mechanism is used for both subroutines and microcoded primitives. This means that a subroutine can be transparently replaced with a microcoded primitive with no impact on other software.

The unique combination of simple hardware linked with hardware stacks leads to a general purpose computer design with an increased efficiency of instruction execution. The user microprogramability of a writable instruction set optimized to application requirements leads to increased semantic content for the instruction set. The combination of these two features leads to increased processor throughput at any specified clock speed when compared to that possible with conventional complex instruction set computers (CISC) and reduced instruction set computers (RISC).

It will be seen that such a computer offers substantial optimization of throughput while maintaining flexibility. These and other advantages and features of the invention will be more clearly understood from a consideration of the drawings and the following detailed description of the preferred embodiment.

BRIEF DESCRIPTION OF THE DRAWINGS

Referring to the associated sheets of drawings.

DETAILED DESCRIPTION OF THE PREFERRED EMBODIMENT

System Hardware

Figure 1A:
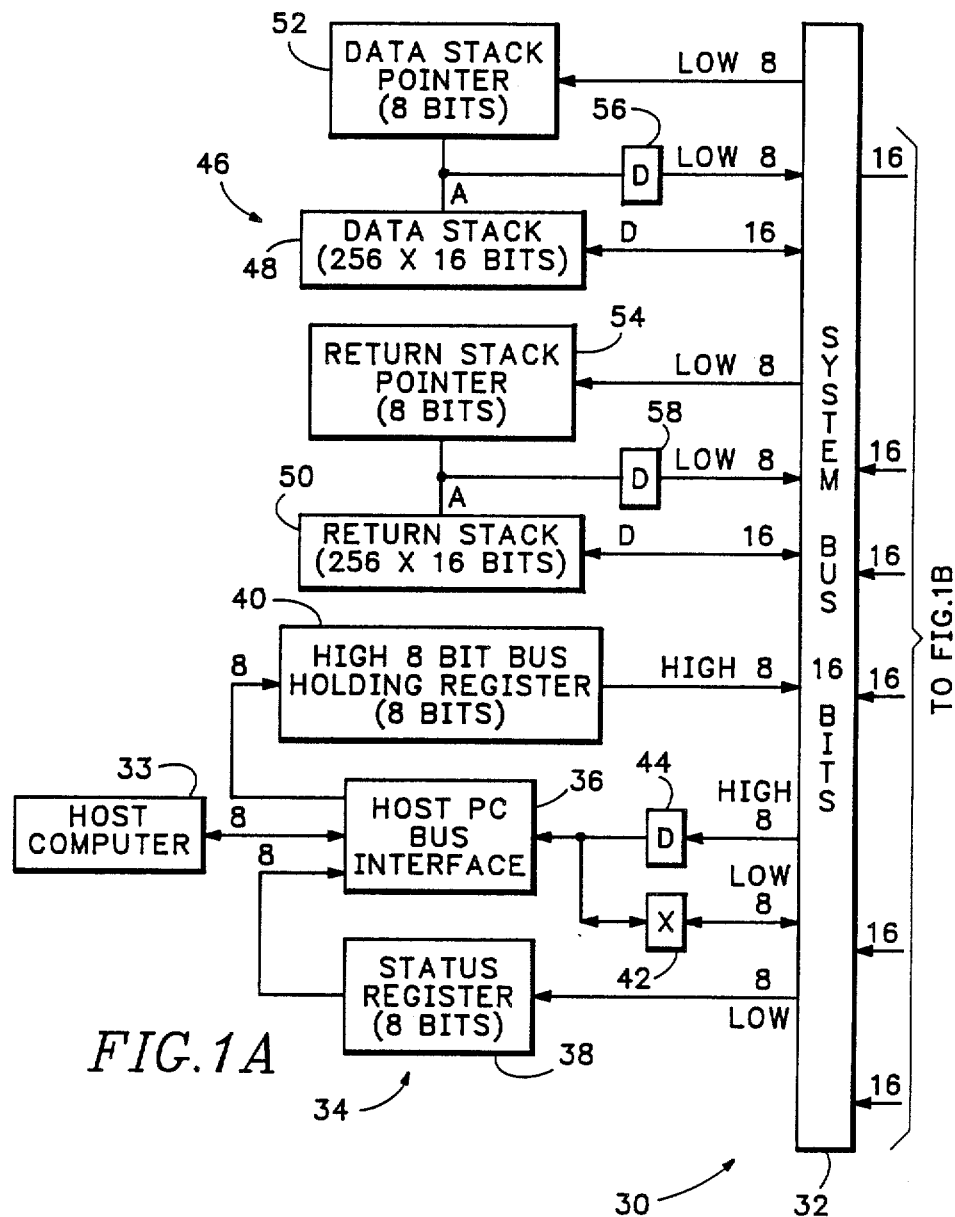
FIGS. 1A and 1B together is a system block diagram showing a preferred embodiment made according to the present invention.
Figure 1B:
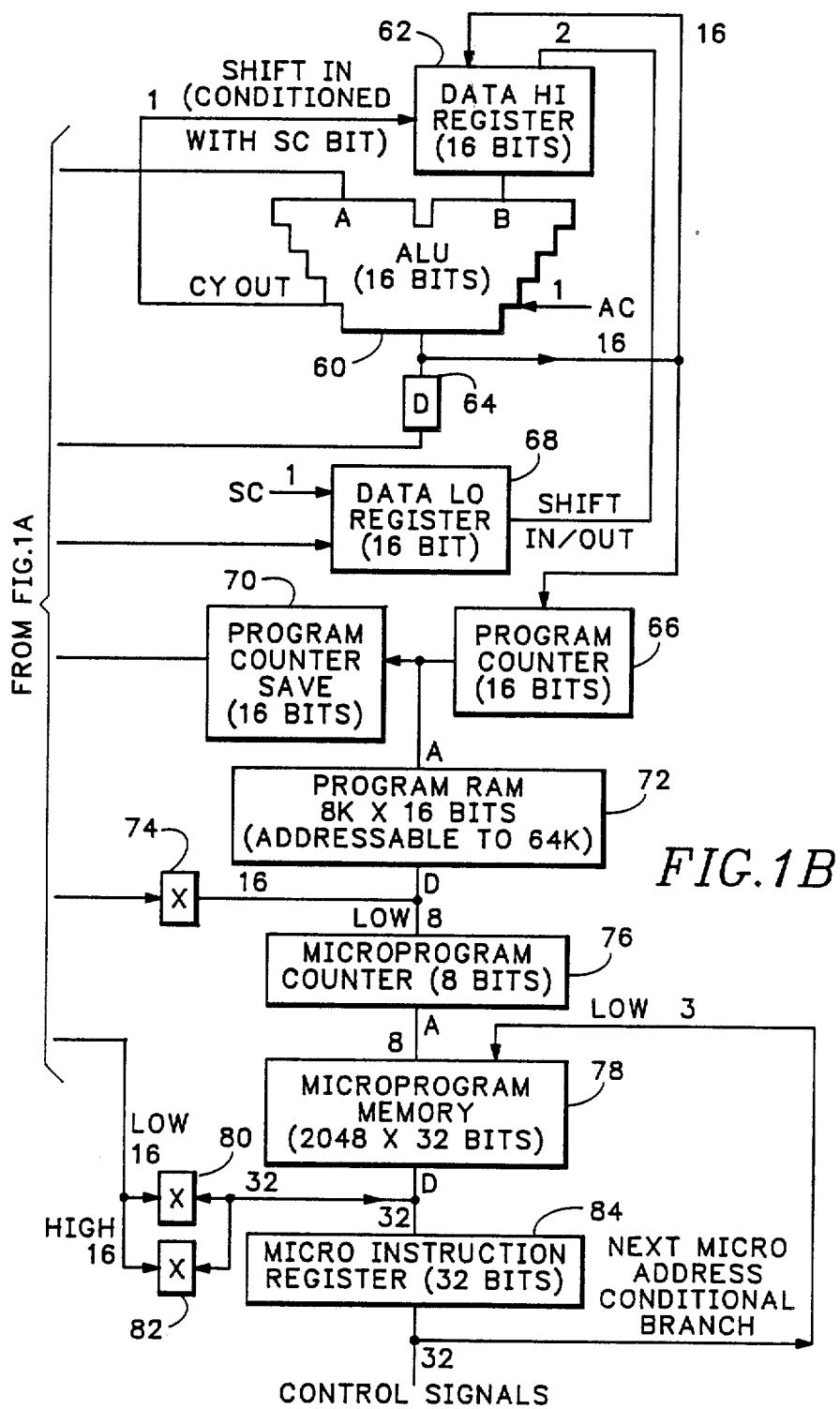

Referring initially to FIGS. 1A and 1B, a system overview of the hardware of a writable instruction set computer 30 made according to the present invention is shown. Computer 30 includes a single 16-bit system databus 32. An interface assembly 34 is coupled to bus 32 for interfacing with a host computer 33, which in the preferred embodiment is an IBM PC/XT/AT, made by International Business Machines, Inc., or equivalent personal computer. Assembly 34 includes a bus interface 36, a status register 38, and a high 8-bit bus-holding register 40. Interface 36 is joined to bus 32 by an eight-bit transceiver 42, as well as by a transmitter 44 connected to provide the high eight bits from the bus to the interface.

Memory stack means, shown generally at 46, are provided in the form of a data stack 48 and a return stack 50. Each stack has an associated pointer. Specifically, a data stack pointer 52 is associated with data stack 48 and a return stack pointer 54 is associated with return stack 50. As can be seen, each pointer receives as input the low eight bits from bus 32 and has its output connected to the address input of the corresponding stack, as well as through a transmitter 56 or 58 to bus 32.

A sixteen-bit arithmetic logic unit (ALU) 60 has its A input connected to bus 32 and its B input connected to a data high register (DHI) 62. The output of ALU 60 is connected through a transmitter 64 to bus 32, to an input to register 62 and to a program counter 66. A data low register (DLO) 68 is connected via a bidirectional path to bus 32 and its shift in/out signals are connected to data high register 62.

The address output of program counter 66 is connected to bus 32 through a program counter save register 70, as well as to a main program random access memory 72. As will be seen, memory 72 may be provided as a basic 8K×16 bits addressable memory, or as an expanded 64K addressable memory as is provided in this preferred embodiment. The data output of memory 72 is connected in a bidirectional path to bus 32 through a transceiver 74. The eight low bits of the data from memory 72 is coupled through decoding circuitry not shown to a microprogram counter 76.

Microprogram counter 76 generates an 8-bit address which is coupled to a microprogram memory 78 having a capacity of 2K×32 bits. The data output of micromemory 78 is connected via a bidirectional path to bus 32 through low and high transceivers 80, 82. Micromemory 78 data output is also connected to a microinstruction register 84 for producing 32-bit control signals. The low three bits of the next micro instruction address are generated from a combination of the microaddress constant inputs and decoding of the condition select field to allow for conditional branching.

The detailed schematics of the various integrated circuits forming computer 30 are shown in FIGS. 2-19. Other than to identify general features of these circuits, they will not be described in detail, the detail being ascertainable from the drawings themselves. However, some general comments are in order.

Computer 30 is designed for construction on two boards which take two expansion slots in a personal computer. It is addressed with conventional 8088 microprocessor IN and OUT port instructions. It uses 16-bit data paths and 32-bit horizontal microcode, and operates on a jumper selectable microinstruction cycle period which is preferably set at 280 ns, most of the logic is the 74LS series. The ALU is composed of several 74LS181 with carry-lookahead logic. All memory chips are 8-bit low-power 150 ns static CMOS. Since simple primitives are only two clock cycles long, this gives a best case operating speed of 1.6 million basic stack operations per second (MOPs). In actual programs, the average promotive used will probably be three clock cycles in length, exclusive of complex microinstructions such as multiplication, division, block moves and block fills yielding an operational speed of approximately 1.1 MOPs. Variable benchmarks have shown speed increases of 20-30 times over an 8088 running MVP-FORTH. A subroutine call takes only 560 ns, a subroutine return takes only 840 ns. Decoding the next macroinstruction usually takes no additional time at all. Although instruction decoding requires a 2-cycle minimum on a microcode word definition, through pipelining it usually takes n additional time.

The Host Interface

Figure 2:
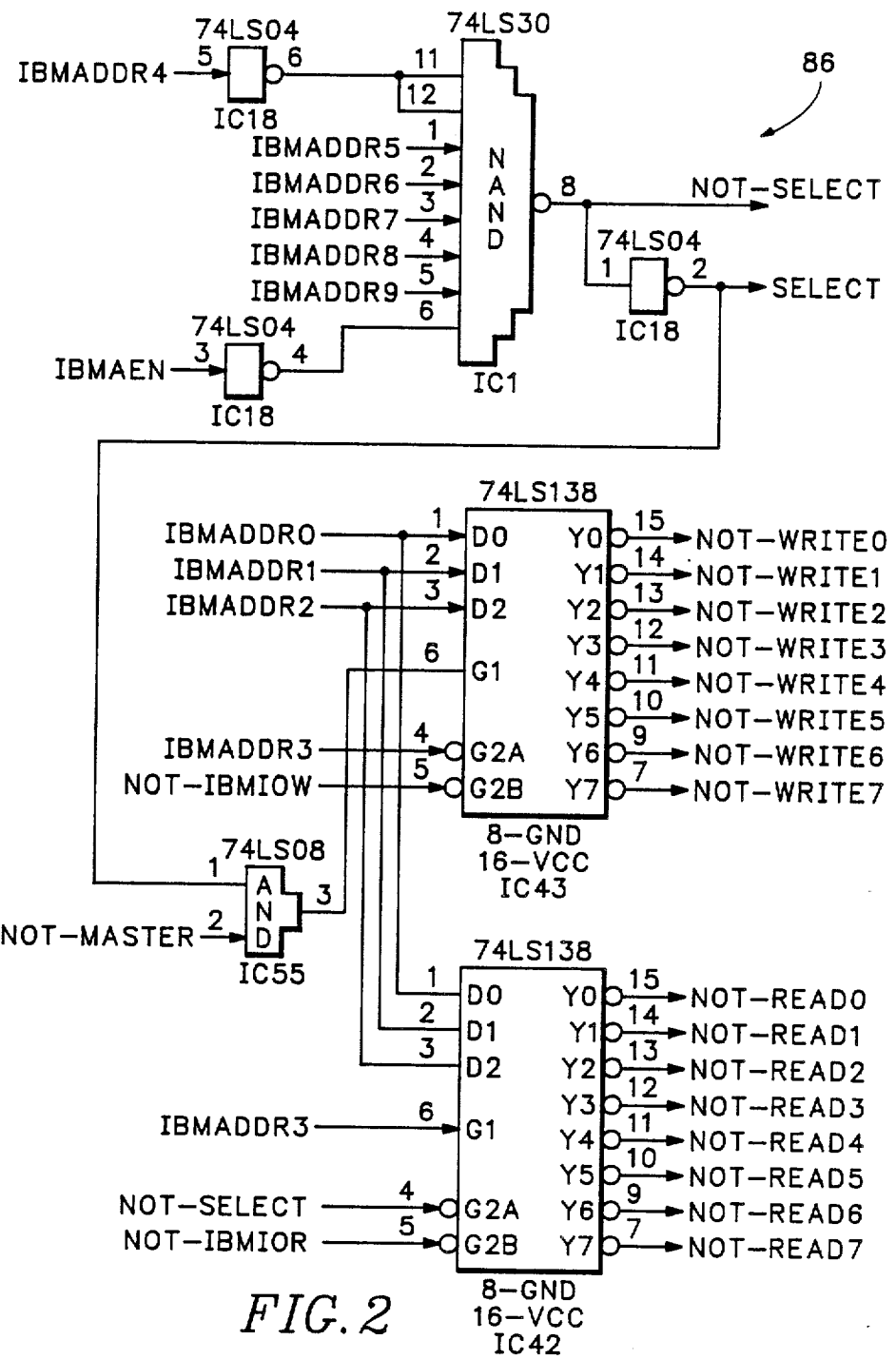
FIG. 2 is a scematic showing the host address decoding logic portion of the host computer interface.
Figure 3:
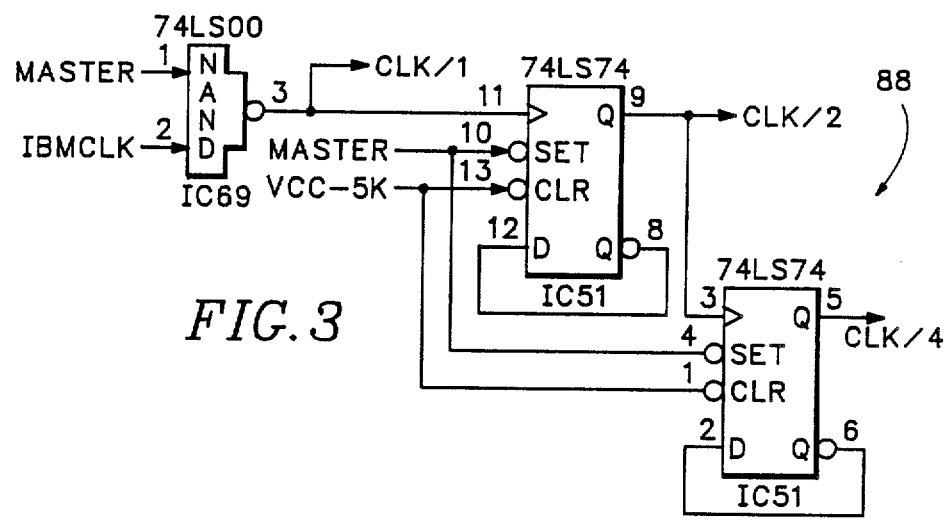
FIG. 3 is a schematic showing the general clock generation circuitry.
Figure 4:
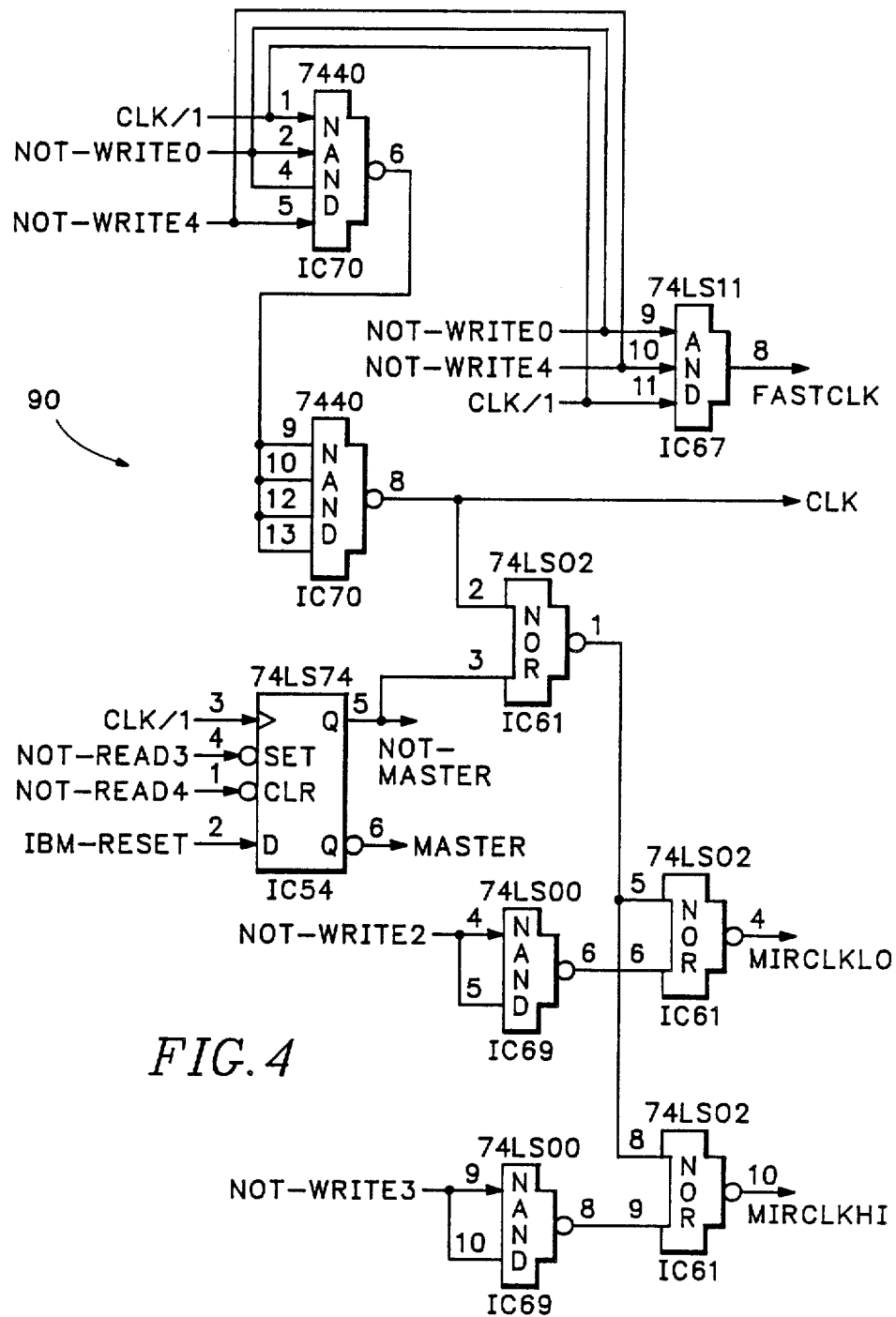
FIG. 4 is a schematic showing generaton of system and microinstruction register clocks.
Figure 5A:
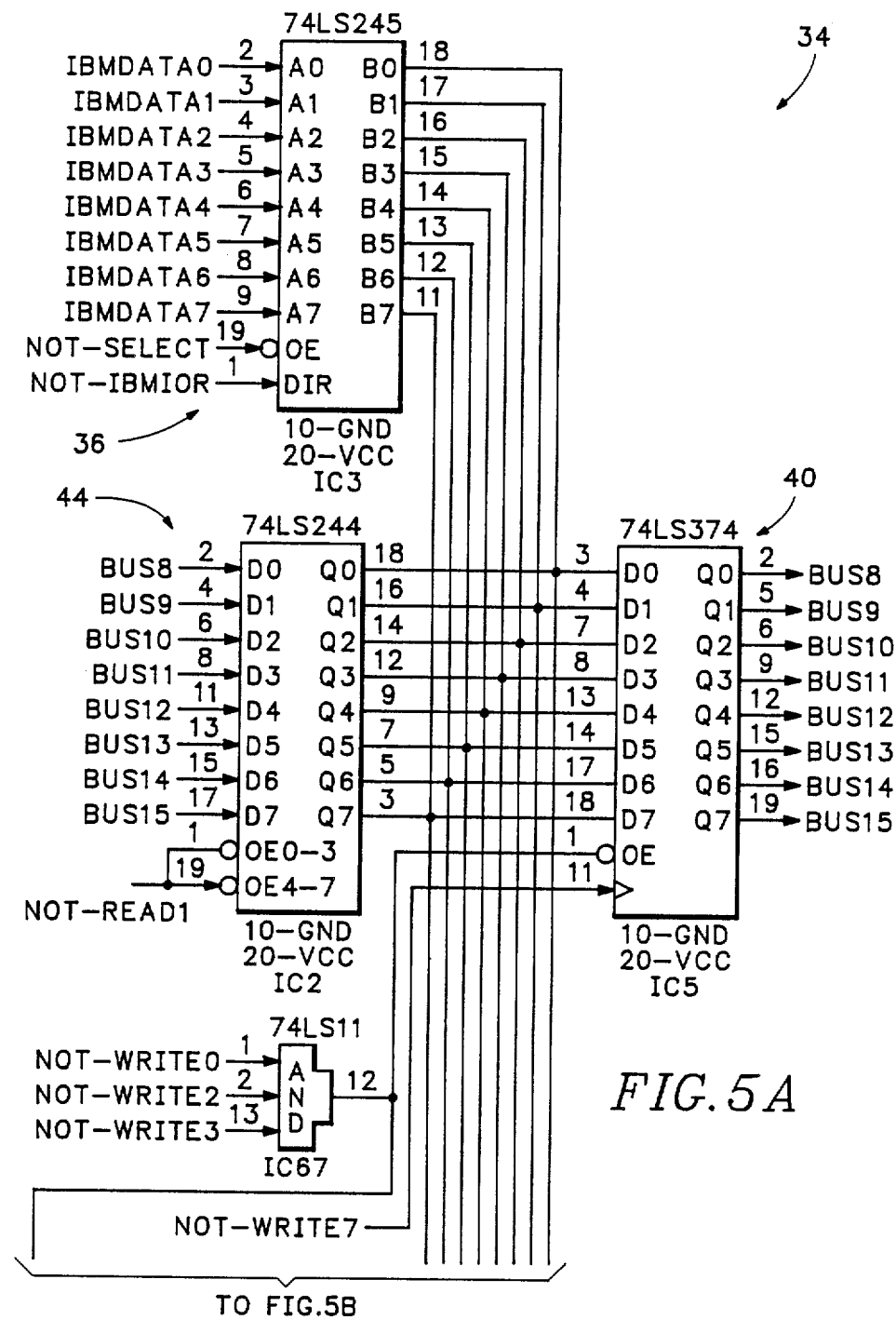
FIGS. 5A and 5B together is a schematic showing the data path portions of the host interface.
Figure 5B:
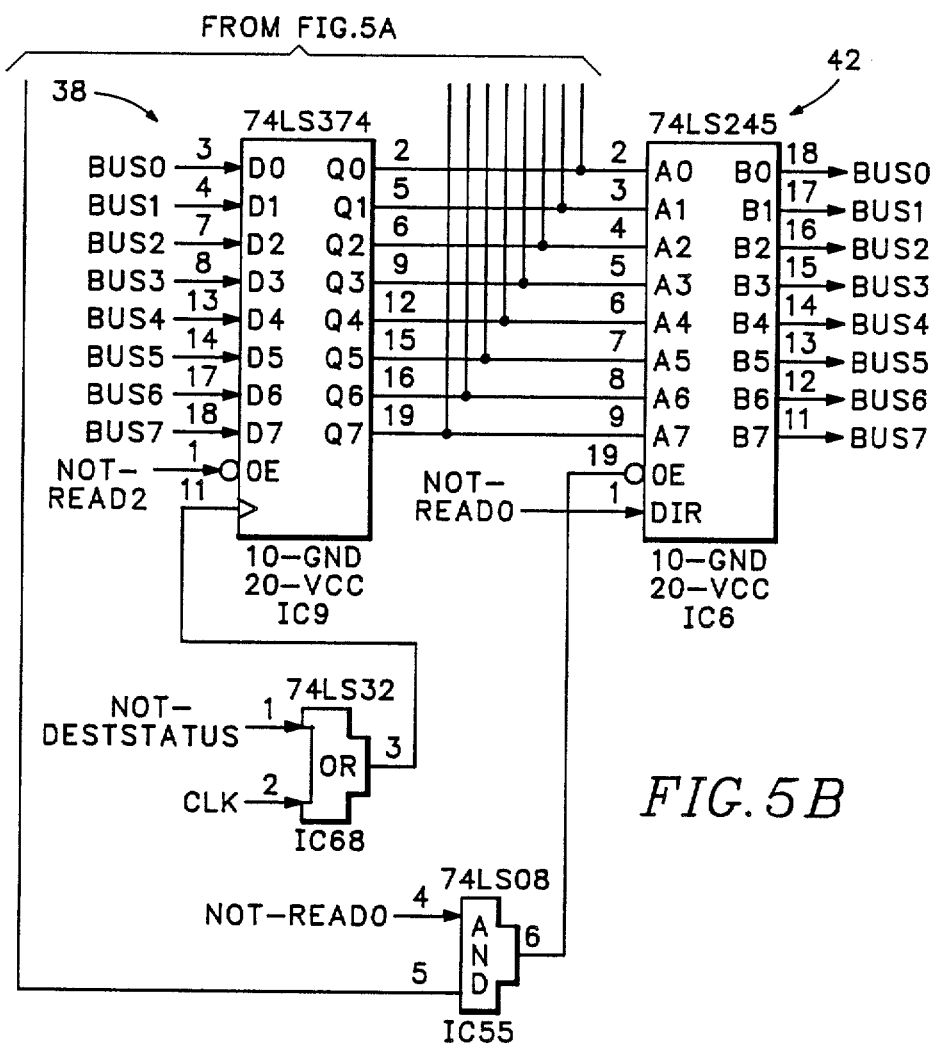

Referring initially to FIGS. 2-5, the host computer interface logic and decoding circuitry is shown generally at 86 in FIG. 2. This is part of the logic of interface assembly 34. FIG. 3 shows a clock generation circuit 88. FIG. 4 shows a Master/Slave mode flip-flop 90 which, is generated for the microinstruction register clock. FIGS. 5A and 5B show the detailed connections associated with the interface assembly 34. It should be noted that clock 4 gives an 820 ns clock cycle. Various clock rates derived from the host computer oscillator are selectable. If desired pin 1 of IC 70 and pin 11 of IC 67 can be connected to clock 1 instead of clock 1 for development purposes. However, clock 1 provides the 280 ns derived from the oscillator of host computer 33.

As mentioned previously, in the preferred configuration, computer 30 is designed to work as a double-board attachment to a standard IBM PC/XT/AT or equivalent personal computer as host computer 33. Minor design changes of the host bus interface 36 would make possible the use of a variety of other makes of host computers. The computer 30 derives its clock from the host clock oscillator. The boards have two modes: Master and Slave. In Slave mode the board's clock is stopped. The board waits for IN and OUT commands in the 8088 to feed it information or read information out of the board. In Master mode, the board's clock cycles as selected, and the 8088 can only use IN commands to monitor the status of the board or to switch back to Slave mode. The board responds to port addresses 3E0 through 3EF hex.

Ports 3E0 through 3E7 are the "WRITE" ports that respond to 8088 OUT commands. They are ignored by the board while in Master mode. In Slave mode they allow writing microinstructions to the board's microinstruction register, cycling the board's clock for one clock cycle and writing to registers or memory on the board.

Of special interest is the use to port 3E1. This port writes 8 bits of data into a holding register on the board. When ports 3E0, 3E2, or 3E3 are later written with the low order 8 bits of data, the holding register is used to access the high order 8 bits of data for a 16-bit destination on the board. The holding register is not cleared after use, so it need only be set once if a series of byte values is being written to the board.

Ports 3E2 and 3E3 allow the host computer to directly set the contents of the microinstruction register (MIR) 84 without affecting micromemory. This allows direct control of the resources of computer 30 by the host computer. An instruction may be written to the MIR and then executed in single-step fashion by cycling the clock of computer 30 with port 3E4. The MIR contents are NOT clocked in from micromemory by this clock cycling. This single-step mode of operation is useful during program development and debugging. Also, by setting up the MIR with an appropriate SOURCE= or DEST= (mnemonics used in the microassembler provided), any resource of computer 30 that can be connected to the bus may be read from or written to computer 30 via ports 3E0, 3E1 3E8 and 3E9.

Ports 3E8 through 3EF are READ ports that may be used at any time by the host. Ports 3E8 and 3E9 directly read whatever is on the data bus 32. This is useful primarily when single-stepping a microprogram or when loading or saving data from the resources of computer 30 before or after a run in master mode.

Port 3EA is the most used read port. It directly reads the contents of status register 38, even while in Master mode. The status register is used as a signal from computer 30 to request services while in Master mode. Typically, a 0 value in status register 38 means no request is active, while any other value is a request to return to Slave mode and perform the services desired. A host program will typically idle until the status register is non-zero, perform requested I/O services, then return computer 30 to Master mode to continue program execution. A considerable amount of concurrency in I/O operation is possible between computer 30 and host 33, since the host may pre-fetch data that is likely to be needed while waiting for computer 30 to request it, and may restart computer 30 before saving/displaying information that computer 30 has given it.

Port 3EB sets Slave mode in computer 30 while port 3EC sets Master mode. Computer 30 cannot control these modes itself, so the host must set Slave mode before servicing an I/O request. Computer 30 is set to Slave mode when the host power-on reset is activated.

The ALU and DHI Register

Figure 6A:
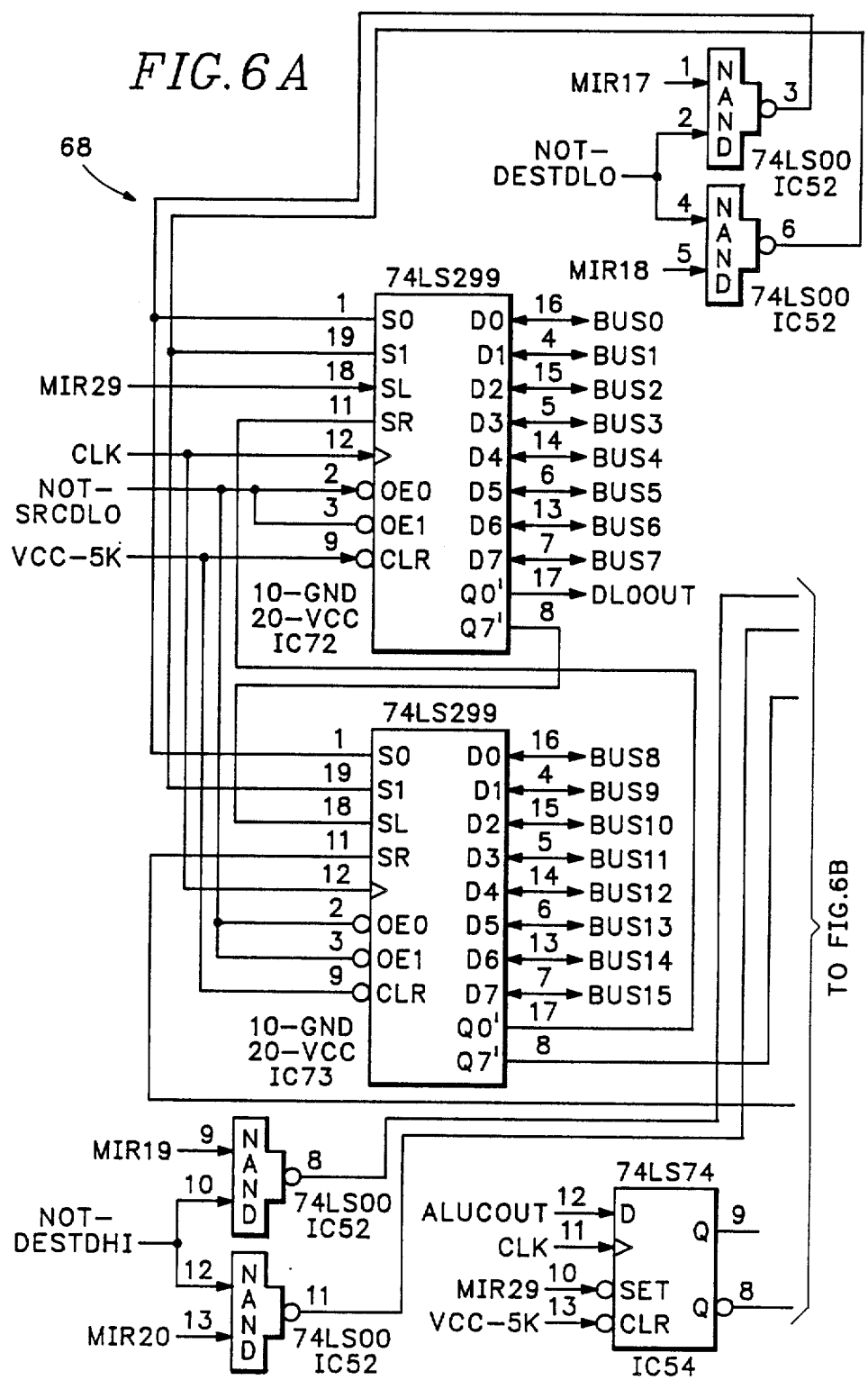
FIGS. 6A and 6B together is a schematic showing the registers configured to act as either two independent 16-bit registers or a single 32-bit shift register under microcode control.
Figure 6B:
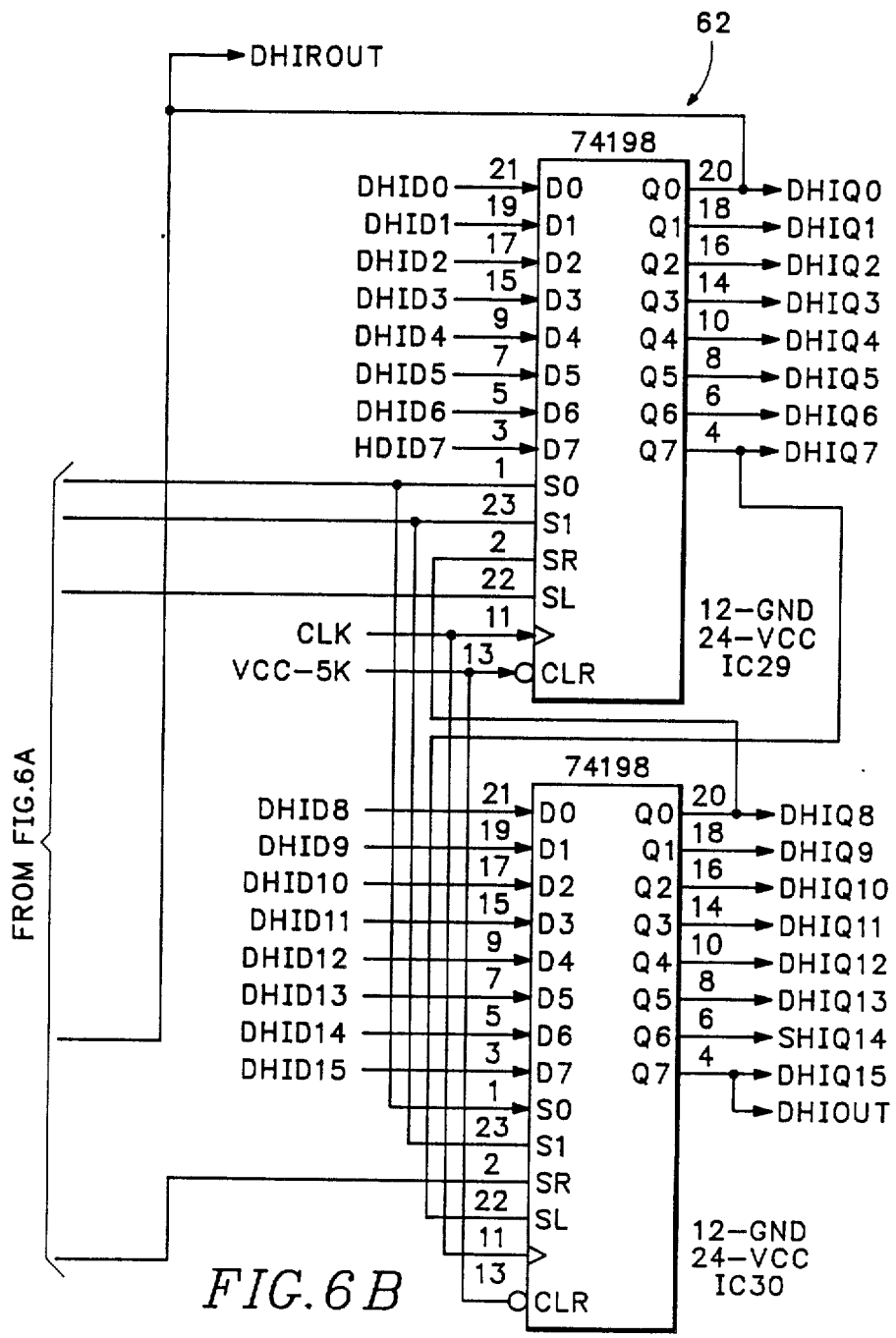
Figure 7:
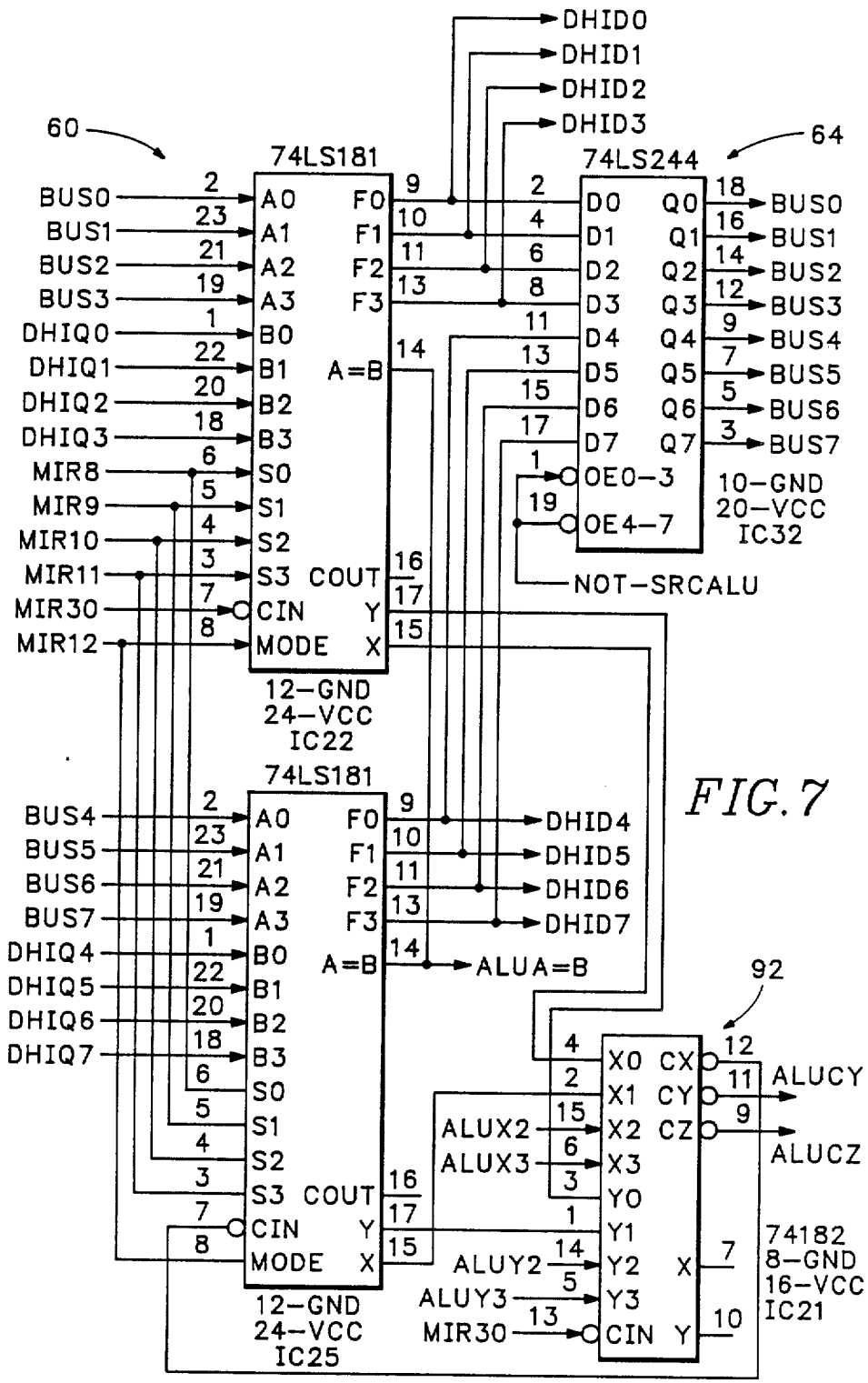
FIG. 7 is a schematic showing the low 8 bits of the ALU.
Figure 8:
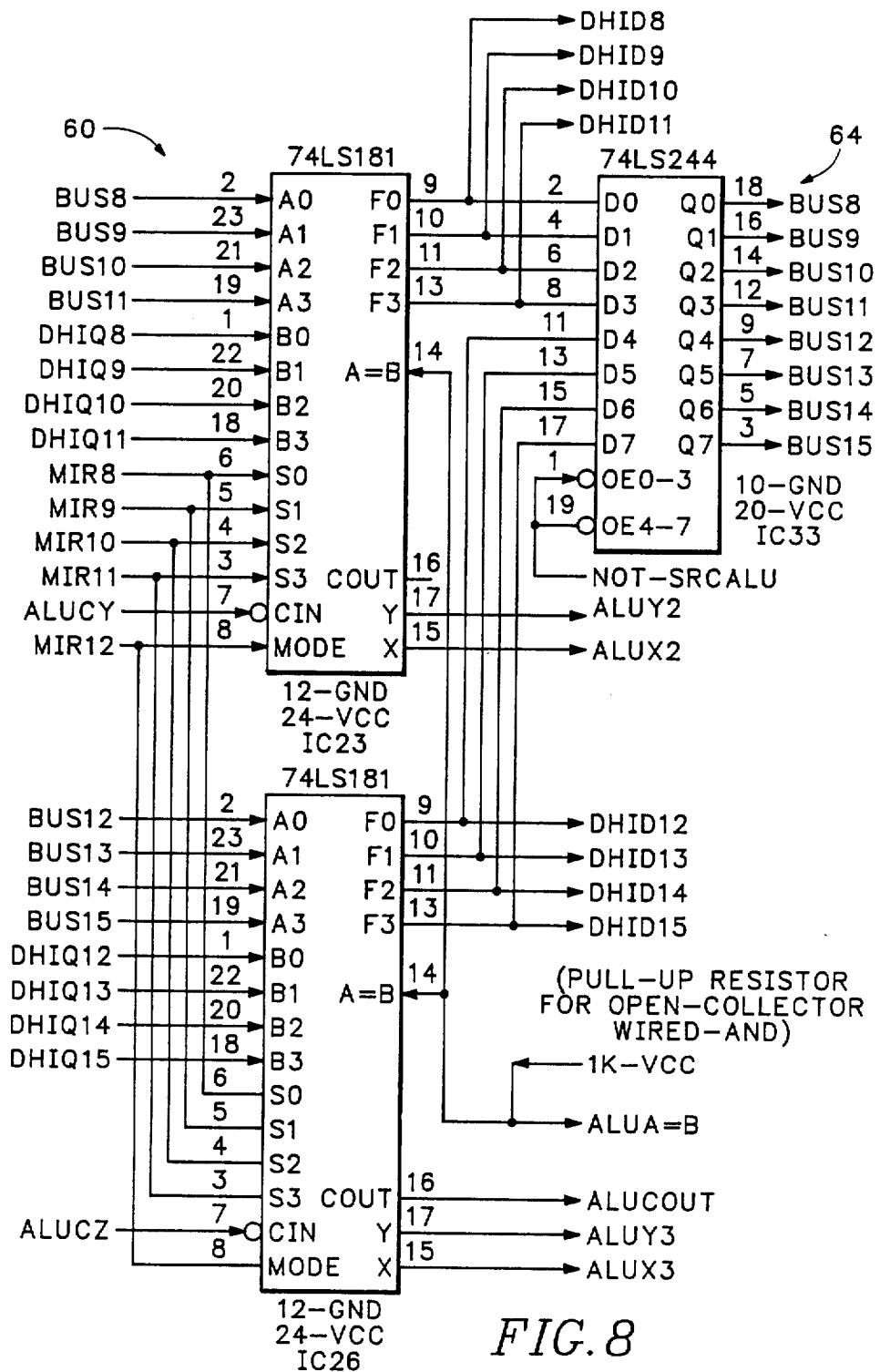
FIG. 8 is a schematic showing the high 8 bits of the ALU.

FIGS. 6A and 6B show data low and high registers 62 and 68. FIGS. 7 and 8 show ALU 60, including a carry look-ahead generator 92, as well as an ALU-to-bus transmitter 64.

The board uses a full 16-bit ALU 60 with carry-lookahead generation to allow reading from any source on the board, routing the data through the ALU, and writing the results to data high register (DHI) 62. Alternatively, DHI may be read through the ALU and written anywhere on the board in a single clock cycle.

ALU 60 is made from 74LS181 chips. Although the chip supports 48 functions only 20 of them are of any use in normal applications. The A side of the ALU is wired to data bus 32. The B side is wired to DHI 2. The output of the ALU may be sent to the data bus, DHI, or program Counter 66. Care should be taken not to use the A side of the ALU for function generation when a SOURCE=ALU statement is used.

The DHI and DLO Registers

In addition to supplying a second operand for ALU functions, the DHI register acts as the top half of a 32-bit shift register. Data low register (DLO) 68 acts as the bottom half of the same 32-bit shift register. The 32-bit shifting is primarily of use in multiplication, division, and floating point normalization.

DHI and DLO may be shifted independently of each other. The low-bit shift in when shifting DLO to the left is the Shift Carry bit set by the SC=0/SC=1 microoperation. The high bit shifted into DLO when shifting right is the current low-bit of DHI (whether DHI is being shifted or not). The low bit shift into DHI is the value of the highest bit in DLO (whether DLO is being shifted or not). The high bit shift into DHI is a little tricky. If SC=1 (the default value), then the shift in the DHI is the ALU carry-out value from the last clock cycle. This value will be 1 unless an ALU operation involving a "+" or a "−" was performed on the last clock cycle. If SC=0, the shift into the high bit of DHI will be 0 for the current clock cycle AND the NEXT clock cycle, regardless of ALU carry-out values or the SC= value in the next microinstruction.

DLO and DHI shifted results are not seen at their outputs until the end of the microcycle, so the old value may be used in an instruction at the same time a shift is occurring. Note that this property of the chips used prevents shifting a value in DHI 62 sending it through ALU 60 in the same clock cycle as called for by multiplication algorithms.

The Return and Data Stacks

Figure 9:
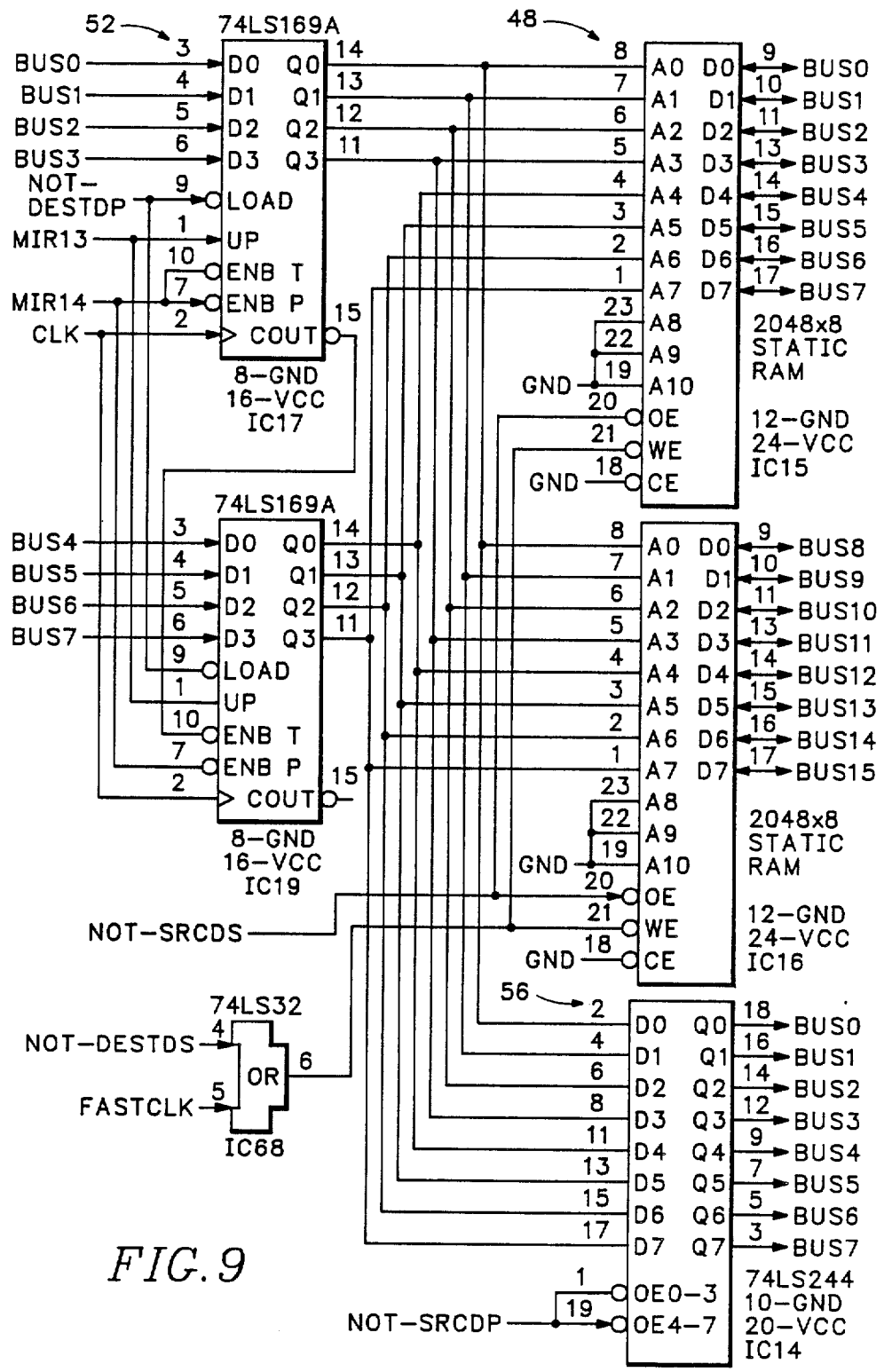
FIG. 9 is a schematic showing the data stack pointer and return stack memory.
Figure 10:
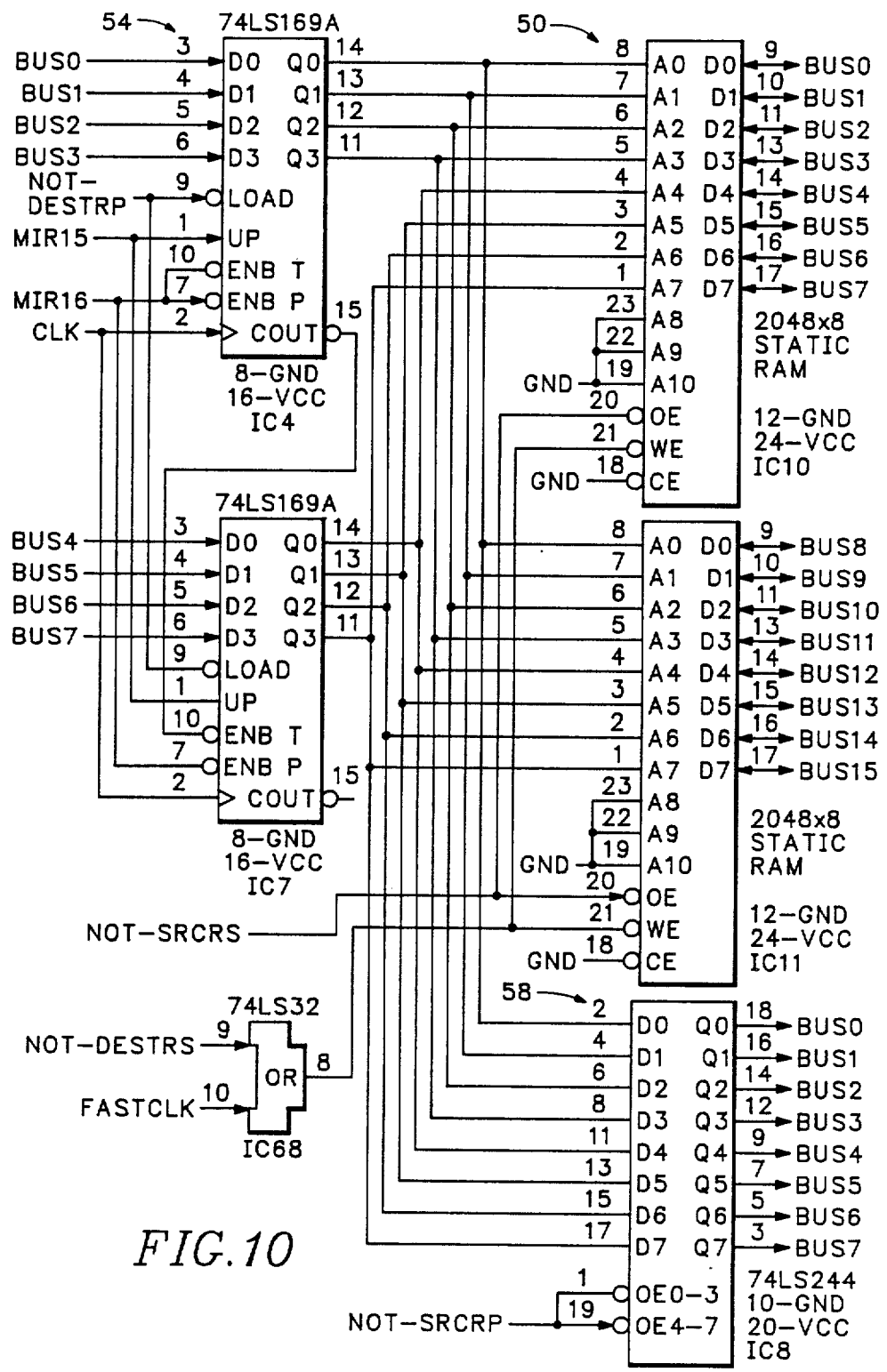
FIG. 10 is a schematic showing the return stack pointer and return stack memory.

FIGS. 9 and 10 show the two hardware stacks, return stack 50 and data stack 48. These stacks are associated with data stack pointer 52 and return stack pointer 54. The hardware implementation of the two stacks is identical, so only the data stack will be discussed.

Data stack 48 is a 256-element by 16-bit LIFO stack. It has an 8-bit dedicated stack pointer 52 that may be incremented or decremented concurrently with other operations in microcode. The data stack pointer is incremented/decremented at the end of the microinstruction, so a value may be read from the current data stack location in a microinstruction, the pointer may be changed, and the value of the new location will be ready in time for the next microinstruction. Changing the value of the stack pointer does not destroy stack contents, so the pointer may be changed to access buried stack values without loss of information, as long as it is properly restored in time for the next normal stack access.

The current microcode implementation leaves the return pointer pointing to the top-most element of the return stack, while the data stack pointer points to the second element of the data stack. By convention, we have always placed the top of the stack in Data High register 62 connected to ALU 60 at the end of each instruction.

The program Counter

Figure 11A:
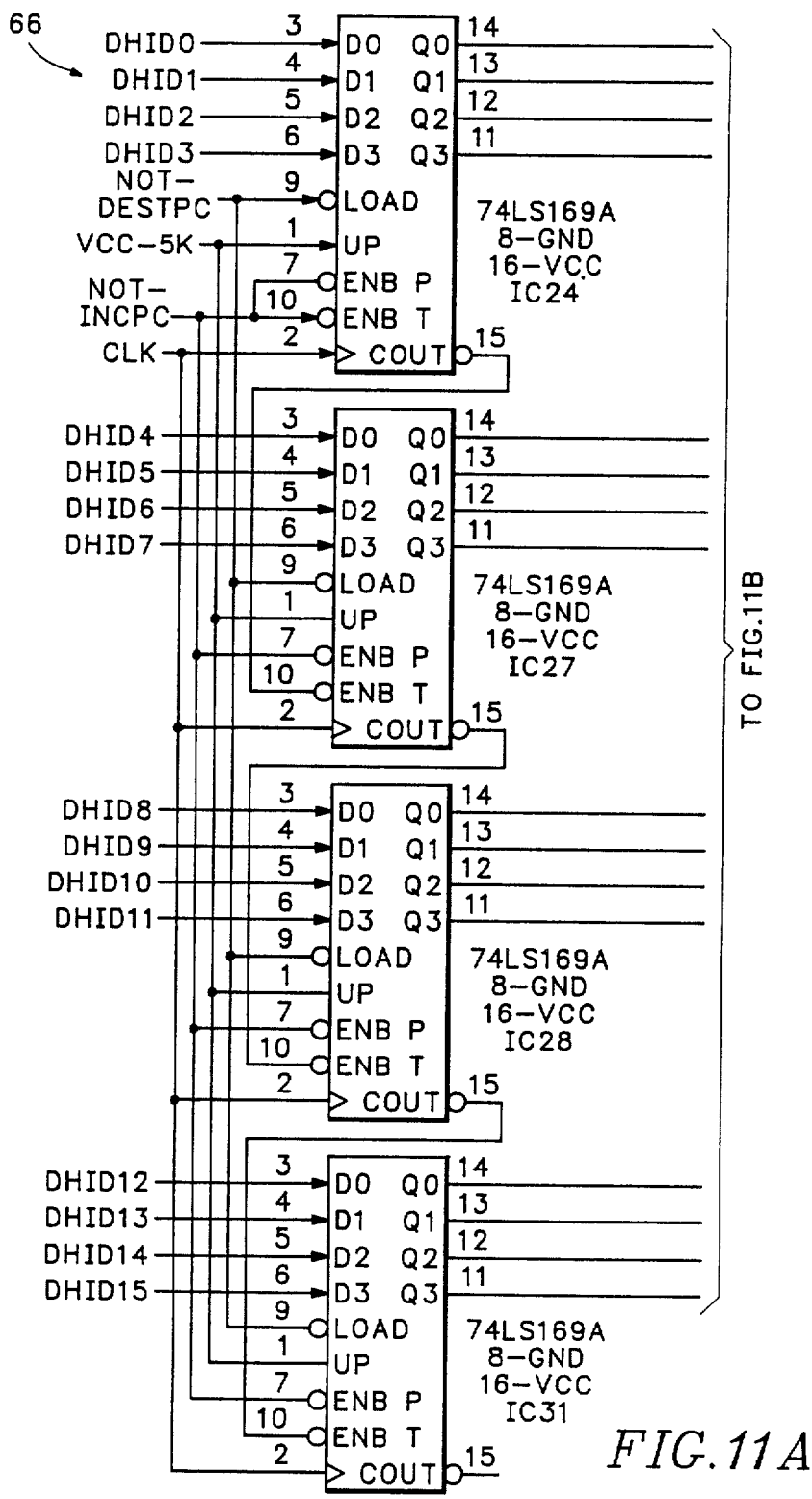
FIGS. 11A and 11B together is a schematic showing the program counter.
Figure 11B:
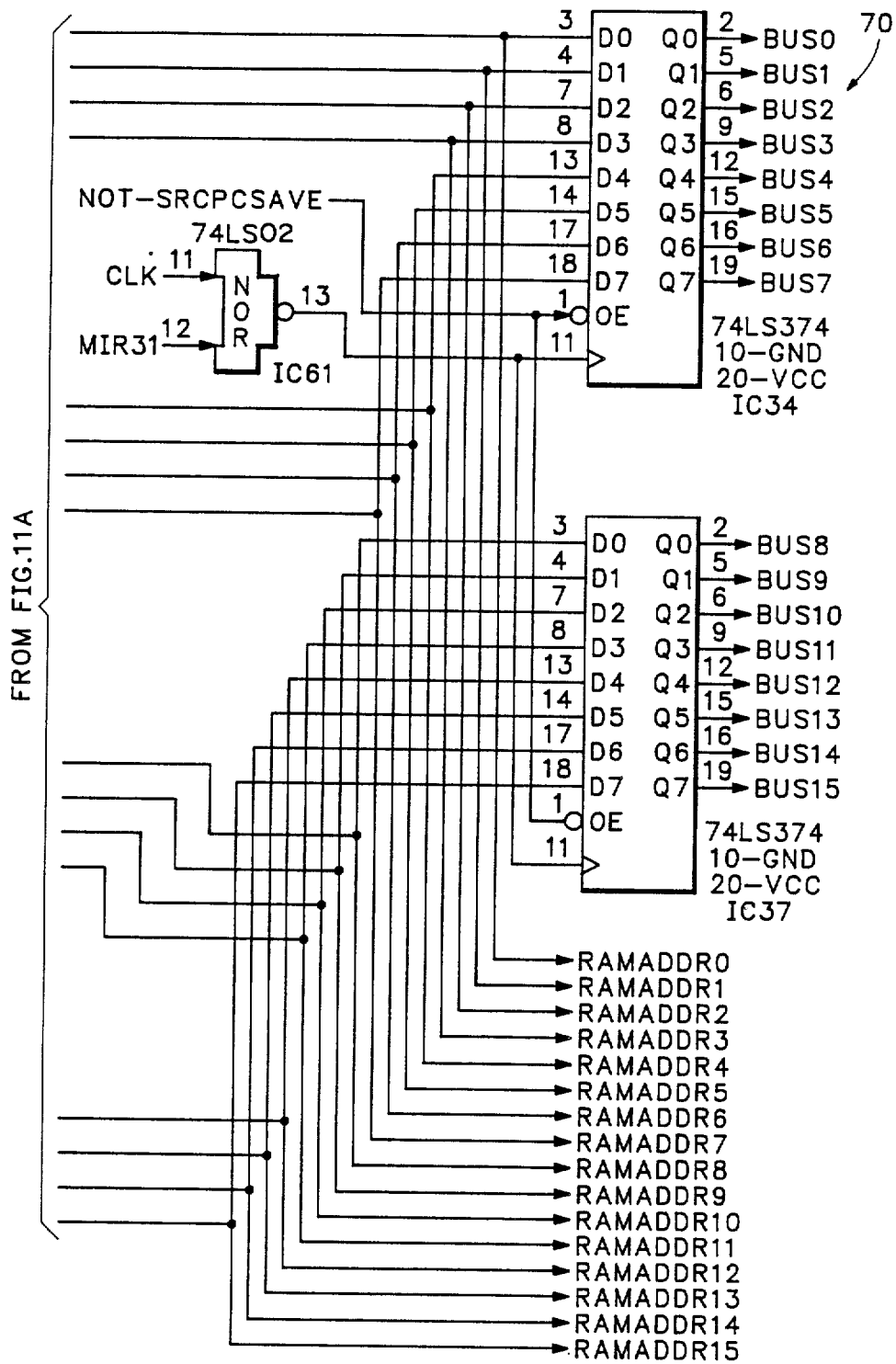
Figure 12A:
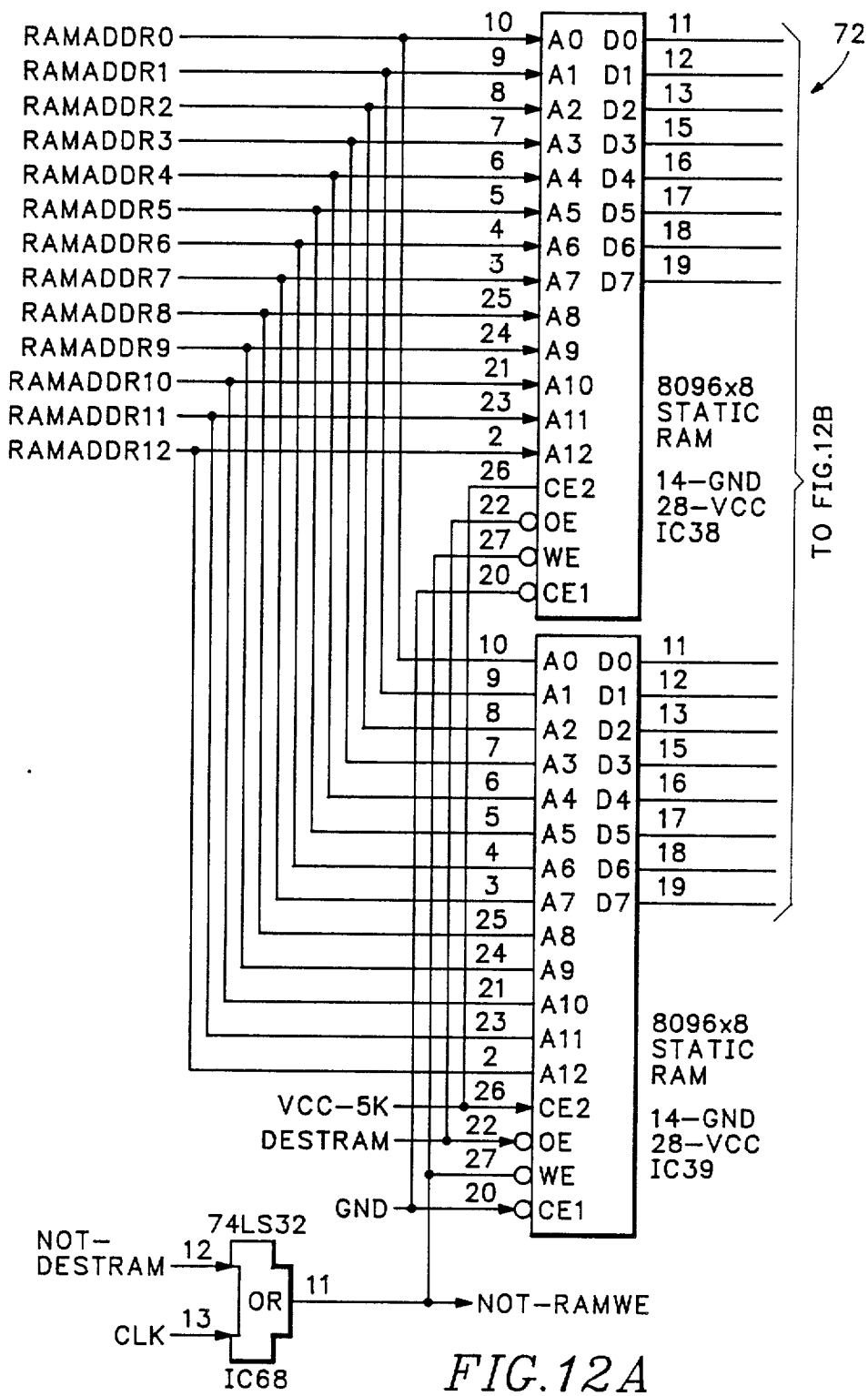
FIGS. 12A and 12B together is a schematic showing the program memory interface to the data bus and the first bank of memory chips.
Figure 12B:
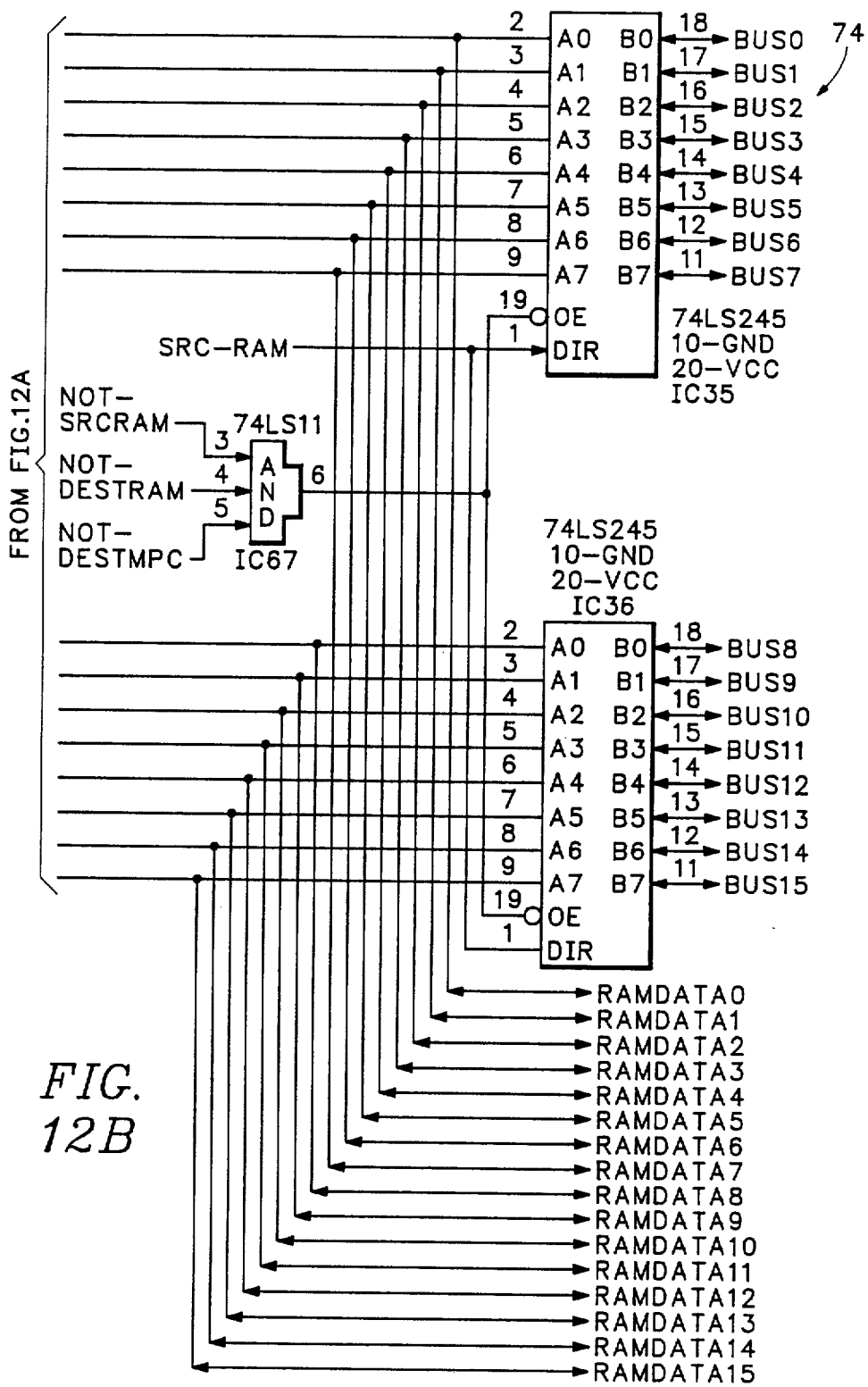
Figure 13A:
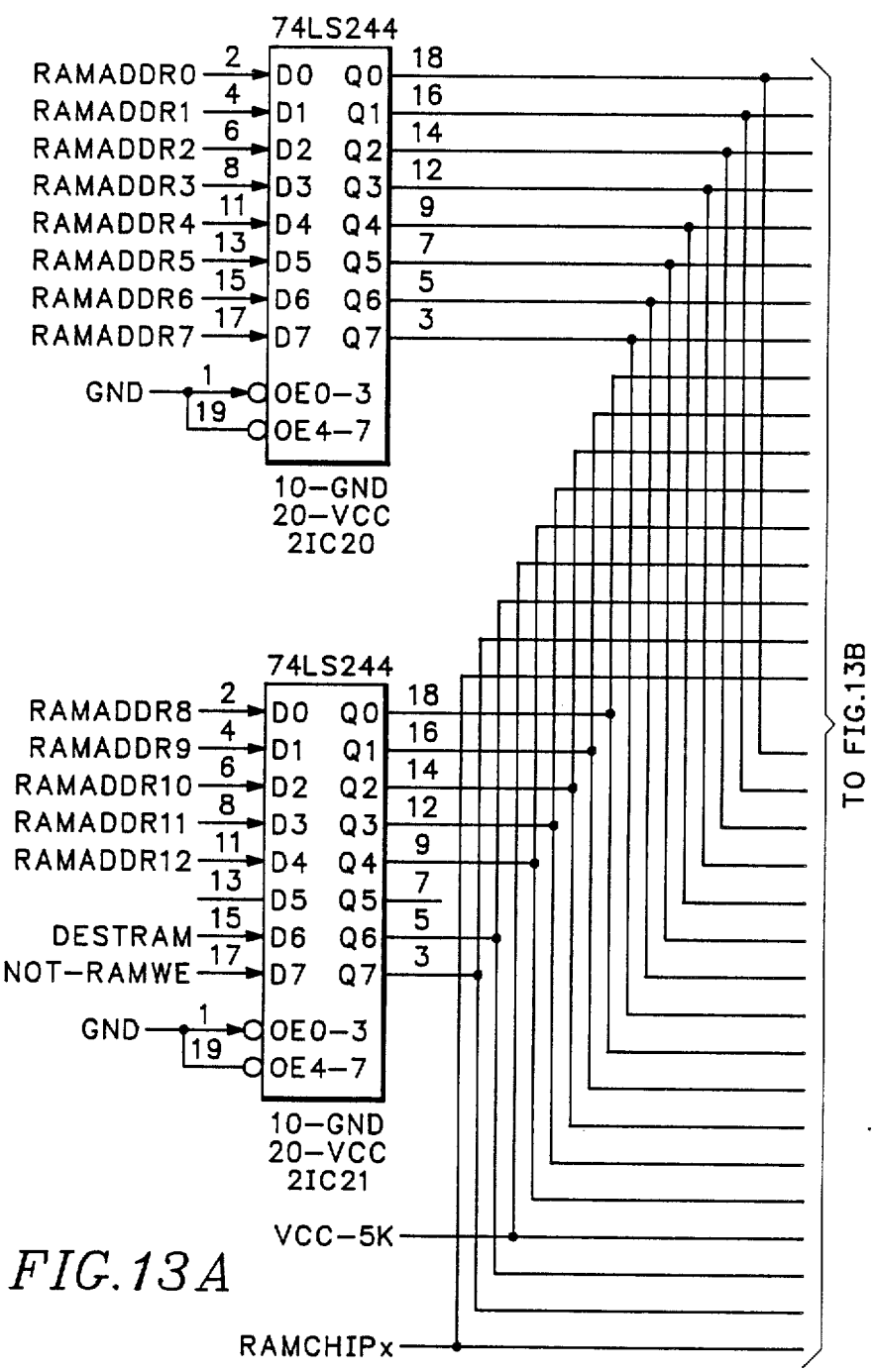
FIGS. 13A and 13B together is a schematic showing the address line buffers and RAM chips used to expand program memory to 64K words (128K bytes).
Figure 13B:
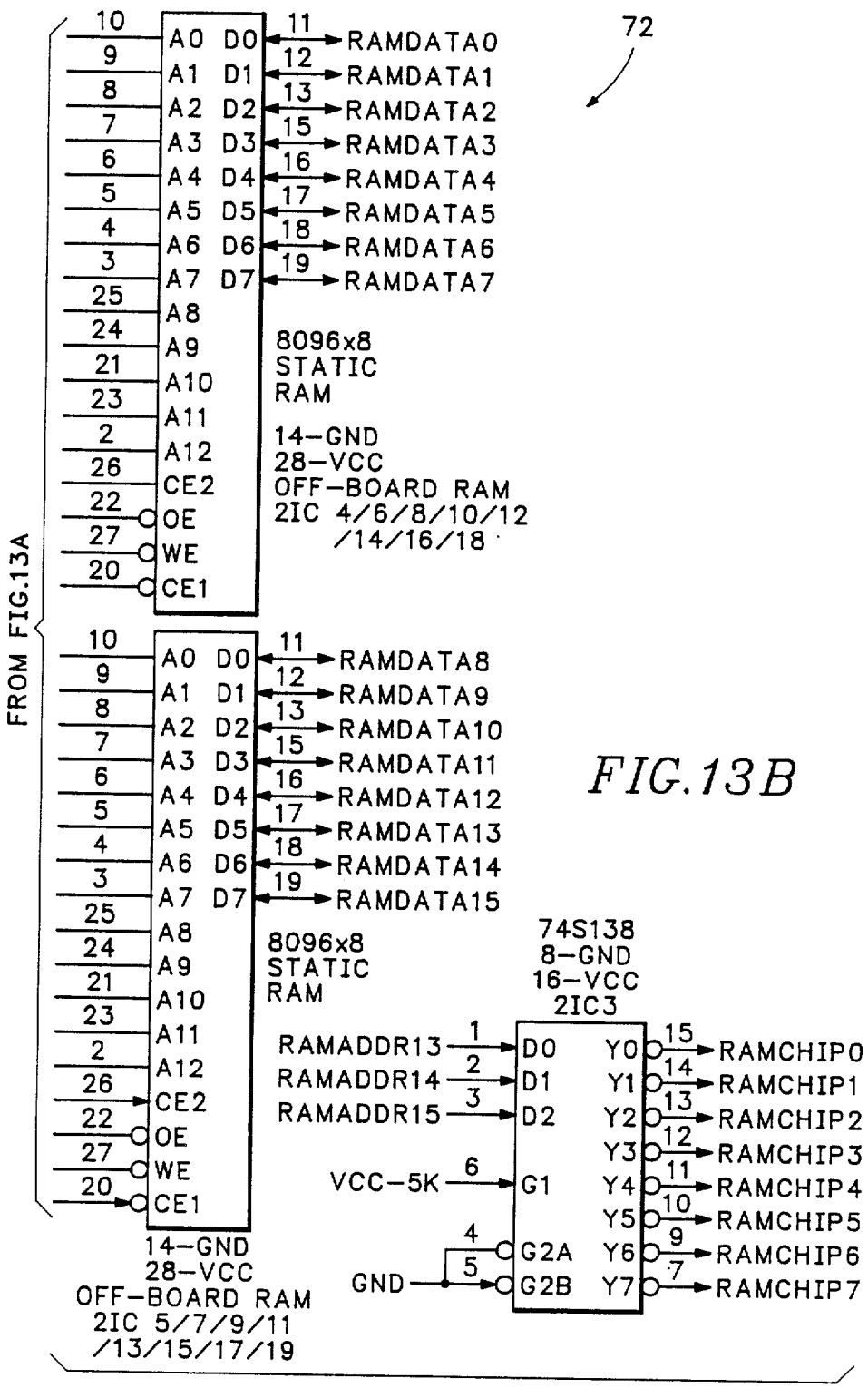

FIGS. 11A and 11B show the connections for providing the program counter 66 and program counter save register 70. The program counter usually contains the value of the interpretive pointer. However, it is the only source of addressing program memory, so at times it will contain a memory address for fetch, store or other operations. Program counter 66 may be incremented concurrently with other board operations. The incrementing occurs at the end to the clock cycle, so the current value of the program counter (pC) may be bused to access memory in the current microinstruction cycle, and the incremented value may be used to access the next memory address on the very next microcycle.

The program counter may either be incremented by the INC[PC] micro-operation, or it may be conditionally incremented with the END micro-operation. The END operation increments the PC only if the high 8 bits of the current RAM 72 output are 1's. As we will see later, this means that the increment will only take place if the microcoded FORTH primitive is being referenced for execution.

The PCSAVE register is a save area for the program counter. It captures the preincremented value of the PC halfway through the END micro-operation for later use either to restore the PC after a memory reference, or as a source for saving the interpretive pointer to the return stack in a subroutine call.

Program Memory

FIGS. 12A, 12B, 13A and 13B define the connections for the base system memory 72, the main memory, as well as the memory/bus interface 74. In the preferred embodiment, the board's main program memory is organized as shown as a linear 16-bit address space of up to 64K 16-bit words. A base board has 8K words on it, while an expansion memory board allows a total of up to 64K words (128K bytes) of addressable memory. All memory except the last 256 words may be used for programs. Byte addressing of the memory is not available, but single bytes may be accessed by use of a byte swap microinstruction in FORTH. Note that a new pC value is clocked in at the end of a clock cycle, so it takes 2 clock cycles to change the PC value and read/write memory.

Program memory 72 may be connected to bus 32 for read/write operations. However, most of the time the program memory bus is isolated from the data bus to allow concurrent pre-fetching of the next op-codes from memory.

The Microprogram Counter

Figure 14:
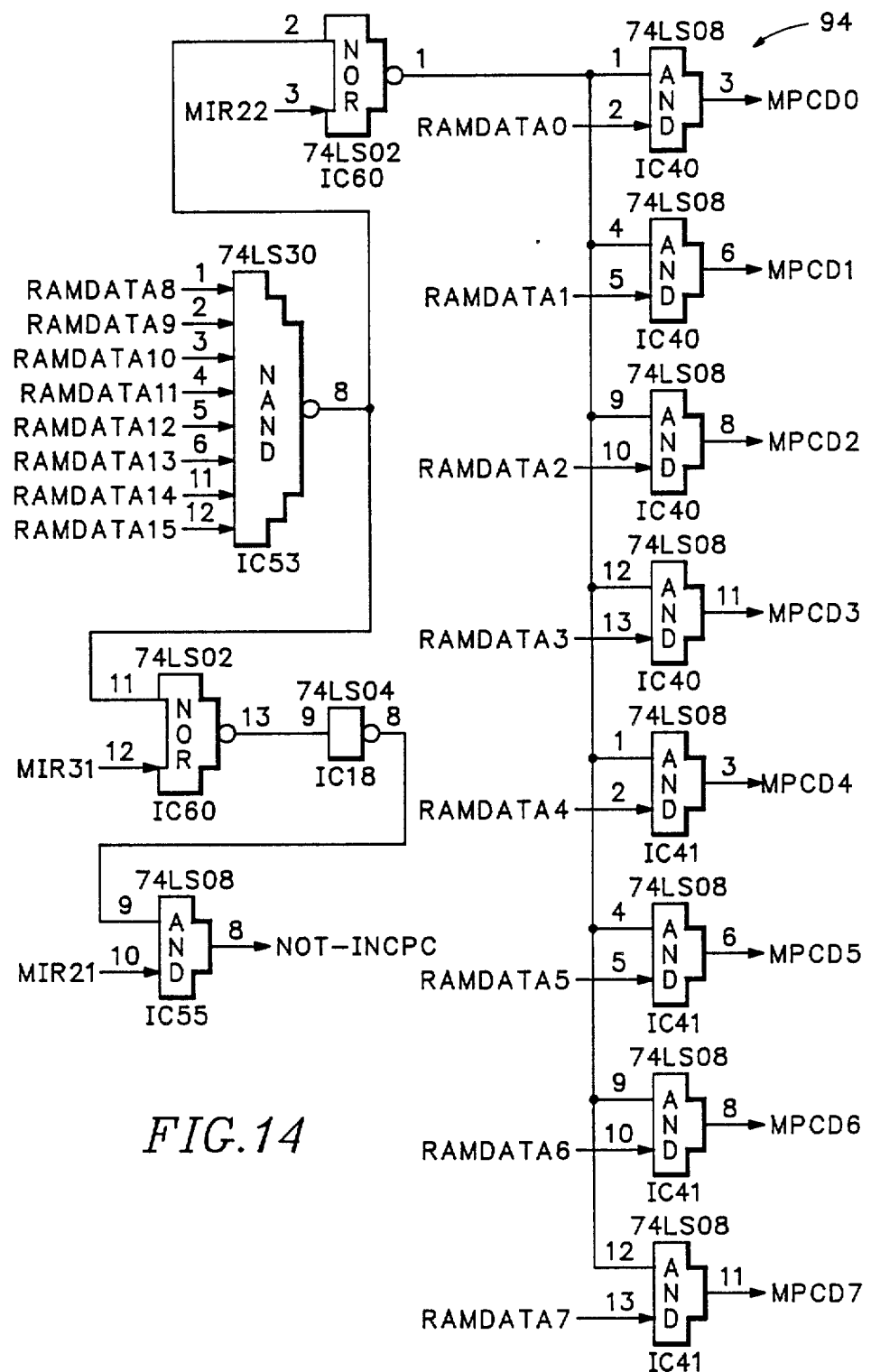
FIG. 14 is a schematic showing the logic used to decode microinstructions.
Figure 15:
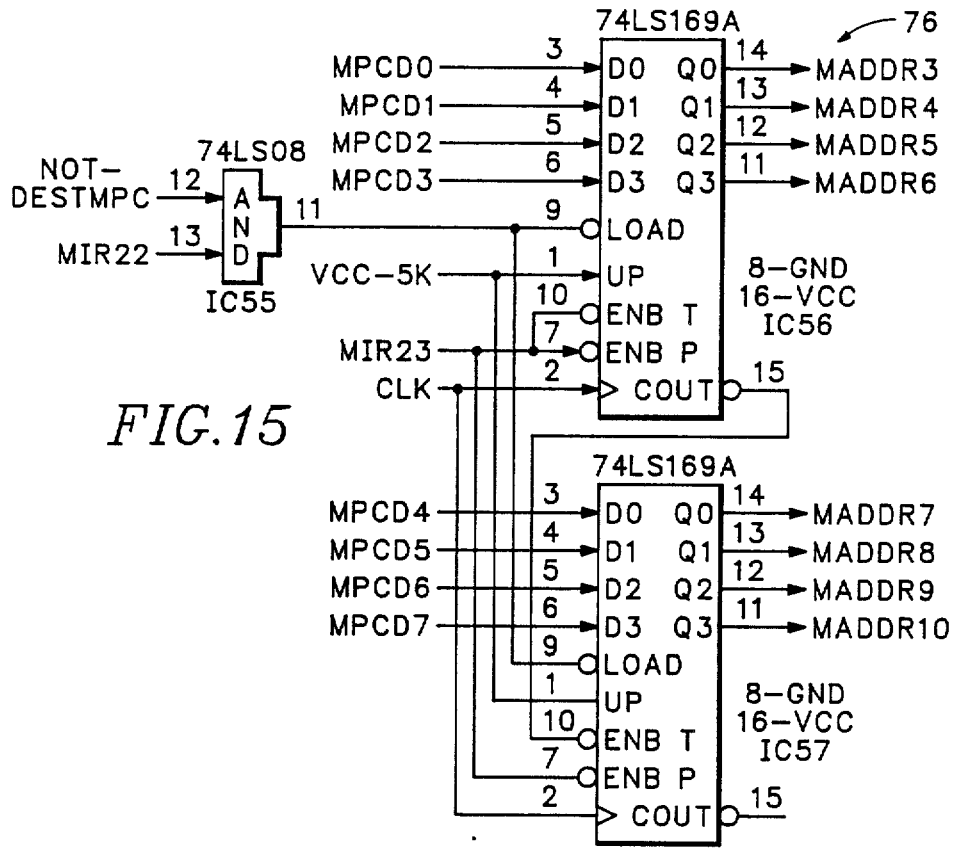
FIG. 15 is a schematic showing the microprogram counter.
Figure 16:
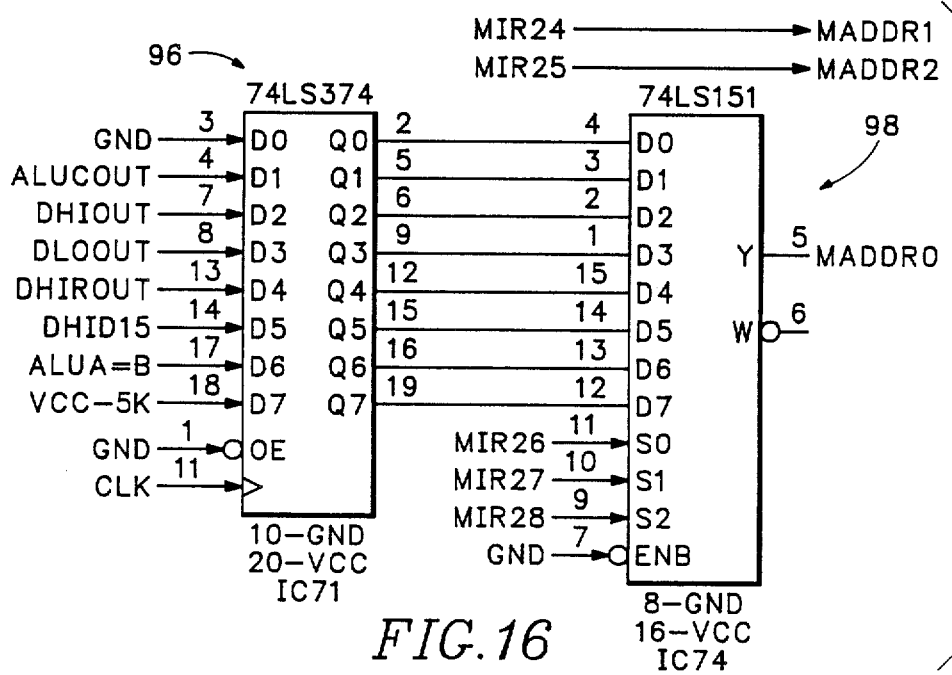
FIG. 16 is a schematic showing the condition code register and the condition code multiplexer used for microprogram conditional branches.
Figure 17A:
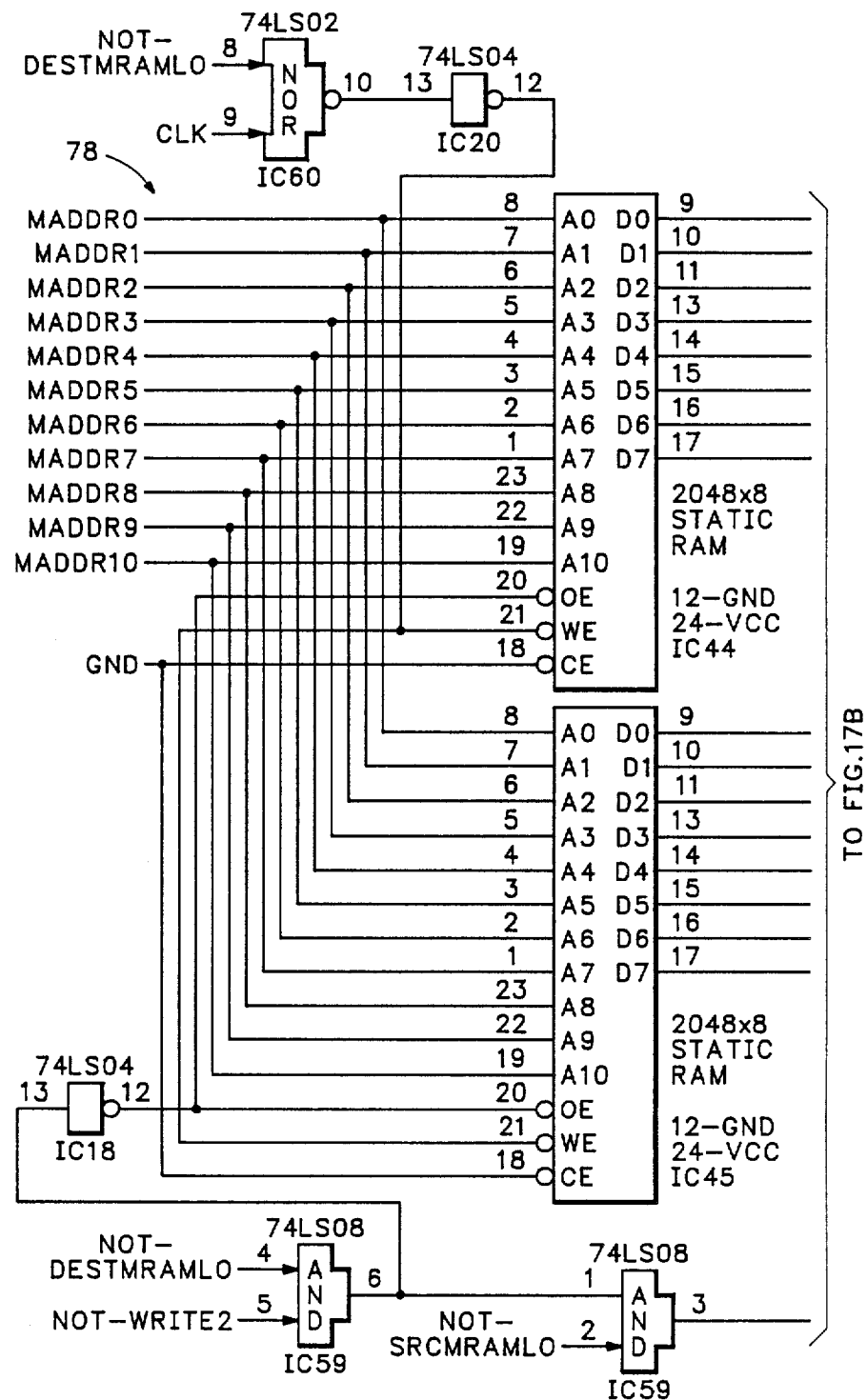
FIGS. 17A and 17B together is a schematic showing bits 0-15 of both microprogram memory and microinstruction register.
Figure 17B:
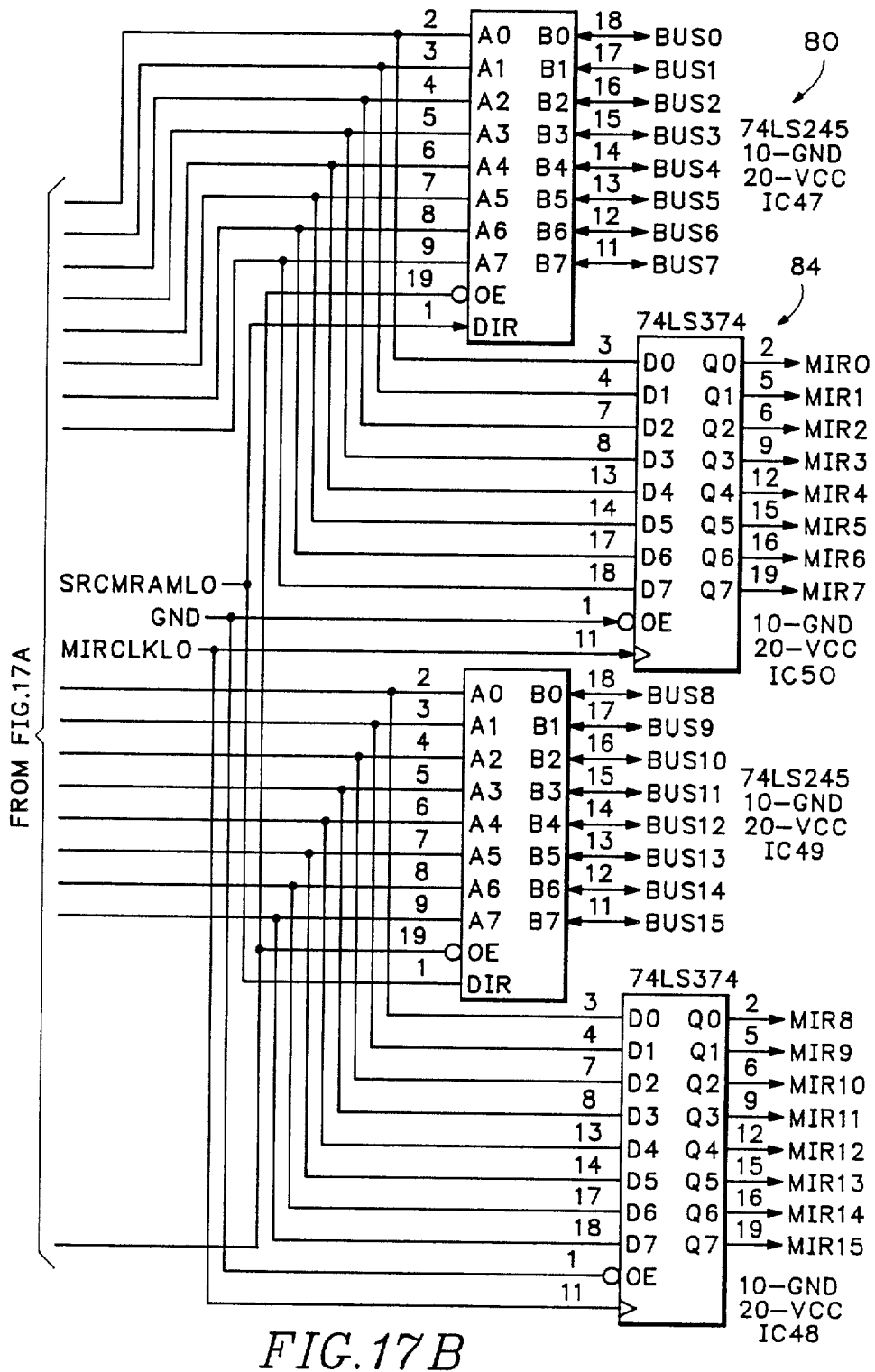
Figure 18A:
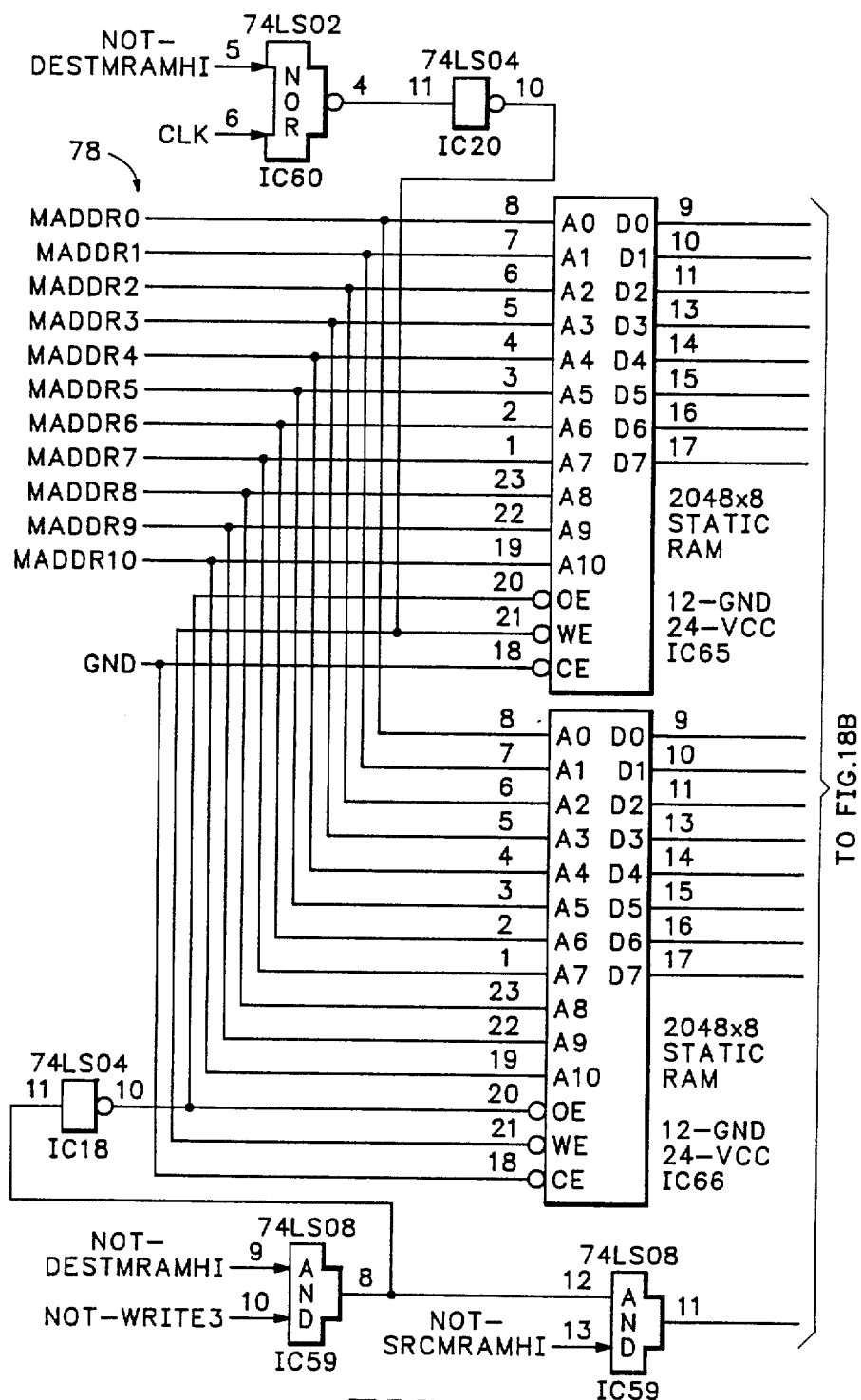
FIGS. 18A and 18B together is a schematic showing bits 16-31 of both microprogram memory and microinstruction register.
Figure 18B:
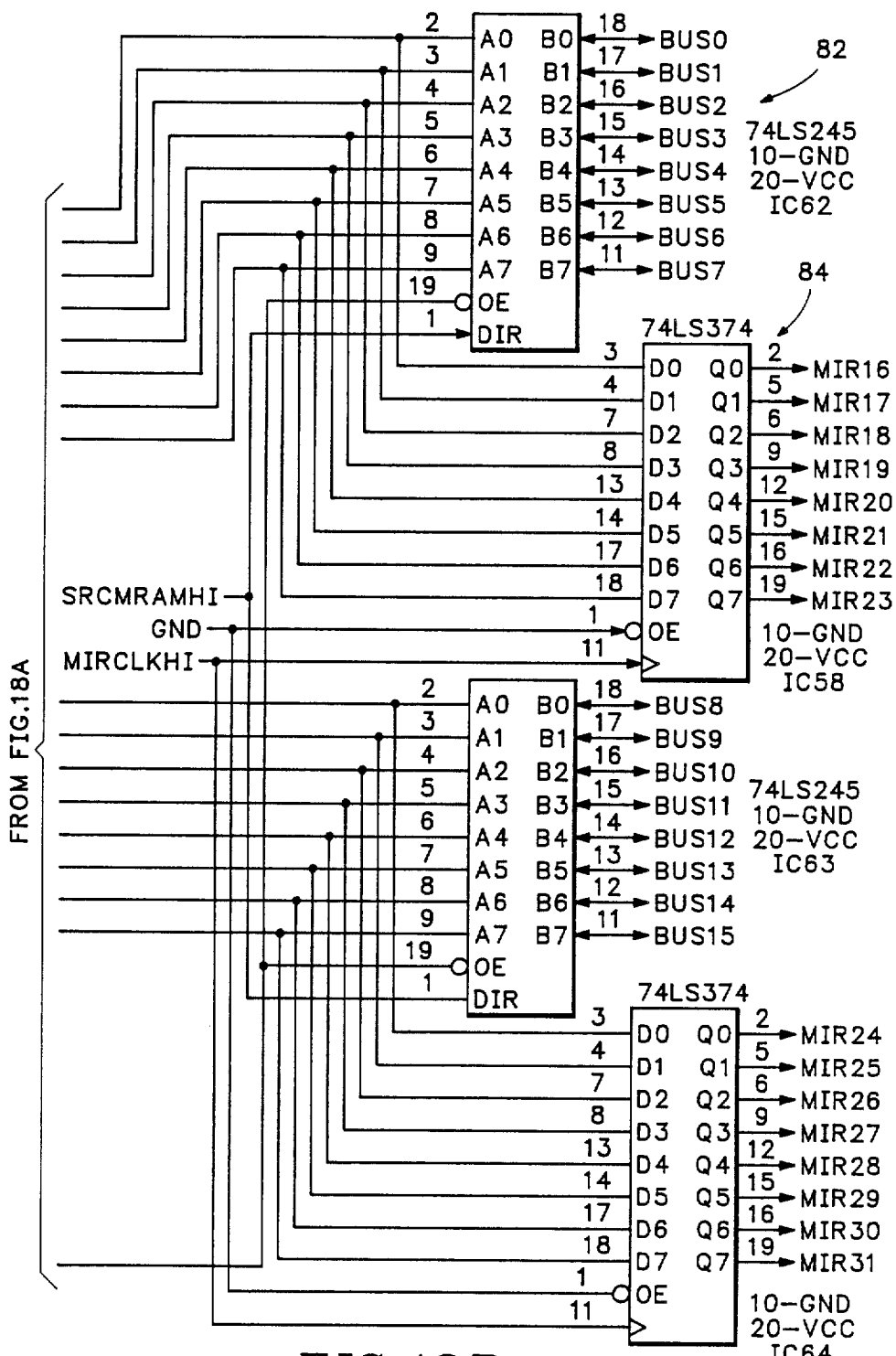

FIGS. 14-16 show the schematics for the microprogram counter and associated logic. In particular, FIG. 14 shows decode microinstruction logic circuitry 94. FIG. 15 shows microprogram counter 76 itself, and FIG. 16 shows a condition code register 96 and an associated condition code selector 98. Micro program Counter (MPC) 76 contains the high 8 bits of the address for the current microinstruction. It is set by the DECODE micro-operation to either the low 8 bits of the contents of the memory bus (if the high 8 bits are all 1's) or to all zeros. This conditional setting of the MPC means that a microcoded primitive instruction is addressed by a FFxx hexadecimal op-code in main memory, where "xx" is the actual high-order 8-bit address in micromemory. If the top 8 bits of the op-code are other than "FF" hex, the MPC is forced to 0, pointing to the DOCOL microcode at micromemory location 0. Thus, all subroutine references are implied by a non-"FFxx" up-code. This means that all of memory D000-FEFF may contain programs. It also means that a Code Field, as such, does not need to be included in colon definitions, since the "DOCOL" operation is implied by the op-code.

Since the MPC holds the high 8 bits of the 11-bit address for micromemory, the microcode may be thought of as being divided into pages of up to eight instructions per page where the highest 8 bits are the same. Within each of these 256 pages, the microinstructions may be placed in any order desired. The JMP= micro-operation allows executing the microinstructions within a page in any order desired. The lowest order bit is determined from condition-code register 96, allowing conditional branching or looping if desired. The other 2 bits of the microinstruction address are directly read from bits 24 and 25 of microinstruction register 84.

MPC 76 may be incremented to allow microcoded primitives to use more than 8 locations in micromemory 78. The INC[MPC] command increments the MPC at the end of the microinstruction. Note that there is a one microinstruction cycle delay between INC[PC] and the time the microprogram executes an instruction in the next micromemory page, due to the microinstruction pre-fetching discussed below.

The Micromemory

Figure 19:
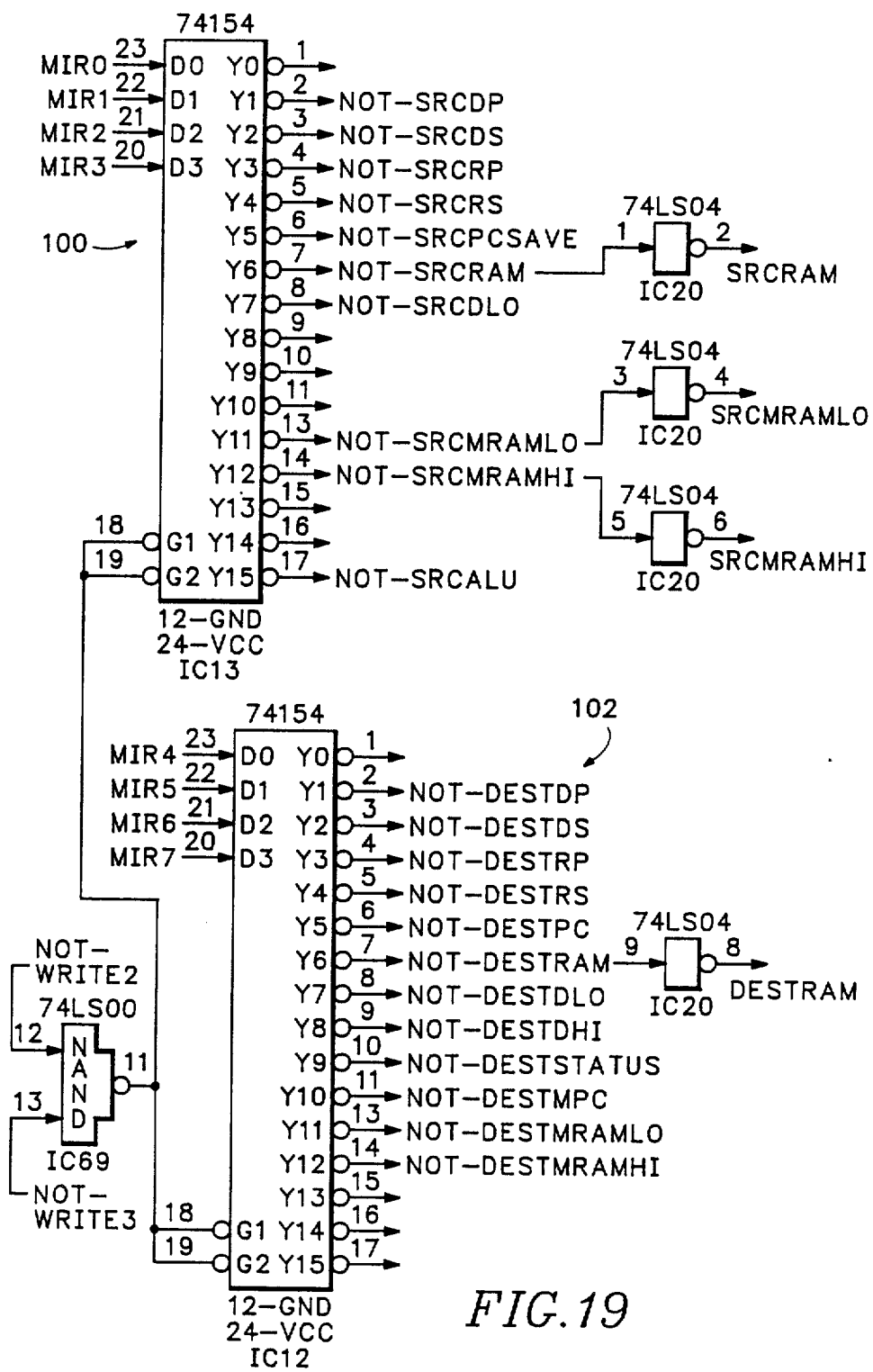
FIG. 19 is a schematic showing the data bus source and destination decoders.

FIGS. 17A, 17B, 18A and 18B show microprogram memory 78 and microinstruction register 84. FIG. 19 shows a source selector 100 and a destination selector 102, which operate in conjunction with microinstruction register 84. Micromemory 78 (microprogram memory, sometimes referred to as control storage) of computer 30 is organized as 256 pages of eight 32-bit instructions. In an effort to keep memory speeds inexpensive (and therefore slow), a microinstruction pre-fetch is used. This means that the next microinstruction is being read from micromemory at the same time the current instruction is being executed. The main benefit is that the micromemory speed is not added to the speed of all the other machine components when computing maximum clock speed, but in fact is totally hidden as long as the microinstruction fetch time is less than the clock speed.

The Microinstruction Register

Microinstruction register (MIR) 84 is a 32-bit register that holds the outputs of micromemory that were fetched in the previous clock cycle. Bits 22 through 28 of the MIR control flow of the microcode program being executed.

While the overlapped fetching of the next microinstruction saves a significant amount to time in the microcycle speed it means that there is a one-cycle delay between the time a change in the MPC occurs and the new page of microinstructions reaches the MIR. This leads to the following programming quirks: (1) A conditional branch will take place in time so that the next microinstruction after the branch will reflect the branching. However, this requires a valid condition code at the start of the clock cycle. Therefore, the condition that is branched upon will reflect the condition codes at the end of the previous microinstruction before the branch. (2) An INC[MPC] command must be used in the next-to-last instruction within a microcode page since it takes a full clock cycle for the effects to flow through the microcode pre-fetch pipe. (3) The DECODE micro-operation, which conditionally sets MPC 76, must also be used in the next-to-last microinstruction in a microcoded operation. This limits the minimum microcoded operation length to 2 clock cycles.

Also, the microassembler forces a JMP=000 micro-operation whenever the END micro-operation is used. This ensures that the 0 location of the page for a microcoded operation is the first microinstruction executed.

Board Interconnection

Figure 20:
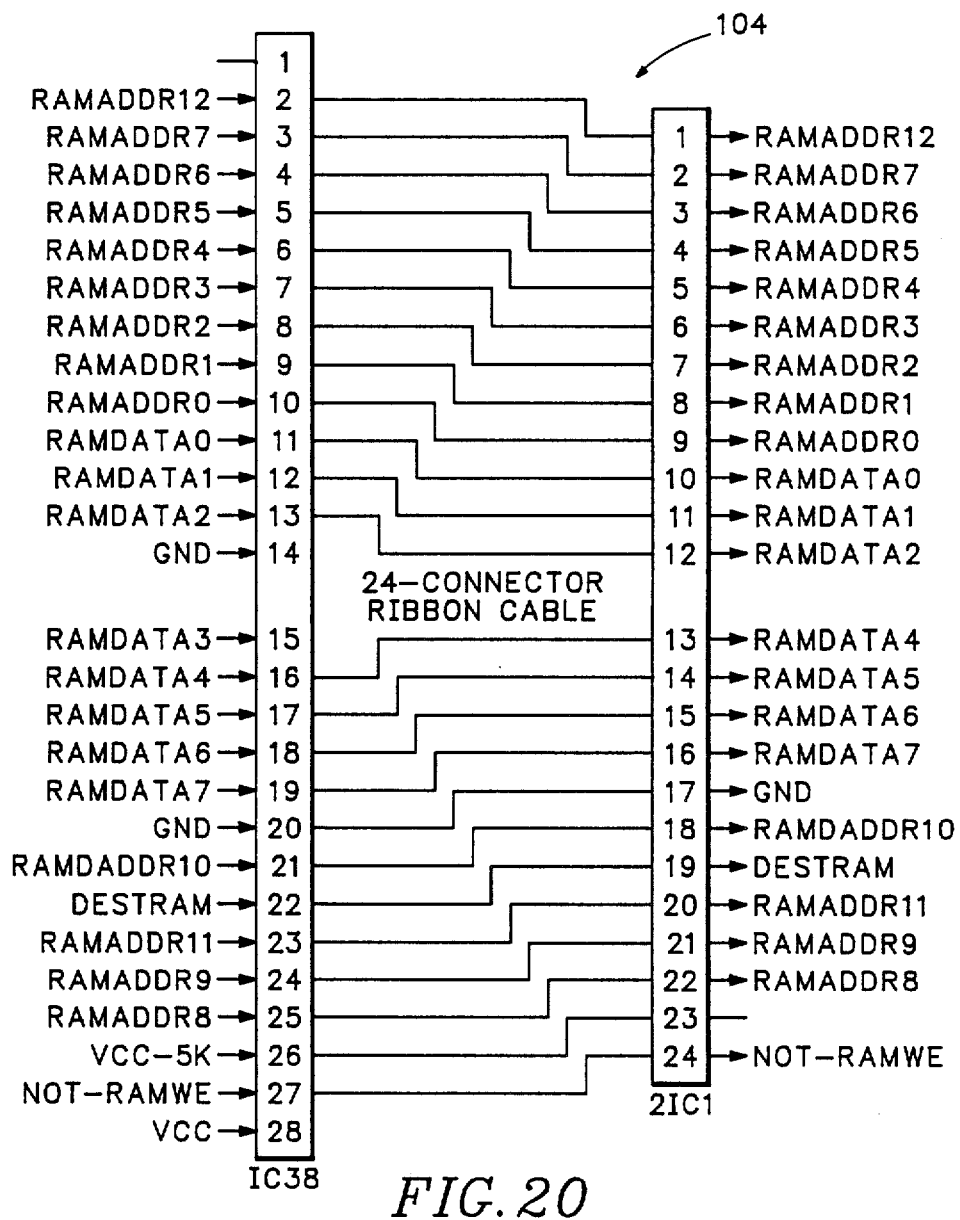
FIG. 20 is a schematic showing the cable connecting the processor card to the memory expansion card, and transferring the program memory address signals and the low 8 bits of the data signals.
Figure 21:
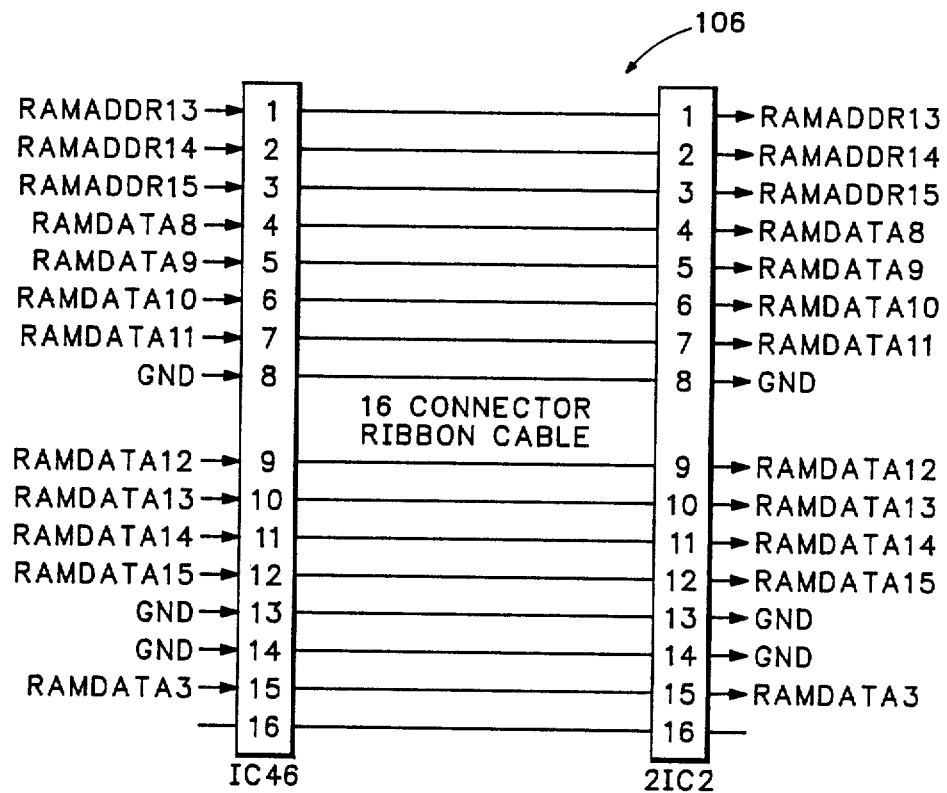
FIG. 21 is a schematic showing the ribbon cable connecting the processor card to the memory expansion card, and transferring the high 8 bits of the data signals.
Figure 22:
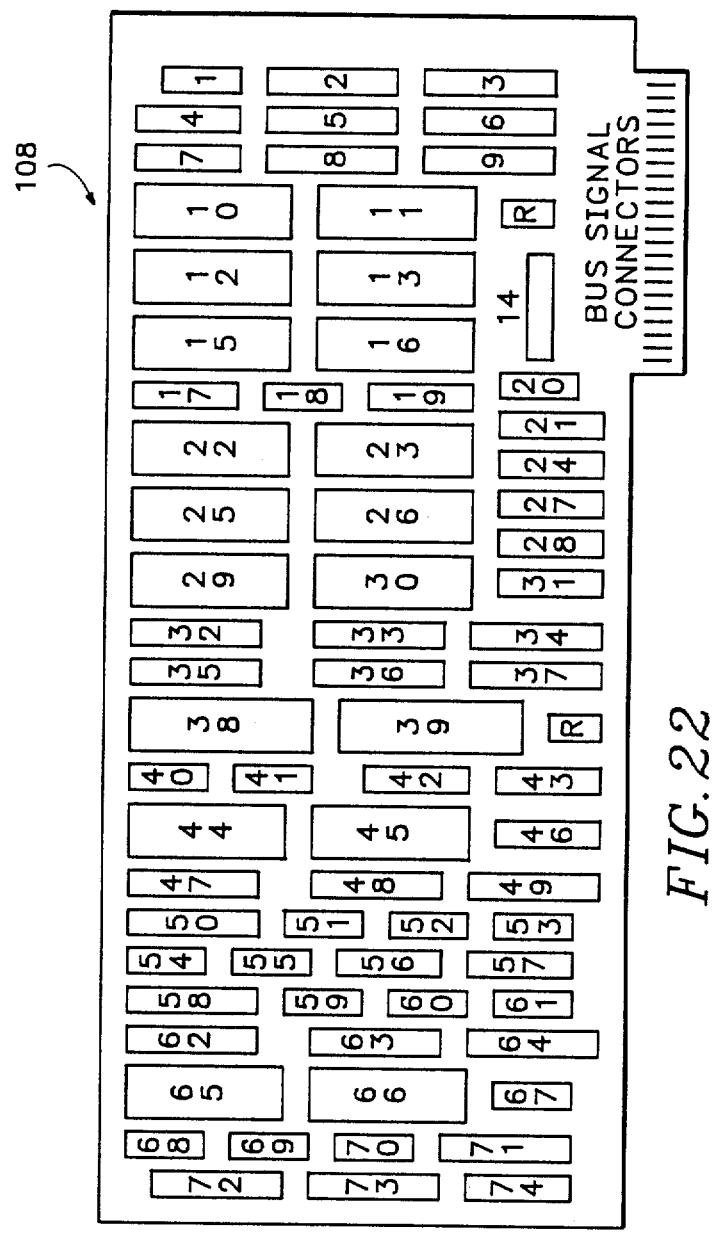
FIG. 22 is a diagram showing the chip arrangement of the processsor card of the preferred embodiment.
Figure 23:
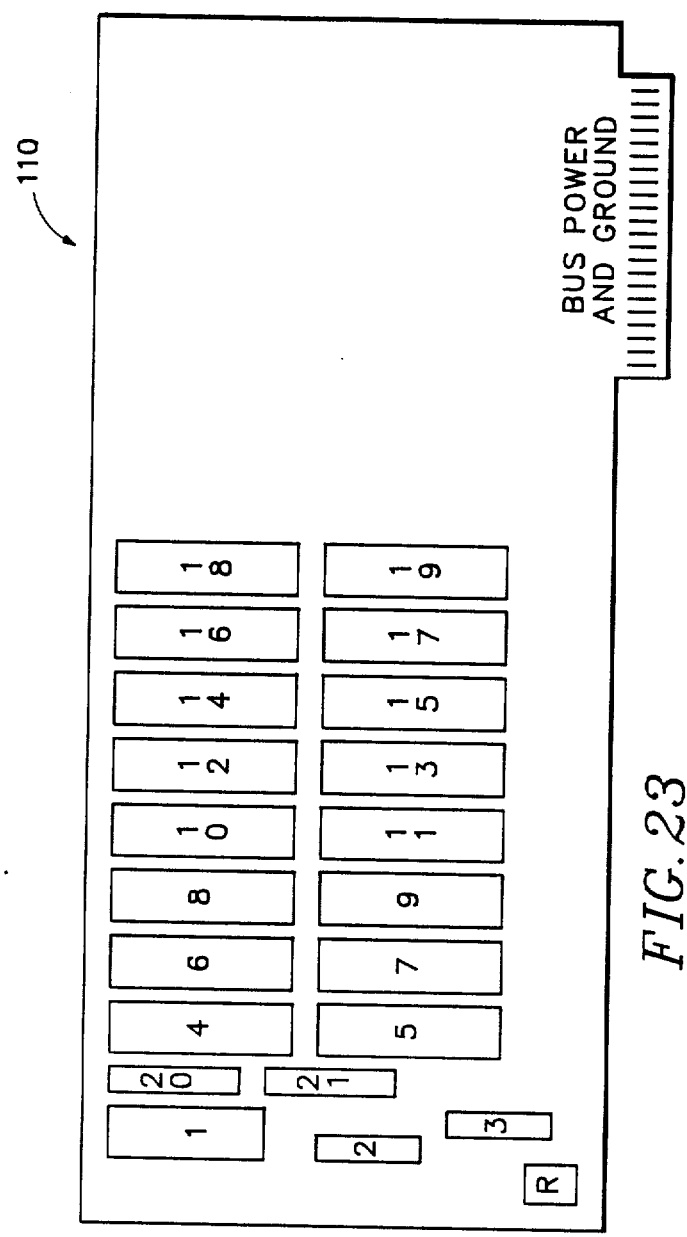
FIG. 23 is a diagram showing the chip arrangement of the memory card of the preferred embodiment.

FIGS. 20 and 21 identify two ribbon cables which are used to make connections between the two circuit boards. In particular FIG. 20 identifies a 24-connector ribbon cable 104, which connects from the baseboard side, shown on the left, to the expansion board side, shown on the right of the figure. FIG. 21 shows the use of a 16-connector ribbon cable 106 for making similar connections between the two boards. FIG. 22 shows the preferred integrated circuit layout on a base board 108, while FIG. 23 shows the corresponding integrated circuit layout on an expansion board 110. The numbers on each of the illustrated integrated circuit outlines identify the integrated circuit numbers shown in FIGS. 2-21.

SYSTEM SOFTWARE

Computer 30 in this preferred embodiment uses various software packages, including a FORTH kernel, a cross-compiler, a microassembler, as well as microcode. The software for these packages. Written using MVP-FORTH, are listed in Appendix A. Further, the microcode format is defined in Appendix B as Table 1a–1d. Some general comments about the software are in order.

The Cross-Compiler

The cross-compiler maintains a sealed vocabulary with all the words currently defined for computer 30. At the base of this dictionary are special cross-compiler words such as IF ELSE THEN : and ; . After cross-compilation has started, words are added to this sealed vocabulary and are also cross-compiled into computer 30. Whenever the keyword CROSS-COMPILER is used, any word definitions constants, variables, etc. will be compiled to computer 30. However, any immediate operations will be taken from the cross-compiler s vocabulary, which is chained to the normal MVP-FORTH vocabulary.

By entering the FORTH word {, the cross-compiler enters the immediate execution mode for computer 30. All words are searched for in the sealed vocabulary for computer 30 and executed by computer 30 itself. The "START . . . " "END" that is displayed indicates the start and the end of execution of computer 30. If the execution freezes in between the start and end, that means that computer 30 is hung up. The cross-compiler builds a special FORTH word in computer 30 to execute the desired definition, then perform a HALT instruction. Entering the FORTH word } will leave the computer 30 mode of execution and return to the cross-compiler. No colon definitions or other creation of dictionary entries should be performed while between { and }.

The FORTH word BOARD will automatically transfer control of the system to computer 30 via its COLD command. The host MVP-FORTH will then execute an idle loop waiting for computer 30 to request services. The word BYE will return control back to the host's MVP-FORTH.

The current cross-compiler can not keep track of DP, etc., in computer 30 if it is out of sync with the cross-compiler's copy. This means that no cross-compiling or microassembly may be done after the FORTH of computer 30 has altered the dictionary in any way. This could be fixed at a later date by updating the cross-compiler's variables from computer 30 after every BYE command to computer 30.

Cross-compiled code should be kept to a minimum, since it is tricky to write. After a bare minimum kernel is up and running, computer 30 should do all further FORTH compilation.

The Microassembler

The microassembler is a tool to save the programmer from having to set all the bits for microcode by hand. It allows the use of mnemonics for setting the micro-operation fields in a microinstruction, and, for the most part, automatically handles the microinstruction addressing scheme.

The microassembler is written to be co-resident with the cross-compiler. It uses the same routines for computer 30 and sealed host vocabulary dictionary handling, etc. Currently all microcode must be defined before the board starts altering its dictionary, but this could be changed as discussed above.

In the terminology used here, a microinstruction is a 32-bit instruction in microcode. while a micro-operation is formed by one or more microcode fields within a single microinstruction.

Tables 1a–1d in Appendix B give a quick reference to all the hardware-defined microinstruction fields supported by the microassembler. Since the microcode layout is very horizontal, you can find a direct relationship between bit settings and control line inputs to various chips on the board. The fields in the 32-bit microinstruction format will be explained by discussing examples from the kernel's microcode. As with most horizontally microcoded machines, as many micro-operations as desired may take place at the same time, although some operations don't do anything useful when used together.

Microcode Definition Format

The microassembler has a few keywords to make life easier for the microprogrammer. The Word OP-CODE: starts a microcode definition. The input parameter is the page number from O - OFF hex that the op-code resides in. For example, the word ± is op-code 7. This means that whenever computer 30 interprets a hex FF07 as an op-code, the word ± will be executed in microcode. The character string after OP-CODE: is the name of the op-code that will be added to the cross-compiler and computer 30 dictionaries. It is the programmer's responsibility to insure that he does not assign two op-codes to the same micromemory page.

The variable CURRENT-PAGE contains the page currently assigned by OP-CODE: It may be changed to facilitate multi-page definitions. See MPC control below.

The word :: signifies the start of the definition of a microinstruction. The number before :: must be from 0 to 7, and signifies the offset from 0 to 7 within the current micromemory page for that microinstruction. Microinstructions may be defined in any order desired.

The word ;; signifies the end of a microinstruction and stores the microinstruction into the appropriate location in micromemory.

The word ;;END signifies the end of a definition of a FORTH microcoded primitive. Its main purpose is to leave the MICROASSEMBLER vocabulary entered with OP-CODE: and return to the CROSS-COMPILER vocabulary.

If the MICROASSEMBLER vocabulary is entered manually by typing in MICROASSEMBLER. the programmer may single-step microcoded programs. Use the normal :: word to start a microinstruction definition (the number from 0 to 7 before must still be used, but is ignored). Instead of ;;, use ;SET to copy the microinstruction to the MIR. This allows reading resources of computer 30 to the host with the X@ word or storing resource values with the X! word. Using ;DO instead of ;; will load the instruction into the MIR and cycle the clock once. This is an excellent way of single-stepping microcode. The diagnostics of computer 30 provide examples of how to use these features.

End/Decode

END and DECODE are the two micro-operations that perform the FORTH NEXT function. DECODE is always in the next to last microinstruction of a microcoded FORTH primitive. It examines the highest 8 bits of the current data on the program memory bus (which is being addressed by program counter 66 and presumably is the next op-code to be executed). If the highest 8 bits are all 1's, the op-code is a microinstruction reference, and the lowest 8 bits are clocked into MIC 76. It any one of the top 8 bits is a 0 the op-code is a colon definition reference, and all 0's are clocked into the MPC for a DOCOL reference.

Since there is a one-cycle delay between setting the MPC and seeing the effects of the new MPC, END is the second half of the NEXT operation, and must always be placed in the last microinstruction executed in a FORTH primitive operation. ED increments the PC only if a microcoded FORTH primitive is being referenced by the PC. If a colon definition is being referenced, the PC is unchanged, so that the reference may be read from memory and back to the PC by DOCOL. Also, PCSAVE is set with the contents of the PC before the PC is incremented. This is used by DOCOL to push the return address to stack 50, and by other FORTH words to restore the PC after accessing program memory with data fetches and stores. END also forces a JMP=000 microinstruction jump. This forces the low order bits of the next microinstruction to O, so that execution of a microcoded FORTH primitive always starts at offset 0 within the micromemory page.

The microcode definition for ± shows that DECODE is in the next-to-last instruction (which also happens to be the first instruction), and END is in the last instruction. There may be several DECODE micro-operations and several END micro-operations in the same microcoded primitive. All that matters is that a DECODE must be executed on the next-to-last microcycle, and an END on the last microcycle before the end of the execution path of the microcoded primitive. See 0< and D+ for examples.

Microcode Next Address Generation

A complete description of the hardware used for next address generation is in the sections describing the MPC, MIR, and micromemory above.

The microassembler automatically generates an appropriate jump to the next sequential offset within a page. This means if a 3 is used before the :: word, then the microassembler will assume that the next microinstruction is at offset 4 unless the JMP= microinstruction is used to tell it otherwise.

The JMP= instruction allows forcing nonsequential execution or conditional branching simultaneously with other microinstruction operations. A JMP=000, JMP=001, ... JMP=111 command forces an unconditional jump to the offset within the same page specified by the binary operand after JMP=. For example. JMP=101 would force a jump to offset 6 for the next microcycle.

A conditional jump allows jumping to one of the two locations depending on the value of one of the 8 condition codes. The unconditional jump described in the preceding paragraph is just a special conditional jump in which the condition picked is a constant that is always set to 0 or 1. The sign bit conditional jump is used below as an example.

A conditional jump sets the lowest bit of the next microinstruction address to the value of the condition that was valid at the end of the previous microcycle. The syntax is JMP=00S, where "S" can be replaced by any of the conditions: CA CB CC CD E. The first two bits are always numeric, indicating the top two binary bits of the jump destination address within the micromemory page. The example JMP=10S would jump to offset 4 within the micromemory page if the sign bit were 0, and location 5 if it were 1.

Of special note: The equal bit (JMP=xxE) is 1 only if all bits of the ALU output are 1. Also, the ALU-carry-out condition (JMP=xxCA) is inverted so the micro-operation JMP=11CA would jump to offset 7 if the ALU carry-out was zero, and offset 6 if it was 1. The microcode for 0< <#LOOP> and FILL all provide examples of conditional branching.

The INC[MPC] microinstruction is used to allow a microcoded word to use more than a single page of micromemory. Looking at FILL as an example, one can see that offset 5 is the next to last word executed within page 23 of the micromemory, and that it has an INC[MPC] micro-operation. Offset 5 then jumps to offset 3 within the same page. As the microinstruction at offset 3 is being executed, the incremented MpC value is being used as the page address for the next microinstruction fetch. The jump from offset 3 to offset 0 (JMP=000) sets the bottom three bits for use with the incremented MPC value in fetching the first microinstruction from the page 24, which in this case is at offset 0. There MUST be some sort of JMP=xxx specified in the last microinstruction to a page (executed just after the INC[MPC], but it may be any kind of jump, even a conditional one.

The programmer must make sure that all microcoded looping is done within the same page, since there is no way to decrement the MPC. However, if this is not possible, the microcode can be written to implement a single step of a loop, and a high level loop may be used to execute the steps. See <$=STEP> for an example of this technique.

INC[PC]

This micro-operation unconditionally increments the program counter at the end of the microcycle. It must not be used in conjunction with DECODE or END. The memory addressed by the incremented PC value will be available in time for use in the very next microcycle.

Shifting

The 32-bit shift register formed by DHI and DLO is covered in detail in the hardware description section.

The rules for using the shift operations are: Do not load and shift the same register in a single clock cycle. DLI and DLO are completely independent of each other. Exercise caution when using SR[DHI], as the shift-in value can be tricky.

Stack Pointers

The 8-bit stack pointers are incremented and decremented at the end of the microcycle. The value in the stack at the current pointer location may be used in the same clock cycle as an increment/decrement of the pointer value. The stack value at the new pointer location will be ready for use in the next microcycle.

The kernel microcode keeps the top data stack element in the DHI register, and the DP pointer points to the second from the top stack element on the DS.

ALU Functions

Table 1c lists the usable ALU functions. The microassembler automatically sets the ALU carry-in bit, mode bit, and ALU function. Of special interest is the fact that only the A side of the ALU can be incremented or decremented. This has special use in EXIT, where the return address must be incremented on its way to the PC.

ALU function ALU=0 sets the ALU outputs to all 0's. ALU=-1 sets the output to a two's complement -1 (all bits 1). The ALU uses two's complement arithmetic.

The DHI register can be tested for true/false values by performing an ALU-notB function and using a JMP=xxE in the next microinstruction. See ?DUP for an example.

Source and Destination

The source and destination selection fields are used to determine the 3-state bus transmitter and receiver for microinstruction. Only one source for the data bus 32 may be specified at a time. The sources MRAMLO and MRHI will not do anything useful if used in Master mode. The SOURCE= micro-operation enables the outputs of the desired resource and places its data on the data bus 32.

The destination micro-operation, specified by DEST=, clocks data into the designated board resource at the end of the current microcycle. This clocking in takes place before any pointers, counters, or shifters have a chance to change value. Using DEST=MPC. DEST=MRAMLO, or DEST=MRAMHI will cause your microprogram to crash in the Master mode. These three destinations are used in Slave mode to access micromemory.

It will thus be appreciated that the described preferred embodiment achieves the desired features and advantages of the invention. While the invention has been particularly shown and described with reference to the foregoing preferred embodiment, it will be understood by those skilled in the art that other changes in form and detail may be made therein without departing from the spirit and scope of the invention, as defined in the claims.

APPENDIX A -- PART I:

MICROASSEMBLER SOURCE CODE

```
SCR #0
   0
   1
   2
   3
   4
   5
   6
   7
   8
   9
  10
  11
  12
  13
  14
  15
```

```
SCR #1
   0 INDEX --- CPU/16 MICROASSEMBLER SOURCE          PHIL KOOPMAN JR.
   1
   2 MVP-FORTH VERSION                          LAST UPDATE: 3/14/87
   3
   4               (C) COPYRIGHT 1986, 1987
   5
   6         Phil Koopman, Jr  &  WISC Technologies, Inc.
   7
   8 SOURCE
   9 SCREENS    CONTENTS
  10 ========   ========
```

```
11 2          LOAD SCREEN FOR MICROASSEMBLER
12 6 - 8      FORTH UTILITY WORDS
13 11 - 83    MICROASSEMBLER/CROSS-ASSEMBLER
14
15

SCR #2
  0 \ LOAD SCREEN FOR MICRO-ASSEMBLER/CROSS-COMPILER FOR CPU/16
  1 DECIMAL
  2 CR CR ." Loading CPU/16 micro/assembler and cross compiler." CR
  3 ." (C) Copyright 1986, 1987 "  CR
  4 ." Phil Koopman, Jr.  &  WISC Technologies, Inc. "  CR CR
  5 3 81 THRU
  6 CR CR ." Load complete." CR CR
  7 ." Please do a SAVE-FORTH to file name MASSEM.COM" CR
  8
  9
 10
 11
 12
 13
 14
 15

SCR #3
  0 \ CASE STATEMENT -- CASE   IFCASE
  1 DECIMAL
  2 : CASE      ( -> )    ( COMPILE )
  3             ( FLAG -> FLAG )    ( EXECUTE )
  4     COMPILE >R   COMPILE R@   0 31 ;
  5     IMMEDIATE
  6
  7 : IFCASE    ( ..ADDRS.. COUNT 31 -> ... BRANADDR COUNT 32 )
  8             ( FLAG -> )    ( EXECUTE )
  9    31 ?PAIRS 32    COMPILE OBRANCH   HERE 0 ,
 10    ROT 1+ ROT  ;
 11    IMMEDIATE
 12
 13
 14
 15

SCR #4
  0 \   CASE ---   NEXTCASE   ELSECASE
  1 DECIMAL
  2 : NEXTCASE  ( ... BRANADDR COUNT 32 -> .. ELSEADDR COUNT 31 )
  3        ( -> FLAG ) ( EXECUTE )
  4    32 ?PAIRS   COMPILE BRANCH   0 ,
  5    SWAP  HERE OVER -  SWAP !
  6    HERE 2- SWAP 31  COMPILE R@  ;
  7    IMMEDIATE
  8
  9 : ELSECASE     ( ... COUNT 32 -> ... COUNT 33 )
 10    32 ?PAIRS COMPILE BRANCH 0 ,
 11    SWAP  HERE OVER -  SWAP !
 12    HERE 2- SWAP 33 ;
 13    IMMEDIATE
 14
 15
```

```
SCR #5
   0 \    CASE --- ENDCASE    BETWEEN
   1 DECIMAL
   2 : ENDCASE   ( -> )
   3    DUP 32 =  IF DROP SWAP HERE OVER -   SWAP !
   4    1- 33 THEN    33 ?PAIRS  BEGIN
   5    DUP 0> WHILE SWAP HERE OVER - SWAP !
   6    1- REPEAT   DROP COMPILE R> COMPILE DROP   ;
   7    IMMEDIATE
   8
   9 : BETWEEN    ( N1 N2 N3 -> N2<=N1<=N3? )
  10    >R    OVER   > NOT    SWAP
  11    R>   > NOT    AND  ;
  12
  13
  14
  15

SCR #6
   0
   1
   2
   3
   4
   5
   6
   7
   8
   9
  10
  11
  12
  13
  14
  15

SCR #7
   0 \ SET UP CPU/16 MEMORY SIZE CONSTANT
   1 HEX
   2 FEF0 CONSTANT MEM-SIZE
   3 DECIMAL
   4 CR MEM-SIZE   U. ." words memory on system"   CR
   5
   6
   7
   8
   9
  10
  11
  12
  13
  14
  15
```

SCR #8
  0
  1
  2
  3
  4
  5
  6
  7
  8
  9
 10
 11
 12
 13
 14
 15

SCR #9
  0 \ FORTH BOARD STOP & GO --   STOP   GO    STATUS?   CYCLE
  1 HEX
  2 VOCABULARY MICRO-ASSEMBLER    IMMEDIATE
  3 MICRO-ASSEMBLER  DEFINITIONS
  4 : STOP    ( -> )
  5    3EB P@ DROP ;
  6 : GO     ( -> )
  7    3EC P@ DROP  ;
  8
  9 : STATUS  ( -> STATUS )    \ Status register contents
 10    3EA P@   OFF AND  ;
 11 : STATUS?   STATUS U.  ;
 12
 13 : CYCLE  ( -> )        \ Cycle one clock tick
 14    0 3E4 P! ;
 15 DECIMAL
   ;

SCR #10
  0 \ FORTH BOARD I/O PRIMITIVES --   X!   X@
  1 HEX
  2 CODE X! ( N -> )    \ WRITE WORD TO BOARD
  3    BX POP     DX , # 3E7 MOV
  4    AL , BH MOV    DX , AL  OUT
  5    DX , # 3E0 MOV    AL , BL MOV   DX , AL  OUT
  6    NEXT  JMP    END-CODE
  7
  8 CODE X@  ( N -> )    \ READ WORD FROM BOARD
  9    DX , # 3E8 MOV
 10    AX , DX IN    AX PUSH
 11    NEXT JMP    END-CODE
 12
 13
 14 DECIMAL
 15

SCR #11
  0 \ FORTH BOARD I/O PRIMITIVES --   MIR!
  1 HEX
  2 CODE MIR!  ( D -> )    \ WRITE 2 WORDS TO BOARD
  3    BX POP
  4    DX , # 3E7 MOV   AL , BH MOV    DX , AL  OUT

```
  5     DX , # 3E3 MOV    AL , BL MOV    DX , AL  OUT
  6     BX POP
  7     DX , # 3E7 MOV    AL , BH MOV    DX , AL  OUT
  8     DX , # 3E2 MOV    AL , BL MOV    DX , AL  OUT
  9     NEXT  JMP     END-CODE
 10
 11 DECIMAL
 12
 13
 14
 15

SCR #12
  0 \ VARIABLES FOR MICROASSEMBLER
  1 DECIMAL
  2 \ Following variables are all flags that indicate if fields
  3 \        have been used in current micro-instruction assembly
  4                                    VARIABLE >ALU
  5 VARIABLE >SHIFTIN           VARIABLE >DEST
  6 VARIABLE >JMP               VARIABLE >SOURCE
  7 VARIABLE >INCMPC            VARIABLE >RP
  8 VARIABLE >DECODE            VARIABLE >DP
  9 VARIABLE >INCPC             VARIABLE >END
 10 VARIABLE >DHI
 11 VARIABLE >DLO
 12
 13 VARIABLE CURRENT-PAGE     \ Micromemory page number
 14 VARIABLE CURRENT-OFFSET   \ Micromemory offset value
 15 DVARIABLE MICRO-WORD      \ Current micro-assembler building word SCR #13
  0 \ INITIALIZE MICROASSEMBLER FLAGS
  1 HEX
  2 : RESET  ( -> )
  3    0 >END    !    0 >ALU    !     0 >SHIFTIN !
  4    0 >DEST   !    0 >JMP    !     0 >SOURCE  !
  5    0 >INCMPC !    0 >DECODE !     0 >INCPC   !
  6    0 >DHI    !    0 >DLO    !     0 >RP      !
  7    0 >DP     !
  8    0. MICRO-WORD D! ;
  9
 10 : ::  ( N -> )     \ Start Defn   N = Offset value
 11    CURRENT-OFFSET !   RESET    ;
 12
 13
 14 DECIMAL
 15

SCR #14
  0 \ STORE MICROCODE WORD --   ;DO
  1 HEX
  2 : FINISH  ( -> )   \ Set required bits for default fields
  3    >END     @ NOT   IF   80000000. MICRO-WORD D+!   THEN
  4    >SHIFTIN @ NOT   IF   20000000. MICRO-WORD D+!   THEN
  5    >INCMPC  @ NOT   IF   00800000. MICRO-WORD D+!   THEN
  6    >DECODE  @ NOT   IF   00400000. MICRO-WORD D+!   THEN
  7    >INCPC   @ NOT   IF   00200000. MICRO-WORD D+!   THEN
  8    >DHI     @ NOT   IF   00180000. MICRO-WORD D+!   THEN
  9    >DLO     @ NOT   IF   00060000. MICRO-WORD D+!   THEN
```

```
10    >RP      @ NOT  IF  00010000. MICRO-WORD D+!  THEN
11    >DP      @ NOT  IF  00004000. MICRO-WORD D+!  THEN
12    >ALU     @ NOT  IF  00001C00. MICRO-WORD D+!  THEN ;
13 : ;SET  ( -> )     \ Perform MIR!, but don't cycle clock
14    FINISH MICRO-WORD D@ MIR!   ;
15 : ;DO  ( -> )      ;SET CYCLE ;  DECIMAL
```

SCR #15
```
 0 \ SOURCE DEFINITIONS
 1 HEX
 2 : SRC  ( DVALUE -> )    ( PFA -> )
 3    CREATE  D,
 4    DOES>       >SOURCE @  ABORT" MULTIPLE SOURCE= STATEMENTS"
 5                1 >SOURCE !   D@  MICRO-WORD D+!  ;
 6
 7    1. SRC SOURCE=DP          2. SRC SOURCE=DS
 8    3. SRC SOURCE=RP          4. SRC SOURCE=RS
 9    5. SRC SOURCE=PCSAVE      6. SRC SOURCE=RAM
10    7. SRC SOURCE=DLO
11    8. SRC SOURCE=MRAMLO      C. SRC SOURCE=MRAMHI
12   OF. SRC SOURCE=ALU
13
14
15 DECIMAL
```

SCR #16
```
 0 \ DEST DEFINITIONS
 1 HEX
 2 : DST  ( DVALUE -> )    ( PFA -> )
 3    CREATE  4 DLSLN D,
 4    DOES>       >DEST @  ABORT" MULTIPLE DEST= STATEMENTS"
 5                1 >DEST !   D@  MICRO-WORD D+!  ;
 6
 7    1. DST DEST=DP            2. DST DEST=DS
 8    3. DST DEST=RP            4. DST DEST=RS
 9    5. DST DEST=PC            6. DST DEST=RAM
10    7. DST <DDLO>             8. DST <DDHI>
11    9. DST DEST=STATUS        A. DST DEST=MPC
12    B. DST DEST=MRAMLO        C. DST DEST=MRAMHI
13 : DEST=DLO  <DDLO>  1 >DLO ! ;
14 : DEST=DHI  <DDHI>  1 >DHI ! ;
15 DECIMAL
```

SCR #17
```
 0 \ RP STACK POINTER CONTROL
 1 HEX
 2 : RP  ( DVALUE -> )    ( PFA -> )
 3    CREATE  OF DLSLN  D,
 4    DOES>       >RP @   ABORT" MULTIPLE RP STATEMENTS"
 5                1 >RP !  D@  MICRO-WORD D@ FFFE7FFF. DAND
 6          DOR   MICRO-WORD D!  ;
 7
 8    0. RP DEC[RP]
 9    1. RP INC[RP]
10
11
12
13 DECIMAL
14
15
```

```
SCR #18
   0 \ DP STACK POINTER CONTROL
   1 HEX
   2 : QP    ( DVALUE -> )      ( PFA -> )
   3    CREATE   OD DLSLN  D,
   4    DOES>       >DP @   ABORT" MULTIPLE DP STATEMENTS"
   5              1 >DP !    D@    MICRO-WORD D@ FFFF9FFF. DAND
   6        DOR    MICRO-WORD D!  ;
   7
   8  O. QP DEC[DP]
   9  1. QP INC[DP]
  10
  11
  12
  13 DECIMAL
  14
  15

SCR #19
   0 \ SHIFT CARRY CONTROL   SC=0   SC=1
   1 HEX
   2 : SC=0    ( -> )
   3    >SHIFTIN @  ABORT" MULTIPLE SC STATEMENTS"  1 >SHIFTIN ! ;
   4
   5 : SC=1    ( -> )
   6    >SHIFTIN @  ABORT" MULTIPLE SC STATEMENTS"  1 >SHIFTIN !
   7    20000000. MICRO-WORD D+!  ;
   8
   9 DECIMAL
  10
  11
  12
  13
  14
  15

SCR #20
   0 \ INC[MPC] , INC[PC]   DECODE
   1 HEX
   2 : INC[MPC]    ( -> )
   3    >INCMPC @  ABORT" MULTIPLE INC[MPC] STATEMENTS"
   4      1 >INCMPC ! ;
   5
   6 : INC[PC]    ( -> )
   7    >INCPC @  ABORT" MULTIPLE INC[PC] STATEMENTS"  1 >INCPC ! ;
   8
   9 : DECODE     ( -> )
  10    >DECODE @  ABORT" MULTIPLE DECODE STATEMENTS"  1 >DECODE !
  11    ( Leave bit at 0 ) ;
  12
  13 DECIMAL
  14
  15

SCR #21
   0 \ DLO AND DHI CONTROL
   1 HEX
   2 : SL[DHI]   ( -> )
   3    >DHI @  ABORT" MULTIPLE DHI STATEMENTS"   1 >DHI !
   4    00080000. MICRO-WORD D+! ;
   5 : SR[DHI]    ( -> )
```

```
 6     >DHI @  ABORT" MULTIPLE DHI STATEMENTS"   1 >DHI !
 7     00100000. MICRO-WORD D+! ;
 8
 9 : SR[DLO]    ( -> )
10     >DLO @  ABORT" MULTIPLE DLO STATEMENTS"   1 >DLO !
11     00040000. MICRO-WORD  D+! ;
12 : SL[DLO]    ( -> )
13     >DLO @  ABORT" MULTIPLE DLO STATEMENTS"   1 >DLO !
14     00020000. MICRO-WORD D+! ;
15 DECIMAL

SCR #22
 0 \ ALU DEFINITIONS
 1 HEX
 2 : ALU  ( DVALUE -> )     ( PFA -> )
 3    CREATE  D,
 4    DOES>      >ALU @   ABORT" MULTIPLE ALU= STATEMENTS"
 5               1 >ALU !    D@  MICRO-WORD D+! ;
 6 \ Logical definitions
 7   1000. ALU ALU=notA            1900. ALU ALU=AxnorB
 8   1100. ALU ALU=AnorB           1A00. ALU ALU=B
 9                                 1B00. ALU ALU=AandB
10   1300. ALU ALU=0               1C00. ALU ALU=-1
11   1400. ALU ALU=AnandB
12   1500. ALU ALU=notB            1E00. ALU ALU=AorB
13   1600. ALU ALU=AxorB           1F00. ALU ALU=A
14
15 DECIMAL SCR #23
 0 \ ALU DEFINITIONS - 2
 1 HEX
 2 \ Arithmetic definitions
 3  40000600. ALU   ALU=A-B-1
 4  40000900. ALU   ALU=A+B
 5  40000C00. ALU   ALU=A+A
 6  40000F00. ALU   ALU=A-1
 7
 8  00000000. ALU   ALU=A+1
 9  00000600. ALU   ALU=A-B
10  00000900. ALU   ALU=A+B+1
11  00000C00. ALU   ALU=A+A+1
12
13 DECIMAL
14
15

SCR #24
 0 \  BOARD MEMORY ACCESS    Z! Z@
 1 DECIMAL
 2 : Z!    ( N ADDR -> )
 3    [ 0 :: ALU=A DEST=PC ;SET  MICRO-WORD D@ ] DLITERAL MIR! X!
 4    [ 1 :: DEST=RAM  ;SET MICRO-WORD D@ ] DLITERAL MIR! X! ;
 5
 6 : Z@    ( ADDR -> N )
 7    [ 0 :: ALU=A DEST=PC ;SET  MICRO-WORD D@ ] DLITERAL MIR! X!
 8    [ 1 :: SOURCE=RAM  ;SET MICRO-WORD D@ ] DLITERAL  MIR! X@ ;
 9
10
11
12
```

```
     13
    .14
     15

;

SCR #25
   0 \ NEXT ADDRESS GENERATION/JMP
   1 HEX
   2 : JMP    ( DVALUE -> )      ( PFA -> )
   3     CREATE   18  DLSLN   D,
   4     DOES>       >JMP @    ABORT" MULTIPLE JMP= STATEMENTS"
   5              1  >JMP !    D@  MICRO-WORD  D+!   ;
   6
   7   00.  JMP    JMP=000            1C.  JMP    JMP=001
   8   01.  JMP    JMP=010            1D.  JMP    JMP=011
   9   02.  JMP    JMP=100            1E.  JMP    JMP=101
  10   03.  JMP    JMP=110            1F.  JMP    JMP=111
  11
  12   04.  JMP    JMP=00CA           05.  JMP    JMP=01CA
  13   06.  JMP    JMP=10CA           07.  JMP    JMP=11CA
  14
  15 DECIMAL

SCR #26
   0 \ NEXT ADDRESS GENERATION/JMP - 2
   1 HEX
   2   08.  JMP    JMP=00CB           09.  JMP    JMP=01CB
   3   0A.  JMP    JMP=10CB           0B.  JMP    JMP=11CB
   4
   5   0C.  JMP    JMP=00CC           0D.  JMP    JMP=01CC
   6   0E.  JMP    JMP=10CC           0F.  JMP    JMP=11CC
   7   10.  JMP    JMP=00CD           11.  JMP    JMP=01CD
   8   12.  JMP    JMP=10CD           13.  JMP    JMP=11CD
   9
  10   14.  JMP    JMP=00S            15.  JMP    JMP=01S
  11   16.  JMP    JMP=10S            17.  JMP    JMP=11S
  12
  13   18.  JMP    JMP=00E            19.  JMP    JMP=01E
  14   1A.  JMP    JMP=10E            1B.  JMP    JMP=11E
  15 DECIMAL

SCR #27
   0 \ AUTOMATIC NEXT ADDRESS GENERATION
   1 HEX
   2 : <AUTO-ADDR>    ( -1..7 -> )
   3      CASE -1 =    IFCASE    JMP=000    NEXTCASE
   4            0 =    IFCASE    JMP=001    NEXTCASE
   5            1 =    IFCASE    JMP=010    NEXTCASE
   6            2 =    IFCASE    JMP=011    NEXTCASE
   7            3 =    IFCASE    JMP=100    NEXTCASE
   8            4 =    IFCASE    JMP=101    NEXTCASE
   9            5 =    IFCASE    JMP=110    NEXTCASE
  10            6 =    IFCASE    JMP=111    NEXTCASE
  11            7 =    IFCASE    ABORT" NOT JMP= ON PAGE CROSSING"
  12      ELSECASE   1 ABORT" ERROR IN AUTO-ADDR"    ENDCASE    ;
  13
  14 DECIMAL
  15

;
```

```
SCR #28
  0 \ BOARD MICRO-MEMORY ACCESS    SETMPC   MADDR
  1 HEX
  2 CODE 8/FF00-OR    ( ADDR1 -> ADDR2 )
  3    AX POP    AX , 1 SHR    AX , 1 SHR    AX , 1 SHR    AX , # FF00 OR
  4    AX PUSH   NEXT JMP       END-CODE
  5
  6 : SETMPC   ( MRAM-ADDR -> )
  7     [ 0 :: DEST=MPC  DECODE ;SET MICRO-WORD D@ ] DLITERAL MIR!
  8           8/FF00-OR   X!  ;
  9
 10 : MADDR    ( ADDR -> )
 11    ( Set microinstruction address bits )
 12     1 :: 07 AND  1-  <AUTO-ADDR>  ;
 13
 14 DECIMAL
 15

SCR #29
  0 \ SET UP FOR HIGH SPEED MICROCODE LOAD
  1 HEX
  2 \ Set appropriate micro-word bits within a page
  3 CODE SET-UP-MADDR  ( DMICRO-WORD1  LO-ADDR -> DMICRO-WORD2 )
  4    AX POP   BX POP
  5    DH , AL MOV     DH , # 6 AND      DH , 1 SHR
  6    BH , DH OR
  7    AX , # 1 AND    <>0? IF   BH , # 01C OR   THEN
  8    BX PUSH
  9    NEXT JMP   END-CODE
 10
 11 DECIMAL
 12
 13
 14
 15

SCR #30
  0 \ HIGH SPEED MICROCODE LOAD FOR A PAGE
  1 DECIMAL
  2 : MZ!PAGE   ( D0 ... D7  MADDR -> )  \ Load page of 8 microwords
  3    SETMPC      0 7
  4    DO  [ 0 :: DEST=MRAMHI JMP=000 ;SET  MICRO-WORD D@ ] DLITERAL
  5         I SET-UP-MADDR  MIR!  X!
  6        [ 0 :: DEST=MRAMLO JMP=000 ;SET  MICRO-WORD D@ ] DLITERAL
  7         I SET-UP-MADDR  MIR!  X!
  8       -1 +LOOP ;
  9
 10
 11
 12
 13
 14
 15

SCR #31
  0 \ BOARD MICRO-MEMORY ACCESS    MZ!   MZ@
  1 HEX
  2 : MZ!   ( D ADDR -> )
  3  >R R@ SETMPC    R@  MADDR    DEST=MRAMHI  ;SET  X!
  4                  R>  MADDR    DEST=MRAMLO  ;SET  X!  ;
```

```
   5
   6 : MZ@      ( ADDR -> D )
   7   DUP   SETMPC   DUP   MADDR   SOURCE=MRAMLO   ;SET   X@   SWAP
   8                        MADDR   SOURCE=MRAMHI   ;SET   X@   ;
   9
  10 DECIMAL
  11
  12
  13
  14
  15

SCR #32
   0 \ STORE MICROCODE WORD --    ;;   INSTRUCTION   END
   1 HEX
   2 : ;;   ( -> )
   3   >JMP @ NOT
   4   IF   CURRENT-OFFSET @   <AUTO-ADDR>   THEN
   5   FINISH   MICRO-WORD D@
   6   CURRENT-PAGE @   8 *   CURRENT-OFFSET @  +  MZ!  ;
   7
   8 : INSTRUCTION   ( N -> )
   9    STOP   CURRENT-PAGE ! ;
  10
  11 : <END>   ( -> )
  12    >END @   ABORT" MULTIPLE END STATEMENTS"
  13    1 >END !    ;
  14 : END      <END>         JMP=000 ;
  15 FORTH DEFINITIONS     DECIMAL

SCR #33
   0 \ FORTH BOARD I/O PRIMITIVES --   W->BOARD - 1
   1 HEX
   2 MICRO-ASSEMBLER
   3 0 ::  DEST=RAM  ;SET       MICRO-WORD D@      DROP
   4 DUP OFF AND           CONSTANT TO-RAM-LO
   5 BYTESWAP OFF AND    CONSTANT TO-RAM-HI
   6
   7 MICRO-ASSEMBLER
   8 1 :: ALU=A DEST=PC ;SET     MICRO-WORD D@    DROP
   9 DUP OFF AND          CONSTANT TO-PC-LO
  10 BYTESWAP OFF AND   CONSTANT TO-PC-HI
  11
  12 FORTH
  13 DECIMAL
  14
  15

;

SCR #34
   0 \ FORTH BOARD I/O PRIMITIVES --   W->BOARD       - 2
   1 HEX
   2 CODE W->BOARD   ( IBMADDR BOARD-ADDR WORDCOUNT -> )
   3    AX , # 3E7 MOV    ES , AX MOV
   4    CX POP     BX POP      DI , SI MOV     SI POP
   5    BEGIN   ( 0 :: ALU=A   DEST=PC ;SET )
   6            AL , # TO-PC-HI MOV    DX , ES    MOV    DX , AL OUT
   7            AL , # TO-PC-LO MOV    DX , # 3E2 MOV    DX , AL OUT
   8            ( Store count in PC )
```

```
   9                AL , BH     MOV    DX , ES    MOV   DX , AL    OUT
  10                AL , BL     MOV    DX , # 3E0 MOV   DX , AL    OUT
  11
  12 DECIMAL
  13
  14
  15

SCR #35
   0 \ FORTH BOARD I/O PRIMITIVES --   W->BOARD         - 3
   1 HEX
   2          ( 0 :: DEST=RAM ;SET )
   3          AL , # TO-RAM-HI MOV    DX , ES     MOV   DX , AL    OUT
   4          AL , # TO-RAM-LO MOV    DX , # 3E2 MOV    DX , AL    OUT
   5  \   Store the actual 16-bit value  into RAM
   6          LODSW    AH , AL XCHG DX , ES       MOV   DX , AL    OUT
   7          AL , AH MOV            DX , # 3E0 MOV    DX , AL    OUT
   8        BX INC
   9     ?LOOP  UNTIL
  10     SI , DI MOV
  11     NEXT JMP    END-CODE
  12 DECIMAL
  13
  14
  15

SCR #36
   0 \  TRANSFER IBM PC RAM TO BOARD RAM  --- IBM->BOARD
   1 HEX
   2 : IBM->BOARD           ( IBMADDR   BOARDADDR WORD-COUNT -> )
   3   MICRO-ASSEMBLER    STOP
   4   [ 0 :: ;SET MICRO-WORD D@ ] DLITERAL MIR!
   5   W->BOARD
   6   [ 3 :: SOURCE=PCSAVE  ALU=A+1 DEST=PC ;SET  MICRO-WORD D@ ]
   7         DLITERAL   MIR!   CYCLE   ;
   8 FORTH DECIMAL
   9
  10
  11
  12
  13
  14
  15
     ;

SCR #37
   0 \ FORTH BOARD I/O PRIMITIVES --   W->IBM
   1 HEX
   2 CODE W->IBM   ( IBMADDR   WCOUNT -> )    \ Factored word
   3    CX POP    DI POP    AX , DS MOV    ES , AX  MOV
   4    BEGIN    DX , # 3E9  MOV      AL , DX IN    AH , AL MOV
   5             DX , # 3E8  MOV      AL , DX IN    STOSW
   6             DX , # 3E4  MOV      DX , AL   OUT
   7       ?LOOP UNTIL
   8    NEXT  JMP   END-CODE
   9
  10 DECIMAL
  11
  12
  13
  14
  15
```

```
SCR #38
   0 \ TRANSFER BOARD RAM TO IBM PC RAM   --- BOARD->IBM
   1 HEX
   2 : BOARD->IBM           ( BOARDADDR  IBMADDR WORD-COUNT -> )
   3    MICRO-ASSEMBLER  STOP
   4    [ 0 ::  ALU=A DEST=PC  ;SET  MICRO-WORD D@ ]  DLITERAL
   5         MIR!    ROT  X!
   6    [ 1 ::  SOURCE=RAM  INC[PC]  ;SET  MICRO-WORD D@ ]
   7         DLITERAL    MIR!
   8    W->IBM
   9    [ 2 ::  SOURCE=PCSAVE  ALU=A+1 DEST=PC ;SET MICRO-WORD D@ ]
  10         DLITERAL    MIR!   CYCLE  ;
  11
  12 FORTH  DECIMAL
  13
  14
  15

SCR #39
   0 \  SAVE MICROCODE IMAGE ON SCREENS 1-8  IN FILE0
   1 DECIMAL
   2 : SAVE-MICRO-SCREEN  ( START-UADDR SCREEN# -> )
   3    BUFFER     OVER  256 +    ROT
   4    DO   I MICRO-ASSEMBLER  MZ@ FORTH  3 PICK  D!   4 +    LOOP
   5    DROP    UPDATE  ;
   6
   7 : SAVE-MICROCODE      ( -> )
   8    DR0   SAVE-BUFFERS      0     MICRO-ASSEMBLER   STOP   FORTH
   9    228 220 DO    DUP .  I .     DUP  I SAVE-MICRO-SCREEN
  10                         256 +     CR LOOP
  11    DROP    SAVE-BUFFERS  ;
  12
  13
  14
  15

SCR #40
   0 \  LOAD MICROCODE IMAGE ON SCREENS 1-8  IN FILE0
   1 DECIMAL
   2 : LOAD-MICRO-SCREEN  ( START-UADDR SCREEN# -> )
   3    BLOCK      OVER  256 +    ROT
   4    DO    8 0 DO  DUP D@ ROT    4 +    LOOP
   5         I  SWAP >R  MICRO-ASSEMBLER  MZ!PAGE FORTH   R>
   6    8 +LOOP      DROP ;
   7
   8 : LOAD-MICROCODE      ( -> )
   9    DR0   SAVE-BUFFERS      0    MICRO-ASSEMBLER   STOP   FORTH
  10    228 220 DO    DUP .  I .     DUP  I LOAD-MICRO-SCREEN
  11                         256 +     CR LOOP
  12    DROP  ;
  13
  14
  15

SCR #41
   0 \  SAVE PGMRAM IMAGE ON SCREENS 9-...  --  IN FILE0
   1 DECIMAL  DMODE
   2 : SAVE-BOARD-SCREEN  ( BOARD-ADDR SCREEN# -> )
   3    BUFFER      512  BOARD->IBM     UPDATE  ;
   4
```

```
 5 : SAVE-BOARD-FORTH    ( -> )
 6    DRO    SAVE-BUFFERS         0
 7    MEM-SIZE O  512   U/MOD SWAP   DROP   230 +     230
 8    DO   DUP U.   I U.    DUP  I SAVE-BOARD-SCREEN
 9                                        512 +    CR LOOP
10    DROP    SAVE-BUFFERS  ;
11
12
13
14
15

SCR #42
 0 \ LOAD PGMRAM IMAGE ON SCREENS 9- ...  -- IN FILE0
 1 DECIMAL
 2 : LOAD-BOARD-SCREEN    ( START-ADDR SCREEN# -> )
 3    BLOCK    SWAP   512     IBM->BOARD  ;
 4
 5 : LOAD-BOARD-FORTH    ( -> )
 6    DRO    O  SAVE-BUFFERS       MICRO-ASSEMBLER   STOP    FORTH
 7    MEM-SIZE O  512   U/MOD SWAP   DROP   230 +     230
 8    DO   DUP U.   I U.    DUP  I LOAD-BOARD-SCREEN
 9                                        512 +    CR LOOP
10    DROP  ;
11
12 : LOAD-ALL    LOAD-MICROCODE   LOAD-BOARD-FORTH ;
13
14
15

;

SCR #43
 0 \ FORTH BOARD I/O PRIMITIVES --   C->BOARD        - 1
 1 HEX
 2 CODE C->BOARD   ( IBMADDR BOARD-ADDR BYTECOUNT -> )
 3    AX , # 3E7 MOV   ES , AX MOV
 4    CX POP    BX POP     DI , SI MOV    SI POP
 5    BEGIN  ( 0 :: ALU=A   DEST=PC ;SET )
 6           AL , # TO-PC-HI MOV    DX , ES    MOV    DX , AL  OUT
 7           AL , # TO-PC-LO MOV    DX , # 3E2 MOV    DX , AL  OUT
 8           ( Store count in PC )    AX , AX MOV
 9           AL , BH         MOV   DX , ES    MOV    DX , AL  OUT
10           AL , BL         MOV   DX , # 3E0 MOV    DX , AL  OUT
11
12 DECIMAL
13
14
15

SCR #44
 0 \ FORTH BOARD I/O PRIMITIVES --   W->BOARD        - 3
 1 HEX
 2           ( 0 :: DEST=RAM ;SET )
 3           AL , # TO-RAM-HI MOV   DX , ES    MOV    DX , AL  OUT
 4           AL , # TO-RAM-LO MOV   DX , # 3E2 MOV    DX , AL  OUT
 5           AL , AL XOR            DX , ES    MOV    DX , AL  OUT
```

```
 6          LODSB              DX , # 3E0 MOV    DX , AL   OUT
 7          BX INC
 8   ?LOOP UNTIL
 9   SI , DI MOV
10   NEXT JMP     END-CODE
11 DECIMAL
12
13
14
15
```

```
SCR #45
 0 \ TRANSFER IBM PC RAM TO BOARD RAM   --- IBM->BOARD(BYTE)
 1 HEX
 2 : IBM->BOARD(BYTE)    ( IBMADDR  BOARDADDR BYTE-COUNT -> )
 3    MICRO-ASSEMBLER    STOP
 4    [ 0 :: ;SET  MICRO-WORD D@ ] DLITERAL MIR!
 5    C->BOARD
 6    [ 3 ::  SOURCE=PCSAVE  ALU=A+1 DEST=PC ;SET  MICRO-WORD D@ ]
 7           DLITERAL  MIR!   CYCLE  ;
 8 FORTH DECIMAL
 9
10
11
12
13
14
15
```

```
SCR #46
 0 \ FORTH BOARD I/O PRIMITIVES --  C->IBM
 1 HEX
 2 CODE C->IBM    ( IBMADDR  COUNT -> )    \ Factored word
 3    CX POP     DI POP    AX , DS MOV    ES , AX  MOV
 4    BEGIN     DX , # 3E8  MOV        AL , DX IN     STOSB
 5              DX , # 3E4  MOV        DX , AL   OUT
 6       ?LOOP UNTIL
 7    NEXT  JMP    END-CODE
 8
 9 DECIMAL
10
11
12
13
14
15
```

```
SCR #47
 0 \ TRANSFER BOARD RAM TO IBM PC RAM   --- BOARD->IBM(BYTE)
 1 HEX
 2 : BOARD->IBM(BYTE)    ( BOARDADDR  IBMADDR WORD-COUNT -> )
 3    MICRO-ASSEMBLER    STOP
 4    [ 0 ::  ALU=A DEST=PC  ;SET  MICRO-WORD D@  ]  DLITERAL
 5           MIR!     ROT   X!
 6    [ 1 ::  SOURCE=RAM  INC[PC] ;SET  MICRO-WORD D@ ]
 7           DLITERAL    MIR!
```

```
 8      C->IBM
 9      [ 2 ::  SOURCE=PCSAVE   ALU=A+1  DEST=PC  ;SET MICRO-WORD D@ ]
10              DLITERAL   MIR!    CYCLE   ;
11
12 FORTH  DECIMAL
13
14
15

SCR #48
  0 \  DATA STACK TO BOARD
  1 HEX    FORTH DEFINITIONS
  2 : DS->BOARD   (  ...STACKIN... -> )
  3   MICRO-ASSEMBLER
  4     STOP
  5     DEPTH 1+   NEGATE   OFF AND    >R
  6     DEPTH 0=  IF   0    THEN
  7     OFF  R@   DO
  8      [ 0 :: DEST=DP  ;SET MICRO-WORD D@ ] DLITERAL MIR!    I   X!
  9      [ 0 :: DEST=DS  ;SET MICRO-WORD D@ ] DLITERAL MIR!        X!
 10     LOOP
 11     0 :: DEST=DP   ;SET  R>     X!
 12     [ 0 :: SOURCE=DS  ALU=A   DEST=DHI   INC[DP]   ;SET
 13        MICRO-WORD D@ ]  DLITERAL   MIR!  CYCLE  ;
 14 FORTH
 15 DECIMAL

SCR #49
  0 \  DATA STACK FROM BOARD
  1 HEX    FORTH DEFINITIONS
  2 : BOARD->DS   ( -> ...STACKOUT... )
  3   MICRO-ASSEMBLER         STOP
  4     SP!    0 :: SOURCE=DP   ;SET   X@   OFF AND
  5     DUP  00  =   IF      DROP
  6     ELSE   1-
  7        1 ::  DEC[DP]   ;DO
  8         [ 2 :: SOURCE=ALU  ALU=B  DEST=DS  ;SET  MICRO-WORD D@ ]
  9            DLITERAL   MIR!   CYCLE
 10        3 ::  DEST=DP   ;SET    0FE X!
 11         [ 1 :: SOURCE=DS  DEC[DP]  ;SET    MICRO-WORD D@ ]
 12            DLITERAL   MIR!
 13        OFF   SWAP  DO              X@  CYCLE   LOOP
 14     THEN  ;
 15 FORTH   DECIMAL

SCR #50
  0 \ BOARD VOCABULARY
  1 DECIMAL    FORTH  DEFINITIONS
  2 : B-RES    [ 'INTERPRET @ ] LITERAL   'INTERPRET !  ;
  3
  4 VARIABLE 'BINTER     'INTERPRET @   'BINTER !
  5
  6 VOCABULARY BOARD-VOC   IMMEDIATE
  7 : {       ( -> )         \ Enter board vocabulary/execution mode
  8    [COMPILE] BOARD-VOC  DEFINITIONS
  9    'BINTER @  'INTERPRET !
 10    ( Get rid of return stack junk )
 11    R> R> DDROP   'INTERPRET @ EXECUTE ;
 12
 13 FORTH DEFINITIONS
 14
 15
```

```
SCR #51
   0 \ NULL FOR BOARD VOCABULARY
   1 HEX    BOARD-VOC  DEFINITIONS
   2 : X     FORTH    BLK @              \ Redefine null
   3     IF  STATE @  ?STREAM  THEN       R> DROP   ;
   4 BOARD-VOC
   5
   6
   7 DECIMAL
   8
   9
  10
  11
  12
  13
  14
  15

SCR #52
   0 \ SERVICE ARRAY
   1 DECIMAL  FORTH DEFINITIONS
   2 CREATE SERVICE-ARRAY  512 ALLOT
   3
   4
   5 : SERVICE-ENTRY  ( CFA INDEX -> )
   6    DUP 255 >    OVER  1 <  OR
   7       ABORT" INVALID SERVICE-ENTRY INDEX"
   8    2*  SERVICE-ARRAY + ! ;
   9
  10
  11
  12
  13
  14
  15

SCR #53
   0 \ SERVICE ARRAY  INITIALIZATION
   1 DECIMAL
   2 : BAD-SERVICE-CALL  ( -> )
   3    1 ABORT" CALL TO BAD SERVICE ROUTINE" ;
   4
   5 : XXX         \ SCRATCH
   6    256 1 DO
   7       ' BAD-SERVICE-CALL CFA   I   SERVICE-ENTRY LOOP ;
   8
   9 XXX
  10 FORGET XXX
  11
  12
  13
  14
  15

SCR #54
   0 \ SERVICE CALL PRIMITIVES
   1 HEX   FORTH DEFINITIONS
   2 : RESTART  ( -> )      \ Restart FORTH board for concurrent usage
   3    MICRO-ASSEMBLER  [ 3 :: JMP=100  ;SET  MICRO-WORD D@ ]
   4    DLITERAL  MIR!  GO   FORTH  ;
   5
```

```
  6 : SERV-PAGE    ( Board:  -> )
  7    RESTART  PAGE ;
  8 ' SERV-PAGE CFA   3 SERVICE-ENTRY
  9
 10 : SERV-KEY    ( Board: 0 -> CHAR )       MICRO-ASSEMBLER
 11    [ 0 :: ALU=A  DEST=DHI ;SET  MICRO-WORD D@ ] DLITERAL MIR!
 12    KEY   X!    FORTH  RESTART  ;
 13 ' SERV-KEY CFA   4 SERVICE-ENTRY
 14
 15 DECIMAL SCR #55
  0 \ SERVICE CALL PRIMITIVES   - 2
  1 DECIMAL  FORTH DEFINITIONS
  2 : SV-2ND    ( -> 2ND.STACK.ITEM )      MICRO-ASSEMBLER
  3    [ 0 :: SOURCE=DS ;SET MICRO-WORD D@ ] DLITERAL MIR! X@ ;
  4
  5 : SERV-READ    ( Board: AD BLK# -> AD BLK# )  MICRO-ASSEMBLER
  6    X@  FORTH  DUP  >R
  7    BLOCK   SV-2ND  1024 IBM->BOARD(BYTE)       RESTART
  8 \  Perform read of next block to have it avaiable in RAM
  9    R> 1+ BPDRV MIN  BLOCK DROP  ;
 10 ' SERV-READ CFA   6 SERVICE-ENTRY
 11 : SERV-WRITE  ( Board: AD BLK# -> AD BLK# )  MICRO-ASSEMBLER
 12    X@  FORTH SV-2ND
 13    SWAP OFFSET @ +  BUFFER  1024       BOARD->IBM(BYTE)
 14    RESTART  UPDATE   SAVE-BUFFERS  ;
 15 ' SERV-WRITE CFA   7 SERVICE-ENTRY SCR #56
  0 \ SERVICE CALL PRIMITIVES   - 3
  1 DECIMAL  FORTH DEFINITIONS
  2 : SERV-TERM    ( Board: 0 -> FLAG )      MICRO-ASSEMBLER
  3    [ 0 :: ALU=A  DEST=DHI ;SET  MICRO-WORD D@ ] DLITERAL MIR!
  4    ?TERMINAL
  5    IF  -1 ELSE 0  THEN  X!   FORTH  RESTART ;
  6 ' SERV-TERM CFA   5 SERVICE-ENTRY
  7
  8
  9
 10
 11
 12
 13
 14
 15

SCR #57
  0 \ SERVICE CALL PRIMITIVES   - 4
  1 HEX  FORTH DEFINITIONS
  2 : SERV-EMIT     ( Board: CHAR EPRINT -> CHAR EPRINT )
  3    EPRINT @  MICRO-ASSEMBLER  X@    EPRINT !
  4    SV-2ND   FORTH  RESTART
  5    EMIT    EPRINT !  ;
  6 ' SERV-EMIT CFA   1 SERVICE-ENTRY
  7
  8 : SERV-CR      ( Board: EPRINT -> EPRINT )
  9    EPRINT @   MICRO-ASSEMBLER  X@    EPRINT !
 10    RESTART  CR      EPRINT !  ;
 11 ' SERV-CR CFA   2 SERVICE-ENTRY
 12
 13 DECIMAL
 14
 15
```

```
SCR #58
  0 \ SERVICE CALL WAIT LOOP WORD
  1 HEX   FORTH DEFINITIONS
  2 \  Uses the DECODE instruction in SYSCALL OFFSET:2 to restart
  3 : NOP ;
  4 ' NOP CFA   OFF   SERVICE-ENTRY
  5
  6 : BSERVICE    ( -> )
  7    BEGIN
  8       BEGIN   MICRO-ASSEMBLER   STATUS FORTH  ?DUP UNTIL
  9       MICRO-ASSEMBLER   STOP     FORTH
 10       DUP >R   OFF AND   2*   SERVICE-ARRAY +  @ EXECUTE
 11    R>     OFF =  UNTIL ;
 12
 13 FORTH
 14 DECIMAL
 15

SCR #59
  0 \ EXECUTE A PROGRAM ON THE BOARD --   BEXECUTE
  1 HEX   FORTH DEFINITIONS
  2 \  Uses the NOP instruction in INSTR:0 OFFSET:7 to run
  3 : BEXECUTE   ( ..STACKIN.. ADDR -> ..STACKOUT.. )
  4    MICRO-ASSEMBLER    >R    ?STACK
  5    0 :: DEST=STATUS   ;SET   0 X!    ( Reset status reg )
  6    FORTH  DS->BOARD  MICRO-ASSEMBLER
  7    1 :: DEST=MPC DECODE   ;SET   FF00 X!  ( Boot instruction )
  8    2 :: ALU=A  DEST=PC    ;SET   R> X!    ( Start address )
  9    3 ::  JMP=101  ;SET
 10    ." START..."   GO
 11    BSERVICE       ." END "   CR
 12    FORTH  BOARD->DS    ;
 13 FORTH    DECIMAL
 14
 15

SCR #60
  0 \ OP-EXECUTE       BOARD
  1 HEX   FORTH DEFINITIONS
  2 : OP-EXECUTE   ( N -> )    \ Single step execute a primitive
  3    MICRO-ASSEMBLER    STOP       0 Z!
  4    FF02 ( HALT ) 1 Z!
  5    0 BEXECUTE     ;
  6
  7 \  JUMP start the board using the COLD execution vector
  8 : BOARD    ( -> )
  9    5 BEXECUTE  ;
 10
 11 DECIMAL
 12
 13
 14
 15

SCR #61
  0 \ REDEFINE INTERPRET FOR  BOARD VOCABULARY USAGE
  1 DECIMAL              FORTH DEFINITIONS
  2 VARIABLE BOARD-FENCE    HERE BOARD-FENCE !
  3 : BOARD-INTERPRET
  4    BEGIN  -FIND
  5       IF
```

```
 6            DROP  DUP       BOARD-FENCE @    U<
 7            IF    CFA  EXECUTE
 8            ELSE  @    OP-EXECUTE
 9            THEN
10       ELSE  HERE   NUMBER     DPL @ 1+
11            NOT IF  DROP      THEN
12       THEN
13   ?STACK    AGAIN    ;
14
15 ' BOARD-INTERPRET   CFA  'BINTER !
```

SCR #62
```
 0              '
 1
 2
 3
 4
 5
 6
 7
 8
 9
10
11
12
13
14
15
```

SCR #63
```
 0 \ CROSS COMPILER VOCABULARY SETUP
 1 DECIMAL
 2 : C-RES
 3    [ 'INTERPRET @ ] LITERAL    'INTERPRET ! ; \ Restore vector
 4
 5 VARIABLE 'CINTER      'INTERPRET @  'CINTER !
 6
 7 VOCABULARY CROSS-VOC   IMMEDIATE
 8
 9 : CROSS-COMPILER  ( -> )
10    [COMPILE] CROSS-VOC     'CINTER @  'INTERPRET !   INTERPRET ;
11                                       IMMEDIATE
12
13 : CC  [COMPILE] CROSS-COMPILER ;
14
15
```

SCR #64
```
 0 \ CROSS COMPILER VOCABULARY SETUP - 2
 1 DECIMAL
 2 CROSS-VOC  DEFINITIONS
 3 : FORTH-VOC    [COMPILE]  FORTH  ;  IMMEDIATE
 4 : MICRO-VOC    [COMPILE] MICRO-ASSEMBLER  ; IMMEDIATE
 5
 6
 7 : FORTH     C-RES     [COMPILE] FORTH   INTERPRET ; IMMEDIATE
 8 : MICRO-ASSEMBLER  C-RES  [COMPILE] MICRO-ASSEMBLER
 9               INTERPRET   ; IMMEDIATE
10
```

```
11 : EDITOR    C-RES  [COMPILE]  EDITOR INTERPRET ;      IMMEDIATE
12 MICRO-ASSEMBLER  DEFINITIONS
13 : ;;END  [COMPILE]  CROSS-COMPILER ;
14 CROSS-COMPILER DEFINITIONS
15
```

```
SCR #65
 0 \  CONSTANTS FOR MICRO-CODE REFERENCES BY CROSS-ASSEMBLER
 1 HEX   CROSS-COMPILER  DEFINITIONS
 2 FF01   CONSTANT  [EXIT]         FF29   CONSTANT  [DO]
 3 FF02   CONSTANT  [HALT]         FF3B   CONSTANT  [BRANCH]
 4 FF04   CONSTANT  [DOVAR]        FF4E   CONSTANT  [LIT]
 5 FF05   CONSTANT  [DOCON]        FF03   CONSTANT  [SYSCALL]
 6 FF13   CONSTANT  [OBRANCH]
 7 FF19   CONSTANT  [#DO]
 8 FF1A   CONSTANT  [#LOOP]
 9 FF20   CONSTANT  [+LOOP]
10 FF22   CONSTANT  [/LOOP]
11 FF2E   CONSTANT  [LOOP]
12
13
14
15 DECIMAL
```

```
SCR #66
 0 \ CROSS-COMPILER DICTIONARY HANDLING
 1 DECIMAL   CROSS-COMPILER  DEFINITIONS
 2 7 CONSTANT USER-AREA
 3 VARIABLE BDP      80 BDP !       \ 7 .. 80 is USER area
 4 : BHERE   ( -> N )
 5    BDP @ ;
 6 : B,  ( N -> )
 7    BHERE  MICRO-ASSEMBLER   Z!  CROSS-COMPILER    1 BDP +! ;
 8
 9 : BLITERAL  ( N -> )
10    STATE @
11    IF   [LIT] B,   B,  THEN    ;
12
13 : DBLITERAL  ( N -> )
14    STATE @
15    IF   SWAP   [LIT] B,  B,    [LIT]  B,  B,  THEN  ;
  ;
```

```
SCR #67
 0 \ CREATE  FOR CROSS-COMPILER
 1 HEX    CROSS-COMPILER  DEFINITIONS
 2 VARIABLE  BLATEST              0 BLATEST !
 3 : BCREATE    ( -> )     \ Create a header on both IBM and Board
 4    [COMPILE] BOARD-VOC  DEFINITIONS    FORTH CREATE
 5    CROSS-COMPILER    ( At run time BOARD-VOC is still current )
 6    BLATEST @ B,      BHERE  BLATEST  !
 7    LATEST    C@   01F AND    8000 OR    B,
 8    LATEST    DUP  C@   01F AND    0
 9    DO   1+   DUP C@  7F AND  B,  LOOP    DROP
10    [COMPILE] CROSS-VOC   DEFINITIONS  ;
11
12 : BSMUDGE   ( -> )
13    BLATEST @   DUP  MICRO-ASSEMBLER   Z@   2000  XOR
14    SWAP  Z!     CROSS-COMPILER     ;
15 DECIMAL
```

```
SCR #68
  0 \ OPCODE:  --- DEFINE A MICROCODE DEFINITION
  1 HEX    CROSS-COMPILER   DEFINITIONS
  2 : OPCODE:  ( N -> )  ( LOADING: Usage  17 OPCODE: <name> )
  3      ( Executing <name> gives address of variable with N + FF00 )
  4    MICRO-ASSEMBLER    DUP  INSTRUCTION    CROSS-COMPILER
  5    BCREATE    FF00 OR  DUP  , B,  ( DEFAULTs to VARIABLE )
  6    BLATEST @    MICRO-ASSEMBLER
  7    DUP   Z@  1000   OR  SWAP   Z!
  8    CROSS-COMPILER     [EXIT]   B,
  9      [COMPILE]   MICRO-VOC           ;
 10
 11 CROSS-COMPILER    DECIMAL
 12
 13
 14
 15

SCR #69
  0 \  ABORT"  ."  FOR CROSS-COMPILER
  1 HEX    CROSS-COMPILER   DEFINITIONS
  2 VARIABLE ABORT"-ADDR      VARIABLE  ."-ADDR
  3 BOARD-VOC   DEFINITIONS
  4 : ABORT"    ( FLAG -> )        CROSS-COMPILER
  5    ABORT"-ADDR @ B,        22 WORD
  6    COUNT    DUP B,     OVER +    SWAP
  7    DO   I C@ B,   1 /LOOP      ;  IMMEDIATE
  8
  9 : ."    ( -> )                CROSS-COMPILER
 10    ."-ADDR @  B,           22 WORD
 11    COUNT    DUP B,     OVER +   SWAP
 12    DO   I C@ B,   1 /LOOP   ;   IMMEDIATE
 13
 14 CROSS-COMPILER   DEFINITIONS   DECIMAL
 15

SCR #70
  0 \ IF..ELSE..THEN  FOR CROSS-COMPILER
  1 HEX   BOARD-VOC  DEFINITIONS
  2 : IF      ( -> PATCH-ADDR 222 )
  3    CROSS-COMPILER  [OBRANCH] B,    BDP @  0 B,  222  ;
  4 IMMEDIATE
  5
  6 : THEN  . ( PATCH-ADDR -> 222 )
  7    CROSS-COMPILER   222 ?PAIRS
  8    BDP @  SWAP  MICRO-ASSEMBLER Z! ;
  9 CROSS-COMPILER   IMMEDIATE
 10
 11 : ELSE   ( PATCH-ADDR1 222 -> PATCH-ADDR2 222 )
 12    CROSS-COMPILER  222 ?PAIRS   [BRANCH] B,   BDP @  0 B,
 13    SWAP   222   BOARD-VOC  [COMPILE] THEN    222  ;
 14 IMMEDIATE
 15 CROSS-COMPILER   DEFINITIONS   DECIMAL

SCR #71
  0 \ CROSS COMPILER  BEGIN  AGAIN  UNTIL
  1 HEX   BOARD-VOC DEFINITIONS
  2 : BEGIN     ( -> JMP-ADDR  333 )
  3    CROSS-COMPILER    ?COMP   BDP @    333  ;
```

```
  4 IMMEDIATE
  5
  6 : AGAIN      ( JMP-ADDR 333 -> )
  7    CROSS-COMPILER   333 ?PAIRS   [BRANCH] B,   B,   ;
  8 IMMEDIATE
  9
 10 : UNTIL     ( JMP-ADDR   333 -> )
 11    CROSS-COMPILER   333 ?PAIRS   [OBRANCH] B,   B,   ;
 12 IMMEDIATE
 13
 14 CROSS-COMPILER  DEFINITIONS  DECIMAL
 15
```

SCR #72
```
  0 \ CROSS COMPILER    WHILE  REPEAT
  1 HEX    BOARD-VOC  DEFINITIONS
  2 : WHILE      ( JMP-ADDR 333 -> JMP-ADDR 333  PATCH-ADDR 224 )
  3    [COMPILE]  IF   2+  ;
  4 IMMEDIATE
  5
  6 : REPEAT    ( JMP-ADDR 333  PATCH-ADDR 224 -> )
  7    >R >R   [COMPILE] AGAIN
  8    R> R>   2-  [COMPILE] THEN  ;
  9 IMMEDIATE
 10
 11 CROSS-COMPILER  DEFINITIONS  DECIMAL
 12
 13
 14
 15
```

SCR #73
```
  0 \ CROSS COMPILER    #DO   #LOOP   DO
  1 HEX   BOARD-VOC  DEFINITIONS
  2 : #DO    ( -> JMP-ADDR 3333 )
  3    CROSS-COMPILER   [#DO] B,    BDP @    3333   ;
  4 IMMEDIATE
  5
  6 : #LOOP  ( JMP-ADDR 3333 -> )
  7    CROSS-COMPILER   3333 ?PAIRS  [#LOOP] B,   B,   ;
  8 IMMEDIATE
  9
 10 : DO     ( -> JMP-ADDR 4444 )
 11    CROSS-COMPILER  [DO] B,    BDP @   4444 ;
 12 IMMEDIATE
 13
 14 CROSS-COMPILER DEFINITIONS   DECIMAL
 15
```

SCR #74
```
  0 \ CROSS-COMPILER     LOOP   /LOOP   +LOOP
  1 HEX    BOARD-VOC  DEFINITIONS
  2 : LOOP  ( JMP-ADDR 4444 -> )
  3    CROSS-COMPILER  4444 ?PAIRS  [LOOP] B,   B,   ;
  4 IMMEDIATE
  5
  6 : /LOOP    ( JMP-ADDR 4444 -> )
```

```
  7    CROSS-COMPILER   4444 ?PAIRS   [/LOOP] B,    B,    ;
  8 IMMEDIATE
  9
 10 : +LOOP    ( JMP-ADDR  4444 -> )
 11    CROSS-COMPILER   4444 ?PAIRS   [+LOOP] B,    B,    ;
 12 IMMEDIATE
 13
 14 CROSS-COMPILER   DEFINITIONS   DECIMAL
 15
```

```
SCR #75
  0 \ CONSTANT VARIABLE USER    FOR CROSS-COMPILER
  1 HEX    CROSS-COMPILER   DEFINITIONS
  2 VARIABLE  DOUSE-ADDR    \ MUST be set by cross-compiled code
  3
  4 : VARIABLE
  5    BCREATE    BHERE  ,
  6    [DOVAR] B,   0 B,    [COMPILE] CROSS-COMPILER DEFINITIONS  ;
  7
  8 : CONSTANT    ( VALUE -> )
  9    BCREATE    BHERE  ,
 10    [DOCON] B,    B,    [COMPILE] CROSS-COMPILER DEFINITIONS  ;
 11
 12 : USER        ( VALUE -> )
 13    BCREATE    BHERE  ,
 14    DOUSE-ADDR @  B,   B,   [COMPILE] CROSS-COMPILER DEFINITIONS ;
 15 DECIMAL
```

```
SCR #76
  0 \ BOARD VOCABULARY    DEFINITIONS & UTILITIES
  1 DECIMAL    BOARD-VOC    DEFINITIONS
  2 : }    ( -> )         \ Leave board vocabulary/execution mode
  3    B-RES  [COMPILE] CROSS-VOC   DEFINITIONS
  4    R> R> DDROP
  5    [COMPILE] CROSS-COMPILER  ;
  6
  7 CROSS-VOC DEFINITIONS
  8
  9 : BLIST       [COMPILE] BOARD-VOC   VLIST  [COMPILE] CROSS-VOC ;
 10
 11 : B'         [COMPILE] BOARD-VOC   [COMPILE] '
 12              [COMPILE] CROSS-VOC  ;   IMMEDIATE
 13
 14
 15
```

```
SCR #77
  0 \ ( ; DEFINITION FOR CROSS-COMPILER
  1 HEX
  2 BOARD-VOC   DEFINITIONS
  3 : (         \ Required to allow stack comments
  4    -1 >IN +!    29 WORD    C@ 1+  HERE +
  5    C@  29 = NOT ?STREAM  ;    IMMEDIATE
  6
  7 : ;
  8         CROSS-VOC  [EXIT] B,  [COMPILE] CROSS-VOC  DEFINITIONS
  9         BSMUDGE   SMUDGE   [COMPILE] [  ;   IMMEDIATE
 10
 11 CROSS-COMPILER   DEFINITIONS    DECIMAL
 12
 13
 14
 15
```

```
SCR #78
  0 \ SEAL BOARD VOCABULARY
  1 HEX    BOARD-VOC
  2 ' X    ( X is the null used in the BOARD vocabulary )
  3 FORTH DEFINITIONS
  4 80C0   OVER   NFA  !      ( Make null header out of X )
  5
  6              LFA    0 SWAP     !
  7 HERE  BOARD-FENCE  !
  8
  9 DECIMAL
 10
 11
 12
 13
 14
 15
    ;

SCR #79
  0 \ COLON DEFINITIONS FOR CROSS-COMPILER
  1 HEX
  2 CROSS-COMPILER   DEFINITIONS
  3 : IMMEDIATE   ( -> )
  4    BLATEST  @     MICRO-ASSEMBLER
  5    DUP  Z@  4000 OR    SWAP  Z!       FORTH ;    CROSS-COMPILER
  6
  7 : :    ( Usage:  : <name> )
  8    BCREATE    BHERE   ,    [COMPILE] BOARD-VOC
  9      SMUDGE  BSMUDGE    ]     FORTH ;
 10 CROSS-COMPILER   DECIMAL
 11
 12
 13
 14
 15

SCR #80
  0 \ REDEFINE INTERPRET FOR CROSS-COMPILER
  1 HEX       FORTH DEFINITIONS
  2 VARIABLE  CROSS-FENCE      HERE  CROSS-FENCE !
  3 : CROSS-INTERPRET
  4    BEGIN  -FIND
  5       IF  STATE @ <
  6          OVER  CROSS-FENCE @  U>
  7          IF   IF   @   CROSS-COMPILER  B,  FORTH
  8               ELSE @   CROSS-COMPILER  OP-EXECUTE FORTH THEN
  9          ELSE ABORT" ILLEGAL COMPILAND"  CFA EXECUTE   THEN
 10       ELSE   HERE   NUMBER   DPL @  1+
 11          IF   CROSS-COMPILER  DBLITERAL   FORTH
 12          ELSE  DROP CROSS-COMPILER BLITERAL FORTH   THEN
 13       THEN  ?STACK   AGAIN   ;
 14 ' CROSS-INTERPRET  CFA  CINTER !
 15 DECIMAL   CROSS-COMPILER    FORTH  DEFINITIONS

SCR #81
  0 ( MICRO.                              GBH 01/05/86 12:09:54:62 )
  1 DECIMAL  MICRO-ASSEMBLER   DEFINITIONS
  2 : MICRO-HEADER
  3    CR ." E  AS SC COND ADR MP DE PC DHI DLO RP    DP  M  ALU   "
  4    ." DEST     SOURCE" ;
  5 : <MICRO.>      BASE @ >R 2 BASE !
```

```
  6      <# # # # # 32 HOLD 32 HOLD # # # # 32 HOLD 32 HOLD
  7      # # # # 32 HOLD 32 HOLD # 32 HOLD 32 HOLD
  8      # # 32 HOLD 32 HOLD # # 32 HOLD 32 HOLD
  9      # # 32 HOLD 32 HOLD # # 32 HOLD 32 HOLD  # 32 HOLD 32 HOLD
 10      # 32 HOLD 32 HOLD # 32 HOLD 32 HOLD # # 32 HOLD 32 HOLD
 11      # # # 32 HOLD 32 HOLD # 32 HOLD 32 HOLD # 32 HOLD 32 HOLD #
 12      #>   CR TYPE R> BASE ! ;
 13    : MICRO.    ( DMICRO-WORD -> )    \ Disassembler a microcode word
 14              MICRO-HEADER  <MICRO.> ;
 15 FORTH DEFINITIONS SCR #82
  0  ( MICRO.                             GBH 01/05/86 12:09:54:62 )
  1 DECIMAL  MICRO-ASSEMBLER  DEFINITIONS
  2  : MICRO-HEADER
  3      CR ." E   AS SC COND ADR MP DE PC DHI DLO RP   DP   M   ALU    "
  4      ." DEST    SOURCE" ;
  5  : <MICRO.>       BASE @ >R 2 BASE !
  6      <# # # # # 32 HOLD 32 HOLD # # # # 32 HOLD 32 HOLD
  7      # # # # 32 HOLD 32 HOLD # 32 HOLD 32 HOLD
  8      # # 32 HOLD 32 HOLD # # 32 HOLD 32 HOLD
  9      # # 32 HOLD 32 HOLD # # 32 HOLD 32 HOLD  # 32 HOLD 32 HOLD
 10      # 32 HOLD 32 HOLD # 32 HOLD 32 HOLD # # 32 HOLD 32 HOLD
 11      # # # 32 HOLD 32 HOLD # 32 HOLD 32 HOLD # 32 HOLD 32 HOLD #
 12      #>   CR TYPE R> BASE ! ;
 13    : MICRO.    ( DMICRO-WORD -> )    \ Disassembler a microcode word
 14              MICRO-HEADER  <MICRO.> ;
 15 FORTH DEFINITIONS

SCR #83
  0
  1
  2
  3
  4
  5
  6
  7
  8
  9
 10
 11
 12
 13
 14
 15
```

APPENDIX A -- PART II: MVP-FORTH/
16 MICROASSEMBLER KERNEL SOURCE CODE

```
SCR #0
   0
   1
   2
   3
   4
   5
   6
   7
   8
   9
  10
  11
  12
  13
  14
  15

SCR #1
   0 INDEX --- MVP-FORTH/16 MICROASSEMBLER SOURCE        PHIL KOOPM
   1
   2 MVP-FORTH VERSION                          LAST UPDATE: 3/14/87
   3
   4              (C) COPYRIGHT 1986, 1987
   5
   6       Phil Koopman, Jr  & WISC Technologies, Inc.
   7
   8 SCREENS     CONTENTS
   9 ========    ========
  10 2           LOAD SCREEN FOR KERNEL/16 (FROM IBM)
  11 3           LOAD SCREEN TO FINISH MVP-FORTH/16 DEFINITIONS
  12   4 - 117   NORMAL KERNEL MICROCODE
  13 119 - 163   ADDITIONAL MICROCODE WORDS
  14 165 - 231   KERNEL/16 CROSS-COMPILE SOURCE
  15 236 - 260   SOURCE TO COMPLETE MVP-FORTH/16

SCR #2
   0 \ LOAD SCREEN FOR MICROCODE & KERNEL/16 -- LOAD FROM PC
   1 DECIMAL
   2 CR CR ." Cross-compiling MVP-FORTH/16 microcode and kernel." CR
   3 ." (C) Copyright 1986, 1987 "  CR
   4 ." Phil Koopman, Jr.  &  WISC Technologies, Inc. "  CR CR
   5 5 231 THRU
   6 CR CR ." Load complete." CR CR
   7 ." Please execute BOARD and then  3 LOAD." CR
   8 .
   9
  10
  11
  12
  13
  14
  15
```

```
SCR #3
  0 \ LOAD SCREEN FOR MVP-FORTH/16 COMPLETION -- LOAD FROM CPU/16
  1 DECIMAL
  2 236 260 THRU
  3 CR CR ." Remainder of MVP-FORTH/16 loaded." CR
  4 ." (C) Copyright 1986, 1987 " CR
  5 ." Phil Koopman, Jr.  &  WISC Technologies, Inc. "  CR CR
  6 ." Please execute BYE to the PC host and do a " CR
  7 ." SAVE-MICROCODE and a SAVE-BOARD-FORTH" CR CR
  8
  9
 10
 11
 12
 13
 14
 15

SCR #4
  0 \  MICROCODE SOURCE - NOTES
  1 CROSS-COMPILER    EXIT
  2 NOTES: 1. Top element of data stack is in DHI reg.
  3        2. Microprogram counter is latched at the end of the
  4           clock cycle, so there is a 1 cycle delay between the
  5           DECODE operation and the jump.
  6        3. Condition codes are captured at the end of the clock
  7           cycle, requiring a wait to the next cycle for a
  8           conditional branch
  9        4. DP, RP, PC, MPC are incremented at end of cycle
 10        5. DP points to 2nd element, RP points to top element
 11        6. PC points to word after current instruction except
 12           when DECODEing a non-colon word. (not INC'ed then)
 13        7. Return address on stack needs to be incremented
 14           before use.
 15

SCR #5
  0 \ MICROCODE --- DOCOL(3)                    (n) = # clock cycles
  1 DECIMAL   CROSS-COMPILER
  2 0 OPCODE: DOCOL     ( -> )    ( return:  -> ADDR )
  3    0 ::    SOURCE=RAM ALU=A DEST=PC DEC[RP] ;; \ PC<-New PC value
  4    1 ::    DECODE  SOURCE=PCSAVE   DEST=RS          ;;
  5                    \ PUSH[RS]<- Old PC
  6    2 ::    END ;;     \ NOP while jumping to next op code
  7
  8 \ Special NOP for initialization use after downloaded DECODE
  9    5 :: ;;
 10    6 ::  DECODE ;;
 11    7 ::  END  ;;
 12 ;;END
 13
 14
 15
```

```
SCR #6
  0 \  MICROCODE --- SEMIS(3)
  1 DECIMAL
  2 1 OPCODE: SEMIS    ( -> )   ( return:  ADDR -> )
  3    0 ::   SOURCE=RS ALU=A+1 DEST=PC INC[RP] ;; \ PC <- POP[RS]
  4    1 ::   DECODE  ;;
  5    2 ::   END ;;                     \ NOP while DECODE effected
  6 ;;END
  7
  8
  9
 10
 11
 12
 13
 14
 15

SCR #7
  0 \  MICROCODE --- HALT(2)
  1 DECIMAL
  2 2 OPCODE: HALT    ( -> )         \ -1 is flag to IBM host
  3    0 ::  SOURCE=ALU  ALU=-1  DEST=STATUS ;;
  4    1 ::  JMP=001  ;;    \ Infinite loop
  5 ;;END
  6
  7
  8
  9
 10
 11
 12
 13
 14
 15

SCR #8
  0 \  MICROCODE --- SYSCALL(6+host delay)
  1 DECIMAL
  2 3 OPCODE: SYSCALL  ( DATA1  N -> DATA2 )
  3    0 ::  SOURCE=ALU  ALU=B     DEST=STATUS  ;;
  4    1 ::  SOURCE=DS   ALU=A  DEST=DHI  INC[DP]  ;;
  5    2 ::  SOURCE=ALU  ALU=B     JMP=010  ;;       \ Infinite loop
  6
  7 \  Restart at address 4
  8    4 ::  ;;
  9    5 ::  SOURCE=ALU  ALU=0  DEST=STATUS   DECODE ;;
 10    6 ::  END  ;;
 11
 12 ;;END
 13
 14
 15
```

```
SCR #9
  0 \ MICROCODE --- DOVAR(4)
  1 DECIMAL
  2 4 OPCODE: DOVAR    ( -> ADDR )    \ Also performs EXIT
  3    0 ::   SOURCE=RS   ALU=A+1 DEST=PC
  4                              INC[RP]   DEC[DP]   ;;
  5    1 ::   SOURCE=ALU  ALU=B   DEST=DS   ;;
  6    2 ::   SOURCE=PCSAVE ALU=A+1 DEST=DHI  DECODE ;;
  7    3 ::   END ;;
  8 ;;END
  9
 10
 11
 12
 13
 14
 15

SCR #10
  0 \ MICROCODE --- DOCON(4)
  1 DECIMAL
  2 5 OPCODE: DOCON    ( -> VALUE )   \ Also performs EXIT
  3    0 ::   SOURCE=RAM   DEST=DLO   ;;
  4    1 ::   SOURCE=RS   ALU=A+1 DEST=PC   INC[RP]  DEC[DP]  ;;
  5    2 ::   SOURCE=ALU  ALU=B   DEST=DS   DECODE ;;
  6    3 ::   SOURCE=DLO  ALU=A   DEST=DHI  END ;;
  7 ;;END
  8
  9
 10
 11
 12
 13
 14
 15

SCR #11
  0 \ MICROCODE --- !(6)
  1 DECIMAL
  2 6 OPCODE: !     ( N ADDR -> )
  3    0 ::   SOURCE=ALU  ALU=B   DEST=PC   ;;   \ PC<-ADDR
  4    1 ::   ;;
  5    2 ::   SOURCE=DS   DEST=RAM  INC[DP] ;;   \ RAM<-N
  6    3 ::   SOURCE=PCSAVE ALU=A+1 DEST=PC  ;;  \ Restore PC
  7    4 ::   SOURCE=DS   ALU=A   DEST=DHI   INC[DP]
  8           DECODE ;;                          \ Update Top of Stack
  9    5 ::   END ;;
 10
 11 ;;END
 12
 13
 14
 15

SCR #12
  0 \ MICROCODE --- #LEAVE(2)
  1 DECIMAL
  2 7 OPCODE: #LEAVE   \ Set COUNT on return stack = 0 for #LOOP
  3    0 ::   SOURCE=ALU  ALU=0   DEST=RS   DECODE ;;
  4    1 ::   END ;;
  5 ;;END
```

```
           6
           7
           8
           9
          10
          11
          12
          13
          14
          15

SCR #13
     0 \  MICROCODE --- %DP!%(2)
     1 DECIMAL
     2 8 OPCODE: %DP!%    ( N -> )
     3   0 ::    SOURCE=ALU  ALU=B  DEST=DP   DECODE   ;;  \ DP<-N
     4   1 ::    SOURCE=DS   ALU=A  DEST=DHI  INC[DP]  END  ;;
     5                      \ update top of stack
     6 ;;END
     7
     8
     9
    10
    11
    12
    13
    14
    15

SCR #14
     0 \  MICROCODE --- %DP@%(3)
     1 DECIMAL
     2 9 OPCODE: %DP@%    ( -> N )  \ N returns SP after pushing DHI
     3   0 ::    DEC[DP]  ;;
     4   1 ::    SOURCE=ALU  ALU=B  DEST=DS   DECODE   ;;
     5                      \ save old top of stack
     6   2 ::    SOURCE=DP   ALU=A  DEST=DHI  END  ;;  \ DHI <- DP
     7
     8 ;;END
     9
    10
    11
    12
    13
    14
    15
  SCR #15
     0 \  MICROCODE --- %RP!%(2)
     1 DECIMAL
     2 10 OPCODE: %RP!%   ( N -> )
     3   0 ::    SOURCE=ALU  ALU=B  DEST=RP   DECODE   ;;  \ RP<-N
     4   1 ::    SOURCE=DS   ALU=A  DEST=DHI  INC[DP]  END  ;;
     5                      \ update top of stack
     6 ;;END
     7
     8
     9
    10
    11
    12
    13
    14
    15
```

```
SCR #16
  0 \ MICROCODE --- %RP@%(3)
  1 DECIMAL
  2 11 OPCODE: %RP@%    ( -> N )
  3    0 ::    DEC[DP]  ;;
  4    1 ::    SOURCE=ALU  ALU=B  DEST=DS  DECODE  ;;
  5                       \ save old top of stack
  6    2 ::    SOURCE=RP  ALU=A  DEST=DHI  END  ;;  \ DHI<-RP
  7
  8 ;;END
  9
 10
 11
 12
 13
 14
 15

SCR #17
  0 \ MICROCODE --- +(2)
  1 DECIMAL
  2 12 OPCODE: +      ( N1 N2 -> NSUM )
  3    0 ::    DECODE ;;
  4    1 ::    SOURCE=DS  ALU=A+B  DEST=DHI  INC[DP]
  5                    END    ;;             \ ADD N1 , N2
  6 ;;END
  7
  8
  9
 10
 11
 12
 13
 14
 15

SCR #18
  0 \ MICROCODE --- +!(7)
  1 DECIMAL
  2 13 OPCODE: +!    ( N  ADDR -> )
  3    0 ::    SOURCE=ALU    ALU=B    DEST=PC   ;;
  4    1 ::    SOURCE=DS     ALU=A    DEST=DHI    INC[DP]  ;;
  5    2 ::    SOURCE=RAM    ALU=A+B  DEST=DHI  ;;
  6    3 ::    SOURCE=ALU    ALU=B    DEST=RAM  ;;
  7    4 ::    SOURCE=PCSAVE ALU=A+1  DEST=PC   ;;
  8    5 ::    SOURCE=DS     ALU=A    DEST=DHI    INC[DP]  DECODE ;;
  9    6 ::    END ;;
 10 ;;END
 11
 12
 13
 14
 15

SCR #19
  0 \ MICROCODE --- -(2)
  1 DECIMAL
  2 14 OPCODE: -      ( N1 N2 -> NSUM )
  3    0 ::    DECODE  ;;
```

```
    4    1 ::    SOURCE=DS   ALU=A-B  DEST=DHI  INC[DP]
    5            END  ;;                   \ SUBTRACT N1-N2
    6 ;;END
    7
    8
    9
   10
   11
   12
   13
   14
   15

SCR #20
   0 \ MICROCODE --- -ROT(5)
   1 DECIMAL
   2 15 OPCODE: -ROT    ( N1 N2 N3 -> N3 N1 N2 )
   3    0 ::   SOURCE=ALU  ALU=B   DEST=DLO   DEC[RP]   ;;  \ DLO<-N3
   4    1 ::   SOURCE=DS   ALU=A   DEST=DHI   INC[DP]   ;;  \ DHI<-N2
   5    2 ::   SOURCE=DS   DEST=RS              ;;          \ RS<-N1
   6    3 ::   SOURCE=DLO  DEST=DS  DEC[DP] DECODE  ;;      \ DS <-N3
   7    4 ::   SOURCE=RS   DEST=DS  INC[RP] END  ;;         \ DS<-N1
   8
   9 ;;END
  10
  11
  12
  13
  14
  15

SCR #21
   0 \ MICROCODE --- 0(3)
   1 DECIMAL
   2 16 OPCODE: 0    ( -> 0 )
   3    0 ::   DEC[DP]  ;;
   4    1 ::   SOURCE=ALU  ALU=B  DEST=DS   DECODE  ;;
   5    2 ::   ALU=0  DEST=DHI  END  ;;
   6 ;;END
   7
   8
   9
  10
  11
  12
  13
  14
  15

SCR #22
   0 \ MICROCODE --- 0<(3)
   1 DECIMAL
   2 17 OPCODE: 0<   ( N -> FLAG )
   3    0 ::   ALU=B  ;;
   4    1 ::   DECODE   JMP=01S  ;;
   5
   6 ( >=0 )  2 ::   ALU=0   DEST=DHI   END  ;;
   7 ( <0 )   3 ::   ALU=-1  DEST=DHI   END  ;;
   8 ;;END
```

```
 9
10      ,
11
12
13
14
15

SCR #23
 0 \   MICROCODE --- 0=(4)
 1 DECIMAL
 2 18 OPCODE:  0=   ( A -> FLAG )
 3    0 ::      ALU=notB   ;;    \ Test for =0
 4    1 ::      ALU=notB   ;;    \ Test for =0
 5    2 ::      JMP=10E   DECODE  ;;
 6
 7 ( <> )    4 ::    ALU=0    DEST=DHI   END  ;;
 8 ( =  )    5 ::    ALU=-1   DEST=DHI   END  ;;
 9
10 ;;END
11
12
13
14
15

SCR #24
 0 \   MICROCODE --- OBRANCH(5/6)
 1 DECIMAL
 2 19 OPCODE: OBRANCH    ( FLAG -> )
 3    0 ::     ALU=notB   ;;
 4    1 ::     ALU=notB   ;;        \ see if FLAG = 0
 5    2 ::     SOURCE=RAM  DEST=DLO   \ Read branch addr into DLO
 6             INC[PC]  JMP=10E  ( 4 -> NOT=  5 -> = ) ;;
 7
 8 ( FLAG<>0 )  4 ::     DECODE    JMP=111     ;;
 9
10 ( FLAG=0 )   5 ::     SOURCE=DLO  ALU=A  DEST=PC  ;;
11
12            6 ::   DECODE ;;
13            7 ::   SOURCE=DS  ALU=A  DEST=DHI  INC[DP]  \ update DHI
14                   END  ;;
15 ;;END SCR #25
 0 \   MICROCODE --- 1+(2)
 1 DECIMAL
 2 20 OPCODE: 1+    ( N -> N+1 )
 3    0 ::  SOURCE=ALU  ALU=B   DEST=DLO    DECODE ;;
 4    1 ::  SOURCE=DLO  ALU=A+1  DEST=DHI   END ;;
 5 ;;END
 6
 7
 8
 9
10
11
12
13
14
15
```

```
SCR #26
  0 \ MICROCODE --- 1-(2)
  1 DECIMAL
  2 21 OPCODE: 1-    ( N -> N-1 )
  3    0 ::   SOURCE=ALU   ALU=B    DEST=DLO   DECODE    ;;
  4    1 ::   SOURCE=DLO   ALU=A-1  DEST=DHI   END       ;;
  5 ;;END
  6
  7
  8
  9
 10
 11
 12
 13
 14
 15

SCR #27
  0 \ MICROCODE --- 2*(2)
  1 DECIMAL
  2 22 OPCODE: 2*       ( N -> 2*N )
  3    0 ::   SOURCE=ALU   ALU=B    DEST=DLO   DECODE    ;;
  4    1 ::   SOURCE=DLO   ALU=A+A  DEST=DHI   END       ;;
  5 ;;END
  6
  7
  8
  9
 10
 11
 12
 13
 14
 15

SCR #28
  0 \ MICROCODE --- 2/(4/5/7)
  1 DECIMAL
  2 23 OPCODE: 2/    ( N -> N/2 )
  3    0 ::   SOURCE=ALU   ALU=B    DEST=DLO  ;;
  4    1 ::   SL[DHI]      ALU=B                         JMP=01S  ;;
  5
  6 ( positive ) 2 ::    SR[DLO]     DECODE    JMP=111   ;;
  7
  8 ( negative ) 3 ::   SOURCE=DLO   ALU=A+1   DEST=DHI  JMP=10E  ;;
  9 ( <>-1 )     4 ::   SOURCE=ALU   ALU=B     DEST=DLO  JMP=110  ;;
 10              6 ::   ALU=-1       DEST=DHI            JMP=010  ;;
 11
 12 ( =-1 )      5 ::   SOURCE=ALU   ALU=0     DEST=DLO  JMP=111  DECODE  ;;
 13              7 ::   SOURCE=DLO   ALU=A     DEST=DHI            END    ;;
 14
 15 ;;END SCR #29
  0 \ MICROCODE --- <(4/5)
  1 DECIMAL
  2 24 OPCODE: <   ( A B -> FLAG )
  3    0 ::   SOURCE=DS   ALU=AxorB  ;;    \ Test for different signs
  4    1 ::   SOURCE=DS   ALU=A-B    JMP=01S  ;;
```

```
  5
  6 ( Same sign inputs ).
  7      2 ::    DECODE    INC[DP]   JMP=10S    ;;
  8 ( >= )  4 :: ALU=0    DEST=DHI        END    ;;
  9 ( <  )  5 :: ALU=-1   DEST=DHI        END    ;;
 10
 11 ( Different sign inputs -- < if A is negative )
 12     3 ::   SOURCE=DS  ALU=A    JMP=010   ;;
 13
 14 ;;END
 15

SCR #30
  0 \  MICROCODE --- <#DO>(4)
  1 DECIMAL
  2 25 OPCODE:  <#DO>   ( N -> )
  3     0 ::   SOURCE=ALU  ALU=B   DEST=DLO   DEC[RP]    ;;
  4     1 ::   SOURCE=DLO  ALU=A-1  DEST=DHI  ;;
  5     2 ::   SOURCE=ALU  ALU=B   DEST=RS    DECODE    ;;    \ RS <- N
  6     3 ::   SOURCE=DS   ALU=A   DEST=DHI   INC[DP]   END ;;
  7                                                              \ Update DHI
  8 ;;END
  9
 10
 11
 12
 13
 14
 15

SCR #31
  0 \  MICROCODE --- <#LOOP>(6/7)     --- COUNT-DOWN LOOP N-1...0
  1 DECIMAL     \ Terminate loop when count crosses to -1
  2 26 OPCODE:  <#LOOP>    ( -> )
  3     0 ::   SOURCE=ALU  ALU=B   DEST=DLO ;;     \ Stash top of stack
  4     1 ::   SOURCE=RS   ALU=A-1           ;;    \ Decrement counter
  5     2 ::   SOURCE=RS   ALU=A-1  DEST=DHI  INC[MPC] ;;
  6     3 ::   SOURCE=RAM  DEST=RS  INC[PC]       \ grab branch addr
  7                   JMP=00E  ( 5 -> end loop, else 4 )   ;;
  8
  9
 10
 11
 12
 13
 14
 15

SCR #32
  0 \  MICROCODE --- <#LOOP>   - 2
  1 DECIMAL
  2 27 CURRENT-PAGE !
  3 ( count<>-1 )  0 ::    SOURCE=RS  ALU=A  DEST=PC   JMP=111 ;;
  4                                  \ Branch PC / JMP TO 7
  5     7 :: SOURCE=ALU  ALU=B  DEST=RS  DECODE    JMP=010 ;;
  6
  7 ( count=-1 )   1 ::  DECODE INC[RP]    ;; \ exit loop
  8
  9     2 ::  SOURCE=DLO  ALU=A  DEST=DHI   END  ;;  \ Restore t.o.s.
 10 ;;END
 11
```

```
SCR #33
  0 \   MICROCODE --- <$=>(APPROX 14*N)
  1 DECIMAL    \ Match text portions of a string
  2 28 OPCODE: <$=>  ( AD1 AD2 CNT -> MATCH=FLAG )
  3 \   Increments AD1 AD2, Decrements CNT  until = 0 or no match
  4     0 ::   ALU=notB  ;;    \ Test counter=0
  5     1 ::   ALU=notB  ;;    \ Test counter=0
  6     2 ::   SOURCE=ALU  ALU=B   DEST=DLO   JMP=10E ;;
  7 \ Done -- exit
  8     5 ::   ALU=-1   DEST=DHI   INC[DP]    DECODE ;;
  9     6 ::   INC[DP]  END ;;
 10 \ Non-zero count -- compare a cell
 11     4 ::   SOURCE=DS   ALU=A    DEST=PC    JMP=011 ;;
 12     3 ::   SOURCE=DS   ALU=A+1  DEST=DHI   INC[MPC]  JMP=111 ;;
 13     7 ::   SOURCE=ALU  ALU=B    DEST=DS    INC[DP]   JMP=000 ;;
 14
 15

SCR #34
  0 \   MICROCODE --- <$=>    -- 2
  1 DECIMAL    \ Match text portions of a string
  2 29 CURRENT-PAGE !
  3     0 ::   SOURCE=RAM    ALU=A    DEST=DHI ;;
  4     1 ::   SOURCE=DS     ALU=A    DEST=PC  ;;
  5     2 ::   SOURCE=RAM    ALU=AxnorB ;;
  6     3 ::   SOURCE=RAM    ALU=AxnorB    INC[MPC] ;;
  7     4 ::   SOURCE=PCSAVE ALU=A DEST=PC    JMP=00E ;;
  8
  9
 10
 11
 12
 13
 14
 15

SCR #35
  0 \   MICROCODE --- <$=>   -- 3
  1 DECIMAL    \ Match text portions of a string
  2 30 CURRENT-PAGE !
  3 \ No match -- terminate search
  4     0 ::   SOURCE=PCSAVE  ALU=A+1 DEST=PC JMP=110 ;;
  5     6 ::   ALU=0   DEST=DHI    INC[DP]    DECODE ;;
  6     7 ::   END ;;
  7
  8 \ String characters match -- repeat
  9     1 ::   SOURCE=DS    ALU=A+1   DEST=DHI ;;
 10     2 ::   SOURCE=ALU   ALU=B     DEST=DS    DEC[DP]  DECODE ;;
 11     3 ::   SOURCE=DLO   ALU=A-1   DEST=DHI   END ;;
 12
 13 ;;END
 14
 15

SCR #36
  0 \   MICROCODE --- <+LOOP>(6/7)
  1 DECIMAL \ IMPLICIT LOOP RANGE SPAN OF 8000 Hex
  2 32 OPCODE: <+LOOP>    ( N -> )    ( RS: LIMIT COUNT -> ... )
  3     0 ::   ALU=B   DEST=DHI    ;;   \ Test sign of N
```

```
 4     1 :: SOURCE=RS    ALU=A+B   DEST=DHI
 5                INC[RP]       JMP=10S ;;     \ Add N to counter
 6
 7 ( +N ) 4 :: SOURCE=RS   ALU=A-B-1
 8                INC[MPC]      JMP=111  ;; \ Test count
 9     7 :: SOURCE=RAM   DEST=DLO  INC[PC]   JMP=00S  ;;
10
11 ( -N ) 5 :: SOURCE=RS   ALU=A-B-1
12                INC[MPC]               ;; \ Test count
13     6 :: SOURCE=RAM   DEST=DLO  INC[PC]   JMP=01S  ;;
14
15
```

```
SCR #37
 0 \ MICROCODE --- <+LOOP>  -- 2
 1 DECIMAL
 2 33 CURRENT-PAGE !
 3 ( +N LOOP  ) 0 :: SOURCE=DLO  ALU=A  DEST=PC  DEC[RP] JMP=101 ;;
 4 ( +N DONE  ) 1 :: INC[RP]     DECODE                  JMP=110 ;;
 5
 6 ( -N DONE  ) 2 :: INC[RP]     DECODE                  JMP=110 ;;
 7 ( -N LOOP  ) 3 :: SOURCE=DLO  ALU=A  DEST=PC  DEC[RP] JMP=101 ;;
 8
 9 ( LOOP )
10     5 :: SOURCE=ALU   ALU=B   DEST=RS   DECODE    ;;
11 ( FINISH UP )
12     6 :: SOURCE=DS    ALU=A   DEST=DHI  INC[DP]   END ;;
13 ;;END
14
15
```

```
SCR #38
 0 \ MICROCODE --- </LOOP>(7/8)
 1 DECIMAL
 2 34 OPCODE: </LOOP>   ( N -> )     ( RS: LIMIT COUNT -> ... )
 3     0 :: SOURCE=RS   ALU=A+B  DEST=DHI  INC[RP] ;;   \ Count+N
 4     1 :: SOURCE=RS   ALU=A  ;;
 5     2 :: SOURCE=ALU  ALU=B   JMP=10S  ;;  \ JMP on limit sign
 6
 7 ( + LIMIT ) 4 :: SOURCE=RS   ALU=A-B-1
 8                    INC[MPC]  JMP=111   ;; \ Test count
 9 ( - LIMIT ) 5 :: SOURCE=RS   ALU=A-B-1 INC[MPC] JMP=11S ;;
10 ( - LIMIT ) .                           \ JMP on count sign
11     ( + COUNT ) 6 :: SOURCE=RAM  ALU=A  DEST=PC  DEC[RP]
12                      JMP=100 ;;    \ Loop
13     ( - COUNT ) 7 :: SOURCE=RAM  DEST=DLO  INC[PC]
14                      JMP=00S ;;   \ Loop if LIMIT-COUNT-1 (+)
15
```

```
SCR #39
 0 \ MICROCODE --- </LOOP>  - 2
 1 DECIMAL
 2 35 CURRENT-PAGE !
 3 ( LOOP )
 4     0 :: SOURCE=DLO  ALU=A  DEST=PC  DEC[RP]  JMP=100  ;;
 5
 6     4 :: SOURCE=ALU  ALU=B  DEST=RS  DECODE  ;;
 7     5 :: SOURCE=DS   ALU=A  DEST=DHI INC[DP]  END ;;
 8
 9 ( EXIT LOOP )
```

```
    10    1 ::  SOURCE=DS  ALU=A  DEST=DHI  INC[DP]  INC[RP] DECODE  ;;
    11    2 ::  END ;;
    12
    13 ;;END
    14
    15

SCR #40
   0 \  MICROCODE --- <<ABORT">>(8/5)
   1 DECIMAL
   2 36 OPCODE: <<ABORT">>   ( FLAG -> )
   3    0 ::  ALU=notB  ;;
   4    1 ::  ALU=notB  JMP=111  ;;
   5    7 ::            JMP=01E  ;;
   6
   7 ( FLAG=0 )  3 ::  SOURCE=RS   ALU=A+1   DEST=PC  ;;
   8    4 ::  ;;
   9    5 ::  SOURCE=RAM  ALU=A+B+1  DEST=PC  INC[RP]  JMP=010 ;;
  10
  11 ( FLAG<>0 )
  12    2 ::  SOURCE=DS  ALU=A  DEST=DHI  DECODE ;;
  13    6 ::  INC[DP]  END ;;
  14 ;;END
  15

SCR #41
   0 \  MICROCODE --- <<MOVEX>(12*N+6)
   1 DECIMAL
   2 37 OPCODE: <<MOVEX> ( SRCADDR DESTADDR N -> )
   3    0 ::  SOURCE=ALU  ALU=B  DEST=DLO  INC[DP]  DEC[RP] ;;
   4    1 ::  SOURCE=DLO  ALU=A-1  ;;    \ Decrement counter
   5 \ Re-entry point for repeating the opcode
   6    2 ::  SOURCE=DLO  ALU=A-1  DEST=DHI ;;
   7    3 ::  SOURCE=ALU  ALU=B  DEST=DLO  JMP=10E ;;
   8
   9 \ Word done -- exit
  10    5 ::  INC[DP]  INC[RP]                    DECODE ;;
  11    6 ::  SOURCE=DS  ALU=A  DEST=DHI  INC[DP]  END ;;
  12 \ Word not done -- get source word
  13    4 ::  SOURCE=DS  ALU=A  DEST=PC  JMP=111  INC[MPC] ;;
  14    7 ::  SOURCE=DS  ALU=A-1  DEST=DHI  JMP=000 ;;
  15

SCR #42
   0 \  MICROCODE --- <<MOVEX> - 2
   1 DECIMAL
   2 38 CURRENT-PAGE !
   3    0 ::  SOURCE=ALU  ALU=B  DEST=DS   DEC[DP] ;;
   4    1 ::  SOURCE=RAM  DEST=RS ;;
   5 \ Save at destination address
   6    2 ::  SOURCE=DS  ALU=A  DEST=PC ;;
   7    3 ::  SOURCE=DS  ALU=A-1  DEST=DHI  ;;
   8    4 ::  SOURCE=RS  DEST=RAM ;;
   9 \ Re-execute this same microcode word
  10    5 ::  SOURCE=PCSAVE  ALU=A  DEST=PC ;;
  11    6 ::  SOURCE=ALU  ALU=B  DEST=DS  INC[DP]  DECODE ;;
  12    7 ::  SOURCE=DLO  ALU=A-1    JMP=010 <END> ;;
  13
  14 ;;END
  15
```

```
SCR #43
   0 \  MICROCODE --- <MOVE>(12*N+6)
   1 DECIMAL
   2 39 OPCODE:  <MOVE> ( SRCADDR DESTADDR N -> )
   3      0 ::   SOURCE=ALU  ALU=B    DEST=DLO  INC[DP]  DEC[RP] ;;
   4      1 ::   SOURCE=DLO  ALU=A-1  ;;       \ Decrement counter
   5 \ Re-entry point for repeating the opcode
   6      2 ::   SOURCE=DLO  ALU=A-1  DEST=DHI ;;
   7      3 ::   SOURCE=ALU  ALU=B    DEST=DLO  JMP=10E ;;
   8
   9 \ Word done -- exit
  10      5 ::   INC[DP]     INC[RP]                     DECODE ;;
  11      6 ::   SOURCE=DS   ALU=A    DEST=DHI  INC[DP]  END ;;
  12 \ Word not done -- get source word
  13      4 ::   SOURCE=DS   ALU=A    DEST=PC   JMP=111  INC[MPC] ;;
  14      7 ::   SOURCE=DS   ALU=A+1  DEST=DHI  JMP=000 ;;
  15

SCR #44
   0 \  MICROCODE --- <MOVE> - 2
   1 DECIMAL
   2 40 CURRENT-PAGE !
   3      0 ::   SOURCE=ALU  ALU=B    DEST=DS   DEC[DP] ;;
   4      1 ::   SOURCE=RAM  DEST=RS  ;;
   5 \ Save at destination address
   6      2 ::   SOURCE=DS   ALU=A    DEST=PC ;;
   7      3 ::   SOURCE=DS   ALU=A+1  DEST=DHI ;;
   8      4 ::   SOURCE=RS   DEST=RAM ;;
   9 \ Re-execute this same microcode word
  10      5 ::   SOURCE=PCSAVE  ALU=A    DEST=PC ;;
  11      6 ::   SOURCE=ALU  ALU=B    DEST=DS   INC[DP]  DECODE ;;
  12      7 ::   SOURCE=DLO  ALU=A-1            JMP=010 <END> ;;
  13
  14 ;;END
  15

SCR #45
   0 \  MICROCODE --- <DO>(4)
   1 DECIMAL
   2 41 OPCODE:  <DO> ( LIMIT  START -> )
   3      0 ::   DEC[RP] ;;
   4      1 ::   SOURCE=DS   DEST=RS   DEC[RP]  INC[DP] ;;
   5      2 ::   SOURCE=ALU  ALU=B     DEST=RS  DECODE  ;;
   6      3 ::   SOURCE=DS   ALU=A     DEST=DHI INC[DP]  END ;;
   7 ;;END
   8
   9
  10
  11
  12
  13
  14
  15

SCR #46
   0 \  MICROCODE --- <ENCLA>
   1 DECIMAL   \ SCAN TO FIRST NON-DELIMITER
   2 42 OPCODE: <ENCLA>  ( ADDR CHAR -> ADDR OFFSET ADDR+OFFSET )
   3 \         RETURN STACK  ( -> CHAR )
```

```
  4 \   DS has offset
  5     0 ::   SOURCE=DS    ALU=A      DEST=PC    DEC[RP]   DEC[DP]  ;;
  6     1 ::   SOURCE=ALU   ALU=B      DEST=RS              INC[MPC] ;;
  7     2 ::   SOURCE=ALU   ALU=0      DEST=DS
  8                         JMP=000        ;;
  9
 10
 11
 12
 13
 14
 15
```

SCR #47
```
  0 \   MICROCODE --- <ENCLA> -- 2
  1 DECIMAL    \ SCAN TO FIRST NON-DELIMITER
  2 43 CURRENT-PAGE !
  3 \     Loop while current char = delimiter
  4     0 ::  SOURCE=RAM   ALU=A       DEST=DHI    ;;
  5     1 ::  SOURCE=RS    ALU=AxnorB  INC[PC] ;;
  6     2 ::  SOURCE=RS    ALU=AxnorB  ;;
  7     3 ::  SOURCE=DS    ALU=A+1     DEST=DHI    JMP=10E ;;
  8
  9 ( = delimiter )  5 :: SOURCE=ALU ALU=B DEST=DS   JMP=000 ;;
 10
 11 ( <>delimiter )  4 :: SOURCE=PCSAVE  ALU=A+1 DEST=PC  JMP=110 ;;
 12     6 ::  SOURCE=DS    ALU=A  DEST=DHI  INC[DP]  DECODE ;;
 13     7 ::  SOURCE=DS    ALU=A+B  DEST=DHI  DEC[DP]  END ;;
 14
 15  ;;END
```

SCR #48
```
  0 \   MICROCODE --- <ENCLB>
  1 DECIMAL    \ SCAN TO NEXT DELIMITER
  2 44 OPCODE: <ENCLB>   ( ADDRN1 -> ADDRN2 )   ( Return: CHAR -> )
  3 \ Re-entry point for looping the word
  4     0 ::  SOURCE=ALU ALU=B   DEST=PC    ;;
  5     1 ::  SOURCE=ALU ALU=B   DEST=DLO   ;;
  6     2 ::  SOURCE=RAM ALU=notA  ;;
  7     3 ::  SOURCE=RAM ALU=notA  DEST=DHI ;;
  8     4 ::  SOURCE=RS  ALU=AxorB            INC[MPC]      JMP=11E ;;
  9
 10 \ <>0 -- Test for <> DELIM
 11     6 ::  SOURCE=RS  ALU=AxorB    JMP=000 ;;
 12 \ =0 -- Set up to exit
 13     7 ::  SOURCE=PCSAVE ALU=A+1 DEST=PC  JMP=101  ;;
 14
 15
```

SCR #49
```
  0 \   MICROCODE --- <ENCLB> -- 2
  1 DECIMAL
  2 45 CURRENT-PAGE !
  3 ( <>0 )  0 ::  SOURCE=PCSAVE  ALU=A DEST=PC JMP=01E ;;
  4
  5 \ =DELIM -- Exit from <ENCLB>
  6     3 ::  SOURCE=PCSAVE  ALU=A+1  DEST=PC  JMP=101  ;;
  7     5 ::  SOURCE=DLO  ALU=A  DEST=DHI  INC[RP] DECODE ;;
  8     6 ::  END ;;
  9
```

```
10 \  <>0 <>DELIM -- Recycle this microinstruction
11      2 ::   SOURCE=DLO   ALU=A+1   DEST=DHI    JMP=001 DECODE ;;
12      1 ::   END ;;
13
14 ;;END
15
```

```
SCR #50
  0 \   MICROCODE --- <LOOP>(7)
  1 DECIMAL
  2 46 OPCODE: <LOOP>    ( -> )     ( RS: LIMIT COUNT -> ... )
  3     0 ::   SOURCE=ALU   ALU=B    DEST=DLO   ;;    \ Stash DHI
  4     1 ::   SOURCE=RS    ALU=A+1  DEST=DHI
  5                         INC[RP]          ;;    \ Increment counter
  6     2 ::   SOURCE=RS    ALU=A-B-1
  7                         INC[MPC]         ;;       \ Test for done
  8     3 ::        JMP=00S   ;;
  9                         \ Done when LIMIT>=COUNT
 10
 11
 12
 13
 14
 15
```

```
SCR #51
  0 \   MICROCODE --- <LOOP> -- 2
  1 DECIMAL
  2 47 CURRENT-PAGE !
  3 ( Loop )  0 :: SOURCE=RAM  ALU=A  DEST=PC  DEC[RP]  JMP=100  ;;
  4     4 ::   SOURCE=ALU   ALU=B   DEST=RS    DECODE ;;
  5     5 ::   SOURCE=DLO   ALU=A   DEST=DHI   END ;;
  6
  7 ( Done )  1 ::  INC[PC]    INC[RP]   ;;
  8     2 ::   SOURCE=DLO   ALU=A   DEST=DHI   DECODE  ;;
  9     3 ::   END ;;
 10
 11 ;;END
 12
 13
 14
 15
```

```
CR #52
  0 \   MICROCODE --- <PICK>(5) \ Does all of PICK exc. error check
  1 DECIMAL
  2 48 OPCODE: <PICK>    ( ..STACK.. A -> ..STACK.. B )
  3     0 ::   SOURCE=DP    DEST=DLO   DEC[DP]  ;;  \ Save DP value
  4     1 ::   SOURCE=DP    ALU=A+B    DEST=DHI  ;;
  5     2 ::   SOURCE=ALU   ALU=B      DEST=DP   ;;
  6     3 ::   SOURCE=DS    ALU=A      DEST=DHI  DECODE    ;;
  7     4 ::   SOURCE=DLO   DEST=DP               END      ;;
  8
  9 ;;END
 10
 11
 12
 13
 14
 15
```

```
SCR #53
  0 \  MICROCODE --- <ROLL>(5+5*N)
  1 DECIMAL \ Does all of ROLL exc. error check
  2 49 OPCODE: <ROLL>  ( ..STACK.. COUNT -> ..STACK.. B )
  3     0 ::  SOURCE=ALU   ALU=B    DEST=DLO
  4                                 DEC[DP]   DEC[RP] ;; \ Save Count
  5     1 ::  SOURCE=DP    ALU=A+B  DEST=DHI  ;;
  6     2 ::  SOURCE=ALU   ALU=B    DEST=DP   INC[MPC]  ;;
  7     3 ::  SOURCE=DS    DEST=RS  DEC[RP]   JMP=000   ;;    \ Save B
  8
  9
 10
 11
 12
 13
 14
 15

SCR #54
  0 \  MICROCODE --- <ROLL> -- 2
  1 DECIMAL
  2 50 CURRENT-PAGE !
  3     0 ::  SOURCE=DLO   ALU=A-1  DEST=DHI  ;;
  4     1 ::  SOURCE=ALU   ALU=B    ;;
  5     2 ::  SOURCE=ALU   ALU=B    DEST=DLO  DEC[DP]   ;;
  6     3 ::  SOURCE=DS    DEST=RS  INC[DP]   JMP=10E   ;;
  7
  8 ( Not done ) 4 ::  SOURCE=RS  DEST=DS  DEC[DP]  JMP=000 ;;
  9
 10 ( Done )      5 ::  INC[DP]   INC[RP]  DECODE ;;
 11     6 ::  SOURCE=RS   ALU=A  DEST=DHI  INC[DP]  INC[RP]  END ;;
 12
 13 ;;END
 14
 15

SCR #55
  0 \  MICROCODE --- =(4)
  1 DECIMAL
  2 51 OPCODE: =   ( A B -> FLAG )
  3     0 ::  SOURCE=DS    ALU=AxnorB ;;  \ Test for =
  4     1 ::  SOURCE=DS    ALU=AxnorB ;;  \ Test for =
  5     2 ::  INC[DP]   JMP=10E   DECODE  ;;
  6
  7 ( <> )    4 ::  ALU=0    DEST=DHI           END ;;
  8 ( = )     5 ::  ALU=-1   DEST=DHI           END ;;
  9
 10 ;;END
 11
 12
 13
 14
 15

SCR #56
  0 \  MICROCODE --- >R(3)
  1 DECIMAL
  2 52 OPCODE: >R     ( N -> )   ( return: -> N )
  3     0 ::  DEC[RP]   ;;
  4     1 ::  SOURCE=ALU   ALU=B  DEST=RS   DECODE  ;;  \ RS <- N
  5     2 ::  SOURCE=DS    ALU=A  DEST=DHI  INC[DP] END ;;
  6
  7 ;;END                                              \ Update DHI
```

```
SCR #57
   0 \  MICROCODE --- ?DUP(4)
   1 DECIMAL
   2 53 OPCODE:  ?DUP    ( A -> 0 / A A )
   3    0 ::    ALU=notB    ;;    \ Test for =0
   4    1 ::    ALU=notB    ;;    \ Test for =0
   5    2 ::    DEC[DP]   JMP=10E   DECODE   ;;
   6
   7 ( <>0 )   4 ::   SOURCE=ALU  ALU=B  DEST=DS    END ;;
   8 ( =0  )   5 ::   INC[DP]  - END  ;;
   9
  10 ;;END
  11
  12
  13
  14
  15

SCR #58
   0 \  MICROCODE --- @(6)
   1 DECIMAL
   2 54 OPCODE:  @      ( ADDR -> N )
   3    0 ::    SOURCE=ALU   ALU=B   DEST=PC  ;;     \ PC<-ADDR
   4    1 ::    ;;
   5    2 ::    SOURCE=RAM             DEST=DLO ;;   \ DLO<-RAM
   6    3 ::    SOURCE=PCSAVE  ALU=A+1  DEST=PC  ;;  \ Restore PC
   7    4 ::    SOURCE=DLO  ALU=A  DEST=DHI   DECODE  ;;
   8    5 ::    END  ;;                              \ Wait for DECODE
   9
  10 ;;END
  11
  12
  13
  14
  15

SCR #59
   0 \  MICROCODE --- ABS(3)
   1 DECIMAL
   2 55 OPCODE:  ABS    ( N1 -> N2 )
   3    0 ::    ALU=B  ;;   \ Test for Sign
   4    1 ::    SOURCE=ALU  ALU=0  DEST=DLO   JMP=01S  DECODE  ;;
   5
   6 ( >=0 )   2 ::  END  ;;
   7 ( <0  )   3 ::  SOURCE=DLO  ALU=A-B  DEST=DHI   END  ;;
   8
   9 ;;END
  10
  11
  12
  13
  14
  15
```

```
SCR #60
   0 \  MICROCODE --- ADC(6)
   1 DECIMAL
   2 56 OPCODE: ADC    ( N1 N2 CYIN -> NSUM CYOUT )
   3     0 ::    ALU=notB    ;;    \   test if CYIN=0
   4     1 ::    ALU=notB    ;;
   5     2 ::    SOURCE=DS   ALU=A      DEST=DHI INC[DP]  JMP=10E  ;;
   6                                                        \ DHI <- N2
   7 ( CYIN<>0 )  4 ::   SOURCE=DS   ALU=A+B+1  DEST=DHI JMP=011 ;;
   8 ( CYIN=0 )   5 ::   SOURCE=DS   ALU=A+B    DEST=DHI JMP=011 ;;
   9
  10     3 :: SOURCE=ALU   ALU=B   DEST=DS     JMP=11CA    DECODE ;;
  11
  12 ( COUT<>0 )  6 ::  ALU=-1   DEST=DHI    END ;;
  13 ( COUT=0 )   7 ::  ALU=0    DEST=DHI    END ;;
  14
  15 ;;END SCR #61
   0 \  MICROCODE --- AND(2)
   1 DECIMAL
   2 57 OPCODE: AND    ( N1 N2 -> N3 )
   3     0 ::    DECODE ;;
   4     1 ::    SOURCE=DS   ALU=AandB   DEST=DHI   INC[DP]
   5            END  ;;             \   DHI = N1 *AND* N2
   6
   7
   8 ;;END
   9
  10
  11
  12
  13
  14
  15

SCR #62
   0 \  MICROCODE --- ASR(4)
   1 DECIMAL
   2 58 OPCODE: ASR   ( N1 -> N2 )
   3     0 ::   SOURCE=ALU   ALU=B  DEST=DLO ;;
   4     1 ::   SL[DHI] ;;
   5     2 ::   SR[DLO] DECODE  ;;
   6     3 ::   SOURCE=DLO  ALU=A   DEST=DHI  END ;;
   7 ;;END
   8
   9
  10
  11
  12
  13
  14
  15

SCR #63
   0 \  MICROCODE --- BRANCH(4)
   1 DECIMAL
   2 59 OPCODE: BRANCH   ( FLAG -> )
   3     0 ::   ;;
   4     1 ::   SOURCE=RAM  ALU=A  DEST=PC ;;
   5     2 ::   DECODE  ;;
   6     3 ::   END  ;;
   7 ;;END
```

```
      8
      9
     10
     11
     12
     13
   · 14
     15

SCR #64
   0 \   MICROCODE --- BYTESWAP(9)
   1 DECIMAL
   2 60 OPCODE: BYTESWAP      ( N1 -> N2 )
   3    0 ::    SOURCE=ALU   ALU=B  DEST=DLO   ;;      \ set up for shift
   4    1 ::    SL[DHI]  SL[DLO]   ;;      \ shift 8 bits to swap bytes
   5    2 ::    SL[DHI]  SL[DLO]   ;;
   6    3 ::    SL[DHI]  SL[DLO]   ;;
   7    4 ::    SL[DHI]  SL[DLO]   ;;
   8    5 ::    SL[DHI]  SL[DLO]   ;;
   9    6 ::    SL[DHI]  SL[DLO]   INC[MPC]   ;;
  10    7 ::    SL[DHI]  SL[DLO]   DECODE    JMP=000 ;;
  11
  12
  13
  14
  15

SCR #65
   0 \   MICROCODE --- BYTESWAP  - 2
   1 DECIMAL
   2 61 CURRENT-PAGE !
   3    0 ::   SL[DHI]   SL[DLO]   END   ;;
   4
   5 ;;END
   6
   7
   8
   9
  10
  11
  12
  13
  14
  15

SCR #66
   0 \   MICROCODE --- D!(9)
   1 DECIMAL    \ Lo half in ADDR+1,  Hi half in ADDR
   2 62 OPCODE: D!    ( N ADDR -> )
   3    0 ::    SOURCE=ALU   ALU=B  DEST=PC    ;;    \ PC<-ADDR
   4    1 ::    ;;
   5    2 ::    SOURCE=DS    DEST=RAM  INC[DP]  ;;   \ HI HALF
   6    3 ::    INC[PC]  ;;
   7    4 ::    INC[MPC] ;;
   8    5 ::    SOURCE=DS    DEST=RAM  INC[DP]  JMP=000 ;;  \ LO HALF
   9
  10
  11
  12
```

```
SCR #67
  0 \  MICROCODE --- D! -- 2
  1 DECIMAL
  2 63 CURRENT-PAGE !
  3    0 ::    SOURCE=PCSAVE  ALU=A+1   DEST=PC    ;;   \ Restore PC
  4    1 ::    SOURCE=DS      ALU=A     DEST=DHI   INC[DP]
  5             DECODE   ;;                              \ Update Top of Stack
  6    2 ::    END   ;;
  7
  8 ;;END
  9
 10
 11
 12
 13
 14
 15

SCR #68
  0 \  MICROCODE --- D+(7)
  1 DECIMAL
  2 64 OPCODE: D+     ( D1 D2 -> D3 )
  3    0 ::    SOURCE=ALU    ALU=B    DEST=DLO    ;;   \ DLO <- D2hi
  4    1 ::    SOURCE=DS     ALU=A    DEST=DHI   INC[DP] ;;  \ DHI <-D2lo
  5    2 ::    INC[DP]   ;;
  6    3 ::    SOURCE=DS     ALU=A+B  DEST=DHI    ;;
  7    4 :: -  SOURCE=ALU    ALU=B    DEST=DS    DEC[DP]
  8                                               JMP=11CA  ;;  \ Carry?
  9
 10 ( CY=1 ) 6 ::   SOURCE=DLO ALU=A+1 DEST=DHI   DECODE   JMP=101 ;;
 11 ( CY=0 ) 7 ::   SOURCE=DLO ALU=A   DEST=DHI   DECODE   JMP=101 ;;
 12
 13    5 ::   SOURCE=DS    ALU=A+B  DEST=DHI   INC[DP]  END ;;
 14
 15 ;;END SCR #69
  0 \  MICROCODE --- D@(8)
  1 DECIMAL \ Hi half in ADDR, Lo half in ADDR+1
  2 65 OPCODE: D@     ( ADDR -> D )
  3    0 ::    SOURCE=ALU    ALU=B    DEST=PC DEC[DP]  ;;   \ PC<-ADDR
  4    1 ::    ;;
  5    2 ::    SOURCE=RAM             DEST=DLO INC[PC] ;;   \ Hi half
  6    3 ::    ;;
  7    4 ::    SOURCE=RAM    DEST=DS   ;;                   \ Lo half
  8    5 ::    SOURCE=PCSAVE ALU=A+1 DEST=PC   ;;    \ Restore PC
  9    6 ::    SOURCE=DLO    ALU=A   DEST=DHI  DECODE  ;;
 10    7 ::    END  ;;                                \ Wait for DECODE
 11
 12 ;;END
 13
 14
 15
```

```
SCR #70
  0 \  MICROCODE --- DDROP(2)
  1 DECIMAL
  2 66 OPCODE: DDROP     ( D -> )
  3    0 ::    INC[DP]      DECODE     ;;
  4    1 ::    SOURCE=DS  ALU=A  DEST=DHI  INC[DP]   END ;;
  5 ;;END
  6
  7
  8
  9
 10
 11
 12
 13
 14
 15

SCR #71
  0 \  MICROCODE --- DDUP(3)
  1 DECIMAL
  2 67 OPCODE: DDUP    ( D1 -> D1 D1 )
  3    0 ::  SOURCE=DS    DEST=DLO    DEC[DP]  ;;
  4    1 ::  SOURCE=ALU   ALU=B   DEST=DS    DEC[DP] DECODE ;;
  5    2 ::  SOURCE=DLO   DEST=DS   END ;;
  6
  7 ;;END
  8
  9
 10
 11
 12
 13
 14
 15

SCR #72
  0 \  MICROCODE --- DNEGATE(6)
  1 DECIMAL
  2 68 OPCODE: DNEGATE   ( D1 -> -D1 )
  3    0 ::   SOURCE=ALU   ALU=notB   DEST=DLO  ;;
  4    1 ::   SOURCE=DS    ALU=notA   DEST=DHI  ;;
  5    2 ::   SOURCE=ALU   ALU=B      DEST=DS   ;;
  6    3 ::   SOURCE=DS    ALU=A+1    DEST=DHI  ;;
  7    4 ::   SOURCE=ALU   ALU=B      DEST=DS   JMP=11CA      DECODE  ;;
  8
  9 ( CY=1 )  6 ::   SOURCE=DLO   ALU=A+1   DEST=DHI   END ;;
 10 ( CY=0 )  7 ::   SOURCE=DLO   ALU=A     DEST=DHI   END ;;
 11
 12 ;;END
 13
 14
 15

SCR #73
  0 \  MICROCODE --- DROP(2)
  1 DECIMAL
  2 69 OPCODE: DROP     ( N -> )
  3    0 ::    DECODE  ;;
  4    1 ::    SOURCE=DS  ALU=A  DEST=DHI  INC[DP]  END ;;
  5                              \ Update top of stack
```

```
  6 ;;END
  7
  8
  9
 10
 11
 12
 13
 14
 15

SCR #74
  0 \   MICROCODE --- DSWAP(8)
  1 DECIMAL
  2 70 OPCODE: DSWAP    ( D1 D2 -> D2 D1 )
  3    0 ::   SOURCE=DS    DEST=DLO    INC[DP]   DEC[RP]   ;;
  4    1 ::   SOURCE=DS    DEST=RS     INC[DP]   DEC[RP]   ;;
  5    2 ::   SOURCE=DS    DEST=RS     ;;
  6    3 ::   SOURCE=DLO   DEST=DS     DEC[DP]   ;;
  7    4 ::   SOURCE=RS    DEST=DLO              INC[RP]   ;;
  8    5 ::   SOURCE=ALU   ALU=B   DEST=DS   DEC[DP]       ;;
  9    6 ::   SOURCE=DLO   DEST=DS     DECODE ;;
 10    7 ::   SOURCE=RS    ALU=A   DEST=DHI INC[RP]    END  ;;
 11
 12 ;;END
 13
 14
 15

SCR #75
  0 \   MICROCODE --- DUP(3)
  1 DECIMAL
  2 71 OPCODE: DUP     ( N -> N N )
  3    0 ::   DEC[DP]   DECODE  ;;
  4    1 ::   SOURCE=ALU  ALU=B   DEST=DS END ;;    \ Copy DHI to DS
  5
  6 ;;END
  7
  8
  9
 10
 11
 12
 13
 14
 15

SCR #76
  0 \   MICROCODE --- FILL(4*N+9)
  1 DECIMAL
  2 72 OPCODE: FILL   ( ADDR  COUNT  VALUE -> )
  3    0 ::   SOURCE=DS    DEST=DLO    INC[DP]   ;;      \ DLO <- COUNT
  4    1 ::   SOURCE=DS    ALU=A   DEST=PC       ;; \ PC <- ADDR
  5    2 ::   SOURCE=ALU   ALU=B   DEST=DS   INC[MPC] ;; \ DS <- VALUE
  6    3 ::   SOURCE=DLO   ALU=A-1   JMP=110 ;;
  7
  8
  9
 10
 11
```

```
        12
        13
        14
        15

SCR #77
   0 \ MICROCODE --- FILL - 2
   1 DECIMAL
   2 73 CURRENT-PAGE !
   3    0 ::    SOURCE=DS     DEST=RAM    JMP=101  ;;
   4    5 ::    SOURCE=DLO    ALU=A-1     INC[PC]  ;;
   5    6 ::    SOURCE=DLO    ALU=A-1     DEST=DHI         ;;
   6    7 ::    SOURCE=ALU    ALU=B       DEST=DLO    JMP=00E  ;;
   7
   8    1 ::   -SOURCE=PCSAVE ALU=A+1     DEST=PC   ;;
   9    2 ::    INC[DP]       DECODE      ;;
  10    3 ::    SOURCE=DS     ALU=A DEST=DHI INC[DP]  END  ;;
  11
  12 ;;END
  13
  14
  15

SCR #78
   0 \ MICROCODE --- I(3)
   1 DECIMAL
   2 74 OPCODE: I    ( -> N )
   3    0 ::    DEC[DP]  ;;
   4    1 ::    SOURCE=ALU   ALU=B   DEST=DS    DECODE  ;;
   5    2 ::    SOURCE=RS    ALU=A   DEST=DHI   END  ;;
   6 ;;END
   7
   8
   9
  10
  11
  12
  13
  14
  15

SCR #79
   0 \ MICROCODE --- I'(3)
   1 DECIMAL \ NOTE: I' is also useful within #DO #LOOP alias for #J
   2 75 OPCODE: I'    ( -> N )
   3    0 ::    DEC[DP]     INC[RP]  ;;
   4    1 ::    SOURCE=ALU   ALU=B   DEST=DS    DECODE  ;;
   5    2 ::    SOURCE=RS    ALU=A   DEST=DHI   DEC[RP]  END  ;;
   6 ;;END
   7
   8
   9
  10
  11
  12
  13
  14
  15
```

```
SCR #80
  0 \  MICROCODE --- J(4)
  1 DECIMAL
  2 76 OPCODE: J    ( -> N )
  3    0 ::   DEC[DP]     INC[RP] ;;
  4    1 ::   SOURCE=ALU   ALU=B  DEST=DS    INC[RP] ;;
  5    2 ::   SOURCE=RS    ALU=A  DEST=DHI   DEC[RP]    DECODE ;;
  6    3 ::       DEC[RP]     END ;;
  7 ;;END
  8
  9
 10
 11
 12
 13
 14
 15

SCR #81
  0 \  MICROCODE --- LEAVE(2)
  1 DECIMAL
  2 77 OPCODE: LEAVE    ( -> )    ( Sets COUNT=LIMIT on return stack )
  3    0 ::  SOURCE=RS   DEST=DLO   INC[RP]   DECODE    ;;
  4    1 ::  SOURCE=DLO  DEST=RS    DEC[RP]   END       ;;
  5 ;;END
  6
  7
  8
  9
 10
 11
 12
 13
 14
 15

SCR #82
  0 \  MICROCODE --- LIT(4)
  1 DECIMAL
  2 78 OPCODE: LIT    ( -> N )
  3    0 ::          ;;
  4    1 ::   SOURCE=RAM  DEST=DLO  INC[PC]   DEC[DP] ;;
  5                                             \ get literal value
  6    2 ::   SOURCE=ALU  ALU=B  DEST=DS   DECODE ;;
  7                               \ Save top of stack
  8    3 ::   SOURCE=DLO  ALU=A  DEST=DHI  END  ;;  \ DHI <- N
  9
 10 ;;END
 11
 12
 13
 14
 15

SCR #83
  0 \  MICROCODE --- LSR(2)
  1 DECIMAL
  2 79 OPCODE: LSR   ( N1 -> N2 )
  3    0 ::     DECODE ;;
  4    1 ::  SC=0  SR[DHI]   END ;;
```

```
 5 ;;END
 6
 7
 8
 9
10
11
12
13
14
15

SCR #84
  0 \ MICROCODE --- NEGATE(2)
  1 DECIMAL
  2 80 OPCODE: NEGATE    ( N -> -N )
  3    0 ::    SOURCE=ALU   ALU=0    DEST=DLO   DECODE   ;;
  4    1 ::    SOURCE=DLO   ALU=A-B  DEST=DHI   END      ;;
  5 ;;END
  6
  7
  8
  9
 10
 11
 12
 13
 14
 15

SCR #85
  0 \ MICROCODE --- NOP(2)
  1 DECIMAL
  2 81 OPCODE: NOP    ( -> )
  3    0 ::  DECODE ;;
  4    1 ::  END    ;;
  5 ;;END
  6
  7
  8
  9
 10
 11
 12
 13
 14
 15

SCR #86
  0 \ MICROCODE --- NOT(4)
  1 DECIMAL
  2 82 OPCODE: NOT    ( N -> 0=FLAG )
  3    0 ::  ALU=notB  ;;
  4    1 ::  ALU=notB  ;;
  5    2 ::  JMP=10E    DECODE   ;;
  6
  7 ( <>0 )  4 ::   ALU=0    DEST=DHI   END  ;;
  8 ( =0 )   5 ::   ALU=-1   DEST=DHI   END  ;;
  9 ;;END
 10
```

```
   11
   12
   13
   14
   15

SCR #87
  0 \   MICROCODE --- OR(2)
  1 DECIMAL
  2 83 OPCODE: OR      ( N1 N2 -> N3 )
  3    0 ::    DECODE ;;
  4    1 ::    SOURCE=DS   ALU=AorB   DEST=DHI   INC[DP]   END  ;;
  5                            \ N3 <- N2 *OR* N1
  6 ;;END
  7
  8
  9
 10
 11
 12
 13
 14
 15

SCR #88
  0 \   MICROCODE --- OVER(3)
  1 DECIMAL
  2 84 OPCODE: OVER    ( N1 N2 -> N1 N2 N1 )
  3    0 ::    SOURCE=DS    DEST=DLO   DEC[DP]  ;;       \ DLO <- N1
  4    1 ::    SOURCE=ALU   ALU=B      DEST=DS
  5            DECODE  ;;   \ Save N2
  6    2 ::    SOURCE=DLO   ALU=A      DEST=DHI  END ;;  \ Copy N1
  7 ;;END
  8
  9
 10
 11
 12
 13
 14
 15

SCR #89
  0 \   MICROCODE --- R>(3)
  1 DECIMAL
  2 85 OPCODE: R>      ( -> N )   ( return: N -> )
  3    0 ::    DEC[DP]  ;;
  4    1 ::    SOURCE=ALU   ALU=B   DEST=DS   DECODE  ;;  \ DS <- DHI
  5    2 ::    SOURCE=RS    ALU=A   DEST=DHI  INC[RP]  END ;;
  6                         \ DHI <- N
  7 ;;END
  8
  9
 10
 11
 12
 13
 14
 15
```

```
SCR #90
  0 \   MICROCODE --- R@(3)
  1 DECIMAL
  2 86 OPCODE: R@    ( -> N )    ( return: N -> N )
  3     0 ::    DEC[DP]   ;;
  4     1 ::    SOURCE=ALU   ALU=B   DEST=DS    DECODE   ;;
  5     2 ::    SOURCE=RS    ALU=A   DEST=DHI   END  ;;
  6 ;;END
  7
  8
  9
 10
 11
 12
 13
 14
 15

SCR #91
  0 \   MICROCODE --- RLC(5/6)
  1 DECIMAL
  2 87 OPCODE: RLC    ( N1 CYIN -> N2 CYOUT )
  3     0 ::    ALU=notB       ;;    \ test if CYIN=0
  4     1 ::    ALU=notB       ;;
  5     2 ::    SOURCE=DS   ALU=A+A   DEST=DHI       JMP=10E   ;;
  6                                                            \ DHI <- N2
  7 ( CYIN<>0 )  4 ::    SOURCE=DS   ALU=A+A+1  DEST=DHI ;;
  8
  9     5 ::    SOURCE=ALU  ALU=B    DEST=DS    JMP=11CA    DECODE ;;
 10
 11 ( COUT<>0 )  6 ::   ALU=-1   DEST=DHI    END  ;;
 12 ( COUT=0  )  7 ::   ALU=0    DEST=DHI    END  ;;
 13
 14 ;;END
 15

SCR #92
  0 \   MICROCODE --- ROT(5)
  1 DECIMAL
  2 88 OPCODE: ROT    ( N1 N2 N3 -> N2 N3 N1 )
  3     0 ::    SOURCE=ALU  ALU=B   DEST=DLO   DEC[RP]  ;; \ DLO<-N3
  4     1 ::    SOURCE=DS   DEST=RS    INC[DP]  ;;         \ RS<-N2
  5     2 ::    SOURCE=DS   ALU=A   DEST=DHI   ;;          \ DHI<-N1
  6     3 ::    SOURCE=RS   DEST=DS  DEC[DP]  DECODE ;;    \ DS<-N2
  7     4 ::    SOURCE=DLO  DEST=DS  INC[RP]  END  ;;      \ DS<-N3
  8
  9 ;;END
 10
 11
 12
 13
 14
 15

SCR #93
  0 \   MICROCODE --- RRC(6)
  1 DECIMAL
  2 89 OPCODE: RRC    ( N1 CYIN -> N2 CYOUT )
  3     0 ::    ALU=notB    ;;   \ test if CYIN=0
  4     1 ::    SOURCE=DS   DEST=DLO   ALU=notB   JMP=111  ;;
```

```
 5     7 ::       JMP=01E    ;;
 6
 7  ( CYIN<>0 )   2 ::    ALU=-1 DEST=DHI    JMP=10CC ;;
 8  ( CYIN=0  )   3 ::    ALU=0  DEST=DHI    JMP=10CC ;;
 9
10  ( CYOUT=0 )   4 ::    SR[DLO] ALU=0  DEST=DHI   DECODE JMP=110 ;;
11  ( CYOUT=1 )   5 ::    SR[DLO] ALU=-1 DEST=DHI   DECODE JMP=110 ;;
12
13     6 ::    SOURCE=DLO  DEST=DS   END ;;
14
15 ;;END

SCR #94
 0 \  MICROCODE --- S->D(3)
 1 DECIMAL
 2 90 OPCODE:  S->D      ( N1 -> D2 )
 3    0 ::    ALU=B      DEC[DP] ;;
 4    1 ::    SOURCE=ALU ALU=B   DEST=DS   JMP=10S   DECODE   ;;
 5
 6 ( >=0 )   4 ::   ALU=0  DEST=DHI    END   ;;
 7 ( <0  )   5 ::   ALU=-1 DEST=DHI    END   ;;
 8
 9
10 ;;END
11
12
13
14
15

SCR #95
 0 \  MICROCODE --- SWAP(3)
 1 DECIMAL
 2 91 OPCODE:  SWAP      ( N1 N2 -> N2 N1 )
 3    0 ::    SOURCE=DS   DEST=DLO ;;    \  DLO<-N1
 4    1 ::    SOURCE=ALU  ALU=B    DEST=DS    DECODE  ;;  \ DS<-N2
 5    2 ::    SOURCE=DLO  ALU=A    DEST=DHI   END   ;;    \ DHI<-N1
 6 ;;END
 7
 8
 9
10
11
12
13
14
15

SCR #96
 0 \  MICROCODE --- TOGGLE(8)
 1 DECIMAL
 2 92 OPCODE:  TOGGLE    ( ADDR N -> )
 3    0 ::   SOURCE=DS ALU=A    DEST=PC    INC[DP] ;;    \ PC<-ADDR
 4    1 ::   ;;
 5    2 ::   SOURCE=RAM              DEST=DLO ;;   \ (ADDR)xorN
 6    3 ::   SOURCE=DLO  ALU=AxorB   DEST=DHI ;;   \ (ADDR)xorN
 7    4 ::   SOURCE=ALU  ALU=B   DEST=RAM     ;;   \ Re-write ADDR
 8    5 ::   SOURCE=PCSAVE  ALU=A+1  DEST=PC  ;;   \ Restore PC
 9    6 ::   SOURCE=DS   ALU=A   DEST=DHI  INC[DP]  DECODE ;;
10    7 ::   END  ;;
```

```
 11
 12 ;;END
 13
 14
 15

SCR #97
  0 \  MICROCODE --- U*(37/38)
  1 DECIMAL
  2 96 OPCODE: U*     ( U1 U2 -> UD3 )
  3    0 ::    SOURCE=ALU  ALU=B  DEST=DLO ;;      \ Move top of stack
  4    1 ::    ALU=0  DEST=DHI    ;;  \ Zero hi product half
  5
  6    2 ::    SC=0  SR[DHI]  SR[DLO]    JMP=10CC  ;;
  7
  8 ( BIT 0: CY=0 ) 4 :: SC=0 SR[DHI] SR[DLO]   INC[MPC] JMP=111 ;;
  9    7 ::   SC=0  JMP=00CC  ;;
 10
 11 ( CY=1 )  5 ::  SC=0  SR[DHI]  SR[DLO]    INC[MPC]  ;;
 12    6 ::   SOURCE=DS  ALU=A+B  DEST=DHI    JMP=00CC  ;;
 13
 14
 15

SCR #98
  0 \  MICROCODE --- U*  - 2
  1 DECIMAL
  2 97 CURRENT-PAGE !
  3 ( BIT 1: CY=0 ) 0 ::   SR[DHI]  SR[DLO]    JMP=011  ;;
  4    3 ::  SC=0  JMP=10CC  ;;
  5
  6 (    CY=1 )  1 ::  SR[DHI]  SR[DLO]   ;;
  7    2 :: SOURCE=DS  ALU=A+B  DEST=DHI    JMP=10CC ;;
  8
  9 ( BIT 2: CY=0 ) 4 ::   SR[DHI]  SR[DLO]   INC[MPC] JMP=111 ;;
 10    7 ::  SC=0  JMP=00CC  ;;
 11
 12 (    CY=1 )  5 ::   SR[DHI]  SR[DLO]    INC[MPC]  ;;
 13    6 ::  SOURCE=DS  ALU=A+B  DEST=DHI    JMP=00CC  ;;
 14
 15

SCR #99
  0 \  MICROCODE --- U*  - 3
  1 DECIMAL
  2 98 CURRENT-PAGE !
  3 ( BIT 3: CY=0 ) 0 ::   SR[DHI]  SR[DLO]    JMP=011  ;;
  4    3 ::  SC=0  JMP=10CC  ;;
  5
  6 (    CY=1 )  1 ::  SR[DHI]  SR[DLO]   ;;
  7    2 :: SOURCE=DS  ALU=A+B  DEST=DHI    JMP=10CC ;;
  8
  9 ( BIT 4: CY=0 ) 4 ::   SR[DHI]  SR[DLO]   INC[MPC] JMP=111 ;;
 10    7 ::  SC=0  JMP=00CC  ;;
 11
 12 (    CY=1 )  5 ::   SR[DHI]  SR[DLO]    INC[MPC]  ;;
 13    6 ::  SOURCE=DS  ALU=A+B  DEST=DHI    JMP=00CC  ;;
 14
 15
```

```
SCR #100
  0 \ MICROCODE --- U* - 4
  1 DECIMAL
  2 99 CURRENT-PAGE !
  3 ( BIT 5: CY=0 ) 0 ::   SR[DHI]  SR[DLO]     JMP=011   ;;
  4     3 ::  SC=0   JMP=10CC   ;;
  5
  6 (    CY=1 )  1 ::  SR[DHI]  SR[DLO]      ;;
  7     2 ::  SOURCE=DS  ALU=A+B   DEST=DHI    JMP=10CC ;;
  8
  9 ( BIT 6: CY=0 )  4 ::    SR[DHI]  SR[DLO]    INC[MPC]  JMP=111 ;;
 10     7 ::  SC=0   JMP=00CC    ;;
 11
 12 (    CY=1 )  5 ::     SR[DHI]  SR[DLO]      INC[MPC]   ;;
 13     6 ::  SOURCE=DS  ALU=A+B   DEST=DHI    JMP=00CC  ;;
 14
 15

SCR #101
  0 \ MICROCODE --- U* - 5
  1 DECIMAL
  2 100 CURRENT-PAGE !
  3 ( BIT 7: CY=0 ) 0 ::   SR[DHI]  SR[DLO]     JMP=011   ;;
  4     3 ::  SC=0   JMP=10CC   ;;
  5
  6 (    CY=1 )  1 ::  SR[DHI]  SR[DLO]      ;;
  7     2 ::  SOURCE=DS  ALU=A+B   DEST=DHI    JMP=10CC ;;
  8
  9 ( BIT 8: CY=0 )  4 ::    SR[DHI]  SR[DLO]    INC[MPC]  JMP=111 ;;
 10     7 ::  SC=0   JMP=00CC    ;;
 11
 12 (    CY=1 )  5 ::     SR[DHI]  SR[DLO]      INC[MPC]   ;;
 13     6 ::  SOURCE=DS  ALU=A+B   DEST=DHI    JMP=00CC  ;;
 14
 15

SCR #102
  0 \ MICROCODE --- U* - 6
  1 DECIMAL
  2 101 CURRENT-PAGE !
  3 ( BIT 9: CY=0 ) 0 ::   SR[DHI]  SR[DLO]     JMP=011   ;;
  4     3 ::  SC=0   JMP=10CC   ;;
  5
  6 (    CY=1 )  1 ::  SR[DHI]  SR[DLO]      ;;
  7     2 ::  SOURCE=DS  ALU=A+B   DEST=DHI    JMP=10CC ;;
  8
  9 ( BIT 10: CY=0 )  4 ::    SR[DHI]  SR[DLO]    INC[MPC]  JMP=111 ;;
 10     7 ::  SC=0   JMP=00CC    ;;
 11
 12 (    CY=1 )  5 ::     SR[DHI]  SR[DLO]      INC[MPC]   ;;
 13     6 ::  SOURCE=DS  ALU=A+B   DEST=DHI    JMP=00CC  ;;
 14
 15

SCR #103
  0 \ MICROCODE --- U* - 7
  1 DECIMAL
  2 102 CURRENT-PAGE !
  3 ( BIT 11: CY=0 ) 0 ::   SR[DHI]  SR[DLO]     JMP=011   ;;
  4     3 ::  SC=0   JMP=10CC   ;;
```

```
  5
  6  (    CY=1  )  1 ::  SR[DHI]  SR[DLO]                    ;;
  7       2 ::  SOURCE=DS  ALU=A+B  DEST=DHI      JMP=10CC  ;;
  8
  9  ( BIT 12: CY=0 )  4 ::  SR[DHI]  SR[DLO]    INC[MPC] JMP=111 ;;
 10       7 ::  SC=0  JMP=00CC    ;;
 11
 12  (    CY=1  )  5 ::    SR[DHI]  SR[DLO]      INC[MPC]      ;;
 13       6 ::  SOURCE=DS  ALU=A+B  DEST=DHI     JMP=00CC     ;;
 14
 15

SCR #104
  0  \ MICROCODE --- U* - 8
  1 DECIMAL
  2 103 CURRENT-PAGE !
  3  ( BIT 13: CY=0 )  0 ::  SR[DHI]  SR[DLO]   JMP=011  ;;
  4       3 ::  SC=0  JMP=10CC  ;;
  5
  6  (    CY=1  )  1 ::  SR[DHI]  SR[DLO]                    ;;
  7       2 ::  SOURCE=DS  ALU=A+B  DEST=DHI      JMP=10CC  ;;
  8
  9  ( BIT 14: CY=0 )  4 ::  SR[DHI]  SR[DLO]    INC[MPC] JMP=111 ;;
 10       7 ::  SC=0  JMP=00CC    ;;
 11
 12  (    CY=1  )  5 ::    SR[DHI]  SR[DLO]      INC[MPC]      ;;
 13       6 ::  SOURCE=DS  ALU=A+B  DEST=DHI     JMP=00CC     ;;
 14
 15

SCR #105
  0  \ MICROCODE --- U* - 9
  1 DECIMAL
  2 104 CURRENT-PAGE !
  3  ( BIT 15: CY=0 )  0 ::  SR[DHI]  SR[DLO]   JMP=011  INC[MPC] ;;
  4       3 ::  SC=0  JMP=00CC  ;;
  5
  6  (    CY=1  )  1 ::  SR[DHI]  SR[DLO]    INC[MPC] ;;
  7       2 ::  SOURCE=DS  ALU=A+B  DEST=DHI      JMP=00CC  ;;
  8
  9
 10
 11
 12
 13
 14
 15

SCR #106
  0  \ MICROCODE --- U* - 10
  1 DECIMAL
  2 105 CURRENT-PAGE !
  3  ( FINISH: CY=0 )  0 ::  SR[DHI]  SR[DLO]   JMP=110 DECODE ;;
  4       6 ::  SOURCE=DLO  DEST=DS    END ;;
  5
  6  (    CY=1  )  1 ::    SR[DHI]  SR[DLO]              ;;
  7       2 ::  SOURCE=DS  ALU=A+B  DEST=DHI     JMP=110 DECODE  ;;
  8
  9  ;;END
 10
```

```
11
12
13
14
15

SCR #107
  0 \  MICROCODE --- U/MOD(40/41)
  1 DECIMAL \  Max divisor is 7FFF  Max dividend is 7FFFFFFF
  2 112 OPCODE: U/MOD   ( UD1DVDND U2DIVISOR -> UREM UQUOT )
  3    0 ::    SOURCE=ALU ALU=B DEST=DLO DEC[RP] ;; \ DIVISOR on DS
  4    1 ::    SOURCE=ALU  ALU=notB DEST=RS  ;;   \ -DIVISOR-1 on RS
  5    2 ::    SOURCE=DS   ALU=A-B  DEST=DHI ;;   \ DVDND IN DHI,DLO
  6  \ Initial subtract.  DHI = DIVIDEND(hi) - DIVISOR
  7    3 ::    SOURCE=DLO  DEST=DS         INC[DP]  ;;
  8    4 ::    SOURCE=DS  DEST=DLO  DEC[DP]   ALU=B   INC[MPC]  ;;
  9    5 ::    SL[DHI]    JMP=00S  ;;
 10
 11
 12
 13
 14
 15

SCR #108
  0 \  MICROCODE --- U/MOD  -- 2
  1 DECIMAL
  2 113 CURRENT-PAGE !
  3 ( BIT 0: SIGN=0 )  0 ::   SOURCE=RS   ALU=A+B+1   DEST=DHI
  4                      SC=1  SL[DLO]       JMP=01O  ;;
  5 (     SIGN=1 )  1 ::   SOURCE=DS  ALU=A+B  DEST=DHI
  6                      SC=0  SL[DLO]           ;;
  7    2 ::    SL[DHI]   JMP=10S  ;;
  8
  9 ( BIT 1: SIGN=0 )  4 ::   SOURCE=RS   ALU=A+B+1   DEST=DHI
 10                      SC=1  SL[DLO]     INC[MPC]  JMP=11O ;;
 11 (     SIGN=1 )  5 ::   SOURCE=DS   ALU=A+B   DEST=DHI
 12                      SC=0  SL[DLO]     INC[MPC]     ;;
 13    6 ::    SL[DHI]   JMP=00S ;;
 14
 15

SCR #109
  0 \  MICROCODE --- U/MOD  -- 3
  1 DECIMAL
  2 114 CURRENT-PAGE !
  3 ( BIT 2: SIGN=0 )  0 ::   SOURCE=RS   ALU=A+B+1   DEST=DHI
  4                      SC=1  SL[DLO]       JMP=01O  ;;
  5 (     SIGN=1 )  1 ::   SOURCE=DS  ALU=A+B  DEST=DHI
  6                      SC=0  SL[DLO]           ;;
  7    2 ::    SL[DHI]   JMP=10S  ;;
  8
  9 ( BIT 3: SIGN=0 )  4 ::   SOURCE=RS   ALU=A+B+1   DEST=DHI
 10                      SC=1  SL[DLO]     INC[MPC]  JMP=11O ;;
 11 (     SIGN=1 )  5 ::   SOURCE=DS   ALU=A+B   DEST=DHI
 12                      SC=0  SL[DLO]     INC[MPC]     ;;
 13    6 ::    SL[DHI]   JMP=00S ;;
 14
 15
```

```
SCR #110
  0 \ MICROCODE --- U/MOD -- 4
  1 DECIMAL
  2 115 CURRENT-PAGE !
  3 ( BIT 4: SIGN=0 )   0 ::   SOURCE=RS   ALU=A+B+1   DEST=DHI
  4                            SC=1  SL[DL0]           JMP=010  ;;
  5 (     SIGN=1 )   1 ::   SOURCE=DS   ALU=A+B    DEST=DHI
  6                            SC=0  SL[DL0]                    ;;
  7       2 ::   SL[DHI]  JMP=10S  ;;
  8
  9 ( BIT 5: SIGN=0 )   4 ::   SOURCE=RS   ALU=A+B+1   DEST=DHI
 10                            SC=1  SL[DL0]           INC[MPC] JMP=110 ;;
 11 (     SIGN=1 )   5 ::   SOURCE=DS   ALU=A+B    DEST=DHI
 12                            SC=0  SL[DL0]           INC[MPC]         ;;
 13       6 ::   SL[DHI]  JMP=00S  ;;
 14
 15

SCR #111
  0 \ MICROCODE --- U/MOD -- 5
  1 DECIMAL
  2 116 CURRENT-PAGE !
  3 ( BIT 6: SIGN=0 )   0 ::   SOURCE=RS   ALU=A+B+1   DEST=DHI
  4                            SC=1  SL[DL0]           JMP=010  ;;
  5 (     SIGN=1 )   1 ::   SOURCE=DS   ALU=A+B    DEST=DHI
  6                            SC=0  SL[DL0]                    ;;
  7       2 ::   SL[DHI]  JMP=10S  ;;
  8
  9 ( BIT 7: SIGN=0 )   4 ::   SOURCE=RS   ALU=A+B+1   DEST=DHI
 10                            SC=1  SL[DL0]           INC[MPC] JMP=110 ;;
 11 (     SIGN=1 )   5 ::   SOURCE=DS   ALU=A+B    DEST=DHI
 12                            SC=0  SL[DL0]           INC[MPC]         ;;
 13       6 ::   SL[DHI]  JMP=00S  ;;
 14
 15

SCR #112
  0 \ MICROCODE --- U/MOD -- 6
  1 DECIMAL
  2 117 CURRENT-PAGE !
  3 ( BIT 8: SIGN=0 )   0 ::   SOURCE=RS   ALU=A+B+1   DEST=DHI
  4                            SC=1  SL[DL0]           JMP=010  ;;
  5 (     SIGN=1 )   1 ::   SOURCE=DS   ALU=A+B    DEST=DHI
  6                            SC=0  SL[DL0]                    ;;
  7       2 ::   SL[DHI]  JMP=10S  ;;
  8
  9 ( BIT 9: SIGN=0 )   4 ::   SOURCE=RS   ALU=A+B+1   DEST=DHI
 10                            SC=1  SL[DL0]           INC[MPC] JMP=110 ;;
 11 (     SIGN=1 )   5 ::   SOURCE=DS   ALU=A+B    DEST=DHI
 12                            SC=0  SL[DL0]           INC[MPC]         ;;
 13       6 ::   SL[DHI]  JMP=00S  ;;
 14
 15

SCR #113
  0 \ MICROCODE --- U/MOD -- 7
  1 DECIMAL
  2 118 CURRENT-PAGE !
  3 ( BIT 10: SIGN=0 )  0 ::   SOURCE=RS   ALU=A+B+1   DEST=DHI
  4                            SC=1  SL[DL0]           JMP=010  ;;
```

```
 5 (    SIGN=1 )   1 ::   SOURCE=DS   ALU=A+B   DEST=DHI
 6                        SC=0   SL[DLO]                    ;;
 7    2 ::   SL[DHI]   JMP=10S   ;;
 8
 9 ( BIT 11: SIGN=0 )   4 ::   SOURCE=RS   ALU=A+B+1   DEST=DHI
10                      SC=1   SL[DLO]        INC[MPC]   JMP=110 ;;
11 (       SIGN=1 )   5 ::   SOURCE=DS   ALU=A+B   DEST=DHI
12                    SC=0   SL[DLO]        INC[MPC]        ;;
13    6 ::   SL[DHI]   JMP=00S ;;
14
15

SCR #114
 0 \ MICROCODE --- U/MOD  -- 8
 1 DECIMAL
 2 119 CURRENT-PAGE !
 3 ( BIT 12: SIGN=0 )   0 ::   SOURCE=RS   ALU=A+B+1   DEST=DHI
 4                      SC=1   SL[DLO]        JMP=010 ;;
 5 (    SIGN=1 )   1 ::   SOURCE=DS   ALU=A+B   DEST=DHI
 6                        SC=0   SL[DLO]                    ;;
 7    2 ::   SL[DHI]   JMP=10S   ;;
 8
 9 ( BIT 13: SIGN=0 )   4 ::   SOURCE=RS   ALU=A+B+1   DEST=DHI
10                      SC=1   SL[DLO]        INC[MPC]   JMP=110 ;;
11 (       SIGN=1)   5 ::   SOURCE=DS   ALU=A+B   DEST=DHI
12                    SC=0   SL[DLO]        INC[MPC]        ;;
13    6 ::   SL[DHI]   JMP=00S ;;
14
15

SCR #115
 0 \ MICROCODE --- U/MOD  -- 9
 1 DECIMAL
 2 120 CURRENT-PAGE !
 3 ( BIT 14: SIGN=0 )   0 ::   SOURCE=RS   ALU=A+B+1   DEST=DHI
 4                      SC=1   SL[DLO]        JMP=010 ;;
 5 (    SIGN=1 )   1 ::   SOURCE=DS   ALU=A+B   DEST=DHI
 6                        SC=0   SL[DLO]                    ;;
 7    2 ::   SL[DHI]   JMP=10S   ;;
 8
 9 ( BIT 15: SIGN=0 )   4 ::   SOURCE=RS   ALU=A+B+1   DEST=DHI
10                      SC=1   SL[DLO]        INC[MPC]   JMP=110 ;;
11 (       SIGN=1 )   5 ::   SOURCE=DS   ALU=A+B   DEST=DHI
12                    SC=0   SL[DLO]        INC[MPC]        ;;
13    6 ::   SOURCE=DS   DEST=RS   INC[DP]   JMP=00S ;;
14
15

SCR #116
 0 \ MICROCODE --- U/MOD  -- 10
 1 DECIMAL
 2 121 CURRENT-PAGE !
 3 ( DONE: SIGN=0 )   0 ::   SOURCE=ALU   ALU=B   DEST=DS
 4                    SC=1   SL[DLO]   DECODE   JMP=011 ;;
 5
 6 (       SIGN=1 )   1 ::   SOURCE=RS   ALU=A+B   DEST=DHI ;;
 7    2 ::   SOURCE=ALU   ALU=B   DEST=DS
 8          SC=0   SL[DLO]   DECODE ;;
 9    3 ::   SOURCE=DLO   ALU=A   DEST=DHI   INC[RP]   END ;;
10
```

```
 11 ;;END
 12
 13
 14
 15

SCR #117
  0 \  MICROCODE --- XOR(2)
  1 DECIMAL
  2 122 OPCODE: XOR    ( N1 N2 -> N2 )
  3    0 ::    DECODE ;;
  4    1 ::    SOURCE=DS  ALU=AxorB  DEST=DHI  INC[DP]
  5           END    ;;                 \ ADD N1 , N2
  6 ;;END
  7
  8
  9
 10
 11
 12
 13
 14
 15

SCR #118
  0
  1
  2
  3
  4
  5
  6
  7
  8
  9
 10
 11
 12
 13
 14
 15

SCR #119
  0 \  MICROCODE --- <UDNORM>(5*N+3)
  1 DECIMAL   ( BEGIN  DUP 4000 AND NOT WHILE DLSL R> 1- >R REPEAT )
  2 123 OPCODE: <UDNORM>    ( DMANT -> DMANTNORM )
  3    0 :: SOURCE=DS  DEST=DLO ;;
  4
  5    1 :: SL[DHI] ;;
  6    2 :: SOURCE=ALU  ALU=B   DEST=DS  ;;
  7    3 :: -SOURCE=RS  ALU=A-1  DEST=DHI     JMP=10S ;;
  8
  9 ( Not done ) 4 :: SOURCE=ALU  ALU=B  DEST=RS
 10                  SC=0  SL[DLO]     JMP=111  ;;
 11    7 :: SC=0  SOURCE=DS  ALU=A  DEST=DHI    JMP=001 ;;
 12
 13 ( Done ) 5 :: SOURCE=DS  ALU=A  DEST=DHI  DECODE  ;;
 14    6 :: SOURCE=DLO  DEST=DS  SC=0  SR[DHI]  END ;;
 15 ;;END
```

```
SCR #120
   0 \ MICROCODE --- D+!(12)     -- 1
   1 DECIMAL
   2 124 OPCODE: D+! ( D1 ADDR -> )
   3    0 ::   SOURCE=ALU   ALU=B    DEST=DLO  ;;
   4    1 ::   SOURCE=DLO   ALU=A+1  DEST=PC   INC[DP]  ;;
   5 \ Add low half
   6    2 ::   SOURCE=DS ALU=A DEST=DHI ;;
   7    3 ::   SOURCE=RAM   ALU=A+B  DEST=DHI  ;;
   8    4 ::   SOURCE=ALU   ALU=B    DEST=RAM   JMP=11CA   INC[MPC] ;;
   9
  10 ( CY=1 )  6 ::  SOURCE=DLO   ALU=A   DEST=PC   DEC[DP] JMP=000 ;;
  11 ( CY=0 )  7 ::  SOURCE=DLO   ALU=A   DEST=PC   DEC[DP] JMP=001 ;;
  12
  13
  14
  15

SCR #121
   0 \ MICROCODE --- D+!  -- 2
   1 DECIMAL
   2 125 CURRENT-PAGE !
   3 ( CY=1 )  0 ::   SOURCE=DS   ALU=A+1  DEST=DHI  JMP=010 ;;
   4 ( CY=0 )  1 ::   SOURCE=DS   ALU=A    DEST=DHI  JMP=010 ;;
   5
   6    2 ::   SOURCE=RAM    ALU=A+B   DEST=DHI  ;;
   7    3 ::   SOURCE=ALU    ALU=B     DEST=RAM           INC[DP] ;;
   8    4 ::   SOURCE=PCSAVE ALU=A+1   DEST=PC            INC[DP] ;;
   9    5 ::   SOURCE=DS     ALU=A     DEST=DHI           INC[DP] DECODE ;;
  10    6 ::   END ;;
  11
  12 ;;END
  13
  14
  15

SCR #122
   0 \ MICROCODE --- D>R(4)
   1 DECIMAL
   2 126 OPCODE: D>R    ( D -> )    ( Return: -> D )
   3    0 ::   DEC[RP] ;;
   4    1 ::   SOURCE=ALU   ALU=B   DEST=RS   DEC[RP] ;;
   5    2 ::   SOURCE=DS    DEST=RS     INC[DP]    DECODE ;;
   6    3 ::   SOURCE=DS    ALU=A   DEST=DHI  INC[DP]  END ;;
   7
   8 ;;END
   9
  10
  11
  12
  13
  14
  15

SCR #123
   0 \ MICROCODE --- DLSLN(6+5*COUNT)
   1 DECIMAL
   2 128 OPCODE: DLSLN    ( D1 COUNT -> D2 )
   3    0 ::   SOURCE=ALU   ALU=B    DEST=DLO  DEC[RP]   INC[DP]  ;;
   4    1 ::   SOURCE=DLO   ALU=A-1  DEST=DHI
```

```
  5                              INC[MPC] ;;      \ DHI has count
  6    2 ::  SOURCE=DS   DEST=DLO  DEC[DP]   ALU=B    JMP=000 ;;
  7                  \ DS has high half , DLO has low half
  8
  9
 10
 11
 12
 13
 14
 15

SCR #124
  0 \  MICROCODE --- DLSLN -- 2
  1 DECIMAL
  2 129 CURRENT-PAGE !
  3    0 ::  SOURCE=ALU  ALU=B  DEST=RS    JMP=015 ;;  \ Stash count
  4
  5 ( SHIFT) 2 ::  SOURCE=DS  ALU=A  DEST=DHI  JMP=110 ;;
  6    6 ::  SC=0  SL[DHI]  SL[DLO]  ;;
  7    7 ::  SOURCE=ALU  ALU=B  DEST=DS  JMP=001 ;;
  8    1 ::  SOURCE=RS   ALU=A-1 DEST=DHI   JMP=000 ;;
  9
 10 ( DONE ) 3 ::  SOURCE=DS   ALU=A   DEST=DHI
 11                            INC[DP] INC[RP]   DECODE   ;;
 12    4 :: SOURCE=DLO   DEST=DS                  END ;;
 13
 14 ;;END
 15

SCR #125
  0 \  MICROCODE --- DLSR(3)
  1 DECIMAL
  2 130 OPCODE: DLSR  ( D1 -> D2 )
  3    0 ::  SOURCE=DS   DEST=DLO      ;;
  4    1 ::  SC=0 SR[DHI] SR[DLO]  DECODE ;;
  5    2 ::  SOURCE=DLO  DEST=DS   END ;;
  6
  7 ;;END
  8
  9
 10
 11
 12
 13
 14
 15

SCR #126
  0 \  MICROCODE --- DLSRN(6+5*COUNT)
  1 DECIMAL
  2 131 OPCODE: DLSRN    ( D1 COUNT -> D2 )
  3    0 ::  SOURCE=ALU   ALU=B  DEST=DLO   DEC[RP]   INC[DP] ;;
  4    1 ::  SOURCE=DLO   ALU=A-1  DEST=DHI
  5                              INC[MPC] ;;    \ DHI has count
  6    2 ::  SOURCE=DS  DEST=DLO  DEC[DP]   ALU=B    JMP=000 ;;
  7                  \ DS has high half , DLO has low half
  8
  9
 10
```

```
         11
         12
         13
         14
         15

SCR #127
   0 \  MICROCODE --- DLSRN -- 2
   1 DECIMAL
   2 132 CURRENT-PAGE !
   3    0 ::  SOURCE=ALU  ALU=B  DEST=RS    JMP=015  ;;   \ Stash count
   4
   5 ( SHIFT) 2 ::  SOURCE=DS   ALU=A  DEST=DHI  JMP=110 ;;
   6    6 ::  SC=0  SR[DHI]  SR[DLO]  ;;
   7    7 ::  SOURCE=ALU  ALU=B  DEST=DS  JMP=001 ;;
   8    1 ::  SOURCE=RS   ALU=A-1 DEST=DHI  JMP=000 ;;
   9
  10 ( DONE ) 3 :: SOURCE=DS   ALU=A  DEST=DHI
  11                                             INC[DP] INC[RP]   DECODE ;;
  12    4 :: SOURCE=DLO  DEST=DS                        END ;;
  13
  14 ;;END
  15

SCR #128
   0 \  MICROCODE --- DR>(4)
   1 DECIMAL
   2 133 OPCODE: DR>     ( -> D )    ( Return: D -> )
   3    0 ::  DEC[DP] ;;
   4    1 ::  SOURCE=ALU  ALU=B  DEST=DS   DEC[DP] ;;
   5    2 ::  SOURCE=RS   DEST=DS   INC[RP]   DECODE ;;
   6    3 ::  SOURCE=RS   ALU=A  DEST=DHI    INC[RP]  END ;;
   7
   8 ;;END
   9
  10
  11
  12
  13
  14
  15

SCR #129
   0 \  MICROCODE --- DROT(12)
   1 DECIMAL
   2 134 OPCODE: DROT  ( D1 D2 D3 -> D2 D3 D1 )
   3    0 ::  DEC[RP] ;;
   4    1 ::  SOURCE=ALU  ALU=B  DEST=RS   DEC[RP] ;;
   5    2 ::  SOURCE=DS   DEST=RS           INC[DP]  DEC[RP] ;;
   6    3 ::  SOURCE=DS   DEST=RS           INC[DP]  DEC[RP] ;;
   7    4 ::  SOURCE=DS   DEST=RS           INC[DP]           ;;
   8    5 ::  SOURCE=DS   ALU=A  DEST=DHI  INC[DP] ;;
   9    6 ::  SOURCE=DS   DEST=DLO                          INC[MPC] ;;
  10    7 ::  SOURCE=RS   DEST=DS   DEC[DP]  INC[RP]   JMP=000 ;;
  11
  12
  13
  14
  15
```

```
SCR #130
  0 \  MICROCODE --- DROT -- 2
  1 DECIMAL
  2 135 CURRENT-PAGE !
  3    0 ::  SOURCE=RS   DEST=DS   DEC[DP]   INC[RP] ;;
  4    1 ::  SOURCE=RS   DEST=DS   DEC[DP]   INC[RP] ;;
  5    2 ::  SOURCE=RS   DEST=DS   DEC[DP]   INC[RP] DECODE ;;
  6    3 ::  SOURCE=DLO  DEST=DS             END ;;
  7
  8 ;;END
  9
 10
 11
 12
 13
 14
 15

SCR #131
  0 \  MICROCODE --- LSLN(6+2*COUNT)
  1 DECIMAL
  2 136 OPCODE: LSLN    ( N1 COUNT -> N2 )
  3    0 ::  SOURCE=DS   DEST=DLO  ;;
  4    1 ::  SOURCE=ALU  ALU=B    DEST=DS ;;
  5    2 ::  SOURCE=DS   ALU=A-1  DEST=DHI ;;
  6
  7    3 ::  SOURCE=ALU  ALU=B    DEST=DS    JMP=10S ;;
  8
  9 ( NOT DONE )
 10    4 :: SC=0  SOURCE=DS  ALU=A-1  DEST=DHI  SL[DLO]  JMP=011 ;;
 11
 12 ( DONE )  5 :: SOURCE=DLO  ALU=A  DEST=DHI  INC[DP]  DECODE ;;
 13    6 ::   END ;;
 14 ;;END
 15

SCR #132
  0 \  MICROCODE --- LSRN(6+3*COUNT)
  1 DECIMAL
  2 137 OPCODE: LSRN    ( N1 COUNT -> N2 )
  3    0 ::  SOURCE=DS   DEST=DLO  ;;
  4    1 ::  SOURCE=ALU  ALU=B    DEST=DS ;;
  5    2 ::  SOURCE=DS   ALU=A-1  DEST=DHI ;;
  6
  7    3 ::  SOURCE=ALU  ALU=B    DEST=DS    JMP=10S ;;
  8
  9 ( NOT DONE )  4 :: ALU=0  DEST=DHI  JMP=111 ;;
 10    7 ::  SOURCE=DS  ALU=A-1  DEST=DHI  SR[DLO]  JMP=011 ;;
 11
 12 ( DONE )  5 :: SOURCE=DLO  ALU=A  DEST=DHI  INC[DP]  DECODE ;;
 13    6 ::   END ;;
 14 ;;END
 15

SCR #133
  0 \  MICROCODE --- Q+(18)     -- 1
  1 DECIMAL
  2 138 OPCODE: Q+  ( q1 q2 -> q3 )
  3    0 ::  DEC[RP] ;;
  4    1 ::  SOURCE=ALU  ALU=B  DEST=RS    DEC[RP] ;;
```

```
 5      2 ::  SOURCE=DS   DEST=RS    INC[DP]     DEC[RP] ;;
 6      3 ::  SOURCE=DS   DEST=RS    INC[DP]     ;;
 7      4 ::  SOURCE=DS   ALU=A      DEST=DHI    INC[DP] ;;
 8      5 ::  INC[DP] ;;
 9      6 ::  INC[DP]     INC[MPC] ;;
10      7 ::  INC[DP]     JMP=000 ;;
11
12
13
14
15

SCR #134
 0 \  MICROCODE --- Q+        -- 2
 1 DECIMAL
 2 139 CURRENT-PAGE !
 3      0 ::  SOURCE=DS   ALU=A+B    DEST=DHI    ;;
 4      1 ::  SOURCE=ALU  ALU=B      DEST=DS     DEC[DP]  JMP=01CA ;;
 5
 6 ( CY=1 )  2 ::  SOURCE=RS  ALU=A     DEST=DHI  INC[RP]  JMP=111 ;;
 7           7 ::  SOURCE=DS  ALU=A+B+1 DEST=DHI  JMP=101  INC[MPC] ;;
 8
 9 ( CY=0 )  3 ::  SOURCE=RS  ALU=A     DEST=DHI  INC[RP]           ;;
10           4 ::  SOURCE=DS  ALU=A+B   DEST=DHI            INC[MPC] ;;
11
12      5 ::  SOURCE=ALU  ALU=B   DEST=DS     DEC[DP]
13                                             JMP=00CA ;;
14
15

SCR #135
 0 \  MICROCODE --- Q+        -- 3
 1 DECIMAL
 2 140 CURRENT-PAGE !
 3 ( CY=1 )  0 ::  SOURCE=RS  ALU=A     DEST=DHI  INC[RP]  JMP=111 ;;
 4           7 ::  SOURCE=DS  ALU=A+B+1 DEST=DHI  JMP=011 ;;
 5
 6 ( CY=0 )  1 ::  SOURCE=RS  ALU=A     DEST=DHI  INC[RP]           ;;
 7           2 ::  SOURCE=DS  ALU=A+B   DEST=DHI                    ;;
 8
 9      3 ::  SOURCE=ALU  ALU=B   DEST=DS     DEC[DP]
10                                   INC[MPC]  JMP=10CA ;;
11
12 ( CY=1 ) 4 ::  SOURCE=RS  ALU=A   DEST=DHI   INC[RP]
13                                   DECODE   JMP=000 ;;
14 ( CY=0 ) 5 ::  SOURCE=RS  ALU=A   DEST=DHI   INC[RP]
15                                   DECODE   JMP=001 ;;

SCR #136
 0 \  MICROCODE --- Q+        -- 4
 1 DECIMAL
 2 141 CURRENT-PAGE !
 3 ( CY=1 )  0 ::  SOURCE=DS  ALU=A+B+1 DEST=DHI  INC[DP]  END ;;
 4
 5 ( CY=0 )  1 ::  SOURCE=DS  ALU=A+B   DEST=DHI  INC[DP]  END ;;
 6
 7 ;;END
 8
 9
10
```

```
 11
 12
 13
 14
 15

SCR #137
  0 \  MICROCODE --- QLSL(9)
  1 DECIMAL
  2 142 OPCODE: QLSL    ( Q1 -> Q2 )
  3    0 ::    INC[DP] ;;
  4    1 ::    SOURCE=ALU   ALU=B   DEST=DLO    INC[DP] ;;
  5    2 ::    SOURCE=DS    ALU=A+A    DEST=DHI    ;;
  6    3 ::   -SOURCE=ALU   ALU=B   DEST=DS    DEC[DP]  JMP=10CA ;;
  7
  8 ( CYOUT=1 )
  9    4 ::    SOURCE=DS    ALU=A+A+1 DEST=DHI INC[MPC] JMP=110   ;;
 10 ( CYOUT =0 )
 11    5 ::    SOURCE=DS    ALU=A+A    DEST=DHI    INC[MPC]  ;;
 12    6 ::    SOURCE=ALU   ALU=B   DEST=DS   DEC[DP]  JMP=00CA ;;
 13
 14
 15

SCR #138
  0 \  MICROCODE --- QLSL     - 2
  1 DECIMAL
  2 143 CURRENT-PAGE !
  3 ( CYOUT = 1 )
  4    0 ::   SOURCE=DS    ALU=A+A+1   DEST=DHI   JMP=010 ;;
  5 ( CYOUT = 0 )
  6    1 ::   SOURCE=DS    ALU=A+A     DEST=DHI    ;;
  7    2 ::   SOURCE=ALU   ALU=B   DEST=DS   JMP=10CA   DECODE   ;;
  8
  9 ( CYOUT=1 )
 10    4 ::   SOURCE=DLO   ALU=A+A+1 DEST=DHI    END  ;;
 11 ( CYOUT =0 )
 12    5 ::   SOURCE=DLO   ALU=A+A     DEST=DHI    END ;;
 13 ;;END
 14
 15

SCR #139
  0 \  MICROCODE --- TDUP(6)
  1 DECIMAL
  2 144 OPCODE: TDUP    ( T1 -> T1 T1 )
  3    0 ::  INC[DP]  DEC[RP] ;;
  4    1 ::  SOURCE=DS   DEST=DLO    DEC[DP] ;;
  5    2 ::  SOURCE=DS   DEST=RS     DEC[DP] ;;
  6    3 ::  SOURCE=ALU  ALU=B  DEST=DS    DEC[DP] ;;
  7    4 ::  SOURCE=DLO  DEST=DS   DEC[DP]  DECODE ;;
  8    5 ::  SOURCE=RS   DEST=DS   INC[RP]  END ;;
  9
 10 ;;END
 11
 12
 13
 14
 15
```

```
SCR #140
   0
   1
   2
   3
   4
   5
   6
   7
   8
   9
  10
  11
  12
  13
  14
  15

SCR #141
   0 \  MICROCODE --- SWAP-DROP(2)     ( A.K.A. NIP )
   1 DECIMAL   ( Combination of SWAP and DROP )
   2 145 OPCODE: SWAP-DROP   ( N1 N2 -> N2 )
   3    0 ::   INC[DP]     DECODE ;;
   4    1 ::               END ;;
   5
   6 ;;END
   7
   8
   9
  10
  11
  12
  13
  14
  15

SCR #142
   0 \  MICROCODE --- DROP;(3)
   1 DECIMAL      ( Combination of DROP and ; )
   2 146 OPCODE: DROP;      ( N -> )    ( return:  ADDR -> )
   3    0 ::   SOURCE=RS ALU=A+1 DEST=PC INC[RP] ;; \ PC <- POP[RS]
   4    1 ::   SOURCE=DS ALU=A   DEST=DHI  INC[DP]  DECODE ;;
   5    2 ::                                        END ;;
   6 ;;END
   7
   8
   9
  10
  11
  12
  13
  14
  15

SCR #143
   0 \  MICROCODE --- DROP-DUP(2)
   1 DECIMAL   ( Combination of DROP and DUP )
   2 147 OPCODE: DROP-DUP   ( N1 N2 -> N1 N1 )
   3    0 ::   SOURCE=DS ALU=A DEST=DHI  DECODE ;;
   4    1 ::                             END ;;
```

```
    5
    6 ;;END
    7
    8
    9
   10
   11
   12
   13
   14
   15

SCR #144
   0 \   MICROCODE --- SWAP-(3)
   1 DECIMAL    ( Combination of SWAP and - )
   2 148 OPCODE: SWAP-    ( N1 N2 -> NDIFF )
   3    0 ::   SOURCE=ALU ALU=B   DEST=DLO   ;;
   4    1 ::   SOURCE=DS  ALU=A   DEST=DHI    INC[DP]    DECODE ;;
   5    2 ::   SOURCE=DLO ALU=A-B DEST=DHI               END ;;
   6
   7 ;;END
   8
   9
  10
  11
  12
  13
  14
  15

SCR #145
   0 \   MICROCODE --- OVER+(2)
   1 DECIMAL    ( Combination of OVER and + )
   2 149 OPCODE: OVER+    ( N1 N2 -> N1 N1+N2 )
   3    0 ::   SOURCE=DS  ALU=A+B DEST=DHI    DECODE ;;
   4    1 ::                                  END ;;
   5
   6 ;;END
   7
   8
   9
  10
  11
  12
  13
  14
  15

SCR #146
   0 \   MICROCODE --- OVER-(3)
   1 DECIMAL    ( Combination of SWAP and - )
   2 150 OPCODE: OVER-    ( N1 N2 -> N1 NDIFF )
   3    0 ::   SOURCE=ALU ALU=B   DEST=DLO   ;;
   4    1 ::   SOURCE=DS  ALU=A   DEST=DHI               DECODE ;;
   5    2 ::   SOURCE=DLO ALU=A-B DEST=DHI               END ;;
   6
   7 ;;END
   8
   9
  10
```

```
 11
 12
 13
 14
 15

SCR #147
  0 \  MICROCODE --- R>-DROP(2)
  1 DECIMAL     ( Combination of R> and DROP )
  2 151 OPCODE: R>-DROP   ( -> )
  3    0 ::  INC[RP]    DECODE ;;
  4    1 ::             END ;;
  5
  6 ;;END
  7
  8
  9
 10
 11
 12
 13
 14
 15

SCR #148
  0 \  MICROCODE --- R>-SWAP->R(3)
  1 DECIMAL     ( Exchange top elements on return and data stack. )
  2 152 OPCODE: R>-SWAP->R   ( N1 -> N2 )
  3    0 ::  SOURCE=RS    DEST=DLO     ;;
  4    1 ::  SOURCE=ALU   ALU=B   DEST=RS    DECODE ;;
  5    2 ::  SOURCE=DLO   ALU=A   DEST=DHI   END ;;
  6
  7 ;;END
  8
  9
 10
 11
 12
 13
 14
 15

SCR #149
  0 \  MICROCODE --- I+(2)
  1 DECIMAL     ( Combination or I and + )
  2 153 OPCODE: I+   ( N1 -> N2 )
  3    0 ::  SOURCE=RS    ALU=A+B   DEST=DHI    DECODE ;;
  4    1 ::                                     END ;;
  5
  6 ;;END
  7
  8
  9
 10
 11
 12
 13
 14
 15
```

```
SCR #150
 0 \   MICROCODE --- @+(6)
 1 DECIMAL   ( Combination of @ and + )
 2 154 OPCODE: @+     ( N1 ADDR -> N2 )
 3    0 ::    SOURCE=ALU    ALU=B    DEST=PC    ;;        \ PC<-ADDR
 4    1 ::                  ;;
 5    2 ::    SOURCE=RAM             DEST=DLO   ;;        \ DLO<-RAM
 6    3 ::    SOURCE=PCSAVE ALU=A+1  DEST=PC    ;;        \ Restore PC
 7    4 ::    SOURCE=DLO    ALU=A    DEST=DHI   DECODE    ;;
 8    5 ::    SOURCE=DS     ALU=A+B  DEST=DHI   INC[DP]   END     ;;
 9
10 ;;END
11
12
13
14
15

SCR #151
 0 \   MICROCODE --- @-(6)
 1 DECIMAL   ( Combination of @ and - )
 2 155 OPCODE: @-     ( N1 ADDR -> N2 )
 3    0 ::    SOURCE=ALU    ALU=B    DEST=PC    ;;        \ PC<-ADDR
 4    1 ::                  ;;
 5    2 ::    SOURCE=RAM             DEST=DLO   ;;        \ DLO<-RAM
 6    3 ::    SOURCE=PCSAVE ALU=A+1  DEST=PC    ;;        \ Restore PC
 7    4 ::    SOURCE=DLO    ALU=A    DEST=DHI   DECODE    ;;
 8    5 ::    SOURCE=DS     ALU=A-B  DEST=DHI   INC[DP]   END     ;;
 9
10 ;;END
11
12
13
14
15

SCR #152
 0 \   MICROCODE --- INC@(6)   -- Incrementing fetch
 1 DECIMAL   ( Combination of DUP @  SWAP 1+ )
 2 156 OPCODE: INC@ ( ADDR -> N1 ADDR+1 )
 3    0 ::    SOURCE=ALU    ALU=B    DEST=PC    ;;        \ PC<-ADDR
 4    1 ::    SOURCE=ALU    ALU=B    DEST=DLO   DEC[DP]   ;;
 5    2 ::    SOURCE=RAM             DEST=DS    ;;        \ DLO<-RAM
 6    3 ::    SOURCE=PCSAVE ALU=A+1  DEST=PC    ;;        \ Restore PC
 7    4 ::    SOURCE=DLO    ALU=A+1  DEST=DHI   DECODE    ;;
 8    5 ::                                      END       ;;
 9
10 ;;END
11
12
13
14
15

SCR #153
 0 \   MICROCODE --- DEC!(7)    -- Decrementing store
 1 DECIMAL         ( Combination of 1-  SWAP OVER ! )
 2 157 OPCODE: DEC!     ( N ADDR -> ADDR-1 )
 3    0 ::  SOURCE=ALU    ALU=B    DEST=DLO   ;;
 4    1 ::  SOURCE=DLO    ALU=A-1  DEST=PC    ;;          \ PC<-ADDR
```

```
  5     2 ::   SOURCE=DLO    ALU=A-1    DEST=DHI    ;;       \  PC<-ADDR
  6     3 ::   SOURCE=DS     DEST=RAM   INC[DP]  ;;    \  RAM<-N
  7     4 ::   SOURCE=PCSAVE ALU=A+1    DEST=PC   ;;       \  Restore PC
  8     5 ::   DECODE ;;
  9     6 ::   END  ;;
 10
 11  ;;END
 12
 13
 14
 15

SCR #154
  0  \  MICROCODE --- [@](8)     Indirect fetch
  1  DECIMAL      ( Combination of  @ @ )
  2  158 OPCODE: [@]   ( ADDR -> N )
  3     0 ::   SOURCE=ALU    ALU=B      DEST=PC   ;;       \  PC<-ADDR
  4     1 ::   ;;
  5     2 ::   SOURCE=RAM    ALU=A      DEST=PC   ;;       \  PC<-ADDR
  6     3 ::   ;;
  7     4 ::   SOURCE=RAM               DEST=DLO  ;;       \  DLO<-RAM
  8     5 ::   SOURCE=PCSAVE ALU=A+1    DEST=PC   ;;       \  Restore PC
  9     6 ::   SOURCE=DLO    ALU=A      DEST=DHI    DECODE  ;;
 10     7 ::   END  ;;                               \ Wait for DECODE
 11
 12  ;;END
 13
 14
 15

SCR #155
  0  \  MICROCODE --- [!](8)     Indirect store
  1  DECIMAL   ( Combination of  @ ! )
  2  159 OPCODE: [!]   ( N ADDR -> )
  3     0 ::   SOURCE=ALU    ALU=B      DEST=PC   ;;       \  PC<-ADDR
  4     1 ::   ;;
  5     2 ::   SOURCE=RAM    ALU=A      DEST=PC   ;;       \  PC<-ADDR
  6     3 ::   ;;
  7     4 ::   SOURCE=DS     DEST=RAM   INC[DP]  ;;    \  RAM<-N
  8     5 ::   SOURCE=PCSAVE ALU=A+1    DEST=PC   ;;       \  Restore PC
  9     6 ::   SOURCE=DS     ALU=A      DEST=DHI    INC[DP]
 10           DECODE  ;;                            \ Update Top of Stack
 11     7 ::   END  ;;
 12
 13  ;;END
 14
 15

SCR #156
  0  \  MICROCODE --- INC[@](10)  -- Incrementing indirect fetch
  1  DECIMAL    ( Combination of DUP @ @  1 ROT +! )
  2  \ This word will greatly speed up software stacks
  3  160 OPCODE: INC[@] ( ADDR -> N1 )
  4     0 ::   SOURCE=ALU    ALU=B      DEST=PC   ;;       \  PC<-ADDR
  5     1 ::   SOURCE=ALU    ALU=-1     DEST=DLO  ;;
  6     2 ::   SOURCE=RAM    ALU=A+1    DEST=DHI  ;;
  7     3 ::   SOURCE=ALU    ALU=B      DEST=RAM  ;;       \  PC<-ADDR
```

```
 8    4 ::    SOURCE=DLO   ALU=A+B   DEST=PC    INC[MPC] ;;
 9    5 ::    JMP=000 ;;
10
11
12
13
14
15
```

```
SCR #157
 0 \ MICROCODE --- INC[@]  -- 2
 1 DECIMAL
 2 161 CURRENT-PAGE !
 3    0 ::    SOURCE=RAM              DEST=DLO   ;;
 4    1 ::    SOURCE=PCSAVE  ALU=A+1  DEST=PC    ;;        \ Restore PC
 5    2 ::    SOURCE=DLO     ALU=A    DEST=DHI   DECODE ;;
 6    3 ::                                       END ;;
 7
 8 ;;END
 9
10
11
12
13
14
15
```

```
SCR #158
 0 \ MICROCODE --- DEC[!](10)  -- Decrementing indirect store
 1 DECIMAL  ( Combination of -1 OVER +! @ ! )
 2 \ This word will greatly speed up software stacks
 3 162 OPCODE: DEC[!] ( N1 ADDR -> )
 4    0 ::    SOURCE=ALU   ALU=B    DEST=PC    ;;        \ PC<-ADDR
 5    1 ::    ;;
 6    2 ::    SOURCE=RAM   ALU=A-1  DEST=DHI   ;;
 7    3 ::    SOURCE=ALU   ALU=B    DEST=RAM   ;;        \ PC<-ADDR
 8    4 ::    SOURCE=ALU   ALU=B    DEST=PC    INC[MPC] ;;
 9    5 ::    JMP=000 ;;
10
11
12
13
14
15
```

```
SCR #159
 0 \ MICROCODE --- DEC[!]  -- 2
 1 DECIMAL
 2 163 CURRENT-PAGE !
 3    0 ::    SOURCE=DS              DEST=RAM   INC[DP] ;;
 4    1 ::    SOURCE=PCSAVE  ALU=A+1 DEST=PC    ;;       \ Restore PC
 5    2 ::    SOURCE=DS      ALU=A   DEST=DHI   INC[DP]  DECODE ;;
 6    3 ::                                      END ;;
 7
 8 ;;END
 9
10
11
12
13
14
15
```

```
SCR #160
  0 \ MICROCODE --- I-!-DDUP(6)   -- SPEEDS UP SIEVE BENCHMARK
  1 DECIMAL
  2 250 OPCODE: I-!-DDUP    ( N1 N2 N3 -> N1 N2 N1 N2 )
  3   0 ::   SOURCE=RS     ALU=A   DEST=PC   INC[DP] ;;     \ PC<-ADDR
  4   1 ::   SOURCE=DS     DEST=DLO          DEC[DP] ;;
  5   2 ::   SOURCE=ALU    ALU=B DEST=RAM            ;;     \ RAM<-N3
  6   3 ::   SOURCE=PCSAVE ALU=A+1 DEST=PC   ;;              \ Restore PC
  7   4 ::   SOURCE=DS     ALU=A   DEST=DHI  DEC[DP] DECODE ;;
  8   5 ::   SOURCE=DLO    DEST=DS  END ;;
  9
 10 ;;END
 11
 12
 13
 14
 15

SCR #161
  0 \ MICROCODE --- DDROP.DROP.1+ -- SPEEDS UP SIEVE BENCHMARK
  1 DECIMAL      ( Combination of DDROP DROP 1+ )
  2 251 OPCODE: DDROP.DROP.1+
  3   0 ::  INC[DP] ;;
  4   1 ::  INC[DP]                                   DECODE ;;
  5   2 ::  SOURCE=DS  ALU=A+1  DEST=DHI INC[DP]      END ;;
  6
  7 ;;END
  8
  9
 10
 11
 12
 13
 14
 15

SCR #162
  0 \ MICROCODE --- I+.@     --- SPEEDS UP SIEVE BENCHMARK
  1 DECIMAL
  2 252 OPCODE: I+.@
  3   0 ::  SOURCE=RS     ALU=A+B  DEST=PC   ;;      \ PC<-ADDR
  4   1 ::                         ;;
  5   2 ::  SOURCE=RAM             DEST=DLO  ;;      \ DLO<-RAM
  6   3 ::  SOURCE=PCSAVE  ALU=A+1 DEST=PC   ;;      \ Restore PC
  7   4 ::  SOURCE=DLO     ALU=A   DEST=DHI  DECODE ;;
  8   5 ::  END ;;                                   \ Wait for DECODE
  9
 10 ;;END
 11
 12
 13
 14
 15

SCR #163
  0 \ MICROCODE --- O.I.2*.3.+.1   --- SPEEDS UP SIEVE BENCHMARK
  1 DECIMAL
  2 253 OPCODE: O.I.2*.3.+.1
  3   0 ::  SOURCE=ALU  ALU=0  DEST=DLO   DEC[DP] ;;
  4   1 ::  SOURCE=ALU  ALU=B  DEST=DS    DEC[DP] ;;
```

```
 5     2 ::   SOURCE=ALU   ALU=0    DEST=DS      DEC[DP] ;;
 6     3 ::   SOURCE=RS    ALU=A+A+1  DEST=DHI ;;
 7     4 ::   SOURCE=DLO   ALU=A+B+1  DEST=DHI ;;
 8     5 ::   SOURCE=DLO   ALU=A+B+1  DEST=DHI ;;
 9     6 ::   SOURCE=ALU   ALU=B    DEST=DS      DECODE ;;
10     7 ::   SOURCE=DLO   ALU=A+1  DEST=DHI     END ;;
11
12 ;;END
13
14
15

SCR #164
 0
 1
 2
 3
 4
 5
 6
 7
 8
 9
10
11
12
13
14
15

SCR #165
 0 \ MVP-FORTH SOURCE --  EXIT & DOUSE
 1 HEX    CROSS-COMPILER
 2 : EXIT  R> R> DDROP ;
 3
 4
 5 VARIABLE UP    7 ( UP ! )
 6
 7 : DOUSE    ( -> ADDR )
 8     R> 1+  @  UP  @  + ;
 9
10 B' DOUSE @  DOUSE-ADDR !
11
12 DECIMAL
13
14
15

SCR #166
 0 \ MVP-FORTH SOURCE --  USER VARIABLES 0 - 07
 1 HEX    CROSS-COMPILER
 2
 3 ( 0 USER )
 4 ( 1 USER )
 5 ( 2 USER )
 6   3 USER SP0              OFF       ( SP0 ! )
 7   4 USER R0               OFF       ( R0 ! )
 8  05 USER TIB              MEM-SIZE 480 -   ( TIB ! )
 9  06 USER WIDTH            1F        ( WIDTH ! )
```

```
 10 07 USER WARNING          1       ( WARNING ! )
 11
 12 DECIMAL
 13
 14
 15

SCR #167
  0 \  MVP-FORTH SOURCE --   USER VARIABLES 08 - 0F
  1 HEX    CROSS-COMPILER
  2
  3 08 USER   FENCE
  4 09 USER   DP
  5 0A USER   VOC-LINK
  6 0B USER   '-FIND
  7 0C USER   '?TERMINAL
  8 0D USER   'ABORT
  9 0E USER   'BLOCK
 10 0F USER   'CR
 11
 12 DECIMAL
 13
 14
 15

SCR #168
  0 \  MVP-FORTH SOURCE --   USER VARIABLES 10 - 17
  1 HEX    CROSS-COMPILER
  2
  3 10 USER  'EMIT
  4 11 USER  'EXPECT
  5 12 USER  'INTERPRET
  6 13 USER  'KEY
  7 14 USER  'LOAD
  8 15 USER  'NUMBER
  9 16 USER  'PAGE
 10 17 USER  'R/W
 11
 12 DECIMAL
 13
 14
 15

SCR #169
  0 \  MVP-FORTH SOURCE --   USER VARIABLES 18 - 1F
  1 HEX    CROSS-COMPILER
  2
  3 18 USER  'T&SCALC
  4 19 USER  'VOCABULARY
  5 1A USER  'WORD
  6 1B USER  >IN           0  ( >IN ! )
  7 1C USER  BASE          0A ( BASE ! )
  8 1D USER  BLK           0  ( BLK ! )
  9 1E USER  CONTEXT
 10 1F USER  CSP
 11
 12 DECIMAL
 13
 14
 15
```

```
SCR #170
   0 \ MVP-FORTH SOURCE --   USER VARIABLES 20 - 27
   1 HEX    CROSS-COMPILER
   2
   3 20 USER CURRENT
   4 21 USER DPL
   5 22 USER FLD
   6 23 USER HLD
   7 24 USER OFFSET
   8 25 USER OUT            0 ( OUT ! )
   9 26 USER R#
  10 27 USER SCR .
  11
  12 DECIMAL
  13
  14
  15

SCR #171
   0 \ MVP-FORTH SOURCE --   USER VARIABLES 28 - 2F
   1 HEX    CROSS-COMPILER
   2
   3 28 USER STATE          0 ( STATE ! )
   4
   5
   6
   7
   8
   9
  10
  11
  12 DECIMAL
  13
  14
  15

SCR #172
   0 \ MVP-FORTH SOURCE --   SP@   SP!    RP@   RP!     DEPTH
   1 HEX    CROSS-COMPILER
   2 : SP@    ( -> N )
   3    %DP@%   OFF  AND  ;
   4
   5 : SP!    ( -> )
   6    OFF   %DP!%  ;
   7
   8 : RP@    ( -> N )
   9    %RP@%  OFF  AND  ;
  10
  11 : RP!    ( -> )
  12    R>  OFF  %RP!%  >R  ;
  13
  14 : DEPTH  ( -> N )
  15    OFE  SP@ -  ;           DECIMAL

SCR #173
   0 \ MVP-FORTH SOURCE --   >   O>     D<   U<
   1 HEX    CROSS-COMPILER
   2 : >      ( A B -> FLAG )
   3    SWAP  <  ;
   4
```

```
  5 : O>      ( N -> FLAG )
  6     O > ;
  7
  8 : D<      ( D1 D2 -> FLAG )
  9     ROT  DDUP =
 10     IF   ROT ROT  DNEGATE  D+   O<
 11     ELSE    SWAP <  SWAP DROP
 12     THEN    SWAP DROP   ;
 13 : U<      ( U1 U2 -> FLAG )
 14     O SWAP  O D<   ;
 15 DECIMAL

SCR #174
  0 \ MVP-FORTH SOURCE --   1  2   BL     2+ 2-      EPRINT
  1 HEX    CROSS-COMPILER
  2 1 CONSTANT 1
  3 2 CONSTANT 2
  4 20 CONSTANT BL
  5
  6 : 2+     ( N1 -> N2 )
  7     1+  1+ ;
  8
  9 : 2-     ( N1 -> N2 )
 10     1-  1- ;
 11
 12 VARIABLE EPRINT     O ( EPRINT ! )
 13
 14 DECIMAL
 15

SCR #175
  0 \ MVP-FORTH SOURCE --   EXECUTE   <EMIT> <CR> <PAGE>
  1 HEX    CROSS-COMPILER
  2 : EXECUTE   ( ADDR -> )
  3       1-  >R   ;
  4
  5 : <EMIT>   ( CHAR -> )
  6     EPRINT @   1 SYSCALL   DDROP  1 OUT +!  ;
  7
  8 : <CR>     ( -> )
  9     EPRINT @  2 SYSCALL   DROP   O OUT !  ;
 10
 11 : <PAGE>   ( -> )
 12     3 SYSCALL  ;
 13 DECIMAL
 14
 15

SCR #176
  0 \ MVP-FORTH SOURCE --    <KEY>    <?TERMINAL>
  1 HEX   CROSS-COMPILER
  2 : <KEY>   ( -> CHAR )
  3     O  4 SYSCALL  ;
  4
  5 : <?TERMINAL>    ( -> FLAG )
  6     O  5 SYSCALL  ;
  7
  8
  9
```

```
10
11
12
13
14
15

SCR #177
  0 \  MVP-FORTH SOURCE --   DECIMAL   HEX
  1 HEX    CROSS-COMPILER
  2 : DECIMAL     OA  BASE !  ;
  3
  4 : HEX         10  BASE !  ;
  5
  6
  7 DECIMAL
  8
  9
 10
 11
 12
 13
 14
 15

SCR #178
  0 \  MVP-FORTH SOURCE --   +-   D+-   DABS
  1 HEX    CROSS-COMPILER
  2 : +-    ( N1 N2 -> N3 )
  3    O<   IF   NEGATE    THEN  ;
  4
  5 : D+-   ( D1 N2 -> D3 )
  6    O<   IF   DNEGATE   THEN  ;
  7
  8 : DABS  ( D1 -> D2 )
  9    DUP  D+-  ;
 10
 11 : MIN   ( N1 N2 -> N3 )
 12    DDUP >    IF   SWAP    THEN    DROP  ;
 13 : MAX   ( N1 N2 -> N3 )
 14    DDUP <    IF   SWAP    THEN    DROP  ;
 15 DECIMAL

SCR #179
  0 \  MVP-FORTH SOURCE --   M+  M*   M/
  1 HEX    CROSS-COMPILER
  2 : M+   ( D1  N2  -> D3 )
  3    S->D   D+  ;
  4
  5 : M*   ( N1 N2 -> D3 )
  6    DDUP XOR    >R    ABS   SWAP  ABS
  7    U*   R>   D+-  ;
  8
  9 : M/   ( D1 N2 -> N3 N4 )
 10    OVER  >R >R   DUP D+-    R@  ABS  U/MOD
 11    R>  R@  XOR  +-  SWAP  R>  +-  SWAP  ;
 12
 13 DECIMAL
 14
 15
```

```
SCR #180
   0 \  MVP-FORTH SOURCE --  M*/
   1 HEX    CROSS-COMPILER
   2 : M*/    ( D1   N1  N2 -> D2  )
   3     DDUP   XOR   SWAP   ABS   >R   SWAP
   4     ABS   >R   OVER XOR    -ROT   DABS
   5     SWAP R@   U*   ROT    R>   U*   ROT    0 D+
   6     R@   U/MOD     -ROT      R>   U/MOD
   7     SWAP  DROP    SWAP   ROT   D+-   ;
   8
   9
  10
  11                      \
  12
  13 DECIMAL
  14
  15

SCR #181
   0 \  MVP-FORTH SOURCE --  *    /MOD   /   MOD
   1 HEX    CROSS-COMPILER
   2 : *     ( N1 N2 -> N3 )
   3    U*   DROP  ;
   4
   5 : /MOD    ( N1 N2 -> NREM NQUOT )
   6    >R   S->D   R>   M/  ;
   7
   8 : /    ( N1 N2 -> N3 )
   9    /MOD    SWAP DROP  ;
  10
  11 : MOD    ( N1 N2 -> N3 )
  12    /MOD    DROP  ;
  13
  14 DECIMAL
  15

SCR #182
   0 \  MVP-FORTH SOURCE --   */MOD   */   M/MOD
   1 HEX    CROSS-COMPILER
   2 : */MOD    ( N1 N2 N3 -> NREM NQUOT )
   3    >R   M*   R>   M/  ;
   4
   5 : */    ( N1 N2 N3 -> N4 )
   6    */MOD   SWAP  DROP  ;
   7
   8 : M/MOD    ( UD1 U2 -> U3 UD4 )
   9    >R 0  R@   U/MOD    R>   SWAP   >R
  10    U/MOD  R>  ;
  11
  12
  13
  14 DECIMAL
  15

SCR #183
   0 \  MVP-FORTH SOURCE --   EMIT   CR   PAGE
   1 HEX    CROSS-COMPILER
   2 B' <EMIT> @  {  'EMIT !  }
   3 : EMIT  ( CHAR -> )
   4    'EMIT @  EXECUTE  ;
```

```
 5
 6 B' <CR>    @   ( 'CR ! )
 7 : CR      ( -> )
 8     'CR @     EXECUTE  ;
 9
10 B' <PAGE>  @   ( 'PAGE ! )
11 : PAGE    ( -> )
12     'PAGE @  EXECUTE  ;
13
14 DECIMAL
15

SCR #184
 0 \  MVP-FORTH SOURCE --   ?TERMINAL  KEY
 1 HEX    CROSS-COMPILER
 2 B' <?TERMINAL> @   ( '?TERMINAL ! )
 3 : ?TERMINAL   ( -> FLAG )
 4     '?TERMINAL   @    EXECUTE ;
 5
 6 B' <KEY>   @   ( 'KEY ! )
 7 : KEY     ( -> CHAR )
 8     'KEY @     EXECUTE  ;
 9
10
11
12
13
14 DECIMAL
15

SCR #185
 0 \  MVP-FORTH SOURCE --   SPACE  COUNT  TYPE
 1 HEX    CROSS-COMPILER
 2 : SPACE   ( -> )
 3     BL  EMIT ;
 4
 5 : COUNT  ( ADDR -> ADDR+1 N )
 6     DUP  1+   SWAP @   OFF AND  ;
 7
 8 : TYPE   ( ADDR N -> )
 9     DUP 0>
10     IF   OVER + SWAP
11         DO  I @  EMIT   1 /LOOP
12     ELSE   DDROP
13     THEN  ;
14
15 DECIMAL

SCR #186
 0 \  MVP-FORTH SOURCE --   -TRAILING   SPACES
 1 HEX    CROSS-COMPILER
 2 : -TRAILING  ( ADDR N1 -> ADDR N2 )
 3     DUP  0
 4     DO   DDUP + 1- @  BL -
 5         IF  LEAVE   ELSE  1-  THEN
 6     LOOP ;
 7
 8 : SPACES    ( COUNT -> )
 9     0 MAX   ?DUP
```

```
10      IF    #DO    SPACE    #LOOP
11      THEN ;
12
13
14
15 DECIMAL

SCR #187
  0 \   MVP-FORTH SOURCE --   PAD   HERE
  1 HEX    CROSS-COMPILER
  2 : HERE      ( -> ADDR )
  3     DP @ ;
  4
  5 : PAD      ( -> ADDR )
  6     HERE  44 + ;
  7
  8
  9
 10
 11 DECIMAL
 12
 13
 14
 15

SCR #188
  0 \   MVP-FORTH SOURCE --   HOLD    <#   #>   #
  1 HEX    CROSS-COMPILER
  2 : HOLD    ( CHAR -> )
  3     -1  HLD  +!    HLD @   ! ;
  4
  5 : <#    ( D1 -> D1 )
  6     PAD  HLD  ! ;
  7
  8 : #>    ( UD -> ADDR N )
  9     DDROP   HLD @    PAD    OVER  - ;
 10
 11 : #     ( UD1 -> UD2 )
 12     BASE @    M/MOD    ROT    9 OVER <
 13     IF  7 +    THEN     30 +    HOLD ;
 14
 15 DECIMAL

SCR #189
  0 \   MVP-FORTH SOURCE --   <ABORT">
  1 HEX    CROSS-COMPILER
  2 VARIABLE <QUIT-ADDR>
  3 VARIABLE <WHERE-ADDR>
  4 : <ABORT">    ( FLAG -> )
  5 ( <<ABORT">>       ( Automatically EXIT if FLAG=0 )
  6   IF   <WHERE-ADDR> @   EXECUTE    CR
  7      R@   1+ COUNT   TYPE   SP!    <QUIT-ADDR> @   EXECUTE
  8   ELSE  R>  1+ DUP @ + >R    THEN ;
  9 B' <ABORT"> @    ABORT"-ADDR !
 10
 11 : <.">    ( -> )
 12     R@   1+   COUNT    DUP 1+   R> + >R    TYPE ;
 13 B' <."> @    ."-ADDR !
 14 DECIMAL
 15
```

```
SCR #190
  0 \ MVP-FORTH SOURCE --  SIGN   #S   D.R  D.
  1 HEX   CROSS-COMPILER
  2 : SIGN   ( N -> )
  3    0<  IF  2D HOLD   THEN  ;
  4
  5 : #S    ( UD -> 0 0 )
  6    BEGIN  #   DDUP   OR  NOT  UNTIL  ;
  7
  8 : D.R   ( D N -> )      ( NOTE: No abort on empty stack here )
  9    DEPTH 3 <   ABORT" EMPTY STACK"
 10    >R   SWAP    OVER   DUP D+-
 11    <#   #S   ROT SIGN   #>
 12    R>  OVER  - SPACES  TYPE  ;
 13 : D.    ( D -> )
 14    0 D.R  SPACE  ;
 15 DECIMAL SCR #191
  0 \ MVP-FORTH SOURCE --   .R  U.   .  .?
  1 HEX   CROSS-COMPILER
  2 : .R   ( N1 N2 -> )
  3    SWAP  S->D  ROT   D.R  ;
  4
  5 : U.   ( N1 -> )
  6    0  D. ;
  7
  8 : .    ( N1 -> )
  9    S->D  D. ;
 10
 11 : ?    ( N1 -> )
 12    @ . ;
 13
 14 DECIMAL
 15

SCR #192
  0 \ MVP-FORTH SOURCE --   ?COMP   ?CSP   ?LOADING   ?PAIRS
  1 HEX   CROSS-COMPILER
  2 : ?COMP    ( -> )
  3    STATE @ NOT   ABORT" COMPILE ONLY"  ;
  4
  5 : ?CSP   ( -> )
  6    SP@  CSP @  -
  7    ABORT" DEFINITION NOT FINISHED"  ;
  8
  9 : ?LOADING   ( -> )
 10    BLK @ NOT   ABORT" LOADING ONLY"  ;
 11
 12 : ?PAIRS   ( N1 N2 -> )
 13    -   ABORT" CONDITIONALS NOT PAIRED"  ;
 14 DECIMAL
 15

SCR #193
  0 \ MVP-FORTH SOURCE --   ?STREAM   ?STACK
  1 HEX   CROSS-COMPILER
  2 : ?STREAM   ( -> )
  3    ABORT" INPUT STREAM EXHAUSTED"  ;
  4
  5 : ?STACK   ( -> )
```

```
  6     SP@   1 <      ABORT" STACK EMPTY"
  7     SP@   3 <      ABORT" STACK FULL"   ;
  8
  9
 10
 11
 12
 13
 14 DECIMAL
 15

SCR #194
  0 \  MVP-FORTH SOURCE --   PICK   ROLL
  1 HEX    CROSS-COMPILER
  2 : PICK    ( N1 -> N2 )
  3     DUP 1 <    ABORT" PICK ARGUMENT < 1"
  4     NOP <PICK> NOP ;
  5
  6 : ROLL    ( N1 -> )
  7     DUP 1 <    ABORT" ROLL ARGUMENT < 1"
  8     NOP <ROLL> NOP ;
  9
 10
 11
 12 DECIMAL
 13
 14
 15

SCR #195
  0 \  MVP-FORTH SOURCE --   MOVE
  1 HEX    CROSS-COMPILER
  2 : MOVE    ( ADDR1  ADDR2  N -> )
  3     DUP 1 <
  4     IF  DDROP    DROP
  5     ELSE  <MOVE>    THEN  ;
  6
  7
  8 DECIMAL
  9
 10
 11
 12
 13
 14
 15

SCR #196
  0 \  MVP-FORTH SOURCE --   <<MOVE>    <MOVE
  1 HEX    CROSS-COMPILER
  2 : <<MOVE>    ( ADDR1 ADDR2 U -> )
  3     >R    SWAP    R@ + 1-    SWAP   R@ + 1-   R>
  4     <<MOVEX>   ;
  5
  6 : <MOVE    ( ADDR1   ADDR2   N -> )
  7     DUP 1 <
  8     IF  DDROP    DROP
  9     ELSE  <<MOVE>    THEN  ;
 10
 11
```

```
12 DECIMAL
13
14
15

SCR #197
 0 \ MVP-FORTH SOURCE --  DISK ACCESS CONSTANTS/VARIABLES
 1 HEX    CROSS-COMPILER
 2 MEM-SIZE  2- CONSTANT LIMIT
 3 1 CONSTANT #BUFF
 4
 5 ( LIMIT  #BUFF ) 404 *  -   CONSTANT FIRST
 6
 7 40 CONSTANT C/L
 8 VARIABLE USE     ( FIRST  USE ! )
 9 VARIABLE PREV    ( FIRST  PREV ! )
10 ( 0  OFFSET ! )
11
12 DECIMAL
13
14
15

SCR #198
 0 \ MVP-FORTH SOURCE --  <R/W>   R/W
 1 HEX    CROSS-COMPILER
 2 : <R/W>    ( ADDR BLK FLAG -> )     ( No wrap over drive limits )
 3    IF    6 SYSCALL    ( Read )
 4    ELSE  7 SYSCALL    ( Write )
 5    THEN  DDROP ;
 6
 7 B' <R/W> @  ( 'R/W ! )
 8
 9 : R/W    ( ADDR BLK FLAG -> )
10    'R/W @  EXECUTE ;
11
12 DECIMAL
13
14
15

SCR #199
 0 \ MVP-FORTH SOURCE --  +BUF   BUFFER  UPDATE
 1 HEX    CROSS-COMPILER
 2 : +BUF    ( ADDR -> ADDR2 FLAG )
 3    404  + DUP  LIMIT =
 4    IF  DROP FIRST  THEN
 5    DUP  PREV @  - ;
 6
 7 : BUFFER   ( N -> ADDR )   ( Single buffer support only!!!!! )
 8    USE @  >R    R@ @  0<
 9    IF  R@ 2+  R@ @  7FFF AND  0 R/W   THEN
10    R@ !   R@ PREV !  R> 2+ ;
11
12 : UPDATE  ( -> )
13    PREV @ @   8000 OR   PREV @ ! ;
14
15 DECIMAL
```

```
SCR #200
  0 \  MVP-FORTH SOURCE --   <BLOCK>  BLOCK
  1 HEX    CROSS-COMPILER
  2 : <BLOCK>    ( N -> ADDR )   ( Supports only one block buffer )
  3     PREV @  @  7FFF AND   OVER =
  4     IF    DROP
  5     ELSE    DUP  BUFFER    SWAP   1  R/W
  6     THEN    PREV @  2+  ;
  7
  8 B' <BLOCK> @  ( 'BLOCK ! )
  9
 10 : BLOCK    ( N -> ADDR )
 11    'BLOCK @    EXECUTE  ;
 12
 13 DECIMAL
 14
 15

SCR #201
  0 \  MVP-FORTH SOURCE --   SAVE-BUFFERS  EMPTY-BUFFERS  CLEAR
  1 HEX    CROSS-COMPILER
  2 : SAVE-BUFFERS    ( -> )
  3    #BUFF  1+  0 DO    7FFF  BUFFER    DROP  LOOP  ;
  4
  5 : EMPTY-BUFFERS    ( -> )
  6    FIRST LIMIT  OVER -   0  FILL
  7    #BUFF 0 DO    7FFF  404 I *   FIRST +   !  LOOP  ;
  8
  9 : CLEAR     ( -> )
 10    OFFSET @  +    BUFFER    400  BL FILL   UPDATE ;
 11
 12 DECIMAL
 13
 14
 15

SCR #202
  0 \  MVP-FORTH SOURCE --   DR0 .. DR3      -- UNUSED
  1 HEX    CROSS-COMPILER
  2 \ : DR0   SAVE-BUFFERS    8 SYSCALL ;
  3 \ : DR1   SAVE-BUFFERS    9 SYSCALL ;
  4 \ : DR2   SAVE-BUFFERS    0A SYSCALL ;
  5 \ : DR3   SAVE-BUFFERS    0B SYSCALL ;
  6
  7 DECIMAL
  8
  9
 10
 11
 12
 13
 14
 15

SCR #203
  0 \  MVP-FORTH SOURCE --   <LINE>  .LINE  LIST
  1 HEX    CROSS-COMPILER
  2 : <LINE>    ( N1  N2 -> ADDR  COUNT )
  3    BLOCK  SWAP  C/L  *  +  C/L  ;
  4
```

```
 5 : .LINE    ( LINE SCR -> )
 6    <LINE>  -TRAILING  TYPE ;
 7
 8 : LIST    ( SCR -> )
 9    CR  DUP  SCR !
10    ." SCREEN #" U.  10 0
11    DO  CR  I  3 .R  SPACE   I SCR @   .LINE
12       ?TERMINAL  IF  <QUIT-ADDR> @ EXECUTE  THEN
13    LOOP  CR ;
14
15 DECIMAL

SCR #204
 0 \ MVP-FORTH SOURCE --  DIGIT  CONVERT
 1 HEX    CROSS-COMPILER
 2 : DIGIT   ( C N1 -> N2 TF / FF )
 3    SWAP  30 -    DUP  9 >
 4    IF   DUP  11 <  IF  DROP -1  ELSE  7 -  THEN  THEN
 5    DUP  ROT  <  NOT  IF  DROP -1  THEN
 6    DUP  0<  IF  DROP 0  ELSE  -1  THEN ;
 7
 8 : CONVERT   ( UD1 ADDR1 -> UD2 ADDR2 )
 9    BEGIN  1+ DUP  >R  @    BASE @  DIGIT
10    WHILE   SWAP  BASE @ U*  DROP   ROT  BASE @  U*
11       D+  DPL @  1+
12       IF  1 DPL +!  THEN
13       R>
14    REPEAT   R> ;
15 DECIMAL

SCR #205
 0 \ MVP-FORTH SOURCE --  <NUMBER>  NUMBER
 1 HEX    CROSS-COMPILER
 2 : <NUMBER>    ( ADDR -> D )
 3    0 0 ROT  DUP 1+  @           02D =   DUP >R  -   -1 DPL !
 4    CONVERT   DUP @ BL >
 5    IF  DUP @  02E =  NOT
 6       ABORT" NOT RECOGNIZED"    0 DPL !
 7       CONVERT  DUP @  BL >      ABORT" NOT RECOGNIZED"
 8    THEN  DROP  R>
 9    IF  DNEGATE  THEN ;
10
11 B' <NUMBER> @  ( 'NUMBER ! )
12
13 : NUMBER   ( ADDR -> D )
14    'NUMBER @ EXECUTE ;
15 DECIMAL

SCR #206
 0 \ MVP-FORTH SOURCE --  <EXPECT>
 1 HEX    CROSS-COMPILER
 2 : <EXPECT>    ( ADDR N -> )
 3    OVER + OVER
 4    DO  KEY  DUP  8 =
 5       IF  DROP  DUP  I = 1 AND  DUP R> 2- + >R
 6          IF   07
 7          ELSE  8 DUP EMIT  BL EMIT  -3 OUT +!  THEN
 8       ELSE  DUP  0D =
 9          IF  LEAVE  DROP  BL  0
10          ELSE  DUP  THEN  I !  0 I 1+ !
```

```
11      THEN    EMIT
12   1 /LOOP   DROP ;
13
14 B' <EXPECT> @  ( 'EXPECT ! )
15 DECIMAL

SCR #207
 0 \  MVP-FORTH SOURCE --   'STREAM    EXPECT    QUERY
 1 HEX    CROSS-COMPILER
 2 : 'STREAM   ( -> ADDR )
 3    BLK @  ?DUP
 4    IF  BLOCK   ELSE   TIB @   THEN
 5    >IN @ + ;
 6
 7 : EXPECT   ( ADDR N -> )
 8    'EXPECT @  EXECUTE ;
 9
10 : QUERY   ( -> )
11    TIB @   50 EXPECT   0 >IN ! ;
12
13 DECIMAL
14
15

SCR #208
 0 \  MVP-FORTH SOURCE --   ENCLOSE
 1 HEX    CROSS-COMPILER
 2 : ENCLOSE  ( ADDR1 C ->  ADDR1  N1 N2 N3 )
 3    <ENCLA>   ( ADDR1 C -> ADDR1 N1 ADDR1+N1 )  ( Return .. -> C )
 4    <ENCLB>   ( ADDR1 N1 ADDR1+N1 -> ADDR1 N1 ADDRN2 )  ( Pop RS )
 5    3 PICK  -
 6    DUP    4 PICK  +   @   0= NOT  1 AND  OVER  +   ;
 7
 8 DECIMAL
 9
10
11
12
13
14
15

SCR #209
 0 \  MVP-FORTH SOURCE --   <WORD>   WORD
 1 HEX    CROSS-COMPILER
 2 : <WORD>    ( CHAR -> ADDR )
 3    'STREAM   SWAP    ENCLOSE   DDUP >
 4    IF  DDROP   DDROP    0 HERE 1+ !    0 HERE 2+ !
 5    ELSE   >IN +!   OVER  -   DUP >R
 6       HERE 1+ !   +   HERE  2+   R>  DUP .OFF >
 7       ABORT" INPUT > 255"  1+   MOVE
 8    THEN  HERE  1+ ;
 9
10 B' <WORD> @  ( 'WORD ! )
11
12 : WORD    ( CHAR -> ADDR )
13    'WORD @  EXECUTE  ;
14
15 DECIMAL
```

```
SCR #210
  0 \ MVP-FORTH SOURCE --  DOVOC  FORTH
  1 HEX    CROSS-COMPILER
  2 : DOVOC    ( -> )
  3    R> 1+  CONTEXT ! ;
  4
  5 : FORTH   ( -> )    ;
  6   -1 BDP +!
  7    B' DOVOC  @  B,
  8    0 B,
  9    8001 B,
 10    BL  B,
 11    0 B,
 12
 13
 14 DECIMAL
 15

SCR #211
  0 \  MVP-FORTH SOURCE --  ALLOT/16  ,  LATEST   DEFINITIONS
  1 HEX    CROSS-COMPILER
  2 : ALLOT/16   ( N -> )
  3    DP +! ;
  4
  5 : ,    ( N -> )
  6    HERE !  1 ALLOT/16 ;
  7
  8 : LATEST    ( -> )
  9    CURRENT @  @ ;
 10
 11 : DEFINITIONS  ( -> )
 12    CONTEXT @  CURRENT ! ;
 13
 14 ( FORTH   DEFINITIONS )
 15 DECIMAL

SCR #212
  0 \  MVP-FORTH SOURCE --  TRAVERSE
  1 HEX    CROSS-COMPILER
  2 : TRAVERSE  ( ADDR1  N ->  ADDR2 )
  3    0<
  4    IF   ( To length word    ADDR1 is last char in header string )
  5       BEGIN   1-  DUP @  0<  UNTIL
  6    ELSE ( To end of name string  ADDR1 is length word )
  7       DUP  @   OFF AND  1 MAX  +
  8    THEN ;
  9
 10 DECIMAL
 11
 12
 13
 14
 15

SCR #213
  0 \  MVP-FORTH SOURCE --  LFA PFA NFA    CFA
  1 HEX    CROSS-COMPILER
  2 \ Header structure:
  3 \    LFA     NFA    ..TEXT..   PFA     ( Note: NO CFA !! )
  4 : NFA    ( PFA -> NFA )
```

```
  5     1-   -1 TRAVERSE   ;
  6
  7 : LFA     ( PFA -> LFA )
  8    NFA  1-  ;
  9
 10 : PFA     ( NFA -> PFA )
 11    1 TRAVERSE   1+ ;
 12
 13 : CFA     ( PFA -> CFA )   ;    ( This will work most of the time )
 14 DECIMAL
 15

SCR #214
  0 \  MVP-FORTH SOURCE --   <$MATCH>
  1 HEX    CROSS-COMPILER
  2 : <$MATCH>   ( TXTADDR1 NFAADDR2 -> MATCH-FLAG ) ( ADDR-LENGTH )
  3    OVER @    OVER @  2OFF AND   =
  4    IF       ( same length )
  5       1+  SWAP  DUP  1+  SWAP   @
  6       <$=>
  7    ELSE
  8       ( Different lengths ) DDROP   0
  9    THEN  ;
 10 DECIMAL
 11
 12
 13
 14
 15

SCR #215
  0 \  MVP-FORTH SOURCE --   <FIND>   <-FIND>
  1 HEX    CROSS-COMPILER
  2 : <FIND>    ( TEXT-ADDR  NFA-ADDR -> PFA STATUS -1 / 0 )
  3    BEGIN    DDUP  <$MATCH>
  4       IF    SWAP DROP   DUP  PFA  SWAP  @   -1    -1
  5       ELSE  1-  @
  6             DUP IF  0     ELSE  DDROP  0  -1  THEN
  7       THEN
  8    UNTIL  ;
  9
 10 : <-FIND>    ( -> PFA STATUS -1 / 0 )
 11    BL WORD   CONTEXT  @ @    <FIND> ;
 12
 13 B' <-FIND> @  ( '-FIND ! )
 14
 15 DECIMAL

SCR #216
  0 \  MVP-FORTH SOURCE --   -FIND    FIND
  1 HEX    CROSS-COMPILER
  2 : -FIND  ( -> PFA STATUS -1 / 0 )
  3    '-FIND @   EXECUTE ;
  4
  5 : FIND    ( -> ADDR )
  6    -FIND    IF  DROP  ELSE  0  THEN ;
  7
  8
  9
 10
```

```
 11                          `
 12 DECIMAL
 13
 14
 15

SCR #217
  0 \   MVP-FORTH SOURCE --   COMPILE   [COMPILE]    [   ]
  1 HEX    CROSS-COMPILER
  2 : COMPILE    ( -> )
  3      ?COMP  R>  1+ DUP  >R  @  ,  ;
  4
  5 : [COMPILE]    ( -> )            ( Not required when in cross-comp )
  6      ?COMP  -FIND  NOT    ABORT" NOT FOUND"
  7      DROP  ,  ;    IMMEDIATE
  8
  9 : [     ( -> )
 10      0 STATE !  ;     IMMEDIATE
 11
 12 : ]     ( -> )
 13      C000  STATE !  ;   IMMEDIATE
 14
 15 DECIMAL SCR #218
  0 \   MVP-FORTH SOURCE --   SMUDGE        S0   BLANK
  1 HEX    CROSS-COMPILER
  2 : SMUDGE    ( -> )
  3      LATEST  2000  TOGGLE  ;
  4
  5 : S0    ( -> )
  6      SP0  @  ;
  7
  8 : BLANK    ( -> )
  9      BL FILL  ;
 10
 11
 12
 13
 14
 15 DECIMAL SCR #219
  0 \   MVP-FORTH SOURCE --   DLITERAL   LITERAL
  1 HEX    CROSS-COMPILER
  2 : LITERAL    ( N -> N / )
  3      STATE @
  4      IF   COMPILE  LIT  ,  THEN  ;  IMMEDIATE
  5
  6 : DLITERAL    ( N -> N / )
  7      STATE @
  8      IF  SWAP   ( [COMPILE] ) LITERAL   ( [COMPILE] ) LITERAL
  9      THEN ;   IMMEDIATE
 10
 11
 12
 13
 14
 15 DECIMAL
```

```
SCR #220
  0 \ MVP-FORTH SOURCE --   <INTERPRET>
  1 HEX    CROSS-COMPILER
  2 : <INTERPRET>   ( -> )
  3    BEGIN  -FIND
  4      IF   DUP  STATE @  U<
  5          IF   1000 AND  IF  @  THEN  ,
  6          ELSE  DROP  EXECUTE  THEN
  7      ELSE    HERE 1+  NUMBER  DPL @  1+
  8          IF  ( [COMPILE] )  DLITERAL
  9          ELSE   DROP  ( [COMPILE] )  LITERAL
 10          THEN
 11      THEN  ?STACK     AGAIN  ;
 12 B' <INTERPRET> @  ( 'INTERPRET ! )
 13 : INTERPRET  ( -> )
 14    'INTERPRET @ EXECUTE  ;
 15 DECIMAL

SCR #221
  0 \ MVP-FORTH SOURCE --   NULL
  1 HEX    CROSS-COMPILER
  2 : X    ( -> )     ( NULL )
  3    BLK @
  4    IF   STATE @    ?STREAM   THEN
  5    R> R> DDROP  ;     IMMEDIATE
  6
  7 B' X @  ( NFA  C000  OVER !   0000 SWAP 1+ !   )
  8
  9 DECIMAL
 10
 11
 12
 13
 14
 15

SCR #222
  0 \ MVP-FORTH SOURCE --   QUIT   <ABORT>
  1 HEX    CROSS-COMPILER
  2 : QUIT    ( -> )
  3    0 BLK !    ( [COMPILE] )  [
  4    BEGIN   RP!   CR   QUERY   INTERPRET
  5       STATE @  NOT
  6       IF   ." (CPU/16)OK"    THEN
  7    AGAIN  ;
  8 B' QUIT @  ( <QUIT-ADDR> ! )    \ Vector for <ABORT">
  9
 10 : <ABORT>    ( -> )
 11    SP!  ?STACK
 12    ( [COMPILE] )  FORTH   DEFINITIONS   QUIT  ;
 13
 14 B' <ABORT> @  (  'ABORT !  )
 15 DECIMAL SCR #223
  0 \ MVP-FORTH SOURCE --   ABORT
  1 HEX    CROSS-COMPILER
  2 : ABORT  ( -> )
  3    'ABORT @  EXECUTE ;
  4
```

```
 5 : COLD  ( -> )
 6    EMPTY-BUFFERS
 7    PAGE  CR CR
 8    19 SPACES ." The WISC CPU/16"   CR CR
 9    19 SPACES ." with MVPFORTH/16   " CR CR
10    1A SPACES ." 14 March 1987"  CR CR
11    0 EPRINT !
12    FIRST  USE !   FIRST  PREV !
13    DECIMAL  ABORT ;
14
15 DECIMAL SCR #224
 0 \ MVP-FORTH SOURCE --   WHERE
 1 HEX    CROSS-COMPILER
 2 : WHERE  ( -> )
 3    BLK @
 4    IF  BLK @  DUP  SCR !   CR  CR  ." SCREEN #"
 5       DUP .  >IN @  3FF MIN  C/L  /MOD  DUP
 6       ." LINE #"  .  C/L  *  ROT  BLOCK  +.
 7       CR CR  C/L  -TRAILING  TYPE
 8       >IN @   3FF >  1 AND  +
 9    ELSE  >IN @
10    THEN   CR  HERE 1+  @   DUP >R  -  HERE 1+ R@  +
11    1+  @  BL =
12    IF 1-  THEN  SPACES  R>  0
13    DO  5E  EMIT  LOOP ;
14 B' WHERE @  { <WHERE-ADDR> ! }   \ Vector for <ABORT">
15 DECIMAL SCR #225
 0 \ MVP-FORTH SOURCE --   <LOAD>  LOAD   THRU
 1 HEX    CROSS-COMPILER
 2 : <LOAD>  ( N -> )
 3    ?DUP NOT   ABORT" UNLOADABLE"
 4    BLK @ >R  >IN  @ >R
 5    0 >IN !   BLK !  INTERPRET
 6    R> >IN !  R> BLK ! ;
 7
 8 B' <LOAD> @  { 'LOAD ! }
 9 : LOAD   ( N -> )
10    'LOAD @  EXECUTE ;
11
12 : THRU  ( N1 N2 -> )
13    1+ SWAP   DO I U.  I LOAD
14       ?TERMINAL  ABORT" BREAK..."  LOOP ;
15 DECIMAL SCR #226
 0 \ MVP-FORTH SOURCE --   CREATE
 1 HEX    CROSS-COMPILER
 2 : CREATE   ( -> )
 3    BL WORD   DUP   1+  @
 4    0= ABORT" ATTEMPTED TO REDEFINE NULL"
 5    DUP  CONTEXT @  @   <FIND>
 6    IF  DDROP  WARNING @
 7       IF  DUP  COUNT  TYPE  SPACE  ." ISN'T UNIQUE" CR
 8       THEN
 9    THEN
10    LATEST ,  ( Store LFA )   HERE  CURRENT  @  !
```

```
 11     @       DUP    8000 OR   ,
 12     ALLOT/16  ( HERE happens to align with text of string )
 13     FF04   ,  ( DOVAR )  ;
 14
 15 DECIMAL SCR #227
  0 \  MVP-FORTH SOURCE --   :       VARIABLE
  1 HEX    CROSS-COMPILER
  2
  3 : :    ( -> )
  4     SP@  CSP  !     CURRENT @  CONTEXT !
  5     CREATE   -1  ALLOT/16   SMUDGE   ]  ;
  6
  7 : VARIABLE  ( -> )
  8     CREATE   1 ALLOT/16  ;
  9
 10
 11
 12
 13
 14
 15 DECIMAL SCR #228
  0 \  MVP-FORTH SOURCE --   \    (
  1 HEX    CROSS-COMPILER
  2 : $    ( -> )       ( alias for "(" )
  3     -1 >IN +!   29  WORD  @    HERE  +  2+
  4     @  29 =    NOT  ?STREAM  ;      IMMEDIATE
  5
  6 28   BLATEST @  1+   ( ! )
  7
  8 : %    ( -> )       ( alias for "\" )
  9     ?LOADING  >IN   @  C/L  /    1+
 10     C/L    *   >IN  !  ;    IMMEDIATE
 11
 12 5C   BLATEST @  1+   ( ! )
 13
 14 DECIMAL
 15

SCR #229
  0 \  MVP-FORTH SOURCE --   '
  1 HEX    CROSS-COMPILER
  2 : '    ( -> ADDR )
  3     -FIND  NOT    ABORT" NOT FOUND"
  4     DROP  ( [COMPILE] ) LITERAL  ;   IMMEDIATE
  5
  6
  7
  8
  9 DECIMAL
 10
 11
 12
 13
 14
 15
```

```
SCR #230
  0 \  MVP-FORTH SOURCE --   BYE  ;
  1 HEX    CROSS-COMPILER
  2 : BYE   ( -> )
  3     HALT  ;
  4
  5 : &    ( -> )           ( Redefine this word to be ; on board )
  6    ?CSP    COMPILE  SEMIS    SMUDGE
  7     ( [COMPILE] )  [   ;          IMMEDIATE
  8 03B ( ";" )     BLATEST @ 1+   ( ! )
  9
 10 DECIMAL
 11
 12
 13
 14
 15

SCR #231
  0 \  MVP-FORTH SOURCE --   LAST SCREEN LOADED
  1 HEX    CROSS-COMPILER
  2 \ Set up vocabulary and dictionary pointers
  3 BLATEST @  ( CONTEXT @  ! )
  4 BHERE    ( DP ! )
  5 B' FORTH @   4 +   ( VOC-LINK ! )
  6
  7 \ Set up COLD vector for cold entry point at addr 5
  8 B' COLD @  ( 5 !    FF01  6 ! )
  9
 10 DECIMAL
 11
 12
 13
 14
 15

SCR #232
  0
  1
  2
  3
  4
  5
  6
  7
  8
  9
 10
 11
 12
 13
 14
 15

SCR #233
  0
  1
  2
  3
  4
```

```
    5
    6
    7
    8
    9
   10
   11
   12
   13
   14
   15

SCR #234
    0
    1
    2
    3
    4
    5
    6
    7
    8
    9
   10
   11
   12
   13
   14
   15

SCR #235
    0
    1
    2
    3
    4
    5
    6
    7
    8
    9
   10
   11
   12
   13
   14
   15

SCR #236
    0 \  BOARD FORTH --- CONSTANT     USER     IMMEDIATE
    1 HEX
    2 : CONSTANT  ( N -> )
    3    CREATE  -1   ALLOT/16
    4    [ ' DOCON @ ] LITERAL  ,   , ;
    5
    6
    7 : USER   ( N -> )
    8    CREATE   -1 ALLOT/16
    9    [ ' DOUSE ]   LITERAL  ,  , ;
   10
```

```
11 : IMMEDIATE    ( -> )
12    LATEST 4000 TOGGLE   ;
13
14 DECIMAL
15

SCR #237
  0 \ BOARD FORTH --- DOES>
  1 HEX
  2 : <DOES>   ( -> )    ( Compilation helper for DOES> )
  3    R> 1+ LATEST PFA !   ;
  4
  5 : DOES>   ( -> PFA )
  6    ?CSP   COMPILE <DOES>
  7    COMPILE R>   COMPILE 1+   ;   IMMEDIATE
  8
  9
 10 DECIMAL
 11
 12
 13
 14
 15

SCR #238
  0 \ BOARD FORTH --- IF  ELSE  THEN
  1 DECIMAL
  2 : IF       ( -> PATCH-ADDR 2 )
  3    COMPILE OBRANCH    HERE  0 ,   2 ;
  4 IMMEDIATE
  5
  6 : THEN    ( PATCH-ADDR 2 -> )
  7    ?COMP    2 ?PAIRS      HERE   SWAP   !  ;
  8 IMMEDIATE
  9
 10 : ELSE    ( PATCH-ADDR1 2 -> PATCH-ADDR2 2 )
 11    2 ?PAIRS    COMPILE BRANCH    HERE   0 ,
 12    SWAP   2   [COMPILE] THEN    2 ;
 13 IMMEDIATE
 14
 15

SCR #239
  0 \ BOARD FORTH --- BEGIN  AGAIN  UNTIL
  1 DECIMAL
  2 : BEGIN       ( -> JMP-ADDR 1 )
  3    ?COMP   HERE  1 ;
  4 IMMEDIATE
  5
  6 : AGAIN      ( JMP-ADDR 1 -> )
  7    1 ?PAIRS    COMPILE BRANCH    ,  ;
  8 IMMEDIATE
  9
 10 : UNTIL      ( JMP-ADDR 1 -> )
 11    1 ?PAIRS    COMPILE OBRANCH    ,  ;
 12 IMMEDIATE
 13
 14
 15
```

```
SCR #240
  0 \ BOARD-FORTH --- WHILE  REPEAT
  1 DECIMAL
  2 : WHILE      ( JMP-ADDR 1 -> JMP-ADDR 1 PATCH-ADDR 3 )
  3    [COMPILE] IF  2+ ;
  4 IMMEDIATE
  5
  6 : REPEAT     ( JMP-ADDR 1 PATCH-ADDR 3 -> )
  7    >R >R    [COMPILE] AGAIN
  8    R> R>    2-  [COMPILE] THEN  ;
  9 IMMEDIATE
 10
 11
 12
 13
 14
 15

SCR #241
  0 \ BOARD FORTH --- #DO  #LOOP  DO
  1 DECIMAL
  2 : #DO    ( -> JMP-ADDR 99 )
  3    COMPILE <#DO>    HERE   99  ;
  4 IMMEDIATE
  5
  6 : #LOOP  ( JMP-ADDR 99 -> )
  7    ?COMP   99 ?PAIRS  COMPILE <#LOOP>   ,  ;
  8 IMMEDIATE
  9
 10 : DO     ( -> JMP-ADDR 4 )
 11    COMPILE <DO>    HERE   4  ;
 12 IMMEDIATE
 13
 14
 15

SCR #242
  0 \ BOARD-FORTH --- LOOP  /LOOP  +LOOP
  1 DECIMAL
  2 : LOOP    ( JMP-ADDR 4 -> )
  3    4 ?PAIRS  COMPILE <LOOP>   ,  ;
  4 IMMEDIATE
  5
  6 : /LOOP   ( JMP-ADDR 4 -> )
  7    4 ?PAIRS  COMPILE </LOOP>  ,  ;
  8 IMMEDIATE
  9
 10 : +LOOP   ( JMP-ADDR 4 -> )
 11    4 ?PAIRS  COMPILE <+LOOP>  ,  ;
 12 IMMEDIATE
 13
 14
 15

SCR #243
  0 \ BOARD-FORTH --- ABORT"
  1 HEX
  2 : ABORT"   ( FLAG -> )
  3    ?COMP    'STREAM  @  22 =
  4    IF  1 >IN +! 0 ,
```

```
 5     ELSE  22  WORD  DUP  @  1+    SWAP  OVER
 6        +  @  22 =  NOT  ?STREAM  COMPILE  <ABORT">  ALLOT/16
 7     THEN  ;  IMMEDIATE
 8
 9 DECIMAL
10
11
12
13
14
15

SCR #244
 0 \   BOARD FORTH --- . "
 1 HEX
 2 : ."    ( -> )
 3    'STREAM   @   22 =
 4    IF    1 >IN  +!   0 ,
 5    ELSE  22 WORD  DUP  @  1+  OVER  +  @
 6          22 = NOT  ?STREAM   STATE @
 7          IF   @ 1+   COMPILE <.">  ALLOT/16
 8          ELSE  COUNT TYPE
 9          THEN
10    THEN  ;  IMMEDIATE
11
12 DECIMAL
13
14
15

SCR #245
 0 \   BOARD FORTH --- VOCABULARY fig
 1 HEX
 2 : VOCABULARY
 3    CREATE
 4       CURRENT @ 1+   ,
 5       8001 ,
 6       BL ,
 7       HERE VOC-LINK @ ,    VOC-LINK !
 8       DOES>    CONTEXT ! ;
 9 DECIMAL
10
11
12
13
14
15

SCR #246
 0 \   BOARD FORTH --- FORGET
 1 : FORGET     BL WORD CURRENT @ @ <FIND> 0=
 2    ABORT" Not in current vocabulary."
 3    DROP  NFA DUP FENCE @ U<
 4    ABORT" In protected dictionary."
 5    >R  R@ CONTEXT @ U<
 6    IF [COMPILE] FORTH THEN
 7    R@ CURRENT @ U<
 8    IF [COMPILE] FORTH DEFINITIONS THEN
 9    VOC-LINK @
10    BEGIN R@ OVER U< WHILE @ REPEAT
11    DUP VOC-LINK !
```

```
 12     BEGIN DUP 2-
 13        BEGIN 1- @ DUP R@ U< UNTIL
 14          OVER 3 - ! @ ?DUP 0=
 15     UNTIL R>    DP ! ;

SCR #247
  0 \  BOARD FORTH --- TEXT  PP
  1 HEX
  2
  3 : TEXT     ( c --- )
  4    HERE C/L 2+ BLANK WORD BL OVER
  5    DUP @ + 1+ ! PAD C/L 1+ MOVE ;
  6
  7 : PP       ( n --- <text> )
  8     DUP FFF0 AND
  9     ABORT" Off screen."
 10     0 TEXT  PAD 1+ SWAP
 11     SCR @ <LINE>   MOVE UPDATE ;
 12
 13 DECIMAL
 14
 15

SCR #248
  0 \  BOARD FORTH --- COPY  DOVER
  1
  2 : DOVER
  3    4 PICK  4 PICK  ;
  4
  5 : COPY
  6    SWAP BLOCK  2-  !  UPDATE ;
  7
  8
  9
 10
 11
 12
 13
 14
 15

SCR #249
  0 \  BOARD FORTH --- DU<  D-  D0=  D=  D>  D@
  1
  2   BASE @  HEX
  3 : DU<    >R  >R  8000  +
  4    R>  R>  8000  +  D<  ;
  5   BASE !
  6
  7 : D-     DNEGATE D+ ;
  8
  9 : D0=    OR  0=  ;
 10
 11 : D=     D- D0= ;
 12
 13 : D>     DSWAP D< ;
 14
 15
```

```
SCR #250
  0 \ BOARD FORTH --- DCONSTANT DMAX DMIN
  1
  2 : DCONSTANT   CREATE  ,  ,
  3     DOES> DUP 2+ @ SWAP @ ;
  4
  5 : DMAX   DOVER DOVER D<
  6    IF DSWAP THEN   DDROP ;
  7
  8 : DMIN   DOVER DOVER D< NOT
  9    IF DSWAP THEN   DDROP ;
 10
 11
 12
 13
 14
 15

SCR #251
  0 \ BOARD FORTH --- PAUSE
  1
  2 : PAUSE   ?TERMINAL
  3    IF 32000 0 DO LOOP
  4      BEGIN ?TERMINAL UNTIL
  5      64000 0 DO 1 /LOOP
  6    THEN ;
  7
  8
  9
 10
 11
 12
 13
 14
 15

SCR #252
  0 \ BOARD FORTH --- DVARIABLE ID. INDEX
  1
  2 : DVARIABLE   CREATE 4 ALLOT/16 ;
  3
  4 : ID.  COUNT 31 AND OVER + SWAP
  5    DO I @ 127 AND EMIT LOOP 32 EMIT ;
  6
  7 : INDEX  ( first, last --- )
  8    1+ SWAP
  9    DO CR I 4 .R 2 SPACES I BLOCK 64 TYPE
 10      PAUSE ?TERMINAL IF LEAVE THEN 1
 11    /LOOP CR ;
 12
 13
 14
 15

SCR #253
  0 \ BOARD FORTH --- VLIST
  1 HEX
  2
  3 : VLIST   C/L OUT ! CONTEXT @ @
  4    BEGIN C/L OUT @ - OVER @ 1F AND 4 + <
```

```
 5      IF CR 0 OUT ! THEN
 6        DUP ID. SPACE SPACE   1 - @ DUP
 7        NOT PAUSE ?TERMINAL OR
 8    UNTIL DROP
 9  ;
10
11 DECIMAL
12
13
14
15

SCR #254
 0 \ BOARD FORTH --- .SS  .SL  .SR  .S
 1
 2 0 CONSTANT .SS       \ .S LEFT OR RIGHT SWITCH
 3
 4 : .SL -1 ' .SS 1+ ! ;   \ .S WITH TOP OF STACK ON LEFT
 5
 6 : .SR 0 ' .SS 1+ ! ; \ .S WITH TOP OF STACK ON RIGHT
 7
 8 : .S  CR
 9   DEPTH DEPTH 1 ROT
10   IF .SS IF SWAP 1- THEN
11     DO I PICK U. 1 .SS +- +LOOP
12   ELSE DDROP ." Empty Stack."
13   THEN CR ;
14
15

SCR #255
 0 \ BOARD FORTH --- DUMP
 1 HEX
 2 : DUMP   ( addr count --- )
 3    BASE @ >R  HEX       0
 4    DO CR DUP I + DUP 0 9 D.R 4 SPACES DUP 8 0
 5      DO DUP I + @ 0 6 D.R
 6      LOOP   DROP 4 SPACES    8 0
 7      DO DUP I + @ DUP 20 < OVER 7E > OR
 8        IF DROP 2E THEN   EMIT
 9      LOOP  DROP 8
10      PAUSE ?TERMINAL IF LEAVE THEN
11    /LOOP   DROP  CR R> BASE ! ;
12
13  DECIMAL
14
15

SCR #256
 0 \ BOARD FORTH --- 'S -TEXT 2! 2@ 2CONSTANT 2DROP 2DUP
 1
 2 : 'S   SP@ ;
 3
 4 : -TEXT   DDUP + SWAP DO DROP 1+ DUP 1- @ I @ - DUP
 5   IF DUP  ABS / LEAVE THEN 1 /LOOP SWAP DROP ;
 6
 7 : 2!   D! ;
 8
 9 : 2@   D@ ;
10
```

```
 11 : 2CONSTANT    DCONSTANT  ;
 12
 13 : 2DROP    DDROP  ;
 14
 15 : 2DUP     DDUP   ;

SCR #257
  0 \  BOARD FORTH --- 2OVER  2SWAP  2VARIABLE  >BINARY  > TYPE
  1
  2 : 2OVER    DOVER  ;
  3
  4 : 2SWAP    DSWAP  ;
  5
  6 : 2VARIABLE   DVARIABLE  ;
  7
  8 : >BINARY  CONVERT  ;
  9
 10 : >TYPE    ."  USED IN MULTIPROGRAMMED SYSTEMS ONLY. " ;
 11 IMMEDIATE
 12
 13
 14
 15

SCR #258
  0 \  BOARD FORTH --- ERASE  FLUSH  H  OCTAL  U.R  [']
  1
  2 : ERASE   0  FILL ;
  3
  4 : FLUSH   SAVE-BUFFERS ;
  5
  6 : H   DP  ;
  7
  8 : OCTAL   8  BASE  !  ;
  9
 10 : U.R    0  SWAP  D.R ;
 11
 12 : [']   ?COMP  [COMPILE]  '  ;   IMMEDIATE
 13
 14
 15

SCR #259
  0 \  BOARD FORTH --- ?MICRO
  1
  2 : ?MICRO          (  FFnn  )
  3    600  90
  4    DO DUP     I @  =
  5      IF I   NFA COUNT 31 AND TYPE  LEAVE
  6      THEN
  7    LOOP DROP    ;
  8
  9
 10
 11
 12
 13
 14
 15
```

```
SCR #260
  0 \  BOARD FORTH --- DECOMP    DECOMPILE
  1
  2 HEX
  3 : DECOMP    DUP CR 0 5 D.R 2 SPACES
  4      DUP   @ DUP    FF00  AND FF00  =
  5      IF  ?MICRO
  6      ELSE        NFA COUNT   TYPE
  7      THEN  1+    ;
  8 DECIMAL
  9
 10 : DECOMPILE  ( addr -> )
 11     DEPTH 1 = IF DUP THEN 20 MIN 0 DO DECOMP LOOP ;
 12
 13 ' DECOMPILE NFA FENCE !
 14
 15
```

APPENDIX A -- PART III: CPU/16 TEST SOURCE CODE

```
SCR #0
  0
  1
  2
  3
  4
  5
  6
  7
  8
  9
 10
 11
 12
 13
 14
 15

SCR #1
  0 INDEX --- CPU/16 TEST SOURCE                    PHIL KOOPMAN JR.
  1
  2 MVP-FORTH VERSION                       LAST UPDATE: 3/14/87
  3
  4               (C) COPYRIGHT 1986, 1987
  5
  6        Phil Koopman, Jr  & WISC Technologies, Inc.
  7
  8 LOAD       SOURCE
  9 SCREEN     SCREENS     CONTENTS
 10 ======     ========    ========
 11 2 LOAD     2 - 23      COMPREHENSIVE TEST SUITE   (RUN FROM PC)
 12 25 LOAD    25 - 34     QUICK TEST SUITE   (RUN FROM PC)
 13 35 LOAD    35 - 90     STRESS TEST SUITE   (RUN FROM CPU/16)
 14 NONE       95 - 105    VARIOUS TESTS   (RUN FROM CPU/16 AND/OR PC)
 15

SCR #2
  0 \  TEST SUITE FOR FORTH BOARD
  1 DECIMAL       MICRO-ASSEMBLER DEFINITIONS
```

```
 2 : ZZ      ( VALUE  VALUE  N -> )
 3      >R   =
 4      IF ." PASS "    ELSE   CR ." *** ERROR #" R@ .  CR
 5      THEN    R> DROP ;
 6
 7 : TASKZZ ;
 8 STOP
 9 : QZ       24  3 DO   I LOAD  ?TERMINAL  ABORT" BREAK" LOOP  ;
10 ( ERROR MESSAGE HERE IF BREAK KEY USED ==> )    QZ
11 FORGET TASKZZ
12
13
14
15 DECIMAL

SCR #3
 0 CR CR ." TEST STATUS REGISTER" CR
 1 HEX
 2 : XXA    0 ::  DEST=STATUS    ;SET    X! ;
 3 : XXB    3EA  F@  ;
 4
 5 0000 XXA    XXB  OFF AND     0000       1 ZZ
 6 00FF XXA    XXB  OFF AND     00FF       2 ZZ
 7 0012 XXA    XXB  OFF AND     0012       3 ZZ
 8 00ED XXA    XXB  OFF AND     00ED       4 ZZ
 9
10
11
12 DECIMAL   CR
13
14
15

SCR #4
 0 CR CR ." TEST DLO REGISTER (STORE/FETCH)" CR
 1 HEX
 2 : XXC    0 ::  DEST=DLO    ;SET    X! ;
 3 : XXD    1 ::  SOURCE=DLO  ;SET    X@ ;
 4
 5 0000 XXC    XXD 0000       1 ZZ
 6 FFFF XXC    XXD FFFF       2 ZZ
 7 3456 XXC    XXD 3456       3 ZZ
 8 CBA9 XXC    XXD CBA9       4 ZZ
 9
10
11
12 DECIMAL   CR
13
14
15

SCR #5
 0 CR CR ." TEST DHI REGISTER (STORE/FETCH)" CR
 1 HEX
 2 : XXE    0 ::  ALU=A  DEST=DHI   ;SET   X! ;
 3 : XXF    1 ::  SOURCE=ALU  ALU=B  ;SET   X@ ;
 4
 5 0000 XXE    XXF 0000       1 ZZ
 6 FFFF XXE    XXF FFFF       2 ZZ
 7 4567 XXE    XXF 4567       3 ZZ
```

```
   8 BA98 XXE    XXF BA98         4 ZZ
   9
  10
  11
  12 DECIMAL       CR
  13
  14
  15

SCR #6
   0 CR CR ." TEST 32-BIT SHIFT LEFT OF DLO/DHI" CR
   1 HEX
   2 : XXG   0 ::  ALU=A  DEST=DHI   ;SET    X!
   3         1 ::  DEST=DLO   ;SET    X!  ;
   4 : XXH   2 ::  SOURCE=DLO   ;SET   X@
   5         3 ::  SOURCE=ALU  ALU=B   ;SET   X@  ;
   6 : XXJ   0 DO  4 ::  SL[DLO] SL[DHI]   SC=0  ;DO   LOOP  ;
   7
   8 0000 0000  XXG      XXH     0000 1 ZZ    0000 2 ZZ
   9 0 :: SL[DLO] SL[DHI]   SC=1   ;DO    XXH    0000 3 ZZ   0001 4 ZZ
  10   7 XXJ     XXH      0000 5 ZZ     0080 6 ZZ
  11   8 XXJ     XXH      0000 7 ZZ     8000 8 ZZ
  12   1 XXJ     XXH      0001 9 ZZ     0000 A ZZ
  13   7 XXJ     XXH      0080 B ZZ     0000 C ZZ
  14   8 XXJ     XXH      8000 D ZZ     0000 E ZZ
  15   1 XXJ     XXH      0000 F ZZ     0000 10 ZZ       DECIMAL    CR

SCR #7
   0 CR CR ." TEST 32-BIT SHIFT RIGHT OF DLO/DHI" CR
   1 HEX
   2 : XXK   0 DO  2 ::  SC=0 SR[DLO] SR[DHI] ;DO   LOOP  ;
   3
   4 0000 0000  XXG      XXH     0000 1 ZZ    0000 2 ZZ
   5 0 :: SC=1 ;DO
   6 0 :: SR[DLO] SR[DHI]   SC=1   ;DO    XXH    8000 3 ZZ   0000 4 ZZ
   7   8 XXK     XXH      0080 5 ZZ     0000 6 ZZ
   8   7 XXK     XXH      0001 7 ZZ     0000 8 ZZ
   9   1 XXK     XXH      0000 9 ZZ     8000 A ZZ
  10   8 XXK     XXH      0000 B ZZ     0080 C ZZ
  11   7 XXK     XXH      0000 D ZZ     0001 E ZZ
  12   1 XXK     XXH      0000 F ZZ     0000 10 ZZ
  13 DECIMAL       CR
  14
  15

SCR #8
   0 CR CR ." FIRST TEST OF ALU FUNCTIONALITY" CR
   1 HEX
   2 : XXL   ( A B -> )
   3         0 ::  ALU=A  DEST=DHI   ;SET    X!
   4         1 ::  DEST=DLO   ;SET    X!
   5         2 ::  SOURCE=DLO  ;
   6
   7 : XXM   ( -> RESULT )
   8                         DEST=DHI   ;DO
   9         3 ::  SOURCE=ALU   ALU=B    ;SET   X@   ;
  10
  11
  12 0 :: SOURCE=ALU   ALU=0   ;SET    X@    0000  1 ZZ
  13 1 :: SOURCE=ALU   ALU=-1  ;SET    X@    FFFF  1 ZZ
  14
  15 DECIMAL
```

```
SCR #9
  0 CR CR ." SECOND TEST OF ALU FUNCTIONALITY" CR
  1 HEX
  2      0 8451   XXL   ALU=B      XXM   8451   1 ZZ
  3
  4 0000    0     XXL   ALU=A      XXM   0000   2 ZZ
  5 FFFF    0     XXL   ALU=A      XXM   FFFF   3 ZZ
  6 ACE9    0     XXL   ALU=A      XXM   ACE9   4 ZZ
  7
  8 0000    0     XXL   ALU=notA   XXM   FFFF   5 ZZ
  9 FFFF    0     XXL   ALU=notA   XXM   0000   6 ZZ
 10 1234    0     XXL   ALU=notA   XXM   EDCB   7 ZZ
 11
 12      0 0000   XXL   ALU=notB   XXM   FFFF   8 ZZ
 13      0 FFFF   XXL   ALU=notB   XXM   0000   9 ZZ
 14      0 8765   XXL   ALU=notB   XXM   789A   A ZZ
 15 DECIMAL SCR #10
  0 CR CR ." THIRD TEST OF ALU FUNCTIONALITY" CR
  1 HEX
  2 FFFF FFFF   XXL   ALU=AnorB   XXM   0000   1 ZZ
  3 0000 FFFF   XXL   ALU=AnorB   XXM   0000   2 ZZ
  4 FFFF 0000   XXL   ALU=AnorB   XXM   0000   3 ZZ
  5 0000 0000   XXL   ALU=AnorB   XXM   FFFF   4 ZZ
  6 ACE4 1252   XXL   ALU=AnorB   XXM   4109   5 ZZ
  7
  8 0000 0000   XXL   ALU=AnandB  XXM   FFFF   6 ZZ
  9 FFFF 0000   XXL   ALU=AnandB  XXM   FFFF   7 ZZ
 10 0000 FFFF   XXL   ALU=AnandB  XXM   FFFF   8 ZZ
 11 FFFF FFFF   XXL   ALU=AnandB  XXM   0000   9 ZZ
 12 9835 87AE   XXL   ALU=AnandB  XXM   7FDB   A ZZ
 13
 14 DECIMAL
 15

SCR #11
  0 CR CR ." FOURTH TEST OF ALU FUNCTIONALITY" CR
  1 HEX
  2 FFFF FFFF   XXL   ALU=AxorB   XXM   0000   1 ZZ
  3 0000 FFFF   XXL   ALU=AxorB   XXM   FFFF   2 ZZ
  4 FFFF 0000   XXL   ALU=AxorB   XXM   FFFF   3 ZZ
  5 0000 0000   XXL   ALU=AxorB   XXM   0000   4 ZZ
  6 ACE4 1252   XXL   ALU=AxorB   XXM   BEB6   5 ZZ
  7
  8 0000 0000   XXL   ALU=AxnorB  XXM   FFFF   6 ZZ
  9 FFFF 0000   XXL   ALU=AxnorB  XXM   0000   7 ZZ
 10 0000 FFFF   XXL   ALU=AxnorB  XXM   0000   8 ZZ
 11 FFFF FFFF   XXL   ALU=AxnorB  XXM   FFFF   9 ZZ
 12 9835 87AE   XXL   ALU=AxnorB  XXM   E064   A ZZ
 13
 14 DECIMAL
 15

SCR #12
  0 CR CR ." FIFTH TEST OF ALU FUNCTIONALITY" CR
  1 HEX
  2 FFFF FFFF   XXL   ALU=AorB    XXM   FFFF   1 ZZ
  3 0000 FFFF   XXL   ALU=AorB    XXM   FFFF   2 ZZ
  4 FFFF 0000   XXL   ALU=AorB    XXM   FFFF   3 ZZ
```

```
 5 0000 0000   XXL  ALU=AorB   XXM   0000  4 ZZ
 6 A3E4 8252   XXL  ALU=AorB   XXM   A3F6  5 ZZ
 7
 8 0000 0000   XXL  ALU=AandB  XXM   0000  6 ZZ
 9 FFFF 0000   XXL  ALU=AandB  XXM   0000  7 ZZ
10 0000 FFFF   XXL  ALU=AandB  XXM   0000  8 ZZ
11 FFFF FFFF   XXL  ALU=AandB  XXM   FFFF  9 ZZ
12 A3E4 8252   XXL  ALU=AandB  XXM   8240  A ZZ
13
14 DECIMAL
15

SCR #13
 0 CR CR ." SIXTH TEST OF ALU FUNCTIONALITY" CR
 1 HEX
 2 0000    0  XXL  ALU=A-1  XXM   FFFF  1 ZZ
 3 1000    0  XXL  ALU=A-1  XXM   0FFF  2 ZZ
 4 1234    0  XXL  ALU=A-1  XXM   1233  3 ZZ
 5 8000    0  XXL  ALU=A-1  XXM   7FFF  4 ZZ
 6
 7 0000    0  XXL  ALU=A+1  XXM   0001  5 ZZ
 8 FFFF    0  XXL  ALU=A+1  XXM   0000  6 ZZ
 9 1234    0  XXL  ALU=A+1  XXM   1235  7 ZZ
10 00FF    0  XXL  ALU=A+1  XXM   0100  8 ZZ
11
12 DECIMAL
13
14
15

SCR #14
 0 CR CR ." SEVENTH TEST OF ALU FUNCTIONALITY" CR
 1 HEX
 2 0000 0000   XXL  ALU=A-B-1  XXM   FFFF  1 ZZ
 3 0010 000F   XXL  ALU=A-B-1  XXM   0000  2 ZZ
 4 8000 7FFF   XXL  ALU=A-B-1  XXM   0000  3 ZZ
 5 1234 5678   XXL  ALU=A-B-1  XXM   BBBB  4 ZZ
 6 7612 176F   XXL  ALU=A-B-1  XXM   5EA2  5 ZZ
 7
 8 0000 0000   XXL  ALU=A-B    XXM   0000  6 ZZ
 9 0010 000F   XXL  ALU=A-B    XXM   0001  7 ZZ
10 8000 8000   XXL  ALU=A-B    XXM   0000  8 ZZ
11 1234 5678   XXL  ALU=A-B    XXM   BBBC  9 ZZ
12 7612 176F   XXL  ALU=A-B    XXM   5EA3  A ZZ
13
14 DECIMAL
15

SCR #15
 0 CR CR ." EIGHTH TEST OF ALU FUNCTIONALITY" CR
 1 HEX
 2 0000 0000   XXL  ALU=A+B+1  XXM   0001  1 ZZ
 3 EEEE 111F   XXL  ALU=A+B+1  XXM   000E  2 ZZ
 4 8000 7FFF   XXL  ALU=A+B+1  XXM   0000  3 ZZ
 5 1234 5678   XXL  ALU=A+B+1  XXM   68AD  4 ZZ
 6 7612 176F   XXL  ALU=A+B+1  XXM   8D82  5 ZZ
 7
 8 0000 0000   XXL  ALU=A+B    XXM   0000  6 ZZ
 9 0002 000F   XXL  ALU=A+B    XXM   0011  7 ZZ
10 EEEE 111F   XXL  ALU=A+B    XXM   000D  8 ZZ
```

```
 11 1234 5678   XXL   ALU=A+B      XXM    68AC  9 ZZ
 12 7612 176F   XXL   ALU=A+B      XXM    6D81  A ZZ
 13
 14 DECIMAL
 15

SCR #16
  0 CR CR ." NINTH TEST OF ALU FUNCTIONALITY" CR
  1 HEX
  2 0000    0   XXL   ALU=A+A+1    XXM    0001  1 ZZ
  3 FFFF    0   XXL   ALU=A+A+1    XXM    FFFF  2 ZZ
  4 01FF    0   XXL   ALU=A+A+1    XXM    03FF  3 ZZ
  5 1234    0   XXL   ALU=A+A+1    XXM    2469  4 ZZ
  6 C612    0   XXL   ALU=A+A+1    XXM    8C25  5 ZZ
  7
  8 0000    0   XXL   ALU=A+A      XXM    0000  6 ZZ
  9 FFFF    0   XXL   ALU=A+A      XXM    FFFE  7 ZZ
 10 01FF    0   XXL   ALU=A+A      XXM    03FE  8 ZZ
 11 1234    0   XXL   ALU=A+A      XXM    2468  9 ZZ
 12 C612    0   XXL   ALU=A+A      XXM    8C24  A ZZ
 13
 14 DECIMAL
 15

SCR #17
  0 CR CR ." DP TEST" CR
  1 HEX
  2 : XXN    0 :: DEST=DP   ;SET   X! ;
  3 : XXP    1 :: SOURCE=DP ;SET   X@ ;
  4
  5 00  XXN  XXP    00FF AND    0000  1 ZZ
  6 FF  XXN  XXP    00FF AND    00FF  2 ZZ
  7
  8 00  XXN  0 :: INC[DP] ;DO   XXP  00FF AND  0001  3 ZZ
  9 0F  XXN  0 :: INC[DP] ;DO   XXP  00FF AND  0010  4 ZZ
 10 FF  XXN  0 :: INC[DP] ;DO   XXP  00FF AND  0000  5 ZZ
 11
 12 00  XXN  0 :: DEC[DP] ;DO   XXP  00FF AND  00FF  6 ZZ
 13 10  XXN  0 :: DEC[DP] ;DO   XXP  00FF AND  000F  7 ZZ
 14 FF  XXN  0 :: DEC[DP] ;DO   XXP  00FF AND  00FE  8 ZZ
 15 DECIMAL

SCR #18
  0 CR CR ." RP TEST" CR
  1 HEX
  2 : XXQ    0 :: DEST=RP   ;SET   X! ;
  3 : XXR    1 :: SOURCE=RP ;SET   X@ ;
  4
  5 00  XXQ  XXR    00FF AND    0000  1 ZZ
  6 FF  XXQ  XXR    00FF AND    00FF  2 ZZ
  7
  8 00  XXQ  0 :: INC[RP] ;DO   XXR  00FF AND  0001  3 ZZ
  9 0F  XXQ  0 :: INC[RP] ;DO   XXR  00FF AND  0010  4 ZZ
 10 FF  XXQ  0 :: INC[RP] ;DO   XXR  00FF AND  0000  5 ZZ
 11
 12 00  XXQ  0 :: DEC[RP] ;DO   XXR  00FF AND  00FF  6 ZZ
 13 10  XXQ  0 :: DEC[RP] ;DO   XXR  00FF AND  000F  7 ZZ
 14 FF  XXQ  0 :: DEC[RP] ;DO   XXR  00FF AND  00FE  8 ZZ
 15 DECIMAL
```

```
SCR #19
   0 CR CR ." DS TEST"   CR
   1 HEX
   2 : XXS    0 :: DEST=DP  ;SET   X!      1 :: DEST=DS   ;SET  X!  ;
   3 : XXT    2 :: DEST=DP  ;SET   X!      3 :: SOURCE=DS ;SET  X@  ;
   4
   5 : XXU
   6        100 0 DO    I   OF7 * I  +    I   XXS     LOOP
   7        100 0 DO    I   XXT     I  OF7 * I  +    I   ZZ     LOOP  ;
   8
   9 ." PLEASE WAIT..."   CR
  10 XXU
  11
  12
  13
  14
  15 DECIMAL

SCR #20
   0 CR CR ." RS TEST"   CR
   1 HEX
   2 : XXW    0 :: DEST=RP  ;SET   X!      1 :: DEST=RS   ;SET  X!  ;
   3 : XXX    2 :: DEST=RP  ;SET   X!      3 :: SOURCE=RS ;SET  X@  ;
   4
   5 : XXY
   6        100 0 DO    I   OF7 * I  +    I   XXW     LOOP
   7        100 0 DO    I   XXX     I  OF7 * I  +    I   ZZ     LOOP  ;
   8
   9 ." PLEASE WAIT..."   CR
  10 XXY
  11
  12
  13
  14
  15 DECIMAL

SCR #21
   0 CR CR ." PC TEST"   CR
   1 HEX
   2 : YYA    0 :: ALU=A   DEST=PC  ;SET   X!  ;
   3 : YYB    2 :: END ;DO
   4          3 :: SOURCE=PCSAVE   ;SET   X@  ;
   5
   6 0000  YYA   YYB      0000  1 ZZ
   7 FFFF  YYA   YYB      FFFF  2 ZZ
   8 7654  YYA   YYB      7654  3 ZZ
   9
  10 00FE  YYA   0 :: INC[PC] ;DO    YYB    00FF    4 ZZ
  11 0FFF  YYA   0 :: INC[PC] ;DO    YYB    1000    5 ZZ
  12 FFFF  YYA   0 :: INC[PC] ;DO    YYB    0000    6 ZZ
  13 1FFF  YYA   0 :: END ;DO
  14              1 :: SOURCE=PCSAVE ;SET   X@ 1FFF   7 ZZ
  15 DECIMAL

SCR #22
   0 CR CR ." RAM TEST"   CR
   1 HEX
   2 : YYC   0 :: ALU=A DEST=PC  ;SET   X!   0 :: DEST=RAM  ;SET   X!  ;
   3 : YYD   0 :: ALU=A DEST=PC  ;SET   X!   0 :: SOURCE=RAM ;SET   X@ ;
   4
```

```
 5 : YYE    ( 256 CELL RAM TEST )
 6    DUP 100 +  OVER   DO   I    I  YYC   LOOP
 7    0   SWAP
 8    DUP 100 +  SWAP  DO   I   YYD  I =  +     LOOP
 9      100  ;
10
11 ." PLEASE WAIT..."  CR
12 0000    YYE      1 ZZ
13 0100    YYE      2 ZZ
14
15 DECIMAL

SCR #23
 0 CR CR ." MICRO-RAM TEST"  CR
 1 HEX
 2 : YYF    ( 64 CELL RAM TEST )
 3    DUP 040 +  OVER   DO   I  I   I MZ!   LOOP
 4    0   SWAP
 5    DUP  040 +  SWAP  DO   I  MZ@    I = SWAP I = AND +   LOOP
 6      040  ;
 7
 8 ." PLEASE WAIT..."  CR
 9 0000    YYF      1 ZZ
10 0040    YYF  ·   2 ZZ
11
12
13
14 DECIMAL
15

SCR #24
 0
 1
 2
 3
 4
 5
 6
 7
 8
 9
10
11
12
13
14
15

SCR #25
 0 \ FUNCTIONALITY TEST - PRIMITIVES
 1 DECIMAL
 2 : TEST  ( VALUE VALUE -> )
 3    = IF ." OK "   ELSE   ." ***** FAILED ***** "  THEN  ;
 4
 5
 6 26 33 THRU
 7
 8
 9
10
```

```
 11
 12
 13
 14
 15

SCR #26
  0 \ TEST STATUS AND DLO
  1 HEX   MICRO-ASSEMBLER    STOP
  2 CR CR ." STATUS REGISTER: "
  3 0 :: DEST=STATUS ;SET       87 X!
  4 3EA P@ .                    87 TEST              CR
  5
  6 CR CR ." DLO: "
  7 0 :: DEST=DLO   ;SET        97E8 X!
  8 1 :: SOURCE=DLO ;SET        X@    97E8 TEST
  9
 10 2 :: SL[DLO]   ;DO
 11 3 :: SOURCE=DLO ;SET    X@ FFFE AND   2FD0 TEST
 12
 13 4 :: SR[DLO]   ;DO
 14 5 :: SOURCE=DLO ;SET    X@ 7FFF AND 17E8 TEST    CR
 15 DECIMAL

SCR #27
  0 \ TEST DHI
  1 HEX    STOP
  2 CR CR  ." DHI: "
  3 0 :: ALU=A  DEST=DHI  ;SET       1234 X!
  4 1 :: SOURCE=ALU ALU=B  ;SET      X@   1234 TEST
  5
  6 2 :: SL[DHI]  ;DO
  7 3 :: SOURCE=ALU ALU=B  ;SET      X@ FFFE AND    2468 TEST
  8
  9 4 :: SR[DHI]  ;DO
 10 5 :: SOURCE=ALU ALU=B  ;SET      X@ 7FFF AND 1234 TEST    CR
 11
 12
 13
 14
 15 DECIMAL

SCR #28
  0 \ TEST ALU
  1 HEX    STOP
  2 CR CR  ." ALU: "
  3 0 :: ALU=-1   DEST=DHI  ;DO
  4 1 :: ALU=AxorB DEST=DHI  ;SET     1234 X!
  5 3 :: SOURCE=ALU ALU=B  ;SET  X@   EDCB TEST
  6
  7 4 :: ALU=A+B+1  DEST=DHI ;SET  234 X!
  8 5 :: SOURCE=ALU ALU=B ;SET  X@   F000 TEST   CR
  9
 10
 11
 12
 13 DECIMAL
 14
 15
```

```
SCR #29
   0 \ TEST DP AND DS
   1 HEX    STOP
   2 CR CR  ." DP/DS: "
   3 0 :: DEST=DP  ;SET     14 X!
   4 1 :: SOURCE=DP ;SET   X@   FF AND   14 TEST
   5
   6 2 :: DEST=DS  INC[DP]  ;SET
   7         4309 X!  2280 X!  5077 X!  0266 X!  FF55 X!  44FF X!
   8 0 :: SOURCE=DP ;SET   X@   FF AND   1A TEST
   9 0 :: DEC[DP] ;DO
  10 : QQ   MICRO-ASSEMBLER   3 :: SOURCE=DS ;SET    X@    TEST
  11         4 :: DEC[DP]  ;DO   ;
  12
  13   44FF QQ  FF55 QQ  0266 QQ  5077 QQ  2280 QQ  4309 QQ   CR
  14
  15 DECIMAL

SCR #30
   0 \ TEST RP AND RS
   1 HEX    STOP
   2 CR CR  ." RP/RS: "
   3 0 :: DEST=RP  ;SET     0F X!
   4 1 :: SOURCE=RP ;SET   X@   FF AND   0F TEST
   5
   6 2 :: DEST=RS  INC[RP]  ;SET
   7         4309 X!  2280 X!  5077 X!  0266 X!  FF55 X!  44FF X!
   8 0 :: SOURCE=RP ;SET   X@   FF AND   15 TEST
   9 0 :: DEC[RP] ;DO
  10 : WW   MICRO-ASSEMBLER   3 :: SOURCE=RS ;SET    X@    TEST
  11         4 :: DEC[RP]  ;DO   ;
  12
  13   44FF WW  FF55 WW  0266 WW  5077 WW  2280 WW  4309 WW   CR
  14
  15 DECIMAL

SCR #31
   0 \ TEST PC
   1 HEX    STOP
   2 CR CR  ." PC: "
   3 0 :: ALU=A  DEST=PC  ;SET     EA45 X!
   4
   5 3 :: END ;DO
   6 4 :: SOURCE=PCSAVE  ;SET    X@   EA45 TEST
   7
   8 FFFF 000F Z!
   9 4 :: ALU=A  DEST=PC  ;SET     000F X!
  10 2 :: INC[PC]  ;DO     3 :: END ;DO
  11 5 :: SOURCE=PCSAVE  ;SET    X@   0010 TEST             CR
  12
  13
  14 DECIMAL
  15

SCR #32
   0 \ PROGRAM RAM TEST
   1 HEX    STOP
   2 CR CR  ." PROGRAM RAM TEST: "
   3 1234   0 Z!       9876   1 Z!       8765   2 Z!     0   3 Z!
   4 FFFF   4 Z!       ACDE 1FFF Z!
   5
```

```
  6  0 Z@    1234 TEST              1 Z@    9876 TEST
  7  2 Z@    8765 TEST              3 Z@       0 TEST
  8  4 Z@    FFFF TEST           1FFF Z@    ACDE TEST
  9
 10 CR
 11
 12 DECIMAL
 13
 14
 15

SCR #33
  0 \ MICRO-PROGRAM RAM TEST
  1 HEX    STOP
  2 CR CR ." MICRO-PROGRAM RAM TEST: "
  3 12345678.  0 MZ!          987654.  1 MZ!     ABCDEF09.  2 MZ!
  4 FFFFFFFF.  3 MZ!               0.  4 MZ!     AAAAAAAA.  5 MZ!
  5 55555555.  6 MZ!        12121212.  7 MZ!     78787856.  8 MZ!
  6
  7  0 MZ@    1234 TEST   5678 TEST     1 MZ@     98 TEST   7654 TEST
  8  2 MZ@    ABCD TEST   EF09 TEST     3 MZ@   FFFF TEST   FFFF TEST
  9  4 MZ@       0 TEST      0 TEST     5 MZ@   AAAA TEST   AAAA TEST
 10  6 MZ@    5555 TEST   5555 TEST     7 MZ@   1212 TEST   1212 TEST
 11  8 MZ@    7878 TEST   7856 TEST
 12
 13 DECIMAL
 14
 15

SCR #34
  0
  1
  2
  3
  4
  5
  6
  7
  8
  9
 10
 11
 12
 13
 14
 15

SCR #35
  0 \  STRESS TEST LOAD SCREEN
  1 DECIMAL
  2 2  CONSTANT REPS
  3 ." STRESS TEST.   ITERATIONS = "  REPS .
  4 CR CR
  5 36 90 THRU
  6
  7
  8
  9
 10
```

```
11
12
13
14
15

SCR #36
  0 \ MICROCODE TESTING      #DO #LOOP
  1 DECIMAL
  2 : X#LOOP
  3     1 2 3 4 5
  4       REPS  #DO  0    -1 #DO
  5           1 +  #LOOP
  6           -1 = NOT ABORT" #LOOPA"
  7             ." ."  ?TERMINAL ABORT" BREAK"    #LOOP
  8     CR . . . . . CR ;
  9
 10 X#LOOP
 11
 12
 13
 14
 15

SCR #37
  0 \ MICROCODE TESTING      DOVAR   DOCON
  1 DECIMAL
  2 1234 CONSTANT CONA
  3 VARIABLE VARA
  4
  5 : XVARCON
  6     1 2 3 4 5
  7       REPS  #DO       -1 #DO
  8         CONA VARA !   VARA @ CONA = NOT  ABORT" DOVAR/DOCON"
  9         0 VARA !
 10       #LOOP ." ."  ?TERMINAL ABORT" BREAK"    #LOOP
 11     CR . . . . . CR ;
 12
 13 XVARCON
 14
 15

SCR #38
  0 \ MICROCODE TESTING      ABORT"
  1 DECIMAL
  2 : XABORT
  3     1 2 3 4 5
  4       REPS  #DO                -1 #DO
  5           1 NOT  ABORT" ABORTA"
  6           0 ABORT" ABORTB"
  7       #LOOP ." ."  ?TERMINAL ABORT" BREAK"    #LOOP
  8     CR . . . . . CR ;
  9
 10 XABORT
 11
 12
 13
 14
 15
```

```
SCR #39
   0 \ MICROCODE TESTING       =
   1 DECIMAL
   2 : X=
   3     1 2 3 4 5
   4     REPS   #DO                         -1 #DO
   5         5              DUP =  NOT   ABORT" =A"
   6         5     5            =  NOT   ABORT" =B"
   7         5     6            =         ABORT" =C"
   8     #LOOP  ." ."  ?TERMINAL ABORT" BREAK"    #LOOP
   9     CR . . . . .  CR ;
  10
  11 X=
  12
  13
  14
  15

SCR #40
   0 \ MICROCODE TESTING       + -
   1 DECIMAL
   2 : X+-
   3     1 2 3 4 5
   4     REPS   #DO      -1 #DO
   5         1234 5678 +  6912 = NOT   ABORT" +"
   6         1234 5678 - -4444 = NOT   ABORT" -"
   7     #LOOP  ." ."  ?TERMINAL ABORT" BREAK"    #LOOP
   8     CR . . . . .  CR ;
   9
  10 X+-
  11
  12
  13
  14
  15

SCR #41
   0 \ MICROCODE TESTING       +!
   1 DECIMAL
   2 VARIABLE VARB
   3 : X+!
   4     1 2 3 4 5
   5     REPS  #DO  1234 DUP VARB !   -1 #DO
   6         I +        I  VARB  +!
   7         DUP   VARB @ = NOT  ABORT" +!"
   8     #LOOP DROP ." ."  ?TERMINAL ABORT" BREAK"    #LOOP
   9     CR . . . . .  CR ;
  10
  11 X+!
  12
  13
  14
  15

SCR #42
   0 \ MICROCODE TESTING       -ROT
   1 DECIMAL
   2 : X-ROT
   3     1 2 3 4 5
   4     REPS   #DO                         -1 #DO
```

```
  5         1111 2222 3333      -ROT
  6         2222 = NOT  ABORT" -ROTA"
  7         1111 = NOT  ABORT" -ROTB"
  8         3333 = NOT  ABORT" -ROTC"
  9    #LOOP  ." ."  ?TERMINAL ABORT" BREAK"     #LOOP
 10    CR . . . . .   CR ;
 11
 12 X-ROT
 13
 14
 15

SCR #43
  0 \ MICROCODE TESTING         ROT
  1 DECIMAL
  2 : XROT
  3    1 2 3 4 5
  4    REPS  #DO                           -1 #DO
  5         1111 2222 3333      ROT
  6         1111 = NOT  ABORT" ROTA"
  7         3333 = NOT  ABORT" ROTB"
  8         2222 = NOT  ABORT" ROTC"
  9    #LOOP  ." ."  ?TERMINAL ABORT" BREAK"     #LOOP
 10    CR . . . . .   CR ;
 11
 12 XROT
 13
 14
 15

SCR #44
  0 \ MICROCODE TESTING         0    OBRANCH   BRANCH
  1 DECIMAL
  2 : X0
  3    1 2 3 4 5
  4    REPS  #DO                           -1 #DO
  5        0 IF  1 ABORT" OBRANCH"  THEN
  6        1 IF  ELSE  1 ABORT" BRANCH"  THEN
  7    #LOOP  ." ."  ?TERMINAL ABORT" BREAK"     #LOOP
  8    CR . . . . .   CR ;
  9
 10 X0
 11
 12
 13
 14
 15

SCR #45
  0 \ MICROCODE TESTING    .    1+   1-   2*
  1 HEX
  2 : X1
  3    1 2 3 4 5
  4    REPS  #DO                           -1 #DO
  5         7FFF  1+   8000 = NOT  ABORT" 1+"
  6         0000  1-   FFFF = NOT  ABORT" 1-"
  7         3FFF  2*   7FFE = NOT  ABORT" 2*"
  8    #LOOP  ." ."  ?TERMINAL ABORT" BREAK"     #LOOP
  9    CR . . . . .   CR ;
 10 DECIMAL
```

```
 11 X1
 12
 13
 14
 15

SCR #46
  0 \ MICROCODE TESTING         <
  1 DECIMAL
  2 : X<
  3    1 2 3 4 5
  4    REPS  #DO                        -1 #DO
  5       5 6 <   NOT   ABORT" <A"
  6       5 5 <         ABORT" <B"
  7    #LOOP  ." ."  ?TERMINAL ABORT" BREAK"    #LOOP
  8    CR . . . . .  CR ;
  9
 10 X<
 11
 12
 13
 14
 15

SCR #47
  0 \ MICROCODE TESTING       DO +LOOP
  1 DECIMAL
  2 : X+LOOP
  3    1 2 3 4 5
  4    REPS  #DO  0    20000 -10000   DO
  5       1 + 3 +LOOP
  6       10000 = NOT ABORT" +LOOPA"
  7           ." ."  ?TERMINAL ABORT" BREAK"    #LOOP
  8    CR . . . . .  CR ;
  9
 10 X+LOOP
 11
 12
 13
 14
 15

SCR #48
  0 \ MICROCODE TESTING       DO /LOOP
  1 DECIMAL
  2 : X/LOOP
  3    1 2 3 4 5
  4    REPS  #DO  0    -1000 0   DO
  5       1 + 3 /LOOP
  6       21512 = NOT ABORT" /LOOPA"
  7           ." ."  ?TERMINAL ABORT" BREAK"    #LOOP
  8    CR . . . . .  CR ;
  9
 10 X/LOOP
 11
 12
 13
 14
 15
```

```
SCR #49
   0 \ MICROCODE TESTING      DO   LOOP
   1 DECIMAL
   2 : XLOOP
   3     1 2 3 4 5
   4       REPS  #DO  0   20000 -10000   DO
   5           1 +    LOOP
   6            30000 = NOT ABORT" LOOPA"
   7             ." ."  ?TERMINAL ABORT" BREAK"    #LOOP
   8     CR . . . . .   CR ;
   9
  10 XLOOP
  11
  12
  13
  14
  15

SCR #50
   0 \ MICROCODE TESTING      AND   OR   XOR
   1 HEX
   2 : XAOX
   3     1 2 3 4 5
   4       REPS  #DO             -1 #DO
   5          05AF 5AF0  AND    00A0 = NOT   ABORT" AND"
   6          05AF 5AF0  OR     5FFF = NOT   ABORT" OR"
   7          05AF 5AF0  XOR    5F5F = NOT   ABORT" XOR"
   8       #LOOP ." ."  ?TERMINAL ABORT" BREAK"    #LOOP
   9     CR . . . . .   CR ;
  10 DECIMAL
  11 XAOX
  12
  13
  14
  15

SCR #51
   0 \ MICROCODE TESTING      D@   D!
   1 DECIMAL
   2 VARIABLE VARC      1 ALLOT
   3 : XD@!
   4     1 2 3 4 5
   5       REPS  #DO           -1 #DO
   6          1234 5678   VARC  D!
   7          VARC D@            5678 = NOT   ABORT" D@!A"
   8                             1234 = NOT   ABORT" D@!B"
   9       #LOOP ." ."  ?TERMINAL ABORT" BREAK"    #LOOP
  10     CR . . . . .   CR ;
  11
  12 XD@!
  13
  14
  15

SCR #52
   0 \ MICROCODE TESTING      D+
   1 HEX
   2 : XD+
   3     1 2 3 4 5
   4       REPS  #DO           -1 #DO
   5          12345678. 456FFA2.  D+
```

```
 6        168B = NOT  ABORT" D+A"
 7        561A = NOT  ABORT" D+B"
 8   #LOOP ." ."  ?TERMINAL ABORT" BREAK"    #LOOP
 9   CR . . . . .  CR ;
10 DECIMAL
11 XD+
12
13
14
15

SCR #53
 0 \ MICROCODE TESTING     DSWAP  DDROP DDUP
 1 DECIMAL
 2 : XDD
 3    1 2 3 4 5
 4     REPS  #DO       -1 #DO
 5      I I 100 +     1111 2222 DSWAP   DDUP
 6      I 100 + = NOT  ABORT" DDA"   I = NOT ABORT" DDB"
 7      DSWAP DDROP
 8      I 100 + = NOT  ABORT" DDC"   I = NOT ABORT" DDD"
 9   #LOOP ." ."  ?TERMINAL ABORT" BREAK"    #LOOP
10   CR . . . . .  CR ;
11
12 XDD
13
14
15

SCR #54
 0 \ MICROCODE TESTING    DUP   DROP   SWAP   OVER
 1 HEX
 2 : XDDSO
 3    1 2 3 4 5
 4     REPS  #DO       -1 #DO
 5      I   1234   OVER  SWAP   DROP
 6      = NOT  ABORT" DDSO"
 7   #LOOP ." ."  ?TERMINAL ABORT" BREAK"    #LOOP
 8   CR . . . . .  CR ;
 9 DECIMAL
10 XDDSO
11
12
13
14
15

SCR #55
 0 \ MICROCODE TESTING     NEGATE   NOT
 1 HEX
 2 : XNN
 3    1 2 3 4 5
 4     REPS  #DO       -1 #DO
 5       0 NEGATE   ABORT" NEGATEA"
 6     -5678 NEGATE  5678 = NOT  ABORT" NEGATEB"
 7      1234 NEGATE -1234 = NOT  ABORT" NEGATEC"
 8      1 NOT NOT          NOT  ABORT" NOTA"
 9      0    NOT           NOT  ABORT" NOTB"
10   #LOOP ." ."  ?TERMINAL ABORT" BREAK"    #LOOP
11   CR . . . . .  CR ;
```

```
12 DECIMAL
13 XNN
14
15

SCR #56
  0 \ MICROCODE TESTING        TOGGLE
  1 DECIMAL
  2 VARIABLE VARF
  3 : XTOGGLE
  4     1 2 3 4 5
  5     REPS  #DO   1234 DUP VARF !  ` -1 #DO
  6       I XOR    VARF  I TOGGLE
  7       DUP   VARF @ = NOT ABORT" TOGGLE"
  8    #LOOP  DROP ." ."  ?TERMINAL ABORT" BREAK"    #LOOP
  9    CR . . . . .  CR ;
 10
 11 XTOGGLE
 12
 13
 14
 15

SCR #57
  0 \ MICROCODE TESTING        U*             JMP=xxCC
  1 DECIMAL
  2 : XU*
  3     1 2 3 4 5
  4     REPS  #DO     -1 #DO
  5       1234  5678  U*
  6        106   = NOT ABORT" U*A"
  7       -5700 = NOT ABORT" U*B"
  8    #LOOP ." ."  ?TERMINAL ABORT" BREAK"    #LOOP
  9    CR . . . . .  CR ;
 10
 11 XU*
 12
 13
 14
 15

SCR #58
  0 \ MICROCODE TESTING       RRC
  1 HEX
  2 : XRRC
  3     1 2 3 4 5
  4     REPS  #DO    -1 #DO
  5   0 1    RRC  0  = NOT ABORT" RRCA"   8000 = NOT ABORT" RRCB"
  6   1 0    RRC -1  = NOT ABORT" RRCC"    0   = NOT ABORT" RRCD"
  7 100 0    RRC  0  = NOT ABORT" RRCE"    80  = NOT ABORT" RRCF"
  8    #LOOP ." ."  ?TERMINAL ABORT" BREAK"    #LOOP
  9    CR . . . . .  CR ;
 10 DECIMAL
 11 XRRC
 12
 13
 14
 15
```

```
SCR #59
   0 \ MICROCODE TESTING      RLC
   1 HEX
   2 : XRLC
   3    1 2 3 4 5
   4     REPS #DO    -1 #DO
   5       0 1 RLC    0 = NOT ABORT" RLCA"      1 = NOT ABORT" RLCB"
   6    8000 0 RLC   -1 = NOT ABORT" RLCC"      0 = NOT ABORT" RLCD"
   7      80 0 RLC    0 = NOT ABORT" RLCE"    100 = NOT ABORT" RLCF"
   8    #LOOP ." ."  ?TERMINAL ABORT" BREAK"    #LOOP
   9    CR . . . . . CR ;
  10 DECIMAL         .
  11 XRLC
  12
  13
  14
  15

SCR #60
   0 \ MICROCODE TESTING      ADC                    JMP=xxCA
   1 HEX
   2 : XADC
   3    1 2 3 4 5
   4     REPS #DO    -1 #DO
   5     0 0 1      ADC  0 = NOT ABORT" ADCA"      1 = NOT ABORT" ADCB"
   6  1234 5678 0 ADC    0 = NOT ABORT" ADCC"   68AC = NOT ABORT" ADCD"
   7  E234 5678 1 ADC   -1 = NOT ABORT" ADCE"   38AD = NOT ABORT" ADCF"
   8    #LOOP ." ."  ?TERMINAL ABORT" BREAK"    #LOOP
   9    CR . . . . . CR ;
  10 DECIMAL
  11 XADC
  12
  13
  14
  15

SCR #61
   0 \ MICROCODE TESTING      BYTESWAP
   1 HEX
   2 : XBS
   3    1 2 3 4 5
   4     REPS #DO    -1 #DO
   5        1234   BYTESWAP   3412 = NOT   ABORT" BYTESWAP"
   6    #LOOP ." ."  ?TERMINAL ABORT" BREAK"    #LOOP
   7    CR . . . . . CR ;
   8 DECIMAL
   9 XBS
  10
  11
  12
  13
  14
  15

SCR #62
   0 \ MICROCODE TESTING      >R R@   R>
   1 HEX
   2 : XRRR
   3    1 2 3 4 5
   4     REPS- #DO    -1 #DO
   5       1234    9876   >R       1234 = NOT   ABORT" >R"
   6       R@                      9876 = NOT   ABORT" R@"
   7       1234   R>               9876 = NOT   ABORT" R>A"
```

```
 8                             1234 = NOT  ABORT" R>B"
 9    #LOOP ." ."  ?TERMINAL ABORT" BREAK"     #LOOP
10    CR . . . . .   CR ;
11 DECIMAL
12 XRRR
13
14
15

SCR #63
 0 \ MICROCODE TESTING       U/MOD
 1 DECIMAL
 2 : X-UM
 3    1 2 3 4 5
 4     REPS  #DO    -1 #DO
 5         123 5678  19876 U/MOD
 6         18721 = NOT ABORT" U/MODA"
 7         14935 = NOT ABORT" U/MODB"
 8    #LOOP ." ."  ?TERMINAL ABORT" BREAK"     #LOOP
 9    CR . . . . .   CR ;
10
11 X-UM
12
13
14
15

SCR #64
 0 \ MICROCODE TESTING       0=         JMP=xxE
 1 DECIMAL
 2 : X-0=
 3    1 2 3 4 5
 4     REPS  #DO    -1 #DO
 5         0    0= 0=      ABORT" 0=A"
 6            123 0=        ABORT" 0=B"
 7    #LOOP ." ."  ?TERMINAL ABORT" BREAK"     #LOOP
 8    CR . . . . .   CR ;
 9
10 X-0=
11
12
13
14
15

SCR #65
 0 \ MICROCODE TESTING       <PICK>
 1 DECIMAL
 2 : X-PICK
 3    1 2 3 4 5
 4     REPS  #DO    -1 #DO
 5         4 PICK  2 = NOT   ABORT" <PICK>"
 6    #LOOP ." ."  ?TERMINAL ABORT" BREAK"    #LOOP
 7    CR . . . . .   CR ;
 8
 9 X-PICK
10
11
12
13
14
15
```

```
SCR #66
   0 \ MICROCODE TESTING     <ROLL>
   1 DECIMAL
   2 : X-ROLL
   3    1 2 3 4 5
   4    REPS  #DO    -1 #DO
   5        1111 2222   2 <ROLL>
   6        1111 = NOT   ABORT" <ROLL>A"
   7        2222 = NOT   ABORT" <ROLL>B"
   8    #LOOP ." ." ?TERMINAL ABORT" BREAK"   #LOOP
   9    CR . . . . . CR ;
  10
  11 X-ROLL
  12
  13
  14
  15

SCR #67
   0 \ MICROCODE TESTING     ?DUP
   1 DECIMAL
   2 : X-QDUP
   3    1 2 3 4 5
   4    REPS  #DO    -1 #DO
   5        1313  0 ?DUP   ABORT" ?DUPA"   1313 = NOT ABORT" ?DUPB"
   6        13131  99 ?DUP
   7         99 = NOT  ABORT" ?DUPC"    99 = NOT ABORT" ?DUPD"
   8        13131 = NOT  ABORT" ?DUPE"
   9    #LOOP ." ." ?TERMINAL ABORT" BREAK"   #LOOP
  10    CR . . . . . CR ;
  11
  12 X-QDUP
  13
  14
  15

SCR #68
   0 \ MICROCODE TESTING     S->D
   1 DECIMAL
   2 : X-SD
   3    1 2 3 4 5
   4    REPS  #DO    -1 #DO
   5        134  S->D   ABORT" S->DA"   134 = NOT ABORT" S->DB"
   6        -134 S->D -1 = NOT ABORT" S->DC" -134 = NOT ABORT" S->DD"
   7    #LOOP ." ." ?TERMINAL ABORT" BREAK"   #LOOP
   8    CR . . . . . CR ;
   9
  10 X-SD
  11
  12
  13
  14
  15

SCR #69
   0 \ MICROCODE TESTING     ABS
   1 DECIMAL
   2 : X-ABS
   3    1 2 3 4 5
   4    REPS  #DO    -1 #DO
```

```
  5         134   ABS   134 = NOT ABORT" ABSA"
  6        -134   ABS   134 = NOT ABORT" ABSB"
  7   #LOOP ." ."  ?TERMINAL ABORT" BREAK"      #LOOP
  8   CR . . . . . CR ;
  9
 10 X-ABS
 11
 12
 13
 14
 15

SCR #70
  0 \ MICROCODE TESTING  CMOVE
  1 DECIMAL
  2 CREATE TEXTD  10 ALLOT    CREATE TEXTE 10 ALLOT
  3 : X-CMOVE
  4    1 2 3 4 5
  5    1111 TEXTE !  2222 TEXTE 1+ !
  6     REPS #DO   3000 #DO
  7        0 TEXTD !  0 TEXTD 1+ !  0 TEXTD 2+ !  0 TEXTD 3 + !
  8        TEXTE  TEXTD 1+  2 CMOVE
  9        TEXTD @ ABORT" CMOVEA"   TEXTD 3 + @ ABORT" CMOVEB"
 10        TEXTD 1+ @  1111 = NOT ABORT" CMOVEC"
 11        TEXTD 2+ @  2222 = NOT ABORT" CMOVED"
 12   #LOOP ." ." ?TERMINAL ABORT" BREAK"     #LOOP
 13   CR . . . . . CR ;
 14 X-CMOVE
 15

SCR #71
  0 \ MICROCODE TESTING  2/
  1 DECIMAL
  2 : X-2/
  3    1 2 3 4 5
  4    REPS #DO     -1 #DO
  5      5 2/  2 = NOT ABORT" 2/A"
  6     -5 2/ -2 = NOT ABORT" 2/B"
  7     -6 2/ -3 = NOT ABORT" 2/C"
  8     -1 2/        ABORT" 2/D"
  9   #LOOP ." ." ?TERMINAL ABORT" BREAK"    #LOOP
 10   CR . . . . . CR ;
 11
 12 X-2/
 13
 14
 15

SCR #72
  0 \ MICROCODE TESTING   @  !
  1 DECIMAL
  2 VARIABLE VARXA
  3 : X-@!
  4    1 2 3 4 5
  5    REPS #DO     -1 #DO
  6     -1 VARXA !   VARXA @  -1 = NOT ABORT" !@A"
  7      0 VARXA !   VARXA @       ABORT" !@B"
  8   #LOOP ." ." ?TERMINAL ABORT" BREAK"    #LOOP
  9   CR . . . . CR ;
 10
```

```
11 X-@!
12
13
14
15

SCR #73
   0 \ MICROCODE TESTING   FILL
   1 DECIMAL
   2 CREATE TEXTF   10 ALLOT
   3 : XFILL
   4    1 2 3 4 5
   5     REPS #DO   3000 #DO
   6        0 TEXTF !   0 TEXTF 1+ !   0 TEXTF 2+ !   0 TEXTF 3 + !
   7        TEXTF 1+   2  12345  FILL
   8        TEXTF  @  ABORT" FILLA"    TEXTF 3 + @ ABORT" FILLB"
   9        TEXTF 1+ @   12345 = NOT ABORT" FILLC"
  10        TEXTF 2+ @   12345 = NOT ABORT" FILLD"
  11     #LOOP   ." ."  ?TERMINAL ABORT" BREAK"    #LOOP
  12     CR . . . . .   CR ;
  13 XFILL
  14
  15

SCR #74
   0 \ MICROCODE TESTING      DROT
   1 DECIMAL
   2 : XDROT
   3    1 2 3 4 5
   4     REPS  #DO                        -1 #DO
   5      11111111. 22222222. 33333333.     DROT
   6      11111111. D= NOT   ABORT" DROTA"
   7      33333333. D= NOT   ABORT" DROTB"
   8      22222222. D= NOT   ABORT" DROTC"
   9     #LOOP   ." ."   ?TERMINAL ABORT" BREAK"    #LOOP
  10     CR . . . . .   CR ;
  11
  12 XDROT
  13
  14
  15

SCR #75
   0 \ MICROCODE TESTING      TDUP
   1 DECIMAL
   2 : XTDUP
   3    1 2 3 4 5
   4     REPS  #DO   1111 2222 3333    -1 #DO
   5        TDUP
   6        3333 = NOT   ABORT" TDUPA"
   7        2222 = NOT   ABORT" TDUPB"
   8        1111 = NOT   ABORT" TDUPC"
   9     #LOOP   3333 = NOT   ABORT" TDUPD"
  10              2222 = NOT   ABORT" TDUPE"
  11              1111 = NOT   ABORT" TDUPF"
  12     ." ."  ?TERMINAL ABORT" BREAK"    #LOOP
  13     CR . . . . .   CR ;
  14
  15 XTDUP
```

```
SCR #76
   0 \ MICROCODE TESTING    DLSLN
   1 HEX
   2 : XDLSLN
   3     1 2 3 4 5
   4      REPS #DO      -1 #DO
   5         1     0     01F     DLSLN
   6         80000000.       D=      NOT      ABORT" DLSLN"
   7      #LOOP ." ."  ?TERMINAL ABORT" BREAK"    #LOOP
   8      CR . . . . .  CR ;
   9
  10 DECIMAL
  11 XDLSLN
  12
  13
  14
  15

SCR #77
   0 \ MICROCODE TESTING    DLSRN
   1 HEX
   2 : XDLSRN
   3     1 2 3 4 5
   4      REPS #DO      -1 #DO
   5         8FFF0F0F. 1F DLSRN  1. D= NOT ABORT" DLSRN"
   6      #LOOP ." ."  ?TERMINAL ABORT" BREAK"  . #LOOP
   7      CR . . . . .  CR ;
   8
   9 DECIMAL
  10 XDLSRN
  11
  12
  13
  14
  15

SCR #78
   0 \ MICROCODE TESTING       Q+
   1 HEX
   2 : XQ+
   3     1 2 3 4 5
   4      REPS #DO                                 -1 #DO
   5         99999999. 5555EEEE. AAAAAAAA. 22227777. Q+
   6         77786666.   D=   NOT    ABORT" Q+A"
   7         44444443.   D=   NOT    ABORT" Q+B"
   8      #LOOP ." ."  ?TERMINAL ABORT" BREAK"    #LOOP
   9      CR . . . . .  CR ;
  10 DECIMAL
  11 XQ+
  12
  13
  14
  15

SCR #79
   0 \ MICROCODE TESTING       QLSL
   1 HEX
   2 : XQLSL
   3     1 2 3 4 5
   4      REPS #DO                           -1 #DO
```

```
  5        80028001. 90080004.  QLSL
  6        20100009.         D= NOT   ABORT" QLSLA"
  7        00050002.         D= NOT   ABORT" QLSLB"
  8   #LOOP ." ." ?TERMINAL ABORT" BREAK"       #LOOP
  9   CR . . . . .  CR ;
 10 DECIMAL
 11 XQLSL
 12
 13
 14
 15

SCR #80
  0 \ MICROCODE TESTING    DNEGATE
  1 HEX
  2 : XDNEGATE
  3    1 2 3 4 5
  4     REPS. #DO      -1 #DO
  5       0. DNEGATE OR   ABORT" DNEGATEA"
  6     -56789ABC. DNEGATE  56789ABC. D= NOT   ABORT" DNEGATEB"
  7      1234ABCD. DNEGATE -1234ABCD. D= NOT   ABORT" DNEGATEC"
  8   #LOOP ." ." ?TERMINAL ABORT" BREAK"       #LOOP
  9   CR . . . . .  CR ;
 10 DECIMAL
 11 XDNEGATE
 12
 13
 14
 15

SCR #81
  0 \ MICROCODE TESTING    DLSR
  1 HEX
  2 : XDLSR
  3    1 2 3 4 5
  4     REPS #DO      -1 #DO
  5       84219412. DLSR 4210C209. D= NOT ABORT" DLSR"
  6   #LOOP ." ." ?TERMINAL ABORT" BREAK"       #LOOP
  7   CR . . . . .  CR ;
  8
  9 DECIMAL
 10 XDLSR
 11
 12
 13
 14
 15

SCR #82
  0 \ MICROCODE TESTING    LSR
  1 HEX
  2 : XLSR
  3    1 2 3 4 5
  4     REPS #DO      -1 #DO
  5       8412 LSR   4209  = NOT ABORT" LSR"
  6   #LOOP ." ." ?TERMINAL ABORT" BREAK"       #LOOP
  7   CR . . . . .  CR ;
  8
  9 DECIMAL
 10 XLSR
```

```
 11
 12
 13
 14
 15

SCR #83
  0 \ MICROCODE TESTING    ASR
  1 HEX
  2 : XASR
  3    1 2 3 4 5
  4     REPS #DO      -1 #DO
  5       8412 ASR   C209  = NOT ABORT" ASRA"
  6       4412 ASR   2209  = NOT ABORT" ASRB"
  7     #LOOP ." ."  ?TERMINAL ABORT" BREAK"     #LOOP
  8     CR . . . . .  CR ;
  9
 10 DECIMAL
 11 XASR
 12
 13
 14
 15

SCR #84
  0 \ MICROCODE TESTING       O<           JMP=xxS
  1 DECIMAL
  2 : XO<
  3    1 2 3 4 5
  4     REPS #DO      -1 #DO
  5         -10   O< O=    ABORT" O<A"
  6          10   O<       ABORT" O<B"
  7     #LOOP ." ."  ?TERMINAL ABORT" BREAK"     #LOOP
  8     CR . . . . .  CR ;
  9
 10 XO<
 11
 12
 13
 14
 15

SCR #85
  0 \ MICROCODE TESTING    LSLN
  1 HEX
  2 : XLSLN
  3    1 2 3 4 5
  4     REPS #DO      -1 #DO
  5        1   OF LSLN  8000 = NOT ABORT" LSLN"
  6     #LOOP ." ."  ?TERMINAL ABORT" BREAK"     #LOOP
  7     CR . . . . .  CR ;
  8
  9 DECIMAL
 10 XLSLN
 11
 12
 13
 14
 15
```

```
SCR #86
   0 \ MICROCODE TESTING    LSRN
   1 HEX
   2 : XLSRN
   3    1 2 3 4 5
   4      REPS #DO       -1 #DO
   5        8FA2 OF LSRN  1 = NOT ABORT" LSRN"
   6      #LOOP ." ."  ?TERMINAL ABORT" BREAK"      #LOOP
   7      CR . . . . .  CR ;
   8
   9 DECIMAL
  10 XLSRN
  11
  12
  13
  14
  15

SCR #87
   0 \ MICROCODE TESTING    I  I'  J
   1 HEX
   2 : XIIJ
   3    1 2 3 4 5
   4      REPS #DO       -1 #DO
   5        1111   2222    3333   >R >R >R       J   I'   I
   6        R>  = NOT ABORT" I"
   7        R>  = NOT ABORT" I'"
   8        R>  = NOT ABORT" J"
   9      #LOOP ." ."  ?TERMINAL ABORT" BREAK"      #LOOP
  10      CR . . . . .  CR ;
  11
  12 DECIMAL
  13 XIIJ
  14
  15

SCR #88
   0 \ MICROCODE TESTING    LIT
   1 HEX
   2 : XLIT
   3    1 2 3 4 5
   4      REPS #DO       -1 #DO
   5        1111   1111   2222 2222   3333 3333   4444 4444
   6        = NOT ABORT" LITA"
   7        = NOT ABORT" LITB"
   8        = NOT ABORT" LITC"
   9        = NOT ABORT" LITD"
  10      #LOOP ." ."  ?TERMINAL ABORT" BREAK"      #LOOP
  11      CR . . . . .  CR ;
  12
  13 DECIMAL
  14 XLIT
  15

SCR #89
   0 \ MICROCODE TESTING      QLSL2
   1 HEX
   2 : XQLSL2
   3    1 2 3 4 5
   4      REPS - #DO                              -1 #DO
```

```
 5      I I I I    QLSL  >R >R
 6      J J J J    J J J J    Q+   >R >R
 7                       D= NOT  ABORT" QLSL2A"
 8      R> R> R> R>     D= NOT  ABORT" QLSL2B"
 9  #LOOP  ." ."  ?TERMINAL ABORT" BREAK"      #LOOP
10  CR . . . . .   CR ;
11 DECIMAL
12 XQLSL2
13
14
15

SCR #90
 0 \ MICROCODE TESTING        <UDNORM>
 1 HEX
 2 : XUDNORM
 3    1 2 3 4 5
 4    REPS  #DO                              4000 #DO
 5    999 >R  10 >R   1 0     <UDNORM>
 6     R> -OE  = NOT  ABORT" <UDNORMA>"
 7     0 4000       D= NOT  ABORT" <UDNORMB>"
 8         999 R>    = NOT  ABORT" <UDNORMC>"
 9  #LOOP  ." ."  ?TERMINAL ABORT" BREAK"     #LOOP
10  CR . . . . .  CR ;
11 DECIMAL
12 XUDNORM
13
14
15

SCR #91
 0
 1
 2
 3
 4
 5
 6
 7
 8
 9
10
11
12
13
14
15

SCR #92
 0
 1
 2
 3
 4
 5
 6
 7
 8
 9
10
```

```
        11
        12
        13
        14
        15

SCR #93
    0
    1
    2
    3
    4
    5
    6
    7
    8
    9
   10
   11
   12
   13
   14
   15

SCR #94
    0
    1
    2
    3
    4
    5
    6
    7
    8
    9
   10
   11
   12
   13
   14
   15

SCR #95
    0 \   GENERAL EXERCISE TEST
    1 DECIMAL
    2 VARIABLE TESTVAR     10000 CONSTANT TEST2    20000 CONSTANT TEST3
    3 : TESTABORT   >R = NOT IF R@ . ." =FAILURE" THEN R> DROP ;
    4 : TESTX    1234 TESTVAR ! 2345 TEST2 !   3456 TEST3 !
    5      TESTVAR @   TEST2 @ +    TEST3 +!   TEST3 @   1 + 2 + 3 + 4 OR
    6         7045   1 TESTABORT ;
    7 : TESTA    12345    8765 U*   +     5640   2 TESTABORT ;
    8 : TESTB    9865   -321 /MOD  -     265   3 TESTABORT ;
    9 : TESTQ    0    2000 #DO   1+ #LOOP    2000   4 TESTABORT ;
   10 : TESTC    TESTA   TESTB    TESTQ       TESTX  ;
   11 : TEST    60000 0   DO    I U.   TESTC
   12        ?TERMINAL   ABORT" BREAK.."   1 /LOOP ;
   13 : FASTTEST   60000 0 DO     I 1023 AND 0= IF ." ." THEN
   14       TESTC   ?TERMINAL   ABORT" BREAK.."  1 /LOOP CR ;
   15 : LONGTEST    BEGIN  FASTTEST AGAIN ;
```

```
SCR #96
  0 \ SPEED TEST FOR HIGH LEVEL MATH OPERATIONS   ( USES D* D/ )
  1 DECIMAL
  2 : MTA    1234567. 987654. D*   DDROP ;
  3
  4 : MTB    9876543. 1234.   D/   DDROP ;
  5
  6 : MTC    1234567. -1234.  D+   DDROP ;
  7            \
  8 : MTD    MTA  MTB  MTC ;
  9
 10 : MTEST 1000 0 DO  MTD  LOOP ;
 11
 12
 13
 14
 15

SCR #97
  0
  1
  2
  3
  4
  5
  6
  7
  8
  9
 10
 11
 12
 13
 14
 15

SCR #98
  0 \ ERATOSTHENES SEIVE -- IBM PC VERSION        1K CELLS
  1 DECIMAL
  2 1024 CONSTANT QSIZE
  3 CREATE QFLAGS  1024 ALLOT
  4 : DO-PRIME  ( RESULT -> RESULT' )
  5    QFLAGS QSIZE  01  FILL
  6    1 QSIZE 0
  7    DO I QFLAGS +  C@
  8      IF 3 I + I + DUP I + QSIZE <
  9      IF QSIZE  QFLAGS +  OVER I +  QFLAGS +
 10      DO  0 I C!  DUP /LOOP
 11    THEN  DROP 1+
 12         THEN LOOP  OR ;
 13
 14 : 100-TIMES   0  100 0 DO   DO-PRIME  LOOP   . ." PRIMES" ;
 15

SCR #99
  0 \ ERATOSTHENES SEIVE -- BOARD VERSION        1K CELLS
  1 DECIMAL
  2 1024 CONSTANT QSIZE      999 BUFFER  CONSTANT QFLAGS
  3
  4 : DO-PRIME  ( RESULT -> RESULT' )
```

```
 5    QFLAGS QSIZE  01   FILL
 6    1  QSIZE  0
 7    DO I QFLAGS +   @
 8      IF  3 I +   I +   DUP I +   QSIZE <
 9      IF QSIZE  QFLAGS +  OVER I +   QFLAGS +
10        DO  0 I !  DUP /LOOP
11      THEN   DROP 1+
12          THEN  LOOP   OR  ;
13
14 : 100-TIMES   0  100 0 DO   DO-PRIME  LOOP    . ." PRIMES" ;
15

SCR #100
 0 \ ERATOSTHENES SEIVE -- IBM PC VERSION    8K CELLS
 1 DECIMAL
 2 8191 CONSTANT QSIZE         \ PRIMES FROM 3 THRU 16381
 3 CREATE QFLAGS  QSIZE ALLOT   10 ALLOT
 4 : DO-PRIME  ( RESULT -> RESULT' )
 5    QFLAGS QSIZE  01   FILL
 6    0  QSIZE  0
 7    DO I QFLAGS +   C@
 8      IF  I 2*  3 +   DUP I +   QSIZE <
 9      IF QSIZE  QFLAGS +  OVER I +   QFLAGS +
10        DO  0 I C!  DUP /LOOP
11      THEN   DROP 1+
12          THEN  LOOP   OR  ;
13
14 : 10-TIMES   0  10 0 DO   DO-PRIME  LOOP    . ." PRIMES" ;
15

SCR #101
 0 \ ERATOSTHENES SEIVE -- BOARD VERSION    8K CELLS
 1 DECIMAL
 2 8191 CONSTANT QSIZE         \ PRIMES FROM 3 THRU 16381
 3 CREATE QFLAGS  QSIZE ALLOT   10 ALLOT
 4 : DO-PRIME  ( RESULT -> RESULT' )
 5    QFLAGS QSIZE  01   FILL
 6    0  QSIZE  0
 7    DO I QFLAGS +   @
 8      IF  I 2*  3 +   DUP I +   QSIZE <
 9      IF QSIZE  QFLAGS +  OVER I +   QFLAGS +
10        DO  0 I !  DUP /LOOP
11      THEN   DROP 1+
12          THEN  LOOP   OR  ;
13
14 \ Approx 1.5 seconds for 10 iterations
15 : 10-TIMES   0  10 0 DO   DO-PRIME  LOOP    . ." PRIMES" ;

SCR #102
 0 \ IMPROVED  ERATOSTHENES SEIVE -- IBM PC VERSION   8K CELLS
 1 DECIMAL  \ Modified to simplify inner loop for better microcode
 2 8191  CONSTANT QSIZE         \ PRIMES FROM 3 THRU 16381
 3 CREATE QFLAGS   QSIZE ALLOT
 4 QFLAGS  QSIZE  +  CONSTANT  QLIMIT
 5 : DO-PRIME  ( RESULT -> RESULT' )
 6   QFLAGS QSIZE  01   FILL
 7   0  QSIZE  0
 8   DO QFLAGS  I +   C@
 9     IF   0     I 2* 3 +    1
10          QLIMIT      QFLAGS  I +
```

```
11          DO    I C!  DDUP /LOOP
12          DDROP DROP  1+
13       THEN
14    LOOP      OR  ;
15 : 10-TIMES   0  10 0 DO    DO-PRIME  LOOP   . ." PRIMES" ;
```

```
SCR #103
 0 \ IMPROVED  ERATOSTHENES SEIVE -- BOARD VERSION    8K CELLS
 1 DECIMAL    \ Allows better microcoding of inner loop
 2 8191  CONSTANT QSIZE          \ PRIMES FROM 3 THRU 16381
 3 CREATE QFLAGS  QSIZE ALLOT
 4 QFLAGS  QSIZE  +  CONSTANT   QLIMIT
 5 : DO-PRIME  ( RESULT -> RESULT' )
 6    QFLAGS QSIZE  01  FILL
 7    0  QSIZE  0
 8    DO QFLAGS  I +    @
 9       IF   0    I  2* 3 +   1
10          QLIMIT    QFLAGS  I +
11          DO    I !  DDUP /LOOP
12          DDROP DROP  1+
13       THEN
14    LOOP      OR  ;
15 : 10-TIMES   0  10 0 DO    DO-PRIME  LOOP   . ." PRIMES" ;
```

```
SCR #104
 0 \ MICROCODED ERATOSTHENES SEIVE -- BOARD VERSION    8K CELLS
 1 DECIMAL    \ Maximizes use of microcoded primitives
 2 8191  CONSTANT QSIZE          \ PRIMES FROM 3 THRU 16381
 3 CREATE QFLAGS  QSIZE ALLOT
 4 QFLAGS  QSIZE  +  CONSTANT   QLIMIT
 5 : DO-PRIME  ( RESULT -> RESULT' )
 6    [ QFLAGS ] LITERAL    [ QSIZE ] LITERAL   1  FILL
 7    0  [ QSIZE ] LITERAL    0
 8    DO [ QFLAGS ] LITERAL    I+.@
 9       IF   0.I.2*.3.+.1
10          [ QLIMIT ] LITERAL       [ QFLAGS ] LITERAL    I+
11          DO    I-!-DDUP /LOOP
12          DDROP.DROP.1+
13       THEN
14    LOOP      OR  ;      \ Approx 1.05 seconds per 10 iterations
15 : 10-TIMES   0  10 0 DO    DO-PRIME  LOOP   . ." PRIMES" ;
```

```
SCR #105
 0 \ DISPLAY RESULTS OF THE SEIVE FOR VERIFICATION
 1 DECIMAL
 2 : .SEIVE-RESULTS ( -> )
 3    CR ."      #  PRIME" CR
 4       ."      1      2" CR   \ Algorithm skips 2 for effeciency
 5    1   QFLAGS QSIZE + QFLAGS
 6    DO  I @
 7       IF  1+  DUP  5 .R
 8          I QFLAGS -  2* 3 + 7 .R    CR THEN
 9       ?TERMINAL ABORT" ..BREAK.."
10    1 /LOOP
11    CR DROP ;
```

SCR #106
0
1
2
3
4
5
6
7
8
9
10
11
12
13
14
15

SCR #107
0
1
2
3
4
5
6
7
8
9
10
11
12
13
14
15

APPENDIX A -- PART IV: MVP-
MATH/16 -- MATH SUPPORT SOURCE CODE

SCR #0
0
1
2
3
4
5
6
7
8
9
10
11
12
13
14
15

```
SCR #1
   0 INDEX --- MVP-MATH/16 MATH SUPPORT                    PHIL KOOPMA
   1
   2 MVP-FORTH VERSION                          LAST UPDATE: 3/14/87
   3
   4              (C) COPYRIGHT 1986, 1987
   5
   6        Phil Koopman, Jr  & WISC Technologies, Inc.
   7
   8 SOURCE
   9 SCREENS    CONTENTS
  10 =======    ========
  11 2          LOAD SCREEN FOR MATH SUPPORT
  12 4 - 35     DOUBLE PRECISION INTEGER SUPPORT
  13 44 - 94    FLOATING POINT SUPPORT
  14 96 - 97    TEST ROUTINES
  15

SCR #2
   0 \ LOAD SCREEN FOR MVP-MATH/16 MATH SUPPORT
   1 DECIMAL
   2 CR CR ." Loading MVP-MATH/16 math support." CR
   3 ." (C) Copyright 1986 by Phil Koopman Jr." CR
   4 4 97 THRU
   5 CR CR ." Load complete." CR CR
   6 ." Please do a SAVE-BOARD-FORTH" CR
   7
   8
   9
  10
  11
  12
  13
  14
  15

SCR #3
   0
   1
   2
   3
   4
   5
   6
   7
   8
   9
  10
  11
  12
  13
  14
  15

SCR #4
   0 ( internal use only variables and holding places )
   1 DECIMAL
   2 VARIABLE TEMP-ADDR  ( temporary address storage )
   3 VARIABLE TSUMH 12 ALLOT/16 ( division temp storage - remainder )
   4   TSUMH 4 + CONSTANT TSUML ( division temp storage - quotient )
```

```
  5    TSUML 4 + CONSTANT TSUMQ  ( quad precision temp storage )
  6 VARIABLE TEMP-CARRY   ( temporary carry storage )
  7 VARIABLE SIGDIG    ( number significant digits )
  8      7 SIGDIG !
  9 VARIABLE TERM  2 ALLOT/16 ( temp storage for transcendentals )
 10 VARIABLE FTERM  2 ALLOT/16 ( temp storage for transcendentals )
 11 VARIABLE <?MODE>  ( numeric input mode )
 12
 13
 14
 15

SCR #5
  0 ( shift/rotate operations  LSL  ASR  LSR )
  1 HEX    ( may be replaced with CODE definitions )
  2 \   : 2/    2 / ;
  3
  4 : LSL    ( n1 -> n2 )
  5    2*   ;
  6
  7 \  : ASR    ( n1 -> n2 )
  8 \     FFFE AND  2/  ;
  9
 10 \  : LSR    ( n1 -> n2 )
 11 \     ASR  7FFF AND  ;
 12
 13 DECIMAL
 14
 15

SCR #6
  0 ( SGN  U> )
  1 DECIMAL
  2 : SGN     ( n -> signum.of.n )
  3    DUP  IF   0<  IF -1 ELSE 1 THEN THEN ;
  4
  5 : U>     ( un1 un2 -> flag )
  6    SWAP U< ;
  7
  8
  9
 10
 11
 12
 13
 14
 15

SCR #7
  0 ( RRC  RLC  ADC )
  1 HEX     ( may be replaced with CODE definitions )
  2 \ : RRC    ( n1 carry.in -> n2 carry.out )
  3 \   SWAP  DUP LSR  ROT
  4 \   IF  8000 OR  THEN     SWAP 1 AND ;
  5
  6 \ : RLC    ( n1 carry.in -> n2 carry.out )
  7 \   SWAP  DUP LSL  ROT
  8 \   IF  1 OR  THEN     SWAP 0< ;
  9
 10 \ : ADC    ( n1 n2 carry.in -> n3  carry.out )
```

```
 11 \   >R  0 ROT 0   D+   R> IF  1 0 D+   THEN ;
 12
 13 DECIMAL
 14
 15

SCR #8
  0 ( single precision multiple rotates    ASRN   LSRN   LSLN   )
  1 DECIMAL
  2 : ASRN     ( n1 count -> n2 )
  3    DUP 0>  IF     0 DO  ASR  LOOP
  4               ELSE  DROP  THEN ;
  5
  6 \ : LSRN     ( n1 count -> n2 )
  7 \  DUP 0>  IF     0 DO  LSR  LOOP
  8 \             ELSE  DROP  THEN ;
  9
 10 \ : LSLN     ( n1 count -> n2 )
 11 \  DUP 0>  IF     0 DO  LSL  LOOP
 12 \             ELSE  DROP  THEN ;
 13
 14
 15

SCR #9
  0 ( conversions    S->Q   D->Q   D->S   Q->S   Q->D   )
  1 DECIMAL
  2 : S->Q    ( n -> q )
  3    S->D  DUP DUP ;
  4
  5 : D->Q    ( d -> q )
  6    S->D  DUP ;
  7
  8 : D->S    ( d -> n )
  9    DROP ;
 10
 11 : Q->S    ( q -> n )
 12    DDROP   DROP ;
 13
 14 : Q->D    ( q -> d )
 15    DDROP ;

SCR #10
  0 ( double stack ops  DOVER  DSWAP  DROT )
  1 DECIMAL      ( may be replaced with CODE definitions )
  2 : DOVER    ( d1 d2 -> d1 d2 d1 )  ( MVP-FORTH UTILITY )
  3    4 PICK  4 PICK ;
  4
  5 \ : DSWAP    ( d1 d2 -> d2 d1 )  ( MVP-FORTH UTILITY )
  6 \   4 ROLL  4 ROLL ;
  7
  8 \ : DROT   ( d1 d2 d3 -> d2 d3 d1 )  ( MVP-FORTH UTILITY )
  9 \   6 ROLL  6 ROLL ;
 10
 11
 12
 13
 14
 15
```

```
SCR #11
   0 ( double precision stack ops  D@  D>R  DR>  DR@  )
   1 DECIMAL     ( may be replaced with CODE definitions )
   2 \ : D>R     ( d -> )
   3 \   R>  SWAP >R  SWAP >R  >R  ;
   4
   5 \ : DR>     ( -> d )
   6 \   R>  R>  R>  ROT  >R  ;
   7
   8 : DR@       ( -> d )
   9    I' J ;
  10
  11
  12
  13
  14
  15

SCR #12
   0 ( double precision stack ops  DPICK  DROLL  D? )
   1 HEX
   2 : DPICK    ( d1 .. dn count -> d1 .. dn dm )
   3   DUP 1 <  ABORT" DPICK ARGUMENT < 1"
   4   2* DUP 1+  PICK  SWAP PICK  ;
   5
   6 : DROLL    ( d1 .. dn count -> d1 ..<omit dm>.. dn dm )
   7   DUP 1 <  ABORT" DROLL ARGUMENT < 1"
   8   2* DUP 1+  ROLL  SWAP ROLL  ;
   9
  10 : D?    ( addr -> )
  11   D@  D. ;
  12
  13 DECIMAL
  14
  15

SCR #13
   0 ( D.  DCONSTANT  DVARIABLE )
   1 DECIMAL
   2 : D,    ( d -> )
   3   , , ;
   4
   5 : DCONSTANT    ( d -> )       ( compiling )
   6                ( -> d )       ( executing )
   7   CREATE  D,
   8    DOES>  D@ ;
   9
  10 : DVARIABLE    ( -> )         ( compiling )
  11                ( -> addr )    ( executing )
  12   CREATE  2 ALLOT/16 ;
  13
  14
  15

SCR #14
   0 ( D-   D+! )
   1 DECIMAL
   2 : D-    ( d1 d2 -> d3 )  ( MVP-FORTH UTILITY )
   3   DNEGATE  D+  ;
   4
```

```
  5 \ : D+!      ( d1 addr -> )
  6 \    DUP >R  D@ D+  R> D! ;
  7
  8
  9
 10
 11
 12
 13
 14
 15

SCR #15
  0 ( double precision rotates/add    DADC  DRRC  DRLC )
  1 HEX
  2 : DADC    ( d1 d2 carry.in -> d3 carry.out )
  3    SWAP >R  ROT  >R
  4    ADC  R>  R>   ROT   ADC ;
  5
  6 : DRRC   ( d1 carry.in -> d2 carry.out )
  7    RRC  SWAP >R  RRC  R> SWAP ;
  8
  9 : DRLC   ( d1 carry.in -> d2 carry.out )
 10    SWAP >R  RLC  R> SWAP  RLC ;
 11
 12 DECIMAL
 13
 14
 15

SCR #16
  0 ( double precision shifts   DASR  DLSR  DLSL )
  1 HEX
  2 : DASR   ( d1 -> d2 )
  3   SWAP  LSR  OVER 1 AND
  4   IF  8000 OR  THEN   SWAP ASR ;
  5
  6 \ : DLSR    ( d1 -> d2 )
  7 \    DASR  7FFF AND ;
  8
  9 : DLSL   ( D1 -> D2 )
 10   DDUP D+ ;
 11
 12 DECIMAL
 13
 14
 15

SCR #17
  0 ( double precision multiple shifts   DASRN  DLSRN  DLSLN )
  1 DECIMAL
  2 : DASRN    ( d1 n -> d2 )
  3    DUP 0>  IF   0 DO  DASR  LOOP
  4            ELSE  DROP  THEN ;
  5
  6 \ : DLSRN    ( d1 n -> d2 )
  7 \   DUP 0>  IF   0 DO  DLSR  LOOP
  8 \           ELSE  DROP  THEN ;
  9
 10 \ : DLSLN   ( d1 n -> d2 )
```

```
 11 \   DUP 0>    IF     0 DO    DLSL   LOOP
 12 \              ELSE   DROP   THEN   ;
 13
 14
 15

SCR #18
  0 ( DOR   DAND   DXOR   BYTESWAP  )
  1 DECIMAL
  2 : DOR     ( d1 d2 -> d3 )
  3   >R  SWAP >R   OR   R> R>  OR   ;
  4
  5 : DAND    ( d1 d2 -> d3 )
  6   >R  SWAP >R   AND   R> R>  AND ;
  7
  8 : DXOR    ( d1 d2 -> d3 )
  9   >R  SWAP >R   XOR   R> R>  XOR ;
 10
 11 \ : BYTESWAP  ( n1 -> n2 )
 12 \     DUP  8 DLSRN DROP   ;
 13
 14
 15

SCR #19
  0 \ double precision comparisons  DO<   DO>   DO=   D>   D=   )
  1 DECIMAL
  2 : DO<    ( d1 -> flag )
  3   SWAP   DROP   0<  ;
  4
  5 : DO>    ( d1 -> flag )
  6   DNEGATE  DO<  ;
  7
  8 : DO=    ( d1 -> flag )
  9   OR  0=  ;
 10
 11 : D>    ( d1 d2 -> flag )      ( MVP-FORTH UTILITY )
 12   DSWAP  D<  ;
 13
 14 : D=    ( d1 d2 -> flag )  ( MVP-FORTH UTILITY )
 15   ( D- DO= )  >R   SWAP  >R   =   R> R>   =   AND  ;

SCR #20
  0 ( DMAX   DMIN   DU<   DU>  )
  1 HEX
  2 : DMAX    ( d1 d2 -> d3 )  ( MVP-FORTH UTILITY )
  3   DOVER DOVER   D< IF   DSWAP   THEN   DDROP  ;
  4
  5 : DMIN    ( d1 d2 -> d3 )  ( MVP-FORTH UTILITY )
  6   DOVER DOVER   D< NOT   IF   DSWAP   THEN   DDROP ;
  7
  8 : DU<    ( ud1 ud2 -> flag )  ( MVP-FORTH UTILITY )
  9   D>R   8000 +   DR>  8000 +   D<  ;
 10
 11 : DU>    ( ud1 ud2 -> flag )
 12   DSWAP  DU<  ;
 13
 14 DECIMAL
 15
```

```
SCR #21
   0 ( quad precision stack ops  QDROP  QDUP  QOVER  QSWAP  QROT )
   1 DECIMAL     ( may be replaced with CODE definitions )
   2 : QDROP   ( q -> )
   3   DDROP DDROP ;
   4
   5 : QDUP    ( q1 -> q1 q1 )
   6   DOVER DOVER ;
   7
   8 : QOVER   ( q1 q2 -> q1 q2 q1 )
   9   4 DPICK  4 DPICK ;
  10
  11 : QSWAP   ( q1 q2 -> q2 q1 )
  12   4 DROLL  4 DROLL ;
  13
  14 : QROT    ( q1 q2 q3 -> q2 q3 q1 )
  15   6 DROLL  6 DROLL ;

SCR #22
   0 ( quad precision store and fetch  Q!  Q@ )
   1 DECIMAL     ( may be replaced with CODE definitions )
   2 : Q!    ( q addr -> )
   3   DUP  >R  D!  R>  2+ D! ;
   4
   5 : Q@    ( addr -> q )
   6   DUP  2+  D@  ROT  D@ ;
   7
   8
   9
  10
  11
  12
  13
  14
  15

SCR #23
   0 ( quad return stack operations  Q>R  QR>  QR@ )
   1 DECIMAL     ( may be replaced with CODE definitions )
   2 : Q>R   ( q -> )
   3   R> TEMP-ADDR !  D>R D>R  TEMP-ADDR @  >R ;
   4
   5 : QR>   ( -> q )
   6   R> TEMP-ADDR !  DR> DR>  TEMP-ADDR @  >R ;
   7
   8 : QR@   ( -> Q )
   9   R> TEMP-ADDR !  DR> DR>
  10   QDUP D>R D>R  TEMP-ADDR @  >R ;
  11
  12
  13
  14
  15

SCR #24
   0 ( quad logical ops  QOR  QAND  QXOR )
   1 DECIMAL
   2 : QOR    ( q1 q2 -> q3 )
   3   D>R  DSWAP  D>R  DOR    DR>    DR>  DOR ;
   4
```

```
  5 : QAND          ( q1 q2 -> q3 )
  6     D>R    DSWAP    D>R    DAND     DR>    DR> DAND   ;
  7
  8 : QXOR          ( q1 q2 -> q3 )
  9     D>R    DSWAP    D>R    DXOR     DR>    DR> DXOR   ;
 10
 11
 12
 13
 14
 15

SCR #25
  0 ( QADC )
  1 DECIMAL       ( may be replaced with CODE definitions )
  2 : QADC    ( q1 q2 carry.in -> q3 carry.out )
  3     TEMP-CARRY !   D>R   DSWAP D>R   TEMP-CARRY @    DADC
  4     DR> DR>   5 ROLL   DADC  ;
  5
  6
  7
  8
  9
 10
 11
 12
 13
 14
 15

SCR #26
  0 ( Q+   QNEGATE   Q-    DM+   )
  1 DECIMAL
  2 \ : Q+     ( q1 q2 -> qsum )
  3 \   0 QADC   DROP  ;
  4
  5 : QNEGATE     ( q1 -> -q1 )
  6     -1. -1. QXOR    1. 0. Q+    ;
  7
  8 : Q-     ( q1 q2 -> q3 )
  9     QNEGATE Q+   ;
 10
 11 : DM+     ( q1 d2 -> q3 )
 12     D->Q Q+  ;
 13
 14
 15

SCR #27
  0 ( Q+!   Q+-   QABS )
  1 DECIMAL
  2 : Q+!    ( q addr -> )
  3     DUP >R   Q@ Q+   R> Q!   ;
  4
  5 : Q+-    ( q1 n2 -> q3 )
  6     0< IF   QNEGATE   THEN   ;
  7
  8 : QABS    ( q1 -> q2 )
  9     DUP Q+-   ;
```

```
10
11
12
13
14
15

SCR #28
  0 ( QASR   QLSR   QLSL )
  1 HEX
  2 : QASR    ( q1 -> q2 )
  3   DSWAP  DLSR  4 PICK  1 AND
  4   IF  8000 OR  THEN    DSWAP DASR  ;
  5
  6 : QLSR    ( q1 -> q2 )
  7   QASR  7FFF AND ;
  8
  9 \ : QLSL    ( q1 -> q2 )
 10 \   QDUP Q+ ;
 11
 12 DECIMAL
 13
 14
 15

SCR #29
  0 ( QASRN   QLSRN   QLSLN )
  1 DECIMAL
  2 : QASRN    ( q1 n2 -> q3 )
  3   DUP 0>  IF   0 DO  QASR  LOOP
  4           ELSE  DROP  THEN  ;
  5
  6 : QLSRN    ( q1 n2 -> q3 )
  7   DUP 0>  IF   0 DO  QLSR  LOOP
  8           ELSE  DROP  THEN  ;
  9
 10 : QLSLN    ( q1 n2 -> q3 )
 11   DUP 0>  IF   0 DO  QLSL  LOOP
 12           ELSE  DROP  THEN  ;
 13
 14
 15

SCR #30
  0 ( basic double multiplication  DU* )
  1 DECIMAL    ( may be replaced with CODE definitions )
  2 : DU*    ( ud1 ud2 -> uq3 )
  3   ( adds 4 partial products to get result )
  4   OVER  5 PICK  U*  D>R  SWAP  3 PICK  U*  D>R
  5   ROT  OVER  U*  D>R  U*  0 0  DSWAP
  6   0  DR>  0 Q+  0 DR>  0 Q+  DR>  0 0 Q+  ;
  7
  8
  9
 10
 11
 12
 13
 14
 15
```

```
SCR #31
  0 ( double precision multiplication  D*  DM* )
  1 DECIMAL
  2 : D*    ( d1 d2 -> d3 )
  3   DU* DDROP  ;
  4
  5 : DM*   ( d1 d2 -> q3 )
  6   DUP  4 PICK  XOR >R
  7   DABS  DSWAP DABS  DU*  R> Q+-  ;
  8
  9
 10
 11
 12
 13
 14
 15

SCR #32
  0 ( double precision unsigned division  DU/MOD )
  1 HEX     ( may be replaced with CODE definitions )
  2 : DU/MOD   ( uq1 ud2 -> ud3 ud4 )
  3   D>R  TSUMH Q!  DR> DDUP DNEGATE  TSUMH D+!  21 >R
  4   BEGIN   TSUMH @  O<  R> 1- DUP >R
  5   WHILE   TSUMH D@  QLSL  TSUMH Q!
  6      IF  ~DDUP
  7      ELSE  DDUP DNEGATE  1 TSUMH 3 +  +!  THEN
  8      TSUMH D+!  REPEAT
  9   R> DROP  TSUMH 2+ D@  3 PICK NOT  DRLC DROP  ROT
 10   IF DSWAP  TSUMH D@ D+
 11   ELSE DSWAP DDROP  TSUMH D@  THEN    DSWAP ;
 12
 13 DECIMAL
 14
 15

SCR #33
  0 ( double precision mixed division  DM/MOD  DM/  D/MOD  D*/MOD )
  1 DECIMAL
  2 : DM/MOD  ( uq1 ud2 -> ud3 uq4 )
  3   D>R  0 0 DR@  DU/MOD  DR> DSWAP D>R  DU/MOD DR>  ;
  4
  5 : DM/    ( q1 d2 -> d3 d4 )
  6   3 PICK >R  D>R  QABS  R> R@  DABS  DU/MOD
  7   R> R@  XOR D+-  DSWAP  R>  D+-  DSWAP  ;
  8
  9 : D/MOD   ( d1 d2 -> d3 d4 )
 10   D>R  D->Q  DR>  DM/  ;
 11
 12 : D*/MOD  ( d1 d2 d3 -> d4 d5 )
 13   D>R  DM*  DR>  DM/  ;
 14
 15

SCR #34
  0 ( D/  D*/  DMOD )
  1 DECIMAL
  2 : D/     ( d1 d2 -> d3 )
  3   D/MOD  DSWAP DDROP  ;
  4
```

```
  5 : D*/      ( d1 d2 d3 -> d4 )
  6   D*/MOD  DSWAP DDROP  ;
  7
  8 : DMOD    ( d1 d2 -> d3 )
  9   D/MOD DDROP  ;
 10
 11
 12
 13
 14
 15

SCR #35
  0 ( DINP#   DMODE   ?MODE )
  1 DECIMAL
  2 : DINP#     ( -> D )  ( "state-smart" word )
  3   BL WORD  <NUMBER>
  4   [COMPILE] DLITERAL  ;   IMMEDIATE
  5     .
  6 : DMODE  ( -> )
  7   0 <?MODE> !
  8   ' <NUMBER> CFA     'NUMBER !
  9   ' <INTERPRET> CFA  'INTERPRET !
 10   R> DROP  INTERPRET ;      IMMEDIATE
 11
 12 : ?MODE    ( -> flag=0,1,2 )
 13   <?MODE> @ ;
 14 DMODE
 15

SCR #36
  0
  1
  2
  3
  4
  5
  6
  7
  8
  9
 10
 11
 12
 13
 14
 15

SCR #37
  0
  1
  2
  3
  4
  5
  6
  7
  8
  9
 10
```

```
   11
   12
   13
   14
   15

SCR #38
   0
   1
   2
   3
   4
   5
   6
   7
   8
   9
  10
  11
  12
  13
  14
  15

SCR #39
   0
   1
   2
   3
   4
   5
   6
   7
   8
   9
  10
  11
  12
  13
  14
  15

SCR #40
   0
   1
   2
   3
   4
   5
   6
   7
   8
   9
  10
  11
  12
  13
  14
  15
```

SCR #41
0
1
2
3
4
5
6
7
8
9
10
11
12
13
14
15

SCR #42
0
1
2
3
4
5
6
7
8
9
10
11
12
13
14
15

SCR #43
0
1
2
3
4
5
6
7
8
9
10
11
12
13
14
15

SCR #44
0 \ floating point return stack operations  F>R  FR>  FR@  )
1 DECIMAL     ( may be replaced with CODE definitions )
2 : F>R    ( f1 -> )
3    R> SWAP >R  SWAP >R   >R ;
4

```
  5 : FR>     ( - -> f1 )
  6    R> R> R>   ROT   >R   ;
  7
  8 : FR@    ( -> f1 )
  9    I' J ;
 10
 11
 12
 13
 14
 15

SCR #45
  0 ( floating point aliases )
  1 DECIMAL
  2 : F@           D@  ;
  3 : F!           D!  ;
  4 : FDROP        DDROP   ;
  5 : FDUP         DDUP  ;
  6 : FSWAP        DSWAP  ;
  7 : FOVER        DOVER  ;
  8 : FROT         DROT  ;
  9 : FPICK        DPICK  ;
 10 : FROLL        DROLL  ;
 11 : FCONSTANT    DCONSTANT  ;
 12 : FVARIABLE    DVARIABLE  ;
 13 : FLITERAL    [COMPILE] DLITERAL  ;   IMMEDIATE
 14 : F,           D,  ;
 15

SCR #46
  0 ( FABS  F0=  and temporary absolute values & zero test )
  1 HEX
  2 : FABS    ( f1 -> f2 )
  3    7FFF AND  ;
  4
  5 : F0=    ( f1 -> flag )
  6    FABS  D0=  ;
  7
  8 : TABS    ( t1 -> t2 )
  9    >R FABS R>  ;
 10
 11 : T0=    ( t1 -> t1 flag )
 12    ( Note:  does NOT remove t1 from stack !!! )
 13    >R  DDUP FABS  D0= R> SWAP  ;
 14
 15 DECIMAL SCR #47
  0 ( various T operations )
  1 HEX
  2 : TDROP    ( t1 -> )
  3    DROP DDROP  ;
  4
  5 : CHK0    ( t1 -> t2 )   ( forces clean zero )
  6    T0=  IF  TDROP 0 0 0  THEN  ;
  7
  8 : TNEGATE    ( t1 -> t2 )
  9    >R  8000 XOR  R> CHK0  ;
 10
```

```
11 : T+-    ( t1 n2 -> t3 )
12   O< IF  TNEGATE  THEN  ;
13
14 DECIMAL
15

SCR #48
  0 ( TSWAP   TOVER  TDUP   T@   T! )
  1 DECIMAL      ( may be replaced with CODE definitions )
  2 : TSWAP    ( t1 t2 -> t2 t1 )
  3    6 ROLL   6 ROLL   6 ROLL  ;
  4
  5 : TOVER    ( t1 t2 -> t1 t2 t1 )
  6    6 PICK   6 PICK   6 PICK  ;
  7
  8 \ : TDUP    ( t1 -> t1 t1 )
  9 \    3 PICK   3 PICK   3 PICK  ;
 10
 11 : T@    ( addr -> t1 )
 12    DUP  1+ D@  ROT @  ;
 13
 14 : T!    ( t1 addr -> )
 15    SWAP  OVER !  1+ D!  ;

SCR #49
  0 ( floating point to temporary conversion )
  1 HEX      ( may be replaced with CODE definitions )
  2 : F->T    ( f1 -> t2 )
  3    DDUP  F0=
  4    IF  DROP  0 0
  5    ELSE  DUP  7F80 AND   7 LSRN   7F -   >R   DUP >R
  6       7F AND   80 OR   7 DLSLN   R> R>
  7       SWAP T+-   THEN  ;
  8
  9 DECIMAL
 10
 11
 12
 13
 14
 15

SCR #50
  0 ( 32-bit normalization of mantissa )
  1 HEX      ( may be replaced with CODE definitions )
  2 : UDNORMALIZE    ( ut1 -> ut2 )
  3    >R   DUP 0<
  4    IF ( shift right )   DLSR R>  1+
  5    ELSE  DDUP  D0=
  6       IF ( zero )  R> DROP  0
  7       ELSE ( shift left )
  8          <UDNORM>  ( BEGIN   DUP  4000 AND NOT          )
  9                    ( WHILE   DLSL  R> 1- >R    REPEAT   )
 10       R>  THEN
 11    THEN  ;
 12
 13 DECIMAL
 14
 15
```

```
SCR #51
  0 ( temporary to floating point conversion )
  1 HEX        ( may be replaced with CODE definitions )
  2 : T->F    ( t1 -> f2 )
  3   CHKO  OVER ( sign ) >R  7F + ( exponent ) >R   FABS
  4   DDUP DO=
  5   IF  R> R> DDROP
  6   ELSE  ( round )  40 0 D+ R> UDNORMALIZE >R
  7      7 DLSRN  7F AND
  8      R>  7 LSLN  7F80 AND  OR
  9      R>  8000 AND OR      THEN ;
 10
 11 DECIMAL
 12
 13
 14
 15

SCR #52
  0 ( floating to temp conversions and quad normalize )
  1 HEX
  2 : SEPARATE2    ( f1 f2 -> t1 t2 )
  3   F>R  F->T   FR>  F->T  ;
  4
  5 : UQNORMALIZE   ( uq1 n2 -> uq3 n4 )
  6   >R   DUP  0<
  7   IF  QLSR  R>  1+
  8   ELSE QDUP  OR OR OR 0=
  9      IF  ( zero )  R> DROP 0
 10      ELSE ( shift left )
 11        BEGIN  DUP  4000 AND  NOT
 12        WHILE  QLSL R> 1- >R  REPEAT   R>  THEN  THEN ;
 13
 14  DECIMAL EXIT
 15

SCR #53
  0 ( temporary floating point addition )
  1 DECIMAL     ( may be replaced with CODE definitions )
  2 : T+    ( t1 t2 -> t3 )
  3   T0= IF TDROP
  4   ELSE  TSWAP  T0=
  5      IF TDROP
  6      ELSE - >R  ROT  R>  SWAP  DDUP >
  7        IF DROT DSWAP   ELSE  SWAP THEN
  8         OVER >R  5 PICK  DUP >R  4 PICK  XOR  0< >R
  9         DROT FABS  DROT FABS  DROT   -    31 MIN DLSRN
 10         DDUP D0= IF R> DROP 0 >R  THEN      R>
 11         IF R> 0<    IF DSWAP THEN
 12           DNEGATE  0 DADC NOT     >R DABS R>
 13         ELSE  D+ R>  0<   THEN
 14      R> SWAP >R UDNORMALIZE R>   IF TNEGATE THEN
 15   THEN THEN     CHKO  ;

SCR #54
  0 ( temporary floating point multiplication )
  1 HEX         ( may be replaced with CODE definitions )
  2 : T*    ( t1 t2 -> t3 )
  3   >R  ROT  R>  +  OVER  5 PICK  XOR  D>R
  4   FABS  DSWAP  FABS  DU*  R> 2+ UQNORMALIZE
```

```
 5    T0= NOT  IF
 6       >R  ( round )   0 8000 0 0 Q+   R> UDNORMALIZE   THEN
 7       >R   DSWAP DDROP   DR>   T+-      CHK0  ;
 8
 9 DECIMAL
10
11
12
13
14
15

SCR #55
 0 ( temporary floating point division )
 1 HEX       ( may be replaced with CODE definitions )
 2 : T/      ( t1 t2 -> t3 )    T0=
 3    ( check for divide by zero )
 4    IF   TSWAP TDROP   ( result is zero )
 5    ELSE   >R   ROT   R>   -  OVER  5 PICK   XOR    >R >R
 6        FABS   DSWAP  FABS   0 0 DSWAP   QLSR DROT
 7        DU/MOD DSWAP DDROP
 8        R>  1- UDNORMALIZE  R>   T+-    THEN    CHK0  ;
 9
10 DECIMAL
11
12
13
14
15

SCR #56
 0 ( F+   F*   F/   F2/   F2* )
 1 DECIMAL
 2 : F+     ( f1 f2 -> f3 )
 3    SEPARATE2   T+  T->F   ;
 4
 5 : F*     ( f1 f2 -> f3 )
 6    SEPARATE2   T*  T->F   ;
 7
 8 : F/     ( f1 f2 -> f3 )
 9    SEPARATE2   T/  T->F   ;
10
11 : F2/    ( f1 -> f2 )
12    F->T   1-   T->F  ;
13
14 : F2*    ( f1 -> f2 )
15    F->T   1+   T->F  ;

SCR #57
 0 ( FNEGATE   F-   F+! )
 1 HEX
 2 : FNEGATE   ( f1 -> f2 )
 3    DDUP  OR   IF   8000 XOR   THEN   ;
 4 DECIMAL
 5 : T-     ( t1 t2 -> t3 )
 6    TNEGATE  T+  ;
 7
 8 : F-     ( f1 f2 -> f3 )
 9    FNEGATE F+  ;
10
```

```
11 : F+!     ( f1 addr -> )
12    DUP  >R  F@ F+  R>  F! ;
13
14 : T+!     ( t1 addr -> )
15    DUP  >R  T@ T+  R>  T! ;

SCR #58
  0 ( conversions  D->F )
  1 HEX      ( may be replaced with CODE definitions )
  2 : D->T    ( d1 -> t2 )    ( floats the integer value )
  3    DUP >R  DABS  01E UDNORMALIZE   R> T+-   CHK0 ;
  4
  5 : D->F    ( d1 -> f2 )
  6    D->T  T->F ;
  7
  8 : T->D    ( t1 -> d2 )
  9    CHK0   01E -   DUP ABS   01E >
 10    IF   TDROP 0 0
 11    ELSE  DUP 0>
 12       IF  DLSLN
 13       ELSE  OVER  >R >R  7FFF AND  R> ABS  DLSRN
 14          R> D+-   THEN THEN ;
 15 DECIMAL SCR #59
  0 ( conversions  F->D  F->S  S->F  )
  1 DECIMAL
  2 : F->D    ( f1 -> d2 )
  3    F->T  T->D ;
  4
  5 : F->S    ( f1 -> n2 )
  6    F->D  DROP ;
  7
  8 : S->F    ( n1 -> f2 )
  9    S->D  D->F ;
 10
 11
 12
 13
 14
 15

SCR #60
  0 ( floating comparisons  F0<  F0>   F= F< F> )
  1 DECIMAL
  2 : F0<           D0< ;
  3
  4 : F0>           D0> ;
  5
  6 : F=            D= ;
  7
  8 : F<    ( f1 f2 -> flag )
  9    F- F0< ;
 10
 11 : F>    ( f1 f2 -> flag )
 12    FSWAP  F< ;
 13
 14
 15
```

```
SCR #61
  0 ( FMIN  FMAX  F+-  FSGN  )
  1 DECIMAL
  2 : FMIN    ( f1 f2 -> f3 )
  3   FOVER FOVER  F>  IF  FSWAP  THEN  FDROP ;
  4
  5 : FMAX    ( f1 f2 -> f3 )
  6   FOVER FOVER  F<  IF  FSWAP  THEN  FDROP ;
  7
  8 : F+-    ( f1 n2 -> f3 )
  9   0<  IF  FNEGATE  THEN  ;
 10
 11 : FSGN   ( f1 -> n2 )
 12   SWAP DROP  SGN ;
 13
 14
 15

SCR #62
  0 ( integer & fractional portion  INT  FRAC  REM )
  1 HEX
  2 : INT    ( f1 -> f2 )
  3   F->T  DUP  01F <  IF  T->D D->T  THEN   T->F ;
  4
  5 : TFRAC   ( t1 -> t2 )
  6   DUP 01F <  IF  TDUP T->D D->T  T-
  7             ELSE  TDROP  0 0 0  THEN ;
  8
  9 : FRAC   ( f1 -> f2 )
 10   F->T TFRAC  T->F ;
 11
 12 : REM    ( f1 f2 -> f3 )
 13    FOVER FOVER   F/   INT  F* F- ;
 14
 15 DECIMAL SCR #63
  0 ( floating point input  FCONVERT )
  1 DECIMAL
  2 : FCONVERT    ( f1 addr2 -> f3 addr4 )
  3   >R F->T   BASE @ 0 D->T  TSWAP R>
  4   BEGIN 1+ DUP >R   @ BASE @ DIGIT
  5   WHILE  >R TOVER T*  R> 0 D->T  T+   DPL @ 1+
  6     IF  1 DPL +!  THEN     R>
  7   REPEAT  TSWAP TDROP  T->F  R> ;
  8
  9
 10
 11
 12
 13
 14
 15

SCR #64
  0 ( floating point input  <FNUMBER> )
  1 HEX
  2 : <FNUMBER>    ( addr1 -> f2 )
  3   0 0 ROT DUP 1+  @  2D = DUP >R  ABS  +  -1 DPL !
  4   FCONVERT  DUP @ BL >
```

```
 5    IF DUP  @ 2E =  NOT  ABORT" NOT RECOGNIZED"
 6         O DPL !  FCONVERT DUP @ BL >  ABORT" NOT RECOGNIZED"
 7    THEN     DROP R>
 8    IF  FNEGATE  THEN      F->T     DPL @
 9    BEGIN    DUP 0>
10    WHILE   >R  BASE @ O D->T   T/   R> 1-
11    REPEAT             DROP T->F  ;
12
13 DECIMAL
14
15

SCR #65
 0 ( floating point interpret --   <FINTERPRET>        )
 1 HEX
 2 : <FINTERPRET>    ( -> )
 3    BEGIN   -FIND
 4       IP  DUP  STATE @  U<
 5          IF   1000 AND  IF   @ THEN   ,
 6          ELSE  DROP  EXECUTE  THEN
 7       ELSE   HERE 1+  NUMBER  DPL @  1+
 8          IF  [COMPILE]    FLITERAL
 9          ELSE  F->S  [COMPILE]  LITERAL
10          THEN
11       THEN  ?STACK    AGAIN  ;
12
13
14
15 DECIMAL SCR #66
 0 ( FMODE   FINF# )
 1 DECIMAL
 2 : FMODE    ( -> )
 3    2 <?MODE> !
 4    ' <FNUMBER> CFA     'NUMBER !
 5    ' <FINTERPRET> CFA  'INTERPRET !
 6    R> DROP   INTERPRET  ;    IMMEDIATE
 7
 8 : FINF#    ( -> f )  ( "state-smart" word )
 9    BL WORD   <FNUMBER>
10    [COMPILE] FLITERAL  ;    IMMEDIATE
11
12
13
14
15

SCR #67
 0 ( floating point input  TCONVERT )
 1 DECIMAL
 2 : TCONVERT    ( t1 addr2 -> t3 addr4 )
 3    >R         BASE @ O D->T  TSWAP R>
 4    BEGIN  1+ DUP >R  @ BASE @ DIGIT
 5    WHILE  >R TOVER T*  R> O D->T  T+   DPL @ 1+
 6       IF  1 DPL +!  THEN      R>
 7    REPEAT  TSWAP TDROP       R> ;
 8
 9
10
```

```
11
12
13
14
15

SCR #68
  0 ( floating point input  <TNUMBER> )
  1 HEX
  2 : <TNUMBER>    ( addr1 -> t2 )
  3    0 0 ROT  0 SWAP DUP 1+  @   2D = DUP >R   ABS +   -1 DPL !
  4    TCONVERT   DUP   @ BL >
  5    IF DUP  @ 2E =   NOT  ABORT" NOT RECOGNIZED"
  6         0 DPL !   TCONVERT DUP @ BL >   ABORT" NOT RECOGNIZED"
  7    THEN    DROP R>
  8    IF  TNEGATE  THEN                       DPL @
  9    BEGIN   DUP 0>
 10    WHILE  >R · BASE @ 0 D->T   T/   R> 1-
 11    REPEAT            DROP  ;
 12
 13 DECIMAL
 14
 15

SCR #69
  0 ( TINP# )
  1 DECIMAL
  2 : TINP#    ( -> f )   ( "state-smart" word )
  3    BL WORD   <TNUMBER>
  4    STATE @    IF
  5        >R [COMPILE] DLITERAL R> [COMPILE] LITERAL
  6    THEN ;     IMMEDIATE
  7
  8
  9
 10
 11
 12
 13
 14
 15

SCR #70
  0 \ TSLOG2 calculation  0.5 <= x <= 1.0  taylor series ln/ln2 )
  1 DECIMAL
  2 : TSLOG2      ( t1 -> t2 )          ( 0.5 <= t1 <=1 )
  3    TABS    TO= NOT  IF
  4    TDUP   TINP# -1 T+    TSWAP    TINP# 1 T+   T/
  5    TDUP TDUP T* TERM T!
  6    TDUP TINP# 2.885390082 ( 2/ln2 ) T*   FTERM T!  TERM T@ T*
  7    TDUP TINP# .9617966939 T*  ( 2/3ln2 ) FTERM T+!    TERM T@ T*
  8    TDUP TINP# .5770780164 T*  ( 2/5ln2 ) FTERM T+!    TERM T@ T*
  9    TDUP TINP# .4121985831 T*  ( 2/7ln2 ) FTERM T+!    TERM T@ T*
 10    TDUP TINP# .3205988980 T*  ( 2/9ln2 ) FTERM T+!    TERM T@ T*
 11    TDUP TINP# .2623081893 T*  ( 2/11ln2 ) FTERM T+!   TERM T@ T*
 12    TDUP TINP# .2219530832 T*  ( 2/13ln2 ) FTERM T+!   TERM T@ T*
 13    TDUP TINP# .1923593388 T*  ( 2/15ln2 ) FTERM T+!   TERM T@ T*
 14    TINP# .1697288283 T*  ( 2/17ln2 ) FTERM T@ T+   THEN ;
 15
```

```
SCR #71
  0 ( chebyshev TS2**   calculation    0.0 <= x <= 1.0 )
  1 DECIMAL
  2 : TS2**       ( t1 -> t2 )         ( 0 <= t1 <=1 )
  3   TABS    TDUP TERM T!     TINF# 1.0  FTERM T!   ( x**0 )
  4   TDUP TINF# .69314718 T*    ( x**1 ) FTERM T+!    TERM T@ T*
  5   TDUP TINF# .24022636 T*    ( x**2 ) FTERM T+!    TERM T@ T*
  6   TDUP TINF# .055505294 T*   ( x**3 ) FTERM T+!    TERM T@ T*
  7   TDUP TINF# .0096135358 T*  ( x**4 ) FTERM T+!    TERM T@ T*
  8   TDUP TINF# .0013429811 T*  ( x**5 ) FTERM T+!    TERM T@ T*
  9   TDUP TINF# .00014299401 T* ( x**6 ) FTERM T+!    TERM T@ T*
 10   TINF# .000021651724 T*     ( x**7 ) FTERM T@ T+  ;
 11
 12
 13
 14
 15

SCR #72
  0 ( basic logarithm  LOG2 )
  1 DECIMAL
  2 : TLOG2    ( t1 -> t2 )
  3   T0=  4 PICK 0< OR    DUP
  4   IF ( BAD OPERATION )    DROP TABS T0= THEN
  5   NOT  IF  >R  -1 TSLOG2
  6     R> 1+  S->D D->T  T+   THEN  ;
  7
  8 : LOG2    ( f1 -> f2 )
  9   F->T  TLOG2  T->F  ;
 10
 11
 12
 13
 14
 15

SCR #73
  0 ( basic exponentiation  2** )
  1 HEX
  2 : T2**    ( t1 -> t2 )
  3   OVER >R ( sign )
  4   TABS   TDUP T->D  DDUP F>R  D->T   T-
  5   TS2**   FR> DROP +   R> 0<
  6   IF  40000000. 0 ( t=1.0 )     TSWAP T/   THEN  ;
  7
  8 : 2**    ( f1 -> f2 )
  9   F->T  T2**  T->F  ;
 10
 11 DECIMAL
 12
 13
 14
 15

SCR #74
  0 ( LOGB  F** )
  1 DECIMAL
  2 : TLOGB    ( t1 tbase -> t3 )    ( log to a base )
  3   TSWAP  TLOG2  TSWAP  TLOG2   T/  ;
  4
```

```
  5 : LOGB   ( f1 f2 -> f3 )
  6   SEPARATE2  TLOGB  T->F  ;
  7
  8 : F**   ( f1 f2 -> f3 )
  9   FSWAP  SEPARATE2  TLOG2  T*  T2**   T->F  ;
 10
 11
 12
 13
 14
 15

SCR #75
  0 ( LOG  LN  10**  E**  )
  1 HEX
  2 : LOG   ( f1 -> f2 )
  3   41200000.  ( f=10.0 )  LOGB  ;
  4
  5 : LN   ( f1 -> f2 )
  6   402DF854.  ( f=2.7182818 )   LOGB  ;
  7
  8 : 10**   ( f1 -> f2 )
  9   41200000.  ( f=10.0 ) FSWAP  F**  ;
 10
 11 : E**   ( f1 -> f2 )
 12   402DF854.  ( f=2.7182818 )  FSWAP  F**  ;
 13
 14 DECIMAL
 15

SCR #76
  0 ( ROOT  **2  1/X  EXP  )
  1 DECIMAL
  2 : ROOT   ( f1 f2 -> f3 )
  3   SEPARATE2 TSWAP  TLOG2  TSWAP  T/  T2**  T->F  ;
  4
  5 : **2   ( f1 -> f2 )
  6   FDUP F*  ;
  7
  8 : 1/X   ( f1 -> f2 )
  9   FINF# 1  FSWAP F/  ;
 10
 11 : EXP   ( f1 n -> f2 )
 12   S->D D->F  BASE @ 0 D->F  FSWAP  F**  F*  ;
 13
 14
 15

SCR #77
  0 ( floating to alpha conversion  F->ME )
  1 HEX
  2 : F->ME   ( f1 -> d2 n3 )
  3   F->T  TO= NOT
  4   IF  OVER >R TABS  BASE @ 0 D->T TSWAP TOVER
  5      TLOGB  TDUP TFRAC  TSWAP  T->D  DROP  3 PICK 0<
  6      IF  1- >R  40000000. 0 ( t=1.0 ) T+  R> THEN
  7      >R  ( log almost 1? ) BASE @ 0 DDUP
  8      SIGDIG @  1  DO FOVER D*  LOOP
  9      -1 M+  F>R D->T FR>  D->T
 10      TSWAP  TLOGB TFRAC  TOVER  T- DROP FO<
```

```
 11       IF   TDROP  0  0  0    R> 1+  >R    THEN
 12       SIGDIG @  1-    0  D->T
 13       T+  TSWAP  TLOG2  T*  T2**     40000000. -1   ( 0.5 )
 14       T+  T->D    R>  R>  SWAP   >R  D+-  R>    THEN   ;
 15 DECIMAL
```

SCR #78
```
  0 ( exponent print   F.ER   F.E  )
  1 HEX
  2 : F.ER    ( f1 n2 -> )
  3    >R  F->ME    DUP >R ABS   S->D
  4    <#  #S  DDROP   R> SIGN   BL HOLD
  5    50 HOLD  58 HOLD  45 HOLD    BL HOLD    DUP >R DABS
  6    SIGDIG @   1  DO   #   LOOP
  7    2E HOLD   #   R> SIGN   #>
  8    R>   OVER -   SPACES TYPE   ;
  9
 10 : F.E    ( f1 -> )
 11    0 F.ER   SPACE   ;
 12
 13 DECIMAL
 14
 15
```

SCR #79
```
  0 ( fixed point numeric printing   <F.>   F.XR   F.X )
  1 HEX
  2 : <F.>    ( d1 n2 -> addr3 n4 n5 )
  3    SIGDIG @ -  1+   NEGATE DUP   0 MAX   >R OVER >R
  4    >R  DABS    <#   R@ 0 MAX      ?DUP
  5    IF   0  DO   #   LOOP   THEN
  6    2E HOLD      R@ 0<
  7    IF   R@ ABS  0   DO    30 HOLD   LOOP   THEN
  8    R> DROP    #S  R> SIGN   #>     R>  ;
  9
 10 : F.XR    ( f1 n2 -> )
 11    >R F->ME   <F.> DROP   R> OVER -   SPACES TYPE   ;
 12
 13 : F.X    ( f1 -> )
 14    0 F.XR   SPACE   ;
 15 DECIMAL
```

SCR #80
```
  0 ( aligned fixed point print   F.AR   F.A )
  1 HEX
  2 : F.AR    ( f1 n2 n3 -> )
  3    >R  0 MAX  >R  F->ME    SIGDIG @  OVER -  1-    R@ -   DUP 0>
  4    IF   SWAP >R  S->F   10**  F2/  F->D D+
  5       R>  <F.>  R>  - -
  6       ELSE  DROP <F.>  R>    DDUP <
  7          IF   SWAP -  3 PICK  3 PICK +   OVER   30 FILL +
  8          ELSE DDROP    THEN         THEN
  9    R>  OVER -   SPACES TYPE   ;
 10
 11 : F.A    ( f1 n2 -> )
 12    0 F.AR   SPACE   ;
 13
 14 DECIMAL
 15
```

```
SCR #81
  0 ( smart floating point prints  F.R  F.  F? )
  1 HEX
  2 : F.R     ( f1 n2 -> )
  3    >R  FDUP F->T   DUP 17 >   SWAP -4 <   OR
  4    IF  DDROP R>  F.ER
  5    ELSE DDROP  F->ME   <F.>  DROP
  6    BEGIN  DDUP + 1- @      30 =
  7    WHILE  1-   REPEAT
  8    R> OVER -  SPACES TYPE   THEN  ;
  9
 10 : F.    ( FP# -> )
 11    0 F.R SPACE ;
 12
 13 : F?      F@ F. ;
 14
 15 DECIMAL SCR #82
  0 ( SQRT  FACTORIAL )
  1 DECIMAL
  2 : SQRT    ( f1 -> f2 )
  3    FABS    F->T  TDUP TERM T!
  4    ( initial approximation is f1/2 )      ASR 1-
  5    5 0 DO   TERM T@ TOVER T/  T+  1-  LOOP
  6    T->F ;
  7
  8 : FACTORIAL   ( f1 -> f2 )
  9    FINP# 1  FSWAP  F->S  ABS
 10    1+ 1 DO   I  S->F  F*    LOOP ;
 11
 12
 13
 14
 15

SCR #83
  0 ( PI  PI/2  PI/4  2*PI  RAD->DEG  DEG->RAD )
  1 DECIMAL
  2 FINP# 3.14159265 FCONSTANT PI
  3 PI    F2/ FCONSTANT PI/2
  4 PI/2 F2/ FCONSTANT PI/4
  5 PI    F2* FCONSTANT 2*PI
  6
  7 : RAD->DEG    ( f1 -> f2 )
  8    FINP# 57.29577951 F* ;
  9
 10 : DEG->RAD    ( f1 -> f2 )
 11    FINP# 0.0174532925 F*  ;
 12
 13
 14
 15

SCR #84
  0 ( chebyshev sine routine )
  1 DECIMAL
  2 : TSIN    ( t1 -> t2 )
  3    ( input from -pi/4 TO pi/4 )
  4    TDUP  TDUP T* TERM T!
```

```
   5     TDUP TINF#  .9999999995 ( x**1 )  T*   FTERM T!
   6     TERM T@ T*   TDUP  TINF# -.1666666663 ( x**3 ) T* FTERM T+!
   7     TERM T@ T*   TDUP  TINF#  .008333328785 ( x**5 ) T* FTERM T+!
   8     TERM T@ T*   TDUP  TINF# -.0001983920268 ( x**7 ) T* FTERM T+!
   9     TERM T@ T*   TINF#  .000002717349463 ( x**9 )  T* FTERM T@ T+ ;
  10
  11
  12
  13
  14
  15

SCR #85
   0 ( chebyshev cosine routine )
   1 DECIMAL
   2 : TCOS   ( t1 -> t2 )
   3   ( input from -pi/4 to pi/4 )
   4   TDUP T* TDUP TERM T!
   5   TDUP TINF# -.4999999943 ( x**2 ) T*  FTERM T!
   6   TERM T@ T*  TDUP  TINF#  .0416666167 ( x**4 ) T* FTERM T+!
   7   TERM T@ T*  TDUP  TINF# -0.001388661862 ( x**6 ) T* FTERM T+!
   8   TERM T@ T*  TINF#  .00002437988031 ( x**8 )  T* FTERM T@ T+
   9   TINF# 1.0  T+ ;
  10
  11
  12
  13
  14
  15

SCR #86
   0 ( full range cosine and sine  <COS>  <SIN>  )
   1 DECIMAL
   2 : <COS>  ( FP# -> FP# )
   3   FABS  2*PI REM   FDUP PI F>
   4   IF  FNEGATE  2*PI F+  THEN
   5   FDUP  PI/2  F>
   6   IF  FNEGATE  PI F+  -1 >R    ELSE   1 >R  THEN
   7   FDUP  PI/4 F>
   8   IF  FNEGATE  PI/2 F+  F->T TSIN T->F
   9   ELSE  F->T TCOS T->F  THEN
  10   R> F+-  ; .
  11
  12 : <SIN>   ( f1 -> f2 )
  13   FNEGATE   PI/2 F+   <COS>  ;
  14
  15

SCR #87
   0 ( derived trig functions  <TAN> <SEC> <CSC> <COT> )
   1 DECIMAL
   2 : <TAN>   ( f1 -> f2 )
   3   FDUP <SIN>  FSWAP <COS>  F/  ;
   4
   5 : <SEC>   ( f1 -> f2 )
   6   <COS>   1/X  ;
   7
   8 : <CSC>   ( f1 -> f2 )
   9   <SIN>   1/X  ;
  10
```

```
11 : <COT>    ( f1 -> f2 )
12     FDUP <COS>  FSWAP <SIN>  F/  ;
13
14
15

SCR #88
  0 ( trig functions  COS  SIN  TAN  SEC  CSC  COT  )
  1 DECIMAL
  2 : COS    ( f1 -> f2 )
  3    DEG->RAD  <COS>  ;
  4 : SIN    ( f1 -> f2 )
  5    DEG->RAD  <SIN>  ;
  6 : TAN    ( f1 -> f2 )
  7    DEG->RAD  <TAN>  ;
  8
  9 : SEC    ( f1 -> f2 )
 10    DEG->RAD  <SEC>  ;
 11 : CSC    ( f1 -> f2 )
 12    DEG->RAD  <CSC>  ;
 13 : COT    ( f1 -> f2 )
 14    DEG->RAD  <COT>  ;
 15

SCR #89
  0 ( chebyshev arctangent routine )
  1 DECIMAL
  2 : TATAN   ( t1 -> t2 )
  3    ( input from -1 to 1 )
  4    TDUP  TDUP  T* TERM T!
  5    TDUP TINF# .9999999842 ( x**1 ) T*  FTERM T!
  6    TERM T@ T*   TDUP  TINF# -.3333306679 ( x**3 ) T* FTERM T+!
  7    TERM T@ T*   TDUP  TINF# .1999248354 ( x**5 ) T* FTERM T+!
  8    TERM T@ T*   TDUP  TINF# -.1420257041 ( x**7 ) T* FTERM T+!
  9    TERM T@ T*   TDUP  TINF# .1063675406 ( x**9 ) T* FTERM T+!
 10    TERM T@ T*   TDUP  TINF# -.0749544546 ( x**11 ) T* FTERM T+!
 11    TERM T@ T*   TDUP  TINF# .0425876076 ( x**13 ) T* FTERM T+!
 12    TERM T@ T*   TDUP  TINF# -.0160050306 ( x**15 ) T* FTERM T+!
 13    TERM T@ T*   TINF# .0028340643 ( x**17 )  T* FTERM T@ T+ ;
 14
 15

SCR #90
  0 ( basic inverse trig function  <ATAN> <ATAN2>  )
  1 DECIMAL
  2 : <ATAN>    ( f1 -> f2 )
  3    FDUP FABS  FINF# 1  F>
  4    IF  DUP >R  FINF# 1  FSWAP F/   F->T TATAN T->F
  5       FNEGATE    PI/2  R> F+-   F+
  6    ELSE  F->T TATAN T->F  THEN  ;
  7
  8 : <ATAN2>    ( fx fy -> f3 )
  9    FOVER F0=
 10    IF  >R DROP FDROP  PI/2  R> F+-
 11    ELSE  FOVER F0<
 12       IF  FDUP F0<  >R  FSWAP F/  <ATAN>  PI  R>
 13          IF  F-  ELSE  F+  THEN
 14       ELSE   FSWAP F/  <ATAN>    THEN THEN ;
 15
```

```
SCR #91
  0 ( derived inverse trig  <ASIN>  <ACOS>  <ACOT>  )
  1 DECIMAL
  2 : <ASIN>    ( f1 -> f2 )
  3   FDUP FABS  FINP# 1  F=
  4   IF  SWAP DROP  PI/2 ROT F+-
  5   ELSE  FINP# 1  FOVER  **2  F-   SQRT F/  <ATAN>  THEN  ;
  6
  7 : <ACOS>    ( f1 -> f2 )
  8   <ASIN> FNEGATE     PI/2 F+  ;
  9
 10 : <ACOT>    ( f1 -> f2 )
 11   <ATAN> FNEGATE     PI/2 F+  ;
 12
 13
 14
 15

SCR #92
  0 ( derived inverse trig  <ASEC>  <ACSC>  )
  1 DECIMAL
  2 : <ASEC>    ( f1 -> f2 )
  3   FDUP  **2  FINP#  -1   F+   SQRT  <ATAN> FSWAP     FO<
  4   IF  PI F- THEN    ;
  5
  6 : <ACSC>   ( FP# -> FP# )
  7   FDUP  FABS  FINP# 1  F=
  8   IF  SWAP DROP  PI/2  ROT F+-
  9   ELSE  FDUP  **2 FINP# -1  F+
 10      SQRT 1/X     <ATAN> FSWAP     FO<
 11      IF  PI F- THEN   THEN  ;
 12
 13
 14
 15

SCR #93
  0 ( trig functions  ACOS  ASIN  ATAN  ASEC  ACSC  ACOT  ATAN2 )
  1 DECIMAL
  2 : ACOS    ( f1 -> f2 )
  3    <ACOS>   RAD->DEG  ;
  4 : ASIN    ( f1 -> f2 )
  5    <ASIN>   RAD->DEG  ;
  6 : ATAN    ( f1 -> f2 )
  7    <ATAN>   RAD->DEG  ;
  8 : ASEC    ( f1 -> f2 )
  9    <ACSC>   RAD->DEG  ;
 10 : ACSC    ( f1 -> f2 )
 11    <ACSC>   RAD->DEG  ;
 12 : ACOT    ( f1 -> f2 )
 13    <ACOT>   RAD->DEG  ;
 14 : ATAN2    ( fx fy -> f3 )
 15    <ATAN2>   RAD->DEG  ;

SCR #94
  0 ( <P->R>  <R->P>  P->R  R->P  )
  1 DECIMAL
  2 : <P->R>    ( frad fang -> fx fy )
  3   FOVER FOVER  <SIN>  F* F>R
  4   <COS>  F* FR>  ;
```

```
  5
  6 : <R->P>   ( fx fy -> frad fang )
  7   FOVER FOVER  <ATAN2>  F>R
  8   **2 FSWAP  **2 F+  SQRT FR>  ;
  9
 10 : P->R   ( frad fang -> fx fy )
 11   DEG->RAD  <P->R>  ;
 12
 13 : R->P   ( fx fy -> frad fang )
 14   <R->P>  RAD->DEG ;
 15

SCR #95
  0
  1
  2
  3
  4
  5
  6
  7
  8
  9
 10
 11
 12
 13
 14
 15

SCR #96
  0 ( Calculation speed and accuracy benchmark )
  1 ( Adapted from BYTE magazine )
  2 (    Volume 10, No. 5, MAY 1985, page 282 )
  3 FINP# 2.71828 FCONSTANT FA
  4 FINP# 3.14159 FCONSTANT FB
  5
  6 : CALCULATIONS   ( -> )
  7    FINP# 1.0
  8    5000 0 DO     FA F*   FB  F*
  9                  FA F/   FB  F/    LOOP
 10   ( CR  ." DONE" CR )  ."    ERROR="  FINP# 1.0  F- F.  ;
 11
 12
 13
 14
 15

SCR #97
  0 \ Trig table test  -- This is a good stress of the board!
  1 DECIMAL
  2 : TEST-TRIG  ( -> )
  3    CR
  4    ."    X          SIN(X)        COS(X)           TAN(X)" CR
  5    ."   ====     ==========    ==========       ===========" CR
  6    361 0 DO
  7       I S->F  FDUP    5 F.R
  8       FDUP   SIN   7 12 F.AR
  9       FDUP   COS   7 12 F.AR
 10              TAN   7 17 F.AR    CR
```

```
 11        PAUSE ?TERMINAL IF LEAVE THEN
 12   LOOP ;
 13
 14
 15

SCR #98
  0
  1
  2
  3
  4
  5
  6
  7
  8
  9
 10
 11
 12
 13
 14
 15
```

APPENDIX B

TABLE 1a.

MICROCODE BIT FORMAT:

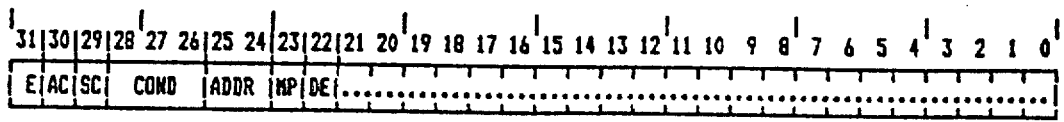

BITS    CONTENTS

31     END
           Microassembler Keyword: END    (default is no end)
           When =0, latch PCSAVE and conditionally increment PC for FORTH NEXT operation

30     NOT - ALU Carry-in    0=Cy in set. Automatically set by microassembler ALU=xxx function

29     Shift Carry-in    Microassembler Keywords: SC=0  SC=1  (default=1)
           If SC=1, Shift-in to DHI(hi end) for shift-right is the ALU carry-out from last instruction
           (1 for non-plus/minus ops). SC=0 forces a zero shift in for current AND next clock cycles.

26-28  CONDITION code select for next micro-address generation. Lowest bit 1 if condition is true.

| VALUE | MNEUMONIC | FUNCTION |
|---|---|---|
| 0 | xx0 | Force 0 |
| 1 | xxCA | NOT-Carry-Out of ALU |
| 2 | xxCB | Shift-Out of DHI (Shift Left) |
| 3 | xxCC | Shift-Out of DLO (Shift Right) |
| 4 | xxCD | Shift-Out of DHI (Shift Right) |
| 5 | xxS | Sign bit of ALU output |
| 6 | xxE | Equal bit of ALU output (AND of all output bits) |
| 7 | xx1 | Force 1 |

Microassembler default selection is xx0 or xx1 as appropriate to select next micro-address after the current instruction address.

Note: Condition codes are based on conditions at the END of the LAST clock cycle before JMP.

24-25 Micro-address constant inputs. Together with CONDITION, this forms bottom 3 bits of the next micro-address. Microassembler Keywords: JMP=xxx  (e.g. JMP=01CA , JMP=110 )

```
000 ]
001 |
... +- The constants from 0 to 7 force a constant next address.
110 |   The micro-assembler automatically increments the current address to get
111 ]   the next address unless a JMP command is used. These are a special case
        of conditional jumps that use conditions codes 0 and 7.

00x ]
01x +- These are conditional jumps. The odd/even address selection is made
10x |  by using the condition code selected by the "x" as the lowest address bit
11x ]
```

23 Increment MPC. Microprogram counter is incremented at the end of the current cycle when this bit is 0.
   Microassembler Keyword: INC[MPC]   default is no increment 22 DECODE bit. The decode bit, when 0, performs the first half of the FORTH NEXT function (the second half of the function is performed by END) The next instruction is read from RAM. If the highest 8 bits of the data are all 1, then the data from RAM is clocked into the MPC and PC is incremented by END (microinstruction reference.) Otherwise, MPC is cleared so that DOCOL is executed (high-level definition reference.)

Microassembler Keyword: DECODE   default is no decode

Note: The instruction after the DECODE instruction (i.e. the last instruction executed in the micro-code definition) must contain the Microassembler Keyword: END to force a JMP=000 condition and conditionally increment PC.

TABLE 1b.

MICROCODE FORMAT:

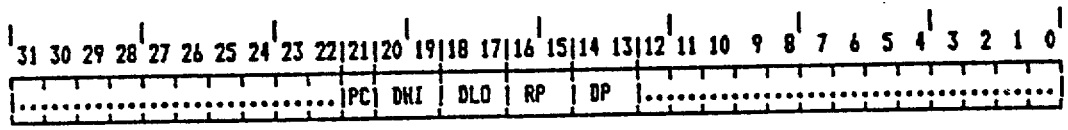

BITS   CONTENTS

21    Increment PC unconditionally. This is an independent increment from the one used by END, which is a conditional increment. Increments at end of clock cycle.
      0 = increment   1 = no increment
                     Microassembler Keyword: INC[PC]   default is no increment 19-20 DHI shift right/left control bits. The shift is accomplished at the end of the clock cycle, and the resulting data in DHI may be used for ALU input in the next clock cycle.

| VALUE | FUNCTION | Microassembler Keyword |
      |-------|----------|------------------------|
      | 0     | load     | DEST=DHI               |
      | 1     | left     | SL[DHI]                |
      | 2     | right    | SR[DHI]                |
      | 3     | nop      | none - default value   |

17-18 DLO shift right/left control bits. The functions are the same as bits 19-20, except the operation is performed on DLO

| VALUE | FUNCTION | Microassembler Keyword |
|---|---|---|
| 0 | load | DEST=DLO |
| 1 | left | SL[DLO] |
| 2 | right | SR[DLO] |
| 3 | nop | none - default value |

15-16  RP increment/decrement control. The increment/decrement is at end of current clock cycle.

| VALUE | FUNCTION | Microassembler Keyword |
|---|---|---|
| 0 | count down | DEC[RP] |
| 1 | count up | INC[RP] |
| 2 | nop | none - default value |
| 3 | unused | |

( bit 15 = ENB, bit 16 = U/D)

13-14  DP increment/decrement control. The increment/decrement is at end of current clock cycle.

| VALUE | FUNCTION | Microassembler Keyword |
|---|---|---|
| 0 | count down | DEC[DP] |
| 1 | count up | INC[DP] |
| 2 | nop | none-default value |
| 3 | unused | |

TABLE 1c.

MICROCODE FORMAT:

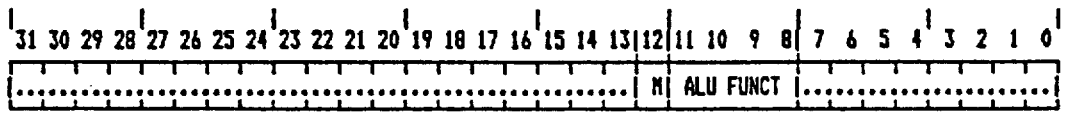

| BITS | CONTENTS |
|---|---|
| 12 | ALU MODE (see ALU function table below for amplification) |
| 8-11 | ALU FUNCTION. Selects ALU= function.  Microassembler sets Mode and Function together. |

| MODE | FUNCTION | KEYWORD | MODE | FUNCTION | KEYWORD(AC=0) | KEYWORD(AC=1) |
|---|---|---|---|---|---|---|
| 1 | 0 | ALU=notA | 0 | 0 | | A+1 |
| 1 | 1 | AnorB | 0 | 1 | | |
| 1 | 2 | | 0 | 2 | | |
| 1 | 3 | 0 | 0 | 3 | | |
| 1 | 4 | AnandB | 0 | 4 | | |
| 1 | 5 | notB | 0 | 5 | | |
| 1 | 6 | AxorB | 0 | 6 | A-B-1 | A-B |
| 1 | 7 | | 0 | 7 | | |
| 1 | 8 | | 0 | 8 | | |
| 1 | 9 | AxnorB | 0 | 9 | A+B | A+B+1 |
| 1 | 10 | B | 0 | 10 | | |
| 1 | 11 | AandB | 0 | 11 | | |
| 1 | 12 | -1 | 0 | 12 | A+A | A+A+1 |
| 1 | 13 | - | 0 | 13 | | |
| 1 | 14 | AorB | 0 | 14 | | |
| 1 | 15 | A | 0 | 15 | A-1 | |

Notes: The Equal condition bit is set only if all 16 output bits of the ALU are 1.
       The Sign condition bit is set only if bit 15 of the ALU output is 1.

What we claim is:

1. A writable instruction set computer for use with a host computer having user input/output means for inputting individual command signals, said writable instruction set computer comprising:
- a single data bus means;
- addressable and writable main program memory means coupled to said bus means for storing data from and loading stored data onto said bus means;
- addressable and writable microprogram memory means coupled to said bus means for storing microcode;
- microinstruction register means coupled to said microprogram memory means and to said bus means for storing microinstructions output from said microprogram memory means;
- arithmetic logic unit means coupled to said bus means for performing operations on data as defined by microcode stored in said microprogram memory means;
- stack memory means coupled to said bus means for storing temporarily information used during program execution independent of said main memory means;
- clock means for generating a single-cycle clock signal for each individual command signal transmitted from the host computer to said clock means;
- execution control logic means, responsive to the clock signal and coupled to said bus means, for performing a single data transfer on said bus means for each clock signal cycle, and for executing a single operation, defined by a microprogram instruction, for each discontinuous single-cycle clock signal; and
- interface means coupled to said bus means and to said clock-signal generating means for connecting said bus means to the host computer for inputting microinstructions from the host computer directly into said microinstruction register means via said bus means for executing the microinstructions stored in said microinstruction register means in a single-step mode.

2. A writable instruction set computer comprising:
- a single data bus means;
- addressable and writable main program memory means coupled to said bus means for storing data from and loading stored data onto said bus means;
- addressable and writable microprogram memory means coupled to said bus means for storing microcode, including instructions comprising only one of an opcode and a subroutine address, wherein opcodes are identified by a plurality of bits of a word, which bits have predetermined values, thereby leaving other values of those bits for specifying subroutine addresses;
- arithmetic logic unit means coupled to said bus means for performing operations on data as defined by microcode stored in said microprogram memory means;
- stack memory means coupled to said bus means for storing temporarily information used during program execution independent of said main memory means;
- clock means for generating a cyclic clock signal; and
- execution control logic means, responsive to the clock signal and coupled to said bus means, for performing a single data transfer on said bus means for each clock signal cycle.

* * * * *

UNITED STATES PATENT AND TRADEMARK OFFICE
CERTIFICATE OF CORRECTION

PATENT NO. : 4,980,821
DATED : December 25, 1990
INVENTOR(S) : Koopman, et al

It is certified that error appears in the above-indentified patent and that said Letters Patent is hereby corrected as shown below:

Title page, item [54], and column 1, line 1, replace "STOCK-MEMORY-

BASED" with --STACK-MEMORY-BASED--.

Signed and Sealed this

Third Day of August, 1993

Attest:

MICHAEL K. KIRK

Attesting Officer

Acting Commissioner of Patents and Trademarks